(12) United States Patent
Cui et al.

(10) Patent No.: US 12,166,916 B2
(45) Date of Patent: Dec. 10, 2024

(54) PRIVACY PROTECTION METHOD FOR ELECTRONIC DEVICE AND ELECTRONIC DEVICE

(71) Applicant: HUAWEI TECHNOLOGIES CO., LTD., Shenzhen (CN)

(72) Inventors: Xiaoying Cui, Shanghai (CN); Junqing Luo, Shanghai (CN); Zhishan Zhuang, Shanghai (CN); Xiaomei Wang, Shanghai (CN); Chuan Qin, Shenzhen (CN); Shaojun Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 17/631,173

(22) PCT Filed: Jul. 29, 2020

(86) PCT No.: PCT/CN2020/105420
§ 371 (c)(1),
(2) Date: Jan. 28, 2022

(87) PCT Pub. No.: WO2021/018169
PCT Pub. Date: Feb. 4, 2021

(65) Prior Publication Data
US 2022/0269800 A1    Aug. 25, 2022

(30) Foreign Application Priority Data

Jul. 30, 2019 (CN) .......................... 201910696931.2
Sep. 19, 2019 (CN) .......................... 201910888137.8

(51) Int. Cl.
G06V 40/16    (2022.01)
G06F 21/62    (2013.01)
H04M 1/72463  (2021.01)

(52) U.S. Cl.
CPC ........ *H04M 1/72463* (2021.01); *G06F 21/62* (2013.01); *G06V 40/161* (2022.01); *G06V 40/167* (2022.01); *G06V 40/172* (2022.01)

(58) Field of Classification Search
CPC ....... H04M 1/72463; H04M 1/724631; H04M 2250/52; G06F 21/62; G06F 21/6245;
(Continued)

(56) References Cited

U.S. PATENT DOCUMENTS 10,182,179 B2 * 1/2019 Kosaka ................. G06F 3/1238
2014/0201844 A1 * 7/2014 Buck ..................... G06F 21/554
726/26
(Continued)

FOREIGN PATENT DOCUMENTS

CN    102880560 A    1/2013
CN    103678979 A    3/2014
(Continued)

*Primary Examiner* — Khoi V Le
(74) *Attorney, Agent, or Firm* — Maier & Maier, PLLC

(57) ABSTRACT

A privacy protection method for the electronic device includes: starting face change detection, where the face change detection is continuously detecting, in a current unlocking period, whether a face in front of a display of the electronic device changes; after starting the face change detection, detecting an operation of starting a first private application; and in response to the operation and determining that a result of the face change detection is that the current face does not change, displaying first private content corresponding to the first private application; or in response to the operation and determining that a result of the face change detection is that the current face changes, displaying first non-private content, where the first non-private content does not include first private content.

18 Claims, 106 Drawing Sheets

(58) Field of Classification Search
CPC .. G06F 21/84; G06F 21/32; G06F 2221/2139; G06F 9/451; G06V 40/161; G06V 40/167
See application file for complete search history.

(56) References Cited

U.S. PATENT DOCUMENTS

| | | | |
|---|---|---|---|
| 2015/0261996 A1* | 9/2015 | Kim | H04N 23/64 348/14.03 |
| 2016/0358015 A1* | 12/2016 | Dhua | G06F 16/784 |
| 2017/0154207 A1* | 6/2017 | Sasaki | G06F 21/6245 |
| 2019/0114060 A1* | 4/2019 | Resudek | G06F 18/22 |

FOREIGN PATENT DOCUMENTS

| | | | |
|---|---|---|---|
| CN | 104915012 A | 9/2015 | |
| CN | 105554226 A | 5/2016 | |
| CN | 106960147 A | 7/2017 | |
| CN | 107169329 A | 9/2017 | |
| CN | 107609366 A | 1/2018 | |
| CN | 107609373 A | 1/2018 | |
| CN | 108021825 A | 5/2018 | |
| CN | 108038363 A | 5/2018 | |
| CN | 108133133 A | 6/2018 | |
| CN | 109871706 A | 6/2019 | |
| EP | 2713298 A1 | 4/2014 | |
| WO | 2018212801 A1 | 11/2018 | |
| WO | 2018235578 A1 | 12/2018 | |

\* cited by examiner

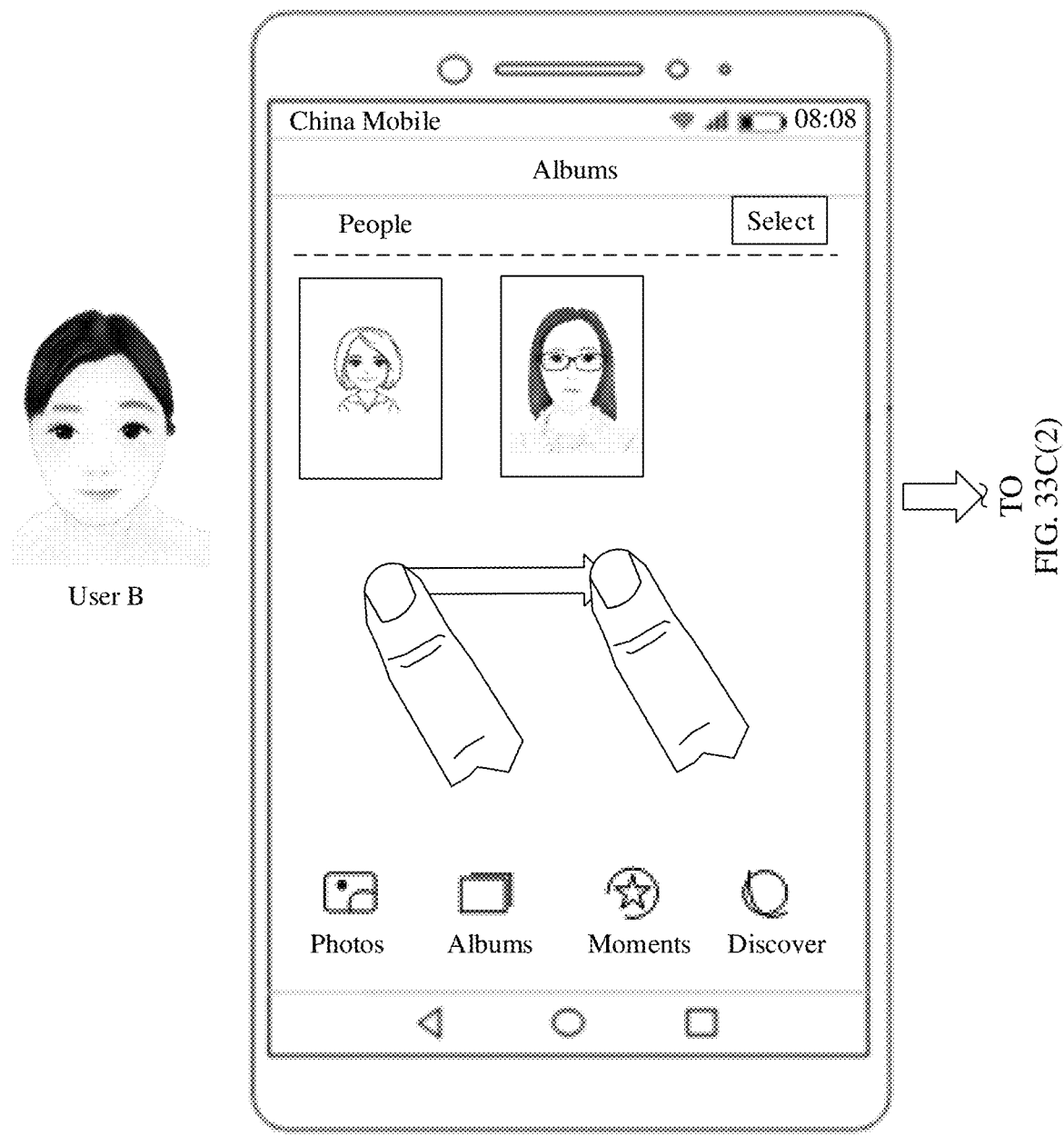
FIG. 33C(1)

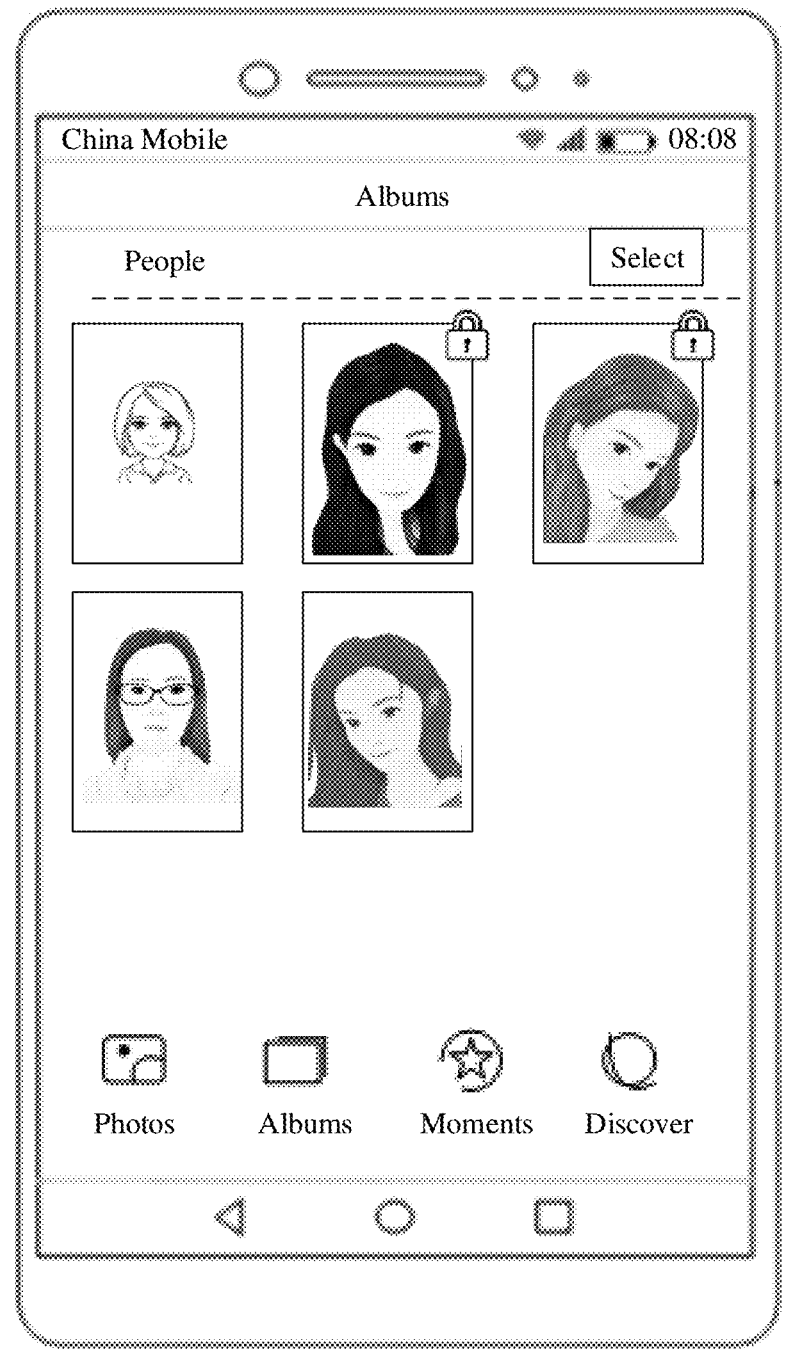
FIG. 33C(2)

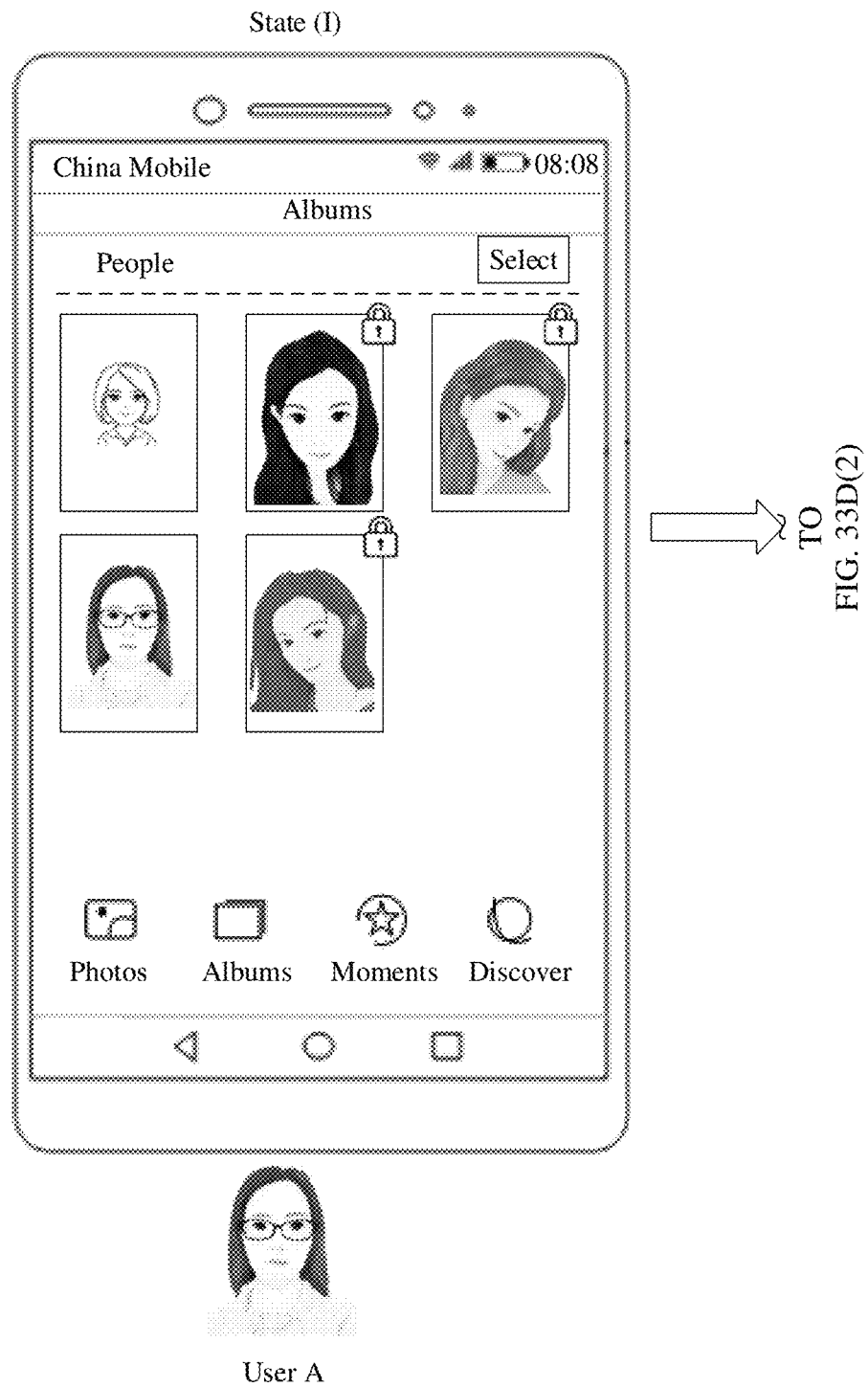
FIG. 33D(1)

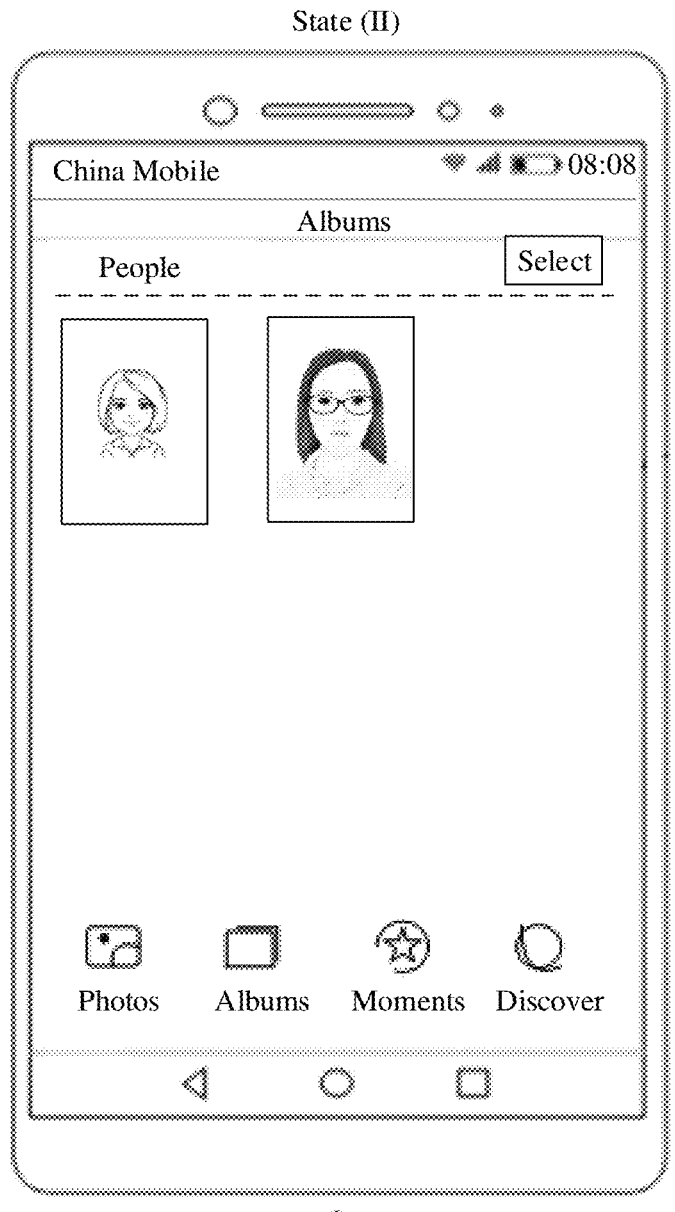
FIG. 33D(2)

State (III)

CONT. FROM FIG. 34B

User A

PRIVACY PROTECTION METHOD FOR ELECTRONIC DEVICE AND ELECTRONIC DEVICE

This application claims priority to Chinese Patent Application No. 201910696931.2, filed with the China National Intellectual Property Administration on Jul. 30, 2019 and entitled "DISPLAY METHOD AND ELECTRONIC DEVICE", and Chinese Patent Application No. 201910888137.8, filed with the China National Intellectual Property Administration on Sep. 19, 2019, and entitled "PRIVACY PROTECTION METHOD FOR ELECTRONIC DEVICE AND ELECTRONIC DEVICE", both of which are incorporated herein by reference in their entireties.

TECHNICAL FIELD

The embodiments relate to the field of information security, and in particular, to a privacy protection method for an electronic device, an electronic device, a computer-readable storage medium, a computer program product, and a chip.

BACKGROUND

With popularity of electronic devices, and in particular, popularity of intelligent mobile terminals such as mobile phones, more applications are integrated in mobile phones, relating to various aspects of people's daily life, such as instant messaging and mobile payment. To ensure privacy security or property security of a user, application locks may be set for some applications, and the applications can be used only after the user decrypts the applications (for example, face authentication succeeds).

In the prior art, when a face recognition mode is used to unlock an application lock, an electronic device first detects an operation of starting a private application by a user, then starts a front-facing camera to capture a face image in front of a display and performs face recognition on the face image. When the face recognition succeeds, the private application is started, and identity authentication needs to be performed each time the user starts the private application. Although privacy is protected, a speed of responding to a user operation by the private application is reduced due to a large quantity of authentication times.

SUMMARY

This application provides a privacy protection method for an electronic device, an electronic device, a computer-readable storage medium, a computer program product, and a chip, to improve efficiency of responding to a user operation by a private application while ensuring private application security.

According to a first aspect, an embodiment provides an electronic device, including:
one or more processors;
a memory;
a plurality of applications; and
one or more computer programs, where the one or more computer programs are stored in the memory, the one or more computer programs include instructions, and when the instructions are executed by the electronic device, the electronic device is enabled to perform the following steps:
starting face change detection, where the face change detection is continuously detecting, in a current unlocking period, whether a face in front of a display of the electronic device changes, and the current face in front of the display of the electronic device does not match a reference face;
after starting the face change detection, detecting an operation of starting a first private application; and
in response to the operation and determining that a result of the face change detection is that the current face does not change, displaying first private content corresponding to the first private application; or
in response to the operation and determining that a result of the face change detection is that the current face changes, displaying first non-private content, where the first non-private content does not include first private content.

According to a second aspect, an embodiment provides an electronic device, including:
one or more processors;
a memory;
a plurality of applications; and
one or more computer programs, where the one or more computer programs are stored in the memory, the one or more computer programs include instructions, and when the instructions are executed by the electronic device, the electronic device is enabled to perform the following steps:
starting face change detection, where the face change detection is continuously detecting, in a current unlocking period, whether a face in front of a display of the electronic device changes, and the current face in front of the display of the electronic device does not match a reference face;
displaying a first icon corresponding to a first private picture in a gallery application; and
in response to determining that a result of the face change detection is that the current face changes, hiding the first icon corresponding to the first private picture.

According to a third aspect, an embodiment provides an electronic device, including:
one or more processors;
a memory;
a plurality of applications; and
one or more computer programs, where the one or more computer programs are stored in the memory, the one or more computer programs include instructions, and when the instructions are executed by the electronic device, the electronic device is enabled to perform the following steps: starting face change detection, where the face change detection is continuously detecting, in a current unlocking period, whether a face in front of a display of the electronic device changes, and the the current face in front of the display of the electronic device does not match a reference face; and
after starting the face change detection, and when displaying a first display interface:
in response to receiving a new message from a first private application, and a result of the face change detection being that the current face changes, skipping displaying the new message on the first display interface, or displaying only a part of content of the new message on the first display interface; or
in response to receiving a new message from a first private application, and a result of the face change detection being that the current face does not change, displaying the new message on the first display interface.

According to a fourth aspect, an embodiment provides a privacy protection method for an electronic device, where the method includes:

starting face change detection, where the face change detection is continuously detecting, in a current unlocking period, whether a face in front of a display of the electronic device changes, and the the current face in front of the display of the electronic device does not match a reference face;

after starting the face change detection, detecting an operation of starting a first private application; and in response to the operation and determining that a result of the face change detection is that the current face does not change, displaying first private content corresponding to the first private application; or in response to the operation and determining that a result of the face change detection is that the current face changes, displaying first non-private content, where the first non-private content does not include first private content.

According to a fifth aspect, an embodiment provides a privacy protection method for an electronic device, where the method includes:

starting face change detection, where the face change detection is continuously detecting, in a current unlocking period, whether a face in front of a display of the electronic device changes, and the current face in front of the display of the electronic device does not match a reference face;

displaying a first icon corresponding to a first private picture in a gallery application; and in response to determining that a result of the face change detection is that the current face changes, hiding the first icon corresponding to the first private picture.

According to a sixth aspect, an embodiment provides a privacy protection method for an electronic device, where the method includes:

starting face change detection, where the face change detection is continuously detecting, in a current unlocking period, whether a face in front of a display of the electronic device changes, and the current face in front of the display of the electronic device does not match a reference face; and after starting the face change detection, and when displaying a first display interface:

in response to receiving a new message from a first private application, and a result of the face change detection being that the current face changes, skipping displaying the new message on the first display interface, or displaying only a part of content of the new message on the first display interface; or in response to receiving a new message from a first private application, and a result of the face change detection being that the current face does not change, displaying the new message on the first display interface.

According to a seventh aspect, an embodiment provides a computer-readable storage medium including instructions. When the instructions are run on an electronic device, the electronic device is enabled to perform the method described in any embodiment.

According to an eighth aspect, an embodiment provides a computer program product including instructions. When the computer program product runs on an electronic device, the electronic device is enabled to perform the method described in any embodiment.

According to a sixth aspect, an embodiment provides a chip including instructions. When the instructions are run on the chip, the chip is enabled to perform the method according to any one of the embodiments.

BRIEF DESCRIPTION OF DRAWINGS

FIG. 33A to FIG. 33F are interface change diagrams of the electronic device based on the privacy protection method for the electronic device shown in FIG. 32;

DESCRIPTION OF EMBODIMENTS

The following describes the solutions in the embodiments with reference to the accompanying drawings. In the descriptions in the embodiments, unless otherwise specified, "/" means "or". For example, A/B may represent A or B. In the embodiments, "and/or" describes only an association relationship between associated objects and represents that three relationships may exist. For example, A and/or B may represent the following three cases: only A exists, both A and B exist, and only B exists.

The following terms "first" and "second" are merely intended for a purpose of description and shall not be understood as an indication or implication of relative importance or implicit indication of a quantity of indicated features. Therefore, a feature limited by "first" or "second" may explicitly or implicitly include one or more features. In the descriptions of the embodiments, unless otherwise specified, "a plurality of" means two or more than two.

Application scenarios related to the embodiments are described below. An electronic device is equipped with components such as a camera, a microphone, a global positioning system (GPS) chip, and various sensors (for example, a magnetic field sensor, a gravity sensor, and a gyro sensor) configured to sense an external environment, an action of a user, and the like. The electronic device provides personalized and scenario-based service experience for the user based on the sensed external environment and the action of the user. The camera can obtain rich and accurate information, so that the electronic device senses the external environment and the action of the user. An embodiment provides an electronic device. The electronic device may be implemented as any one of the following devices including a camera: digital display products such as a mobile phone, a tablet computer (pad), a portable game console, a personal digital assistant (PDA), a notebook computer, an ultra mobile personal computer (UMPC), a handheld computer, a netbook, a vehicle-mounted media playback device, a wearable electronic device, a virtual reality (VR) terminal device, and an augmented reality (AR) terminal device.

Figure 1:
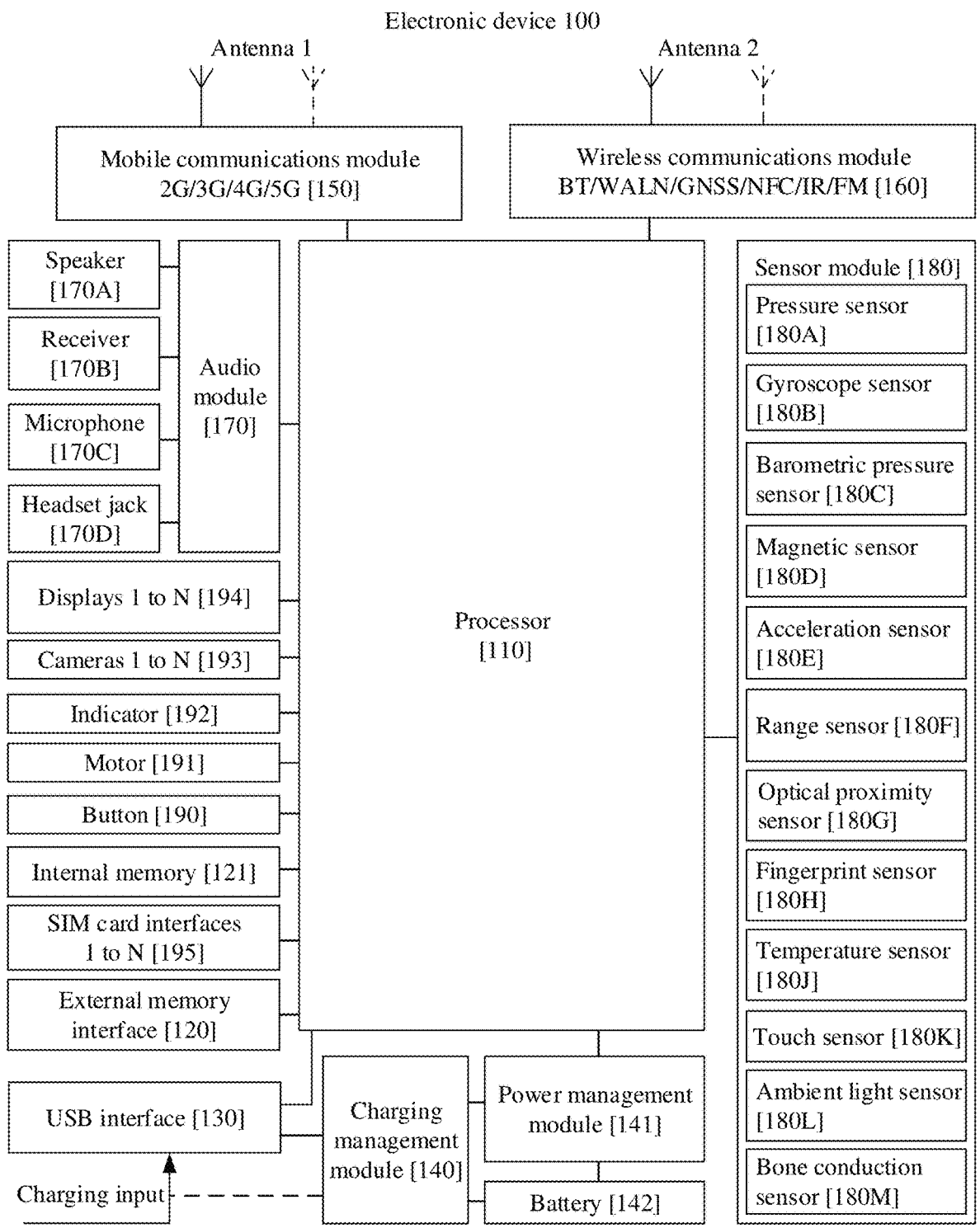
FIG. 1 is a schematic diagram of a structure of an electronic device according to an embodiment.

FIG. 1 is a schematic diagram of a structure of an electronic device 100 according to an embodiment.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments does not constitute a limitation on the electronic device 100. In some other embodiments, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural network processing unit (NPU). Different processing units may be independent components or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110 and is configured to store instructions and data.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in the embodiments is merely an example for description and does not constitute a limitation on the structure of the electronic device 100. In some other embodiments, the electronic device 100 may alternatively use an interface connection manner different from that in this embodiment, or a combination of a plurality of interface connection manners.

The charging management module 140 is configured to receive a charging input from a charger. The charger may be a wireless charger or a wired charger.

The power management module 141 is configured to connect the battery 142 and the charging management module 140 to the processor 110. The power management module 141 receives an input from the battery 142 and/or the charging management module 140, and supplies power to the processor 110, the internal memory 121, an external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (LNA), and the like.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and then transferred to the application processor.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology.

The electronic device 100 implements a display function by using the GPU, the display 194, the application processor, and the like. The GPU is a microprocessor for image processing and is connected to the display 194 and the application processor. The GPU is configured to perform mathematical and geometric calculation and render an image. The processor 110 may include one or more GPUs that execute program instructions to generate or change display information.

The display 194 is configured to display an image, a video, and the like. In some embodiments, the electronic device 100 may include one or N displays 194, where N is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera 193 through a lens. An optical signal is converted into an electrical signal. The photosensitive element of the camera 193 transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

Figure 2:
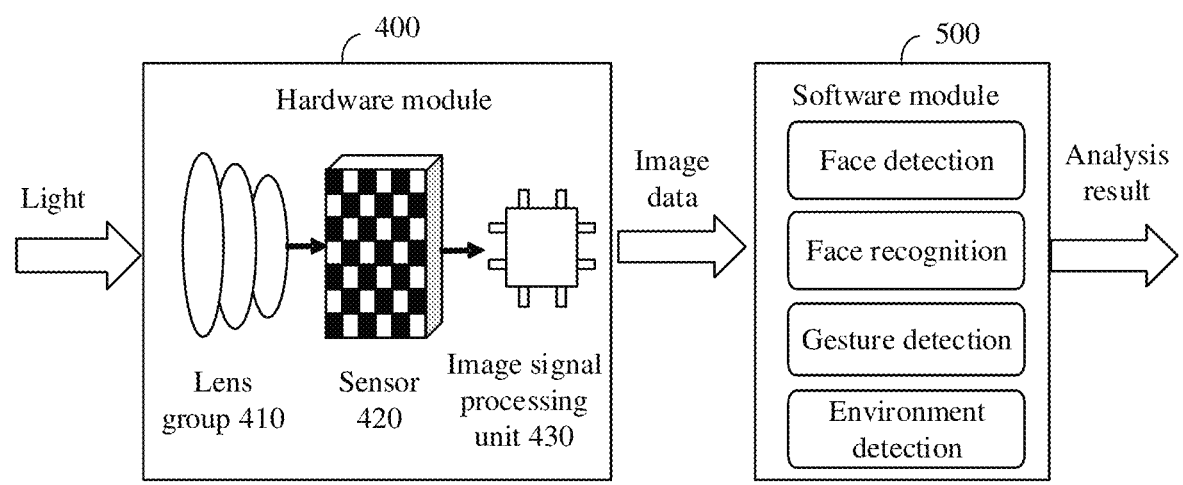
FIG. 2 is a schematic diagram of a structure of a hardware module and a software module of a camera according to an embodiment.
Figure 3:
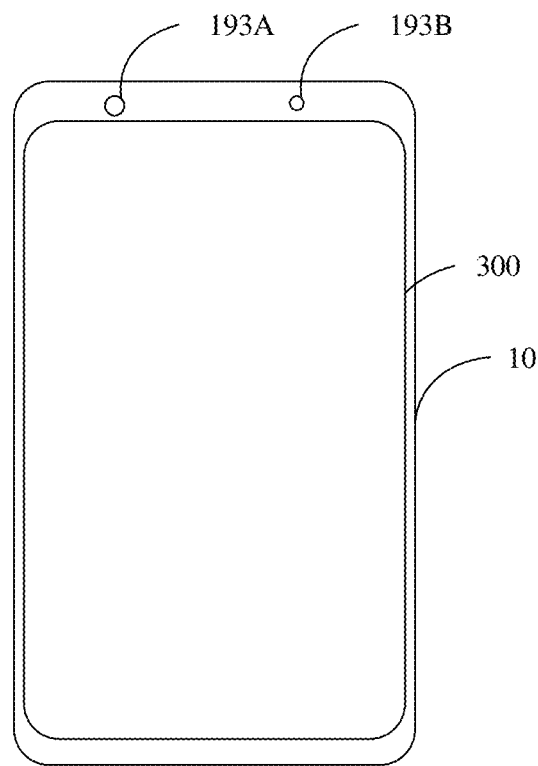
FIG. 3 is a diagram of a structure of another electronic device according to an embodiment.

The camera 193 is configured to capture a static image or a video. An optical image of an object is generated through the lens and is projected onto the photosensitive element. The photosensitive element is an image sensitive element array in a sensor 420 described in FIG. 2. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1. The N cameras 193 may include a low-power camera 193A and a front-facing camera 193B shown in FIG. 3. The low-power camera 193A may be a camera visible on a front panel of the electronic device 100 shown in FIG. 3 or may be an under-display camera. Similarly, the front-facing camera 193B may be a camera visible on the front panel of the electronic device 100 or may be an under-display camera.

The low-power camera 193A may be an infrared camera, and outputs a black-and-white image. A time interval at which the low-power camera 193A captures an image is longer than that of the common front-facing camera 193B, a color depth of the captured image is lower than that of the common front-facing camera 193B, and a resolution of the captured image is also lower than that of the common front-facing camera 193B. Therefore, power consumption of the low-power camera 193A is lower than that of the common front-facing camera 193B. The low-power camera 193A is configured to sense an external environment and an action of a user. The front-facing camera 193B may be configured to capture a face for face recognition, and further implement unlocking, identity authentication, application unlocking, and the like of the electronic device 100.

For example, a resolution of the low-power camera 193A is 100,000 pixels, and generally does not exceed mega pixels. For example, the resolution of the image shot by the low-power camera 193A is 200×200 (that is, a pixel value on each side of the shot image is 200), 640×480 (that is, 640 pixels on one side and 480 pixels on another side). A resolution of an image captured by a camera in the prior art is usually 10 mega pixels. Therefore, processing power consumption of the low-power camera 193A is much lower than that of the camera in the prior art. A capture frequency of the low-power camera 193A is also far lower than that of the camera in the prior art. For example, the capture frequency of the low-power camera is 5 to 15 frames per second, but a capture frequency of a common camera is higher than 30 frames per second. Therefore, capture energy consumption of the low-power camera is also greatly reduced. The capture energy consumption of the low-power camera 193A is only about 1/10 of capture energy consumption of the common camera in the prior art or the front-facing camera 193B.

A resolution of an image shot by the front-facing camera 193B is 2560×1920, that is, a pixel value in a width direction of the shot image is 2560 and a pixel value in a height direction is 1920. A color depth of image data output by a sensor of a camera 100 is 4 bits, and image data of 16 levels (2 raised to the power of 4) of white or one of three primary colors (red, green, and blue) may be output on each pixel. Further, a related parameter (for example, a resolution or a color depth) or the like of the front-facing camera 193B may be further set to another value. This is not limited in this embodiment.

The low-power camera 193A may capture an image at a first frequency and determine whether a face included in the image changes. For example, the first frequency may be but is not limited to 10 frames per second. The front-facing camera 193B may capture an image at a second frequency. The second frequency is higher than the first frequency, and the second frequency, for example, may be but is not limited to 30 frames per second. In other words, a time interval at which the low-power camera 193A captures an image is longer than a time interval at which the front-facing camera 193B captures an image.

Figure 4:
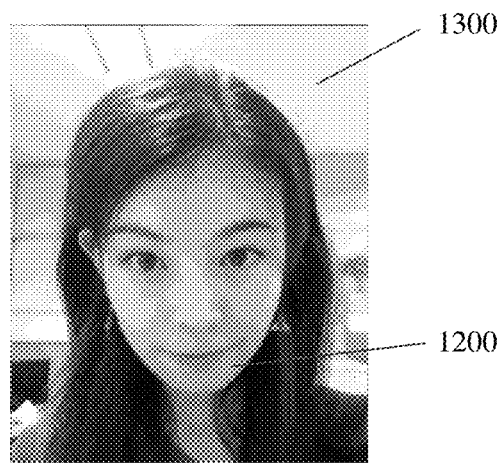
FIG. 4 is a schematic diagram of a face captured by a low-power camera according to an embodiment.

FIG. 4 is a schematic diagram of an image shot by the low-power camera 193A according to an embodiment. As shown in FIG. 4, because the low-power camera 193A has a low color depth and the shot image has a low resolution, only a face 1200 can be recognized after image recognition is performed on the face captured by the low-power camera 193A, and a round face, an oval face, or a square face can be distinguished. Optionally, face features having great differences may be further distinguished. For example, thick eyebrows and pale eyebrows, and large eyes and small eyes may be distinguished. However, after image recognition, the electronic device 100 cannot distinguish detail features, for example, whether there are double-fold eyelids.

Optionally, after the image recognition, the electronic device 100 cannot recognize an environment 1300 in which the electronic device 100 is located or can only determine that an environment 1300 in which the electronic device 100 is located is indoor or outdoor.

Because the low-power camera 193A has a lower color depth than the front-facing camera 193B and an image sensitive element array of the low-power camera 193A enables the shot image to have a lower resolution and carry less information, in comparison with the image shot by the front-facing camera 193B and having rich information, using the image shot by the low-power camera 193A for face change detection can reduce harms caused by "being normally on" and leakage to security and privacy of user information, and improve security of the user information, and can ensure real-time tracking, thereby improving privacy protection security.

To sense the external environment and the action of the user, the low-power camera 193A may be normally on when the electronic device 100 in a power-on state. That the low-power camera 193A is normally on means that when the electronic device 100 is powered on and in a working state, the camera 193A is always in a working state without being invoked, and can capture image data, and the electronic device 100 can perform image recognition based on the captured image data. When the electronic device 100 is in the power-on state, the display may be in a screen-off state or may be in a screen-on state. The electronic device 100 is in the screen-off state after being powered on, and the electronic device 100 can still receive a message (such as an instant application message) and can also perform functions such as positioning and step counting. In this case, the camera 193A that is normally on in the electronic device 100 is also in the working state to capture image data. The electronic device 100 can perform image recognition based on the captured image data, so that the electronic device 100 senses the external environment, the action of the user, and the like. The electronic device 100 is in the screen-on state after being powered on, and the low-power camera 193A is similarly also in the working state to capture image data. The electronic device 100 is in the screen-on state after being powered on. The low-power camera 193A may be enabled when the electronic device 100 starts a private application, and the low-power camera 193A subsequently remains in the working state to capture image data. The private application is an application in which a permission of an authorized user (an owner or a person authorized by an owner) is not limited when the application is used, but an unauthorized user cannot use the application or has a limited permission to use the application.

Generally, the private application may be, for example, an album, contacts, SMS, instant chat software, or payment software. The user may set a private picture folder (which can store pictures or videos) in the album, set a private contact in the contacts, set the payment software as a private application, and the like. After detecting that the current user is an authorized user, the electronic device 100 may display private content. After detecting that the current user is not an authorized user, the electronic device 100 may not display private content.

The following describes concepts related to the embodiments.

(1) Resolution

For cameras with a same focal length, an image output by a camera with more pixels contains more details, and the image is clearer. The image resolution may be expressed as a quantity of pixels in each direction. For example, a resolution of 640×480 indicates that a quantity of pixels in a width direction of an image shot by the camera is 640, and that a quantity of pixels in a height direction is 480, and the image may be shot by a camera with 307,200 pixels (about 300,000 pixels). For another example, an image with a resolution of 1600×1200 may be shot by a camera with 1,920,000 pixels.

In the embodiments, the resolution of the image shot by the camera 193 is determined by a quantity of image sensitive elements in an image sensitive element array in the camera 193. For the description of the image sensitive element array, refer to the example description described in FIG. 2. For example, if the image sensitive element array of the camera 193 is a 128×96 array, the resolution of the image shot by the camera 193 is 128×96.

(2) Color Depth

The color depth is also referred to as a quantity of color bits, in units of binary bits (bits), indicating a quantity of recorded color tones. If an image has a higher color depth and a larger color range, the image can reproduce details of bright and dark parts of each color in a real scene more finely. For example, an image with a color depth of 24 bits can theoretically represent 16,777,216 (2 raised to the power of 24) colors.

Image data with a color depth is calculated by using a demosaic algorithm and using image data with another color depth that is output by a sensor of the camera 193, and the color depth of the image data output by the sensor of the camera 193 determines the color depth of the image. Generally, the image data output by the sensor of the camera 193 is at least an 8-bit color depth, that is, white or one of three primary colors (red, green, and blue) is divided into 256 different levels (2 raised to the power of 8). Therefore, if the image data output by the sensor of the camera 193 has a higher color depth, the color depth of the shot image is higher, the image can reproduce the colors more realistically, and the image carries more information about a photographed object.

The digital signal processor is configured to process a digital signal and may further process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos in a plurality of coding formats, for example, moving picture experts group (MPEG)-1, MPEG-2, MPEG-3, and MPEG-4.

The NPU is a neural network (NN) computing processor, quickly processes input information by referring to a structure of a biological neural network, for example, by referring to a transfer mode between human brain neurons and may further continuously perform self-learning. The NPU can implement applications such as intelligent cognition of the electronic device 100, for example, image recognition, facial recognition, speech recognition, and text understanding. For example, a face detection example, a face recognition example, a gesture detection example, and an environment detection example are implemented.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. In addition, the internal memory 121 may include a high-speed random access memory and may further include a nonvolatile memory.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output and is also configured to convert an analog audio input into a digital audio signal. The audio module 170 may be further configured to code and decode an audio signal.

The speaker 170A, also referred to as a "horn", is configured to convert an audio electrical signal into a sound signal. The electronic device 100 may be used to listen to music or answer a call in a hands-free mode through the speaker 170A.

The receiver 170B, also referred to as an "earpiece", is configured to convert an audio electrical signal into a sound signal. When the electronic device 100 answers a call or listens to a voice message, the receiver 170B may be placed near a human ear to listen to a voice.

The microphone 170C, also referred to as a "mike" or a "microphone", is configured to convert a sound signal into an electrical signal.

The headset jack 170D is configured to connect to a wired headset.

The pressure sensor 180A is configured to sense a pressure signal and can convert the pressure signal into an electrical signal. In some embodiments, the pressure sensor 180A may be disposed on the display 194.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D.

The acceleration sensor 180E may detect values of accelerations in various directions (usually on three axes) of the electronic device 100 and may detect a magnitude and a direction of gravity when the electronic device 100 is still.

The range sensor 180F is configured to measure a distance.

The optical proximity sensor 180G may include a light-emitting diode (LED) and an optical detector, for example, a photodiode.

The ambient light sensor 180L is configured to sense ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch screen".

The bone conduction sensor 180M may obtain a vibration signal. In some embodiments, the bone conduction sensor 180M may obtain a vibration signal of a vibration bone of a human vocal-cord part.

The button 190 includes a power button, a volume button, and the like. The button 190 may be a mechanical button or may be a touch button. The electronic device 100 may receive a key input and generate a key signal input related to a user setting and function control of the electronic device 100.

The motor 191 may generate a vibration prompt.

The indicator 192 may be an indicator and may be configured to indicate a charging status and a power change, or may be configured to indicate a message, a missed call, a notification, and the like.

The SIM card interface 195 is configured to connect to a SIM card.

A software system of the electronic device 100 may use a layered architecture, an event-driven architecture, a microkernel architecture, a micro service architecture, or a cloud architecture. In the embodiments, an Android system of a layered architecture is used as an example to describe a software structure of the electronic device 100.

Figure 5:
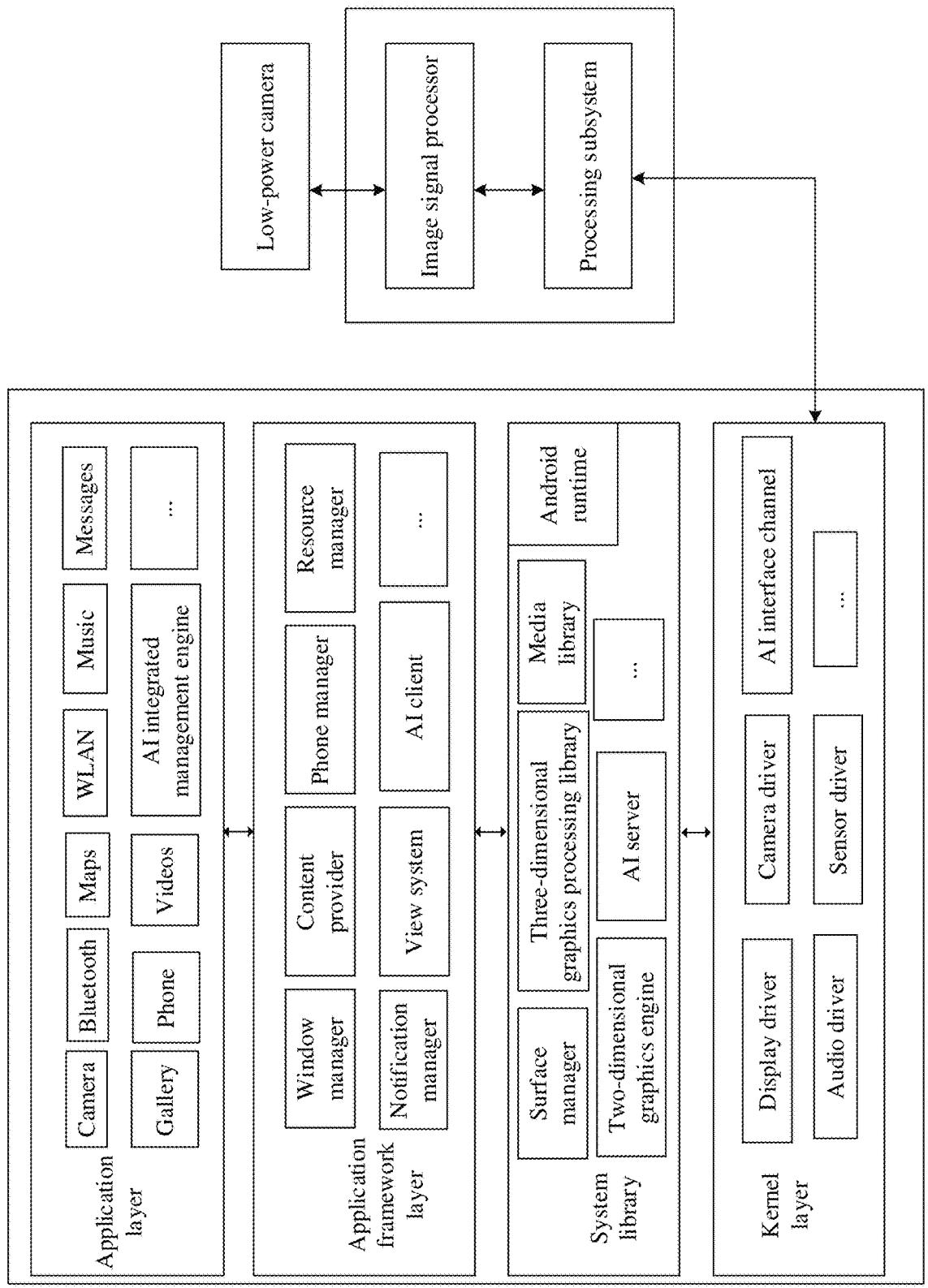
FIG. 5 is a block diagram of a software structure of an electronic device according to an embodiment.

FIG. 5 is a block diagram of the software structure of the electronic device 100 according to an embodiment.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages and an AI (artificial intelligence) integrated management engine. As shown in FIG. 5, the application packages may include applications such as Camera, Gallery, Calendar, Phone, Maps, Navigation, WLAN, Bluetooth, Music, Videos, and Messages.

AI integrated management engine: It is not appropriate to directly expose functions with relatively high security performance to an upper-layer application and a third-party application. In this case, the AI integrated management engine directly provides capabilities of these functions to the upper-layer application and the third-party application. The AI integrated management engine comprehensively determines other AI results, such as sensing and user portraits, to recognize more intelligent scenarios.

In some embodiments, the AI integrated management engine may not be required, and corresponding functions may be directly provided to the upper-layer application and the third-party application. This is not limited in this embodiment.

The application framework layer provides an application programming interface (API) and a programming framework for an application at the application layer. The application framework layer includes some predefined functions.

As shown in FIG. 5, the application framework layer may include a window manager, a content provider, a view system, a phone manager, a resource manager, a notification manager, an AI client, and the like.

The window manager is configured to manage a window program. The window manager may obtain a size of a display, determine whether there is a status bar, perform screen locking, take a screenshot, and the like.

The content provider is configured to: store and obtain data and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including a message notification icon may include a text display view and a picture display view.

The phone manager is configured to provide a communication function of the electronic device 100, for example, management of a call status (including answering or declining a call).

The resource manager provides various resources for an application, such as a localized character string, an icon, a picture, a layout file, and a video file.

The notification manager enables an application to display notification information in a status bar and may be configured to convey a notification type message. The displayed notification information may automatically disappear after a short pause and require no user interaction. For example, the notification manager is configured to notify download completion, provide a message notification, and the like. The notification manager may alternatively be a notification that appears in the status bar at the top of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator blinks.

The Android runtime includes a kernel library and a virtual machine. The Android runtime is responsible for scheduling and management of the Android system.

AI client: The AI client interconnects the AI integrated management engine and an AI server in the system library.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), a 2D graphics engine (for example, SGL), and an AI server.

The surface manager is configured to manage a display subsystem and provide fusion of 2D and 3D layers for a plurality of applications.

The media library supports playback and recording in a plurality of commonly used audio and video formats, static image files, and the like. The media library may support a plurality of audio and video coding formats, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The AI server is configured to comprehensively manage AI functions, including an algorithm registration, a result callback, a signature encryption check on an algorithm model, and the like. The AI server can perform the signature encryption check on the algorithm model. Only a trusted algorithm model can be sent to a corresponding execution module for execution.

The kernel layer is a layer between hardware and software. The kernel layer includes at least a display driver, a camera driver, an audio driver, a sensor driver, and an AI interface channel.

The AI interface channel is configured to transmit a control command and an algorithm result of face change detection. In an implementation, an HIDL interface may be implemented at the kernel layer, and the AI server uses the HIDL (HAL interface definition language) interface to transmit a control command and data for face change detection.

The image signal processor is configured to control the camera 193 to capture and process image data.

A processing subsystem is configured to run a face change detection algorithm based on the image data obtained by the image signal processor and send a result of the face change detection to the AI integrated management engine.

The following describes work processes of software and hardware of the electronic device 100 by using an example with reference to a face change detection scenario.

When the upper-layer application needs to invoke the face change detection algorithm, the AI integrated management engine is informed that the face change detection algorithm is required. The AI integrated management engine sends the requirement to the AI server by using the AI client. After learning the requirement, the AI server determines that the electronic device 100 has a face change detection function, and the AI server sends the requirement to the processing subsystem by using the AI interface channel. The processing subsystem starts the face change detection algorithm, instructs the image signal processor to control the camera 193 to capture an image. After obtaining the image captured by the camera 193, the processing subsystem performs face change detection, and sends a result of the face change detection to the AI server by using the AI interface channel, where the face recognition result sent by the processing subsystem to the AI server is a non-plaintext data byte. The AI server converts the result into a character string and then sends the character string to the AI integrated management engine by using the AI client. The AI integrated management engine sends the result of the face change detection to the corresponding upper-layer application. After the face change detection algorithm is enabled, the face change detection algorithm is always in an enabled state in an unlocking period, and the upper-layer application may invoke a tracking result of the face change detection algorithm at any time.

The camera 193 used for the face change detection may be the front-facing camera 193B or may be the low-power camera 193A.

Optionally, the processing subsystem, the image signal processor, and the camera 193 may be independent of an operating system of the electronic device 100. Therefore, when the electronic device 100 is in a sleep state, the processing subsystem, the image signal processor, and the camera 193 are still in a working state to perform face change detection, so that energy consumption of the electronic device 100 is reduced while real-time face change detection is performed. In this case, the camera 193 is, for example, the low-power camera 193A, the image signal processor is configured to control the low-power camera 193A to capture the image, and the processing subsystem is configured to perform face change detection based on the image data captured by the low-power camera 193A. Before a privacy protection method described in the embodiments is described, private content and non-private content in the embodiments are first described.

(1) Private content and non-private content of a private application.

① For the private application, the private content of the private application is, for example, a home page of the private application, and the non-private content of the private application is, for example, other content irrelevant to the home page. For example, the non-private content may be a login interface of the private application, and the private application can be accessed only after login. The non-private content may also be an identity authentication interface and can be accessed only after an identity of the user is successfully authenticated. The identity authentication interface may provide a plurality of authentication modes for the user to select, for example, an identity authentication mode such as fingerprint, password, face recognition, or iris recognition. After the user selects one of the identity authentication modes, an entry for the identity authentication is displayed. The non-private content may alternatively be a prompt interface for prompting the user that the user has no permission to use the private application. The non-private content may alternatively be mosaiced content of the home page of the private application. The non-private content may alternatively be other content completely irrelevant to the home page of the private application. This is not limited. Details are not listed in this embodiment.

Figure 6A:
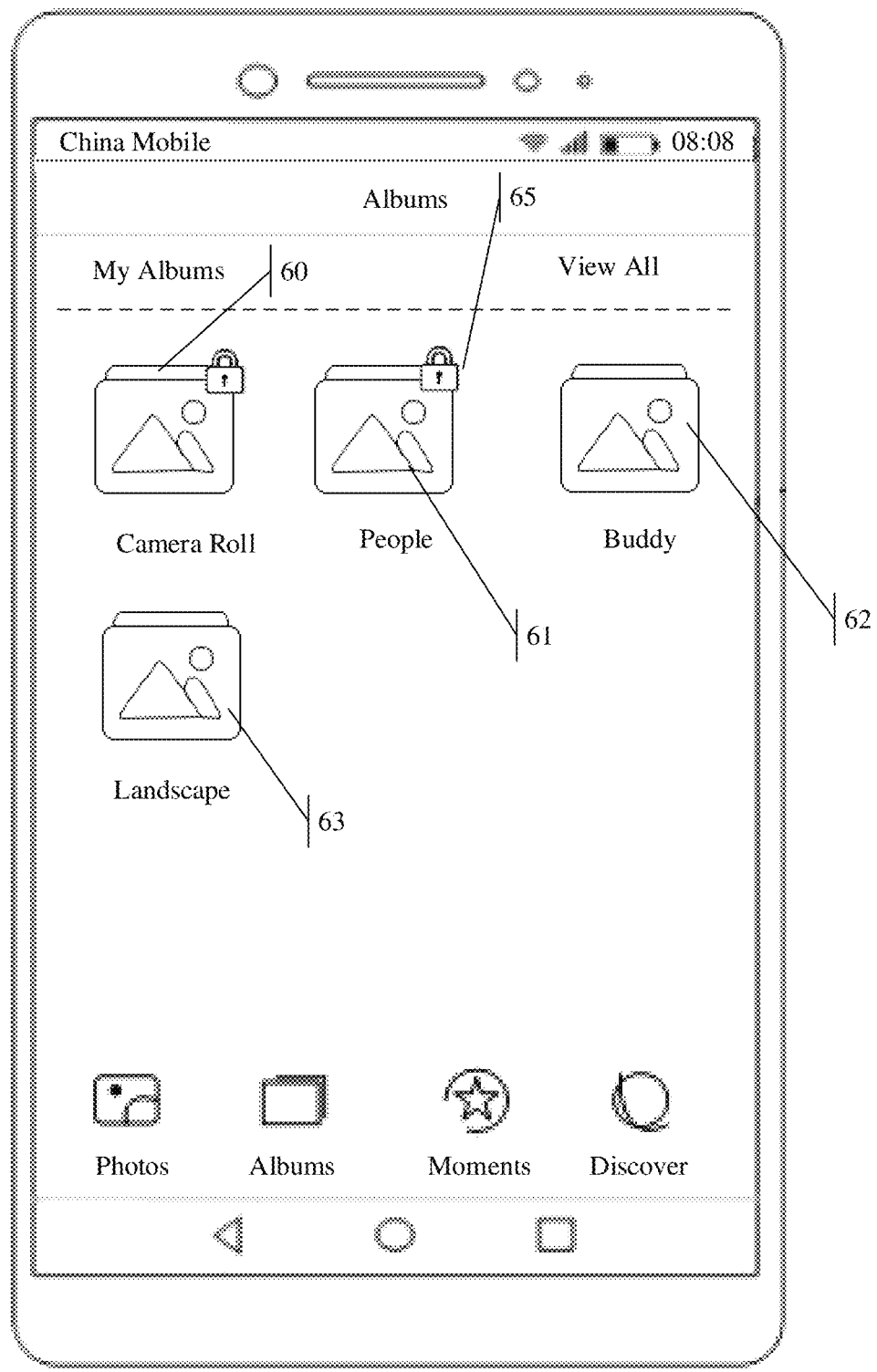
FIG. 6A to FIG. 6D are schematic diagrams of private content and non-private content of an album application according to an embodiment.
Figure 6B:
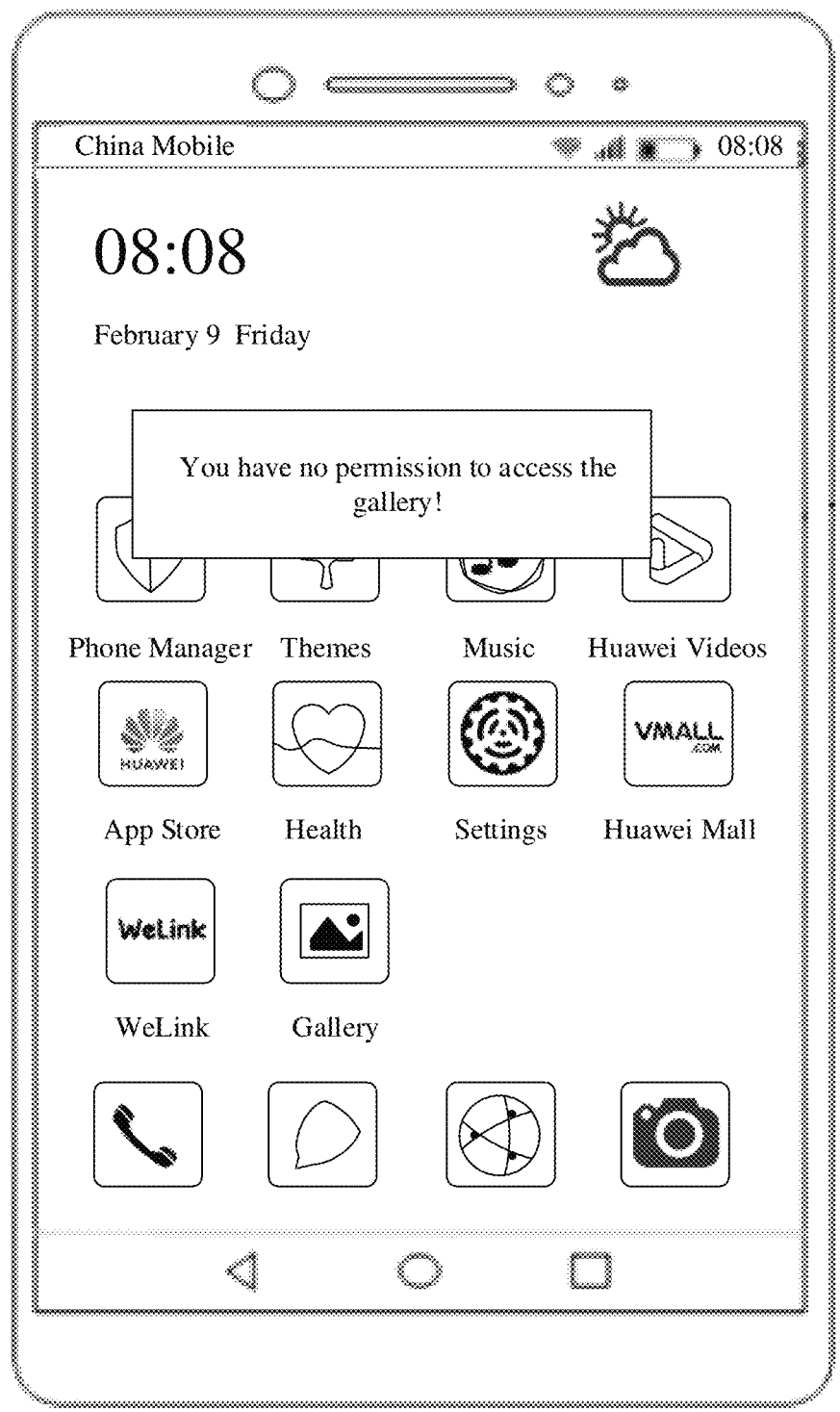

Assuming that the private application is an album application, the private content of the private application is, for example, an album home page shown in FIG. 6A. The album home page includes icons of four albums: an icon of a camera roll album 60, an icon of a people album 61, an icon of a food album 62, and an icon of a landscape album 63. The albums may store both pictures and videos. The non-private content of the private application is, for example, prompt information shown in FIG. 6B and used to prompt that the user has no permission to access the album. Alternatively, the non-private content of the private application is, for example, an identity authentication interface shown in FIG. 6C and used to prompt the user that face authentication is being performed on the user, and when the face authentication fails, prompt the user to select another mode, such as fingerprint authentication or password authentication. Alternatively, the non-private content of the private application is, for example, an identity authentication interface shown in FIG. 6D. The identity authentication interface provides a plurality of identity authentication modes for the user to select. After the user selects an identity authentication mode, the user is authenticated in the identity authentication mode. Content of the home page of the album application may alternatively be replaced with another file (album or picture) that is completely different, and the file used for replacement may be one or more files, and is a system default file or a file that is set by the user and specially provided for viewing by an unauthorized user, instead of an album or a picture actually included in the album application.

Figure 7A:
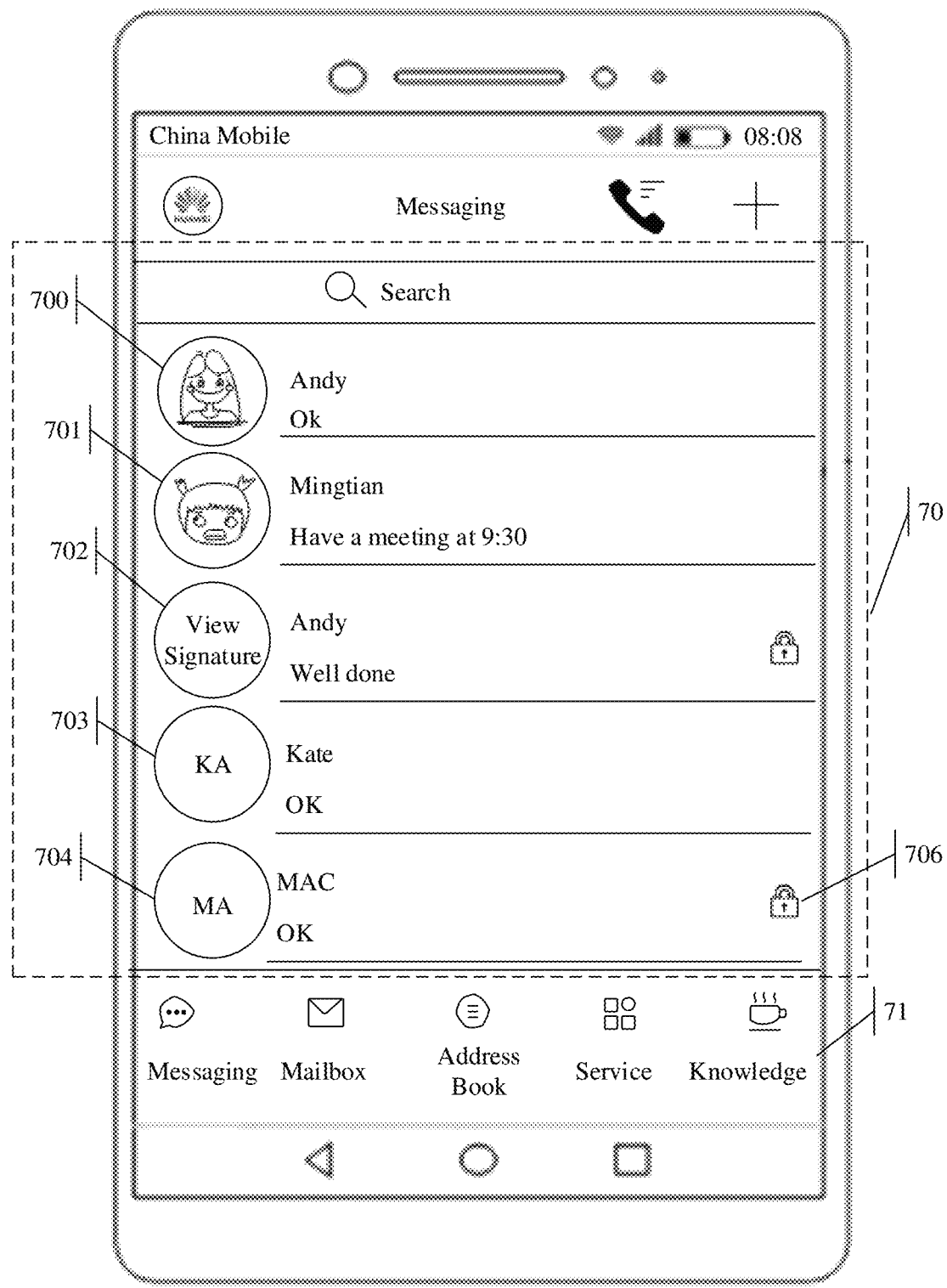
FIG. 7A and FIG. 7B are schematic diagrams of private content and non-private content of instant chat software according to an embodiment.
Figure 7B:
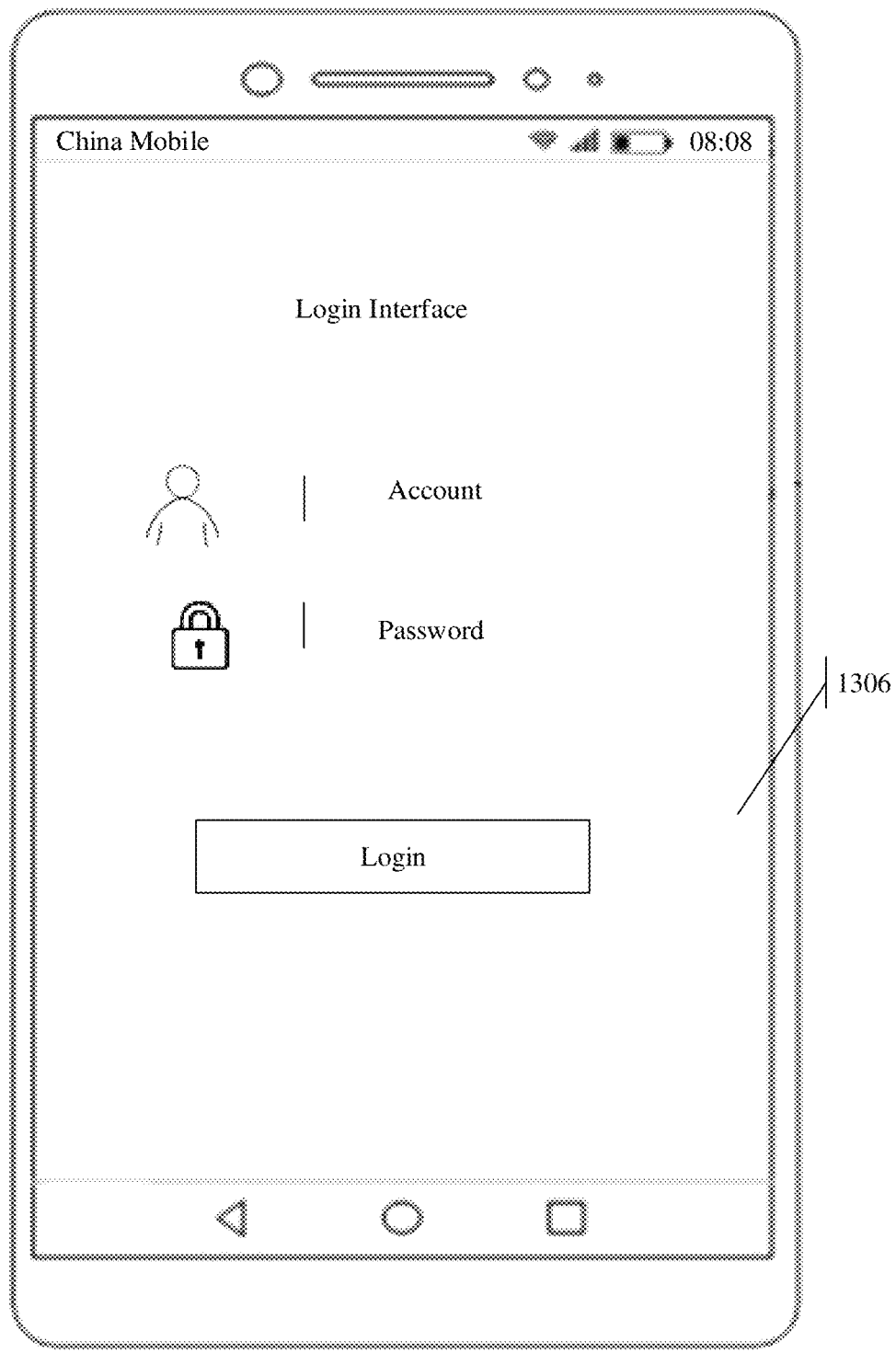

Assuming that the private application is instant messaging software, the private content of the private application is, for example, a home page of the instant messaging software shown in FIG. 7A. The home page of the instant messaging software includes a message browse page 70 and a menu 71. The menu 71 includes a message control, a mailbox control, an address book control, a service control, and a knowledge control. The message control is used to trigger the electronic device 100 to display the message browse page 70. The mailbox control may be used to trigger the electronic device 100 to display a mailbox interface. The address book control may be used to trigger the electronic device 100 to display one or more contacts. The service control may be used to trigger the electronic device 100 to display some other functions of the instant chat software, for example, network space, customer service, and voting. The knowledge control is used to trigger the electronic device 100 to display some related articles. The message browse page 70 includes one or more message options, for example, a chat record 700 with a contact Andy (Andy 1), a chat record 701 with a contact Mingtian, a chat record 702 with Andy (Andy 2), a chat record 703 with Kate, and a chat record 704 with MAC, including two private chat records: the chat record 702 with the contact Andy (Andy 2) and the chat record 704 with the contact MAC. Privacy icons 706 are further provided on the two private chat records to prompt the user that the two chat records are private chat records. Further, the privacy icon 706 may be in any shape and is displayed at any position of a corresponding private chat record, or the privacy icon 706 may be hidden. This is not limited in this embodiment. When using the electronic device 100, the unauthorized user may exit a login account of the instant chat software to display a login interface 1306 shown in FIG. 7B. Alternatively, the home page of the instant chat software may be covered with other content, and the identity authentication interface is displayed to prompt that the user can access the instant chat software only after identity authentication succeeds, or the like. This is not limited. Details are not listed in this embodiment.

② For the private application, the private content of the private application is, for example, preset content of the home page of the private application, and the non-private content includes, for example, other content than the preset content hidden on the home page of the private application.

For example, the preset content may be content of a preset attribute or may be content set by the user. The preset attribute is, for example, a password, an account, an amount, or a certificate photo (for example, a bank number or an identity card). The content set by the user is, for example, a picture, an article, a chat record, a recording, or a contact set by the user. Blur processing may be performed on the private content of the home page of the private application to obtain the non-private content, or the non-private content may be obtained by directly hiding the private content of the home page. This is not limited in this embodiment. Mask, blur, and fill processing may be performed on the account, password, and number; a photo or a picture is skipped and a next non-private picture is directly displayed; and a preset interface (for example, an identity authentication interface, or a prompt interface prompting that no access permission is available) or the like is displayed for other content, a type of content, or content including a keyword or symbol.

Figure 8:
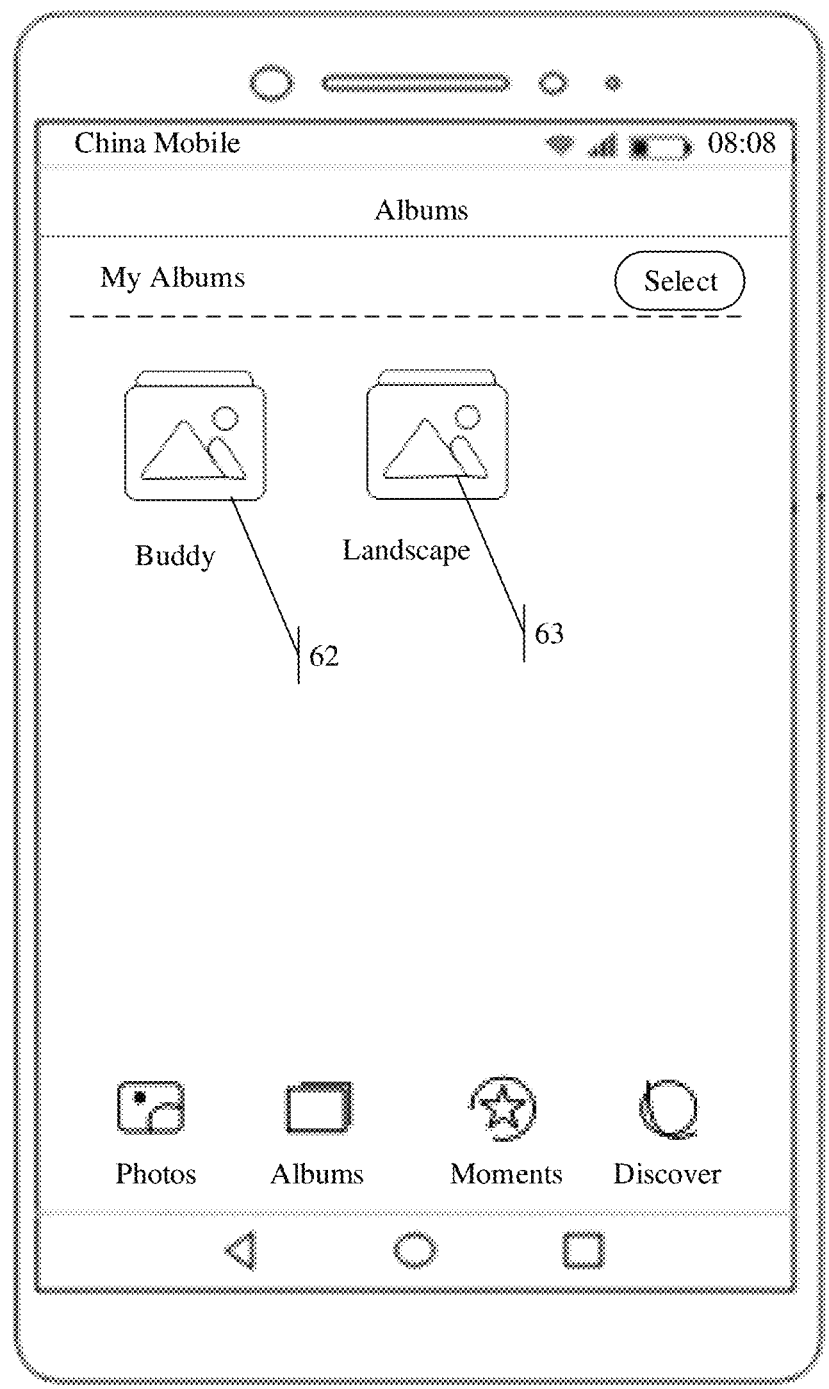
FIG. 8 is another schematic diagram of non-private content of an album application according to an embodiment.

Assuming that the private application is the album application, with continued reference to FIG. 6A, the four albums displayed on the album interface include two private albums: the camera roll album 60 and the people album 61. A privacy icon 65 is provided on each of the icon of the camera roll album 60 and the icon of the people album 61 to prompt that the album is a private album. The privacy icon 65 may be provided at any position of the album icon and may be in any shape. The privacy icon 65 may be displayed or hidden. In this case, the private content of the album application includes the camera roll album 60 and the people album 61 (which may be the icons of the albums or may be pictures or videos included in the albums). The non-private content is other content than the camera roll album 60 and the people album 61 that are hidden on the home page of the album application, as shown in FIG. 8. Blur processing may be further performed on the camera roll album 60 and the people album 61, and the camera roll album album 60 and the people album 61 may be further replaced with other albums. This is not limited. Details are not listed in this embodiment.

Figure 9A:
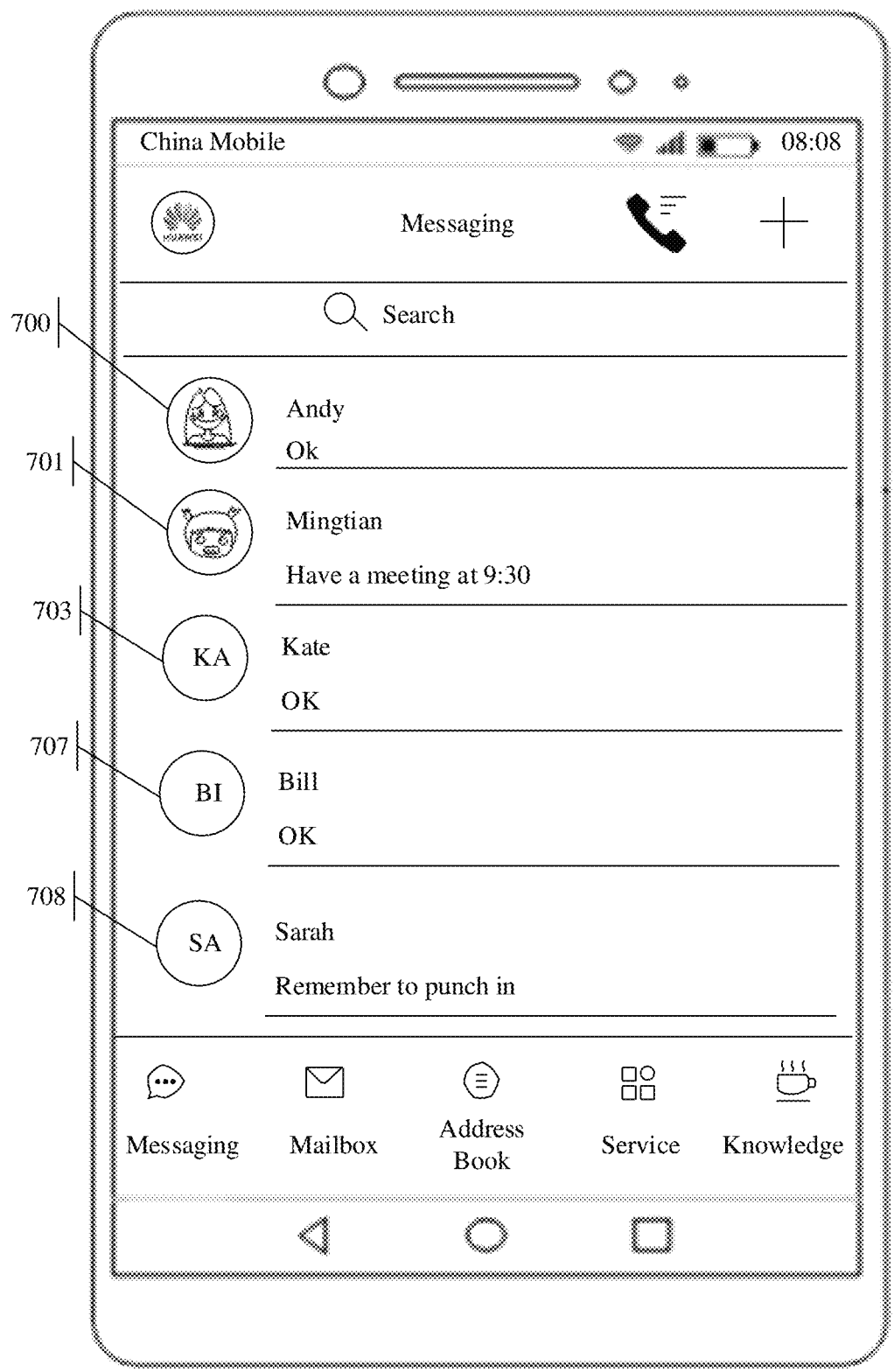
FIG. 9A and FIG. 9B are another two schematic diagrams of non-private content of instant messaging software according to an embodiment.
Figure 9B:
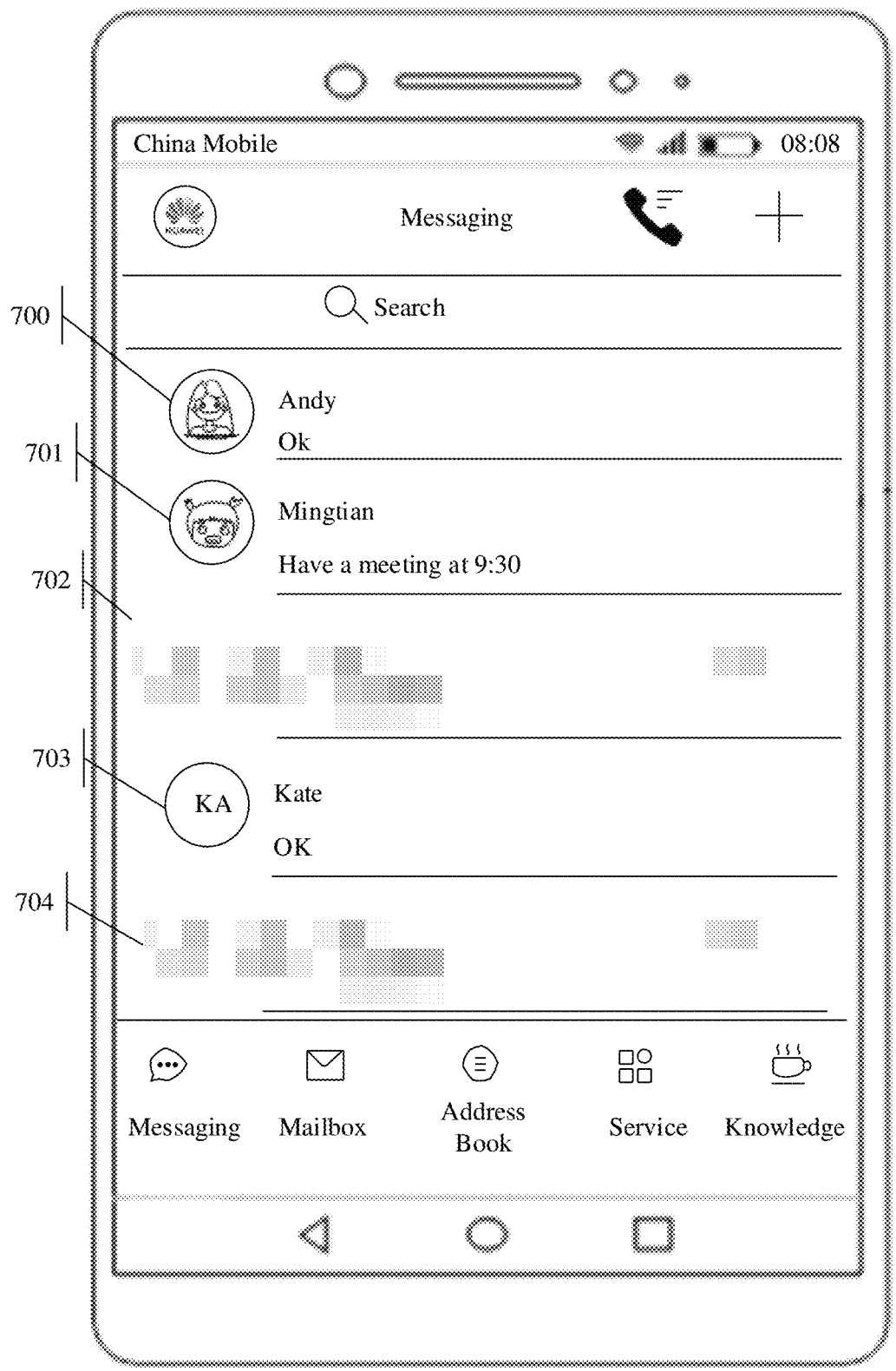

Assuming that the private application is the instant chat software, with continued reference to FIG. 7A, the private content includes, for example, the chat record 702 with the contact Andy and the chat record 704 with the contact MAC, as shown in FIG. 7A. The non-private content may be remaining content after the two private chat records are hidden. As shown in FIG. 9A, blank areas that appear after the original private chat records are hidden are replaced with two pieces of non-private information 707 and 708. Alternatively, blur processing (for example, mosaicing) may be performed on the private chat records, as shown in FIG. 9B.

The private application may further include a browser, the payment software, various types of chat software, social software, and the like.

(2) The private content is a file or folder included in the application or is preset content included in the application. The private content may be an index (for example, an icon or an entry) of a file, a folder, or preset content, or may be content included in a file or a folder or may be preset content. This is not limited in this embodiment.

In other words, the user can access the application, but cannot view the preset content, file, or folder in the application. In this solution, some content of the application can be protected.

Using the album application as an example, the private content of the album application may include an icon of a private picture folder and an icon of a private picture, and the non-private content may include an icon of a non-private picture folder and an icon of a non-private picture.

For another example, the private content of the album application is a picture included in a private picture folder or a private picture itself.

Still using a main interface of the album application shown in FIG. 6A as an example, the private content of the album application is, for example, the icon of the camera roll album 60 (private picture folder) and the icon of the people album 61, and the non-private content is, for example, the icon of the food album 62 and the icon of the landscape album 63. When the authorized user accesses the album application, the authorized user can see icons of all albums included in the home page of the album application. When the unauthorized user accesses the album application, the unauthorized user can only see icons of non-private albums. Alternatively, the non-private content is content included in a picture or folder. When the unauthorized user accesses the album application, the electronic device 100 may display an icon of a private album, but the user cannot access the album corresponding to the icon. When an operation of accessing the private album by the user is detected, thumbnails of pictures included in the private album are not displayed, but other content such as an authentication interface, an authorization interface, or an icon of another picture for hiding a private picture by default is displayed.

For another example, if the electronic device 100 detects a user operation of opening a buddy album 62 in an album list shown in FIG. 6A (for example, tapping an icon of the buddy album 62, or generating a gesture or a voice instruction), the buddy album 62 is displayed. As shown in FIG.

Figure 10A:
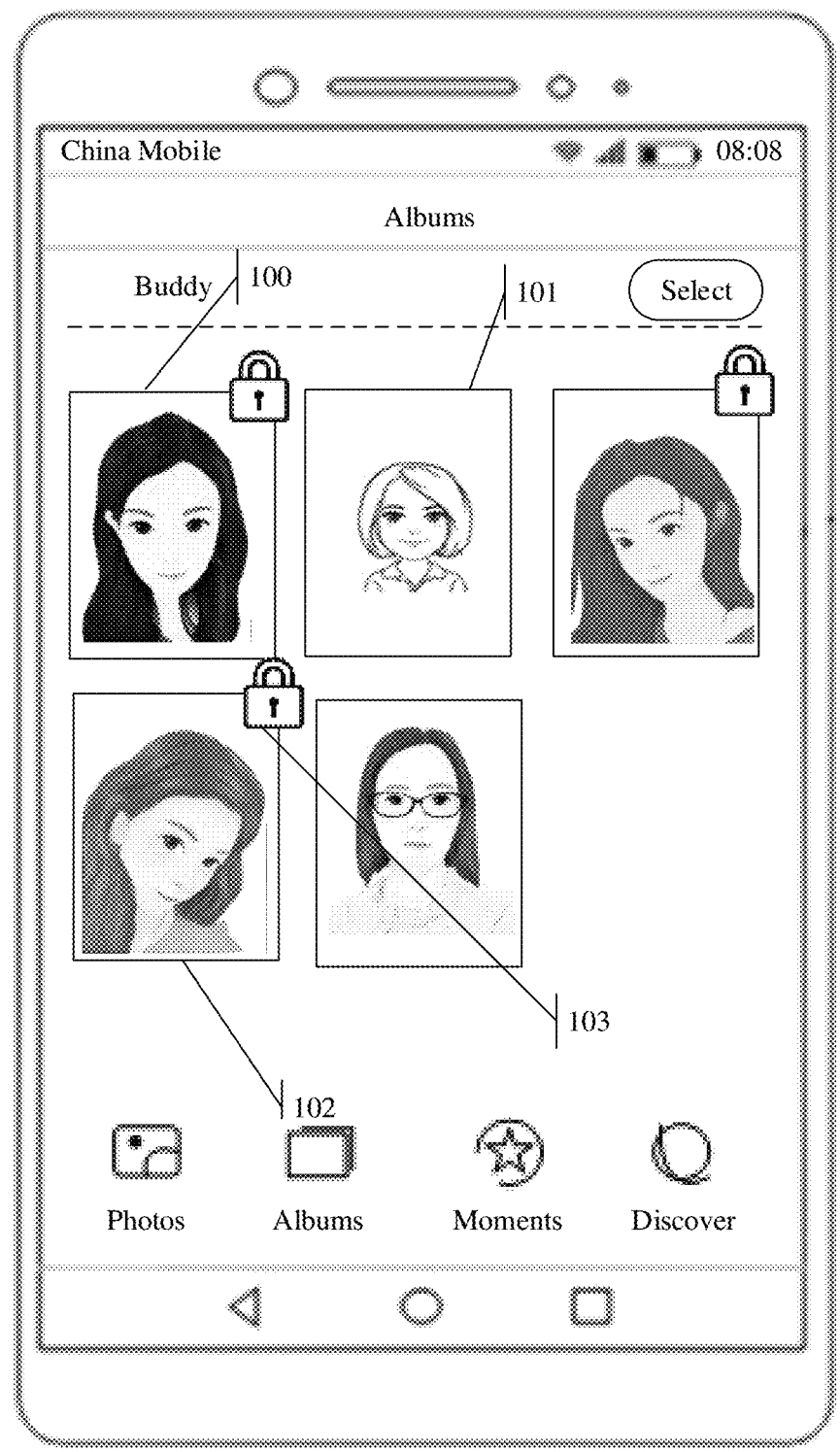
FIG. 10A and FIG. 10B are schematic diagrams of private content and non-private content in an album according to an embodiment.
Figure 10B:
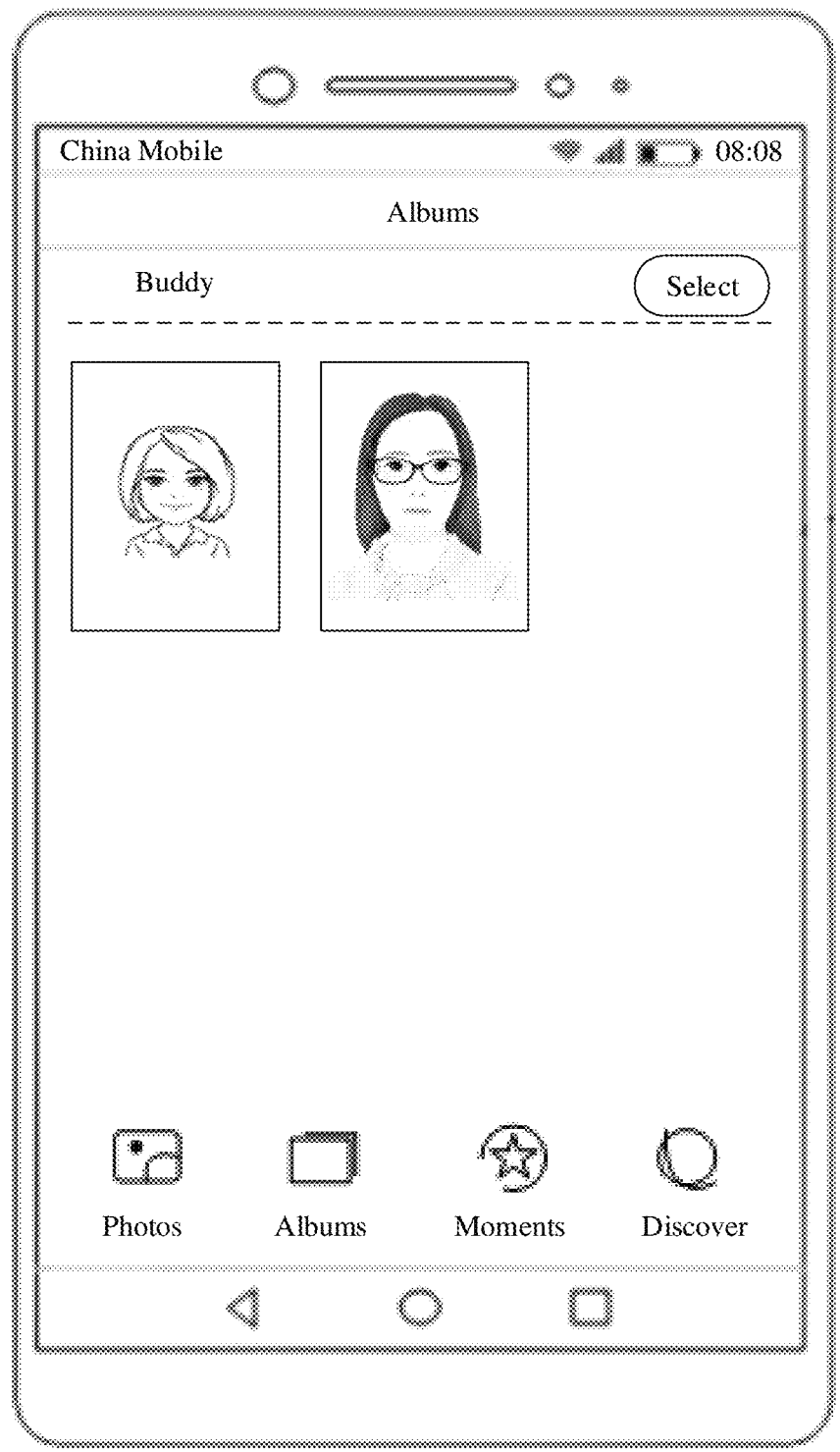

10A, the buddy album 62 includes five pictures, including three private pictures (private content): a picture 100, a picture 101, and a picture 102. Privacy icons 103 are provided in upper right corners of the three pictures to prompt the user that the three pictures are private pictures. Further, the privacy icon 103 may be provided at any position of a corresponding picture and may be in any shape, or the privacy icon 103 may not be displayed. In this case, the corresponding non-private content is remaining icons after icons of the three private pictures are removed from the icons of the five pictures, as shown in FIG. 10B. Alternatively, blur processing may be performed on the icons of the three private pictures, or the icons of the three private pictures may be replaced with icons of other non-private pictures (for example, system default settings or user settings). Alternatively, although the icons of the three private pictures are displayed, the user cannot view a corresponding private picture by using a corresponding icon; and when an operation of opening the private picture by the user is detected, the identity authentication interface, a next non-private picture, another picture for hiding the private picture by default, or the like may be displayed.

The picture and album may be a locally stored picture and album, for example, a picture and an album included in the album application, or an album used to store pictures in another application and a picture stored in the album, or an album and a picture stored in a local folder or directory. Alternatively, the picture and album may be a picture and an album stored in a net disk, for example, a Baidu net disk or a micro cloud net disk.

Assuming that the private application is the instant chat software, the private content includes, for example, related data of a private contact (records of communication with the private contact, all records related to the privacy contact, and the like), data (for example, chat records or other content related to accounts, passwords, and certificate photos), an interface (such as a payment interface), a contact list, and other content manually set by the user (for example, a segment of chat content, a picture, or a voice).

Figure 11A:
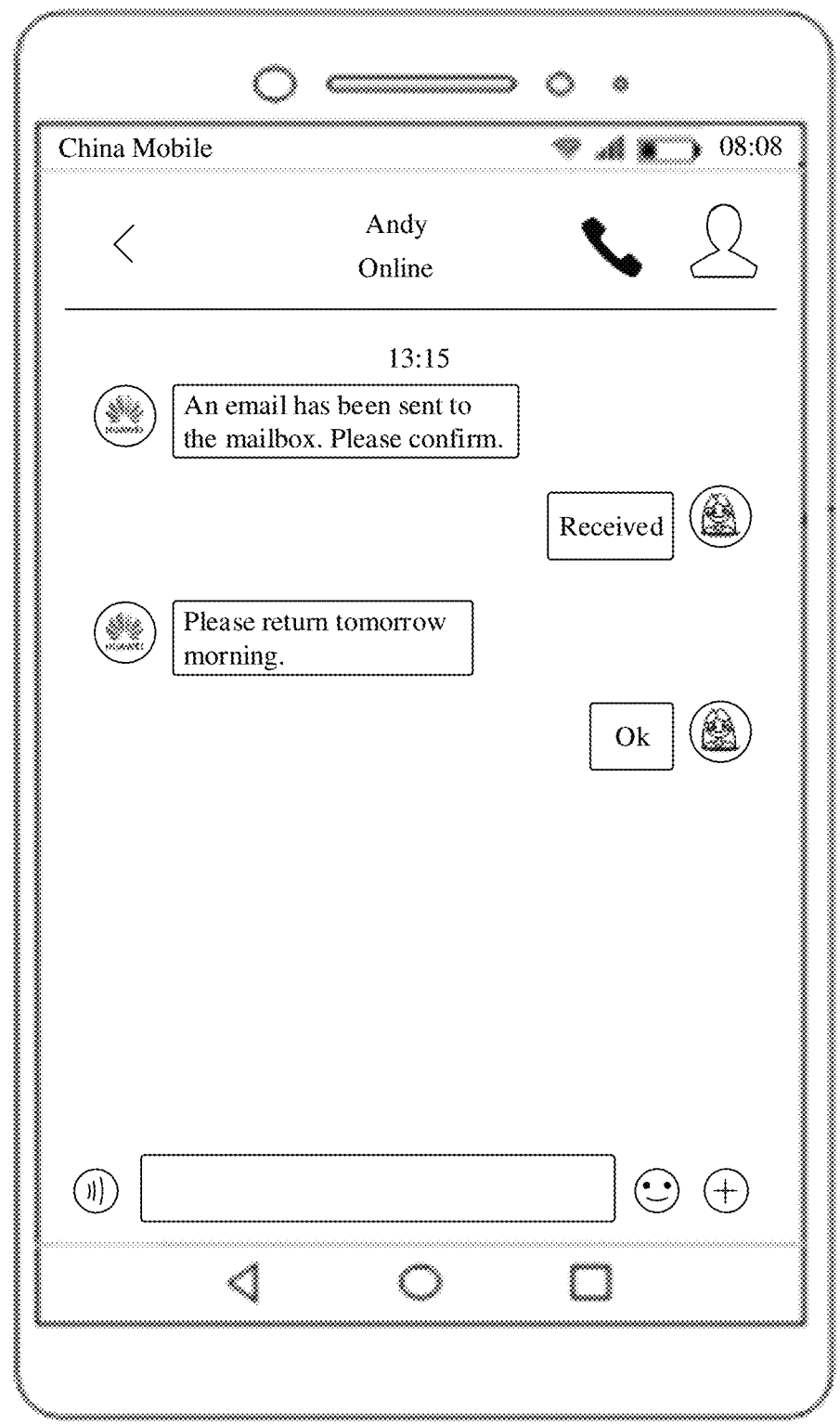
FIG. 11A and FIG. 11B are schematic diagrams of private content and non-private content on a chat interface according to an embodiment.
Figure 11B:
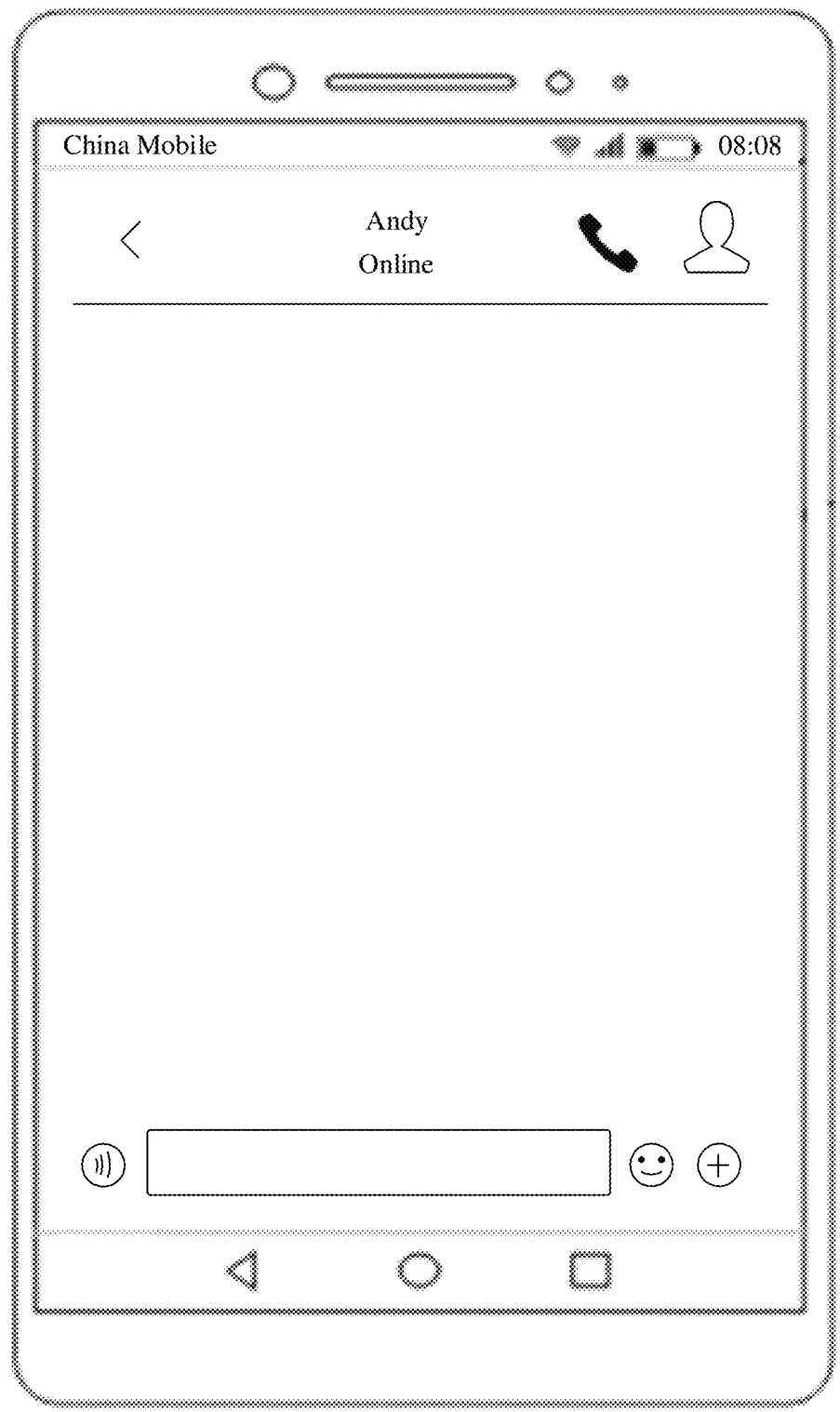

When the authorized user accesses the instant chat software, all content of the home page of the instant chat software is displayed, as shown in FIG. 9A, but if the unauthorized user accesses the instant chat software, only the non-private content is displayed. For example, no chat record with the private contact may be displayed on the message browse interface 70, or the private contact may not be displayed in the address book, so that the unauthorized user cannot perceive that the private contact is included in the instant messaging software. Alternatively, when detecting an operation of opening a dialog interface with the private contact, the electronic device 100 does not display the dialog interface (may display a fake dialog interface, prompt identity authentication, prompt an authorization interface, prompt that no access permission is available, or the like). Alternatively, although a dialog interface is displayed, there is no chat content (as shown in FIG. 11A, when the authorized user performs access, what the electronic device 100 displays is shown in FIG. 11B). Alternatively, although a dialog interface is displayed, dialog content including a keyword is hidden, or the dialog interface uses another default dialog (system setting or user setting) to replace a chat interface with the private contact. This is not limited. Details are not listed in this embodiment.

Figure 12A:
FIG. 12A and FIG. 12B are schematic diagrams of non-private content and private content of an incoming call according to an embodiment.
Figure 12B:
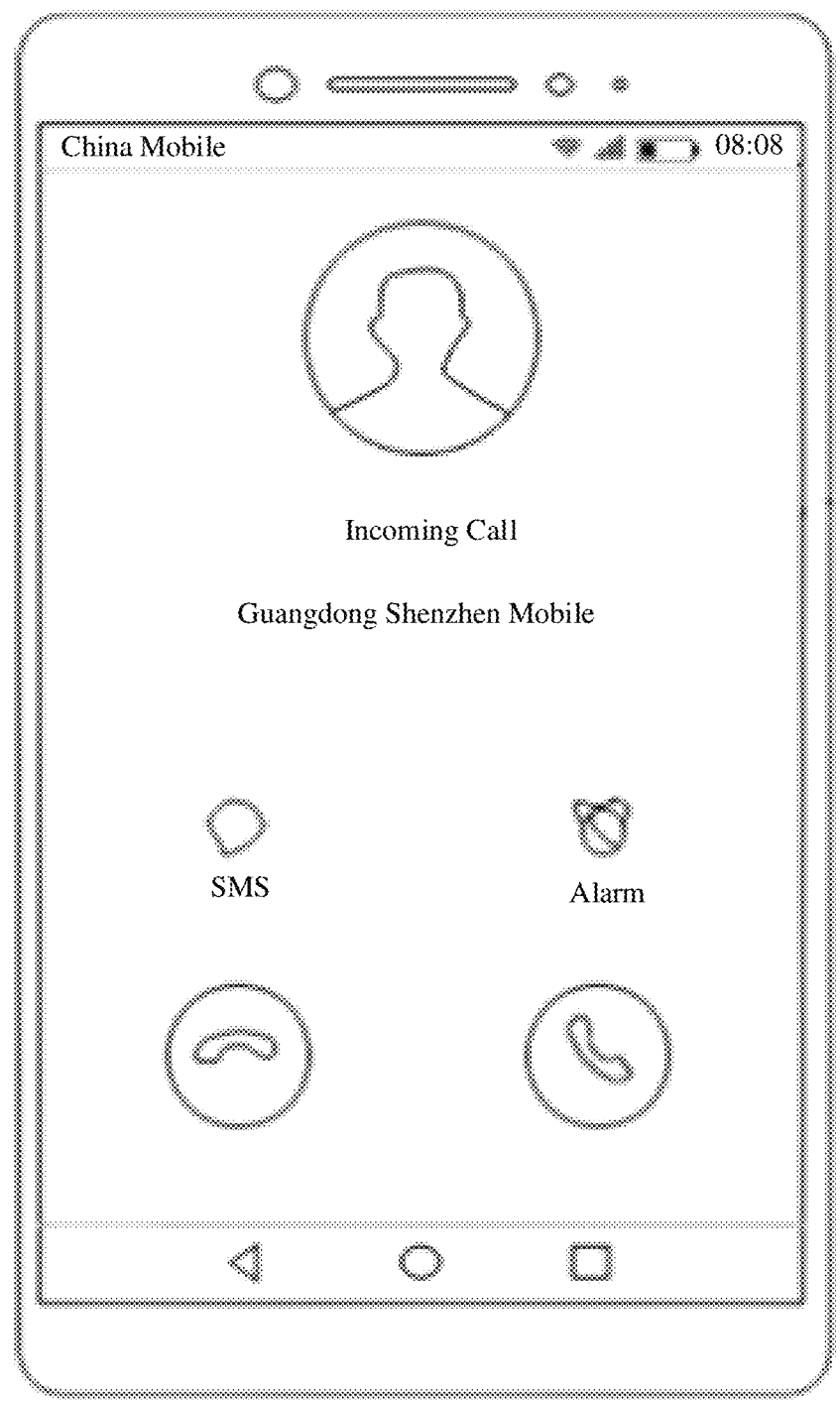

Assuming that the application is an incoming call, the private content of the application may include contact information of the incoming call. When the authorized user uses the application, the contact information is displayed when the incoming call is received, as shown in FIG. 12A. When the unauthorized user uses the application, the contact information is hidden when the incoming call is received. For example, a contact name is replaced with the word "incoming call" and a contact portrait is replaced with a default portrait, as shown in FIG. 12B. Further, the private content may also be hidden in another manner. Details are not listed in this embodiment.

The private content may further include a picture, a video, a contact, a short message, a photo, a call record, a private access record of the browser, and the like.

(3) Private content and non-private content of the display interface of the electronic device.

The private content includes, for example, an icon of a private application displayed on a screen interface (for example, a home screen or a minus one screen) of the electronic device 100, a private message displayed on the screen interface, and the like.

Figure 13A:
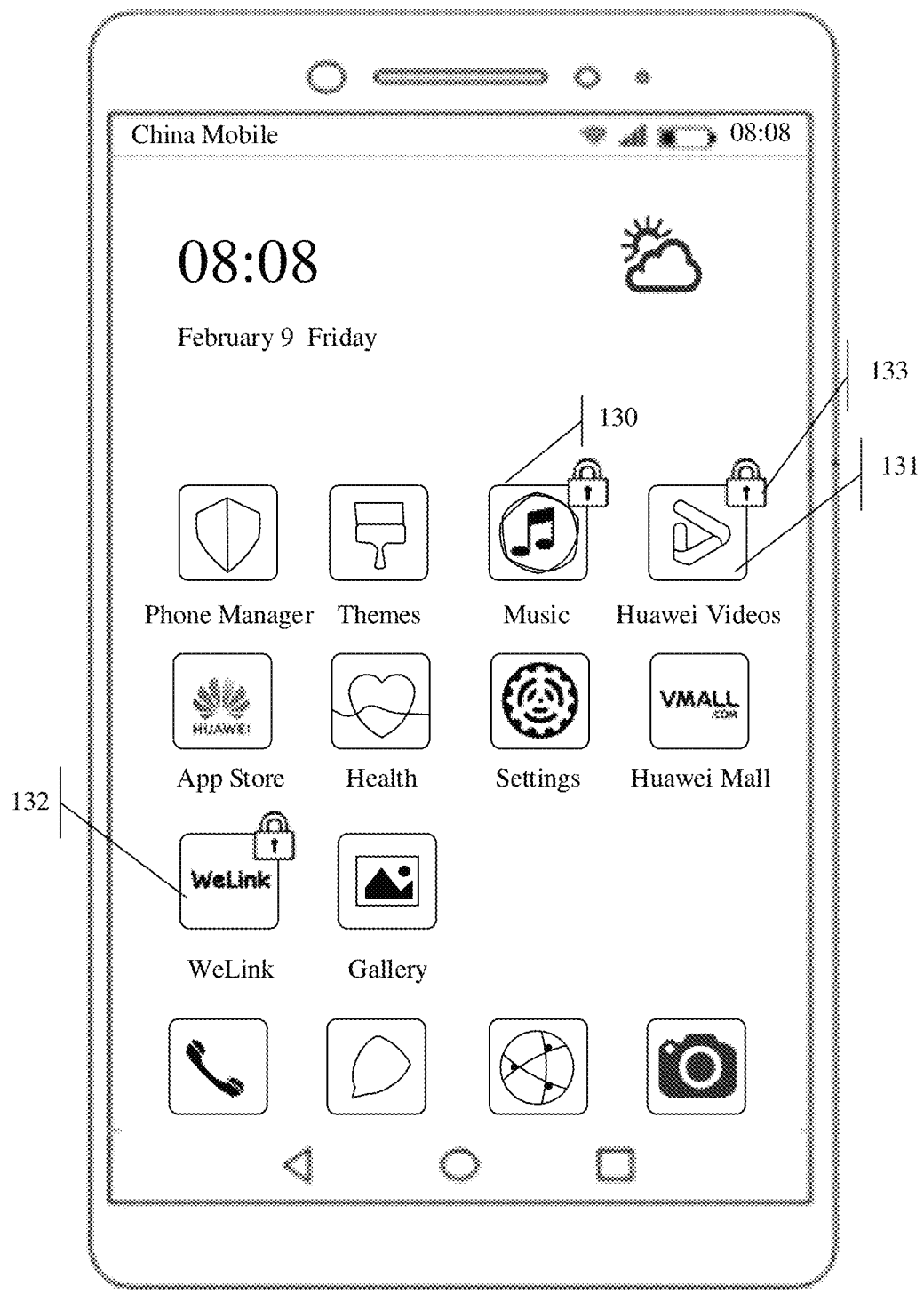
FIG. 13A and FIG. 13B are schematic diagrams of private content and non-private content on a home screen of an electronic device according to an embodiment.
Figure 13B:

For example, the electronic device 100 includes three private applications: Music 130, Huawei Videos 131, and Wilink 132. As shown in FIG. 13A, icons of the three applications are displayed on the home screen (private content) of the electronic device 100. Privacy labels 133 may be further displayed in upper right corners of the icons of the three applications. In some other embodiments, the privacy labels may not be displayed, and icons of some non-private applications such as an icon of Phone Manager, an icon of Huawei Mall, and an icon of the App Store are further displayed on the home screen. When the unauthorized user performs access, the icons of the three private applications may be hidden on the home screen of the electronic device 100, so that non-private content shown in FIG. 13B is displayed. Further, blur processing may also be performed on the three icons. This is not limited in this embodiment.

For another example, when the authorized user performs access, the minus one screen displays various private notifications (for example, an SMS notification, an instant messaging software notification, and a game notification); when a non-owner performs access, the minus one screen does not display various private notifications. The private notification is private content, and the private notification may be a notification received by a private application or may include a notification of preset content (for example, an account, a password, a bank card number, or special chat content).

In addition, the private content may further include related information corresponding to a private contact, for example, an address book item, a short message, a photo, a call record, an incoming call, a video, and a file corresponding to the private contact. The private contact may be associated with a plurality of applications. For example, a contact is associated with the address book, the incoming call, SMS, other instant messaging information, and the like simultaneously. In this case, all related information corresponding to the private contact in these applications is private information.

In an implementation process, when the unauthorized user uses the electronic device 100, the electronic device 100 may not only hide the private content from the unauthorized user, but also restrict use of some other functions by the unauthorized user. The following lists two cases for description. The implementation process is not limited to the following two cases.

(1) Restricting a permission of the unauthorized user to use a preset system function.

The preset system function includes, for example, setting and changing a password, adjusting volume, installing an application, and various notifications. A setting interface of the preset system function may be private content and may be displayed on the display of the electronic device 100 when the authorized user uses the preset system function. However, when the unauthorized user uses the preset system function, the setting interface is not displayed. Alternatively, when the authorized user uses the preset system function, the setting interface of the system function may display setting entries of all functions, but when the unauthorized user uses the preset system function, the setting interface of the system function hides a setting entry of the preset system function, or changes a color of the setting entry to prompt that no setting operation is allowed at the setting entry (for example, the color is adjusted to gray), or the like.

(2) Restricting a permission of the unauthorized user to use some functions of the private application.

The preset function includes, for example, a forwarding function, an editing function, a deletion function, or a shooting function. In this way, the unauthorized user is assigned a permission to browse the private application but use of other functions by the user is restricted.

Assuming that the private application is the instant chat software, when the unauthorized user uses the album application, the user can browse a gallery and pictures, but cannot delete a picture, perform beautification processing on a picture, forward a picture to another user by using the instant messaging software, or the like. Assuming that the private application is the instant chat software, when using the instant chat software, the authorized user can browse chat records, send information to a contact, edit content of Moments, use a payment function, and the like; or when using the instant chat software, the unauthorized user can only browse chat records but cannot send messages or use functions such as payment. Therefore, for the authorized user, these functions in the system are all in a display state, but in a non-owner state, these functions are in a hidden state, or in a display but uneditable state, or the like.

In another embodiment, layouts of a same interface used by the authorized user and the unauthorized user are different. For example, when used by the authorized user, the minus one screen is displayed with a first layout, but when used by the unauthorized user, the minus one screen is displayed with a second layout. At least one of icon arrangement modes, colors, and displayed content of the first layout is different from that of the second layout. The layout used by the authorized user may be a special layout adapted to characteristics of the authorized user, but the layout used by the unauthorized user is a general layout.

In an implementation process, the private content, the private application, the preset system function, and the application function use of which by the unauthorized user is restricted may be set by the user or may be set by the system by default. This is not limited in this embodiment.

For example, for some functions that have relatively high security level requirements, such as a payment function, an instant messaging function, and a password setting or change function, the system may set the functions as private functions by default, to provide different displayed content for the authorized user and the unauthorized user or provide different permissions for the users.

Assuming that the private application is the album application (or the private content is a picture included in the album application), the electronic device 100 may automatically recognize (or send the picture to a server for recognition) sensitive content included in the picture and set a privacy label for the picture including the sensitive content. The sensitive content includes, for example, a picture of a certificate (for example, an identity card, a driver's license, or a bank card), screenshots of chat records (such as accounts and passwords) including private content, or the like, so that the content can be set as private content.

Assuming that the private application is the instant chat software (or the private content is preset content included in the instant chat software), the electronic device 100 (or the server) may set a privacy label for a contact in the instant chat software. After detecting that the owner chats with a contact, the electronic device 100 (or the server) always deletes the chat record and sets a privacy label for the contact. The user (or the server) may further set data of the instant chat software as private content, and the data includes, for example, chat content related to an account and a password, transfer information, and collection and payment information.

The following describes in detail several manners of setting the private function by the user. The implementation process is not limited to the following several cases, and in absence of conflicts, the following several cases may be used in combination.

(1) Setting a private application.

Figure 14:
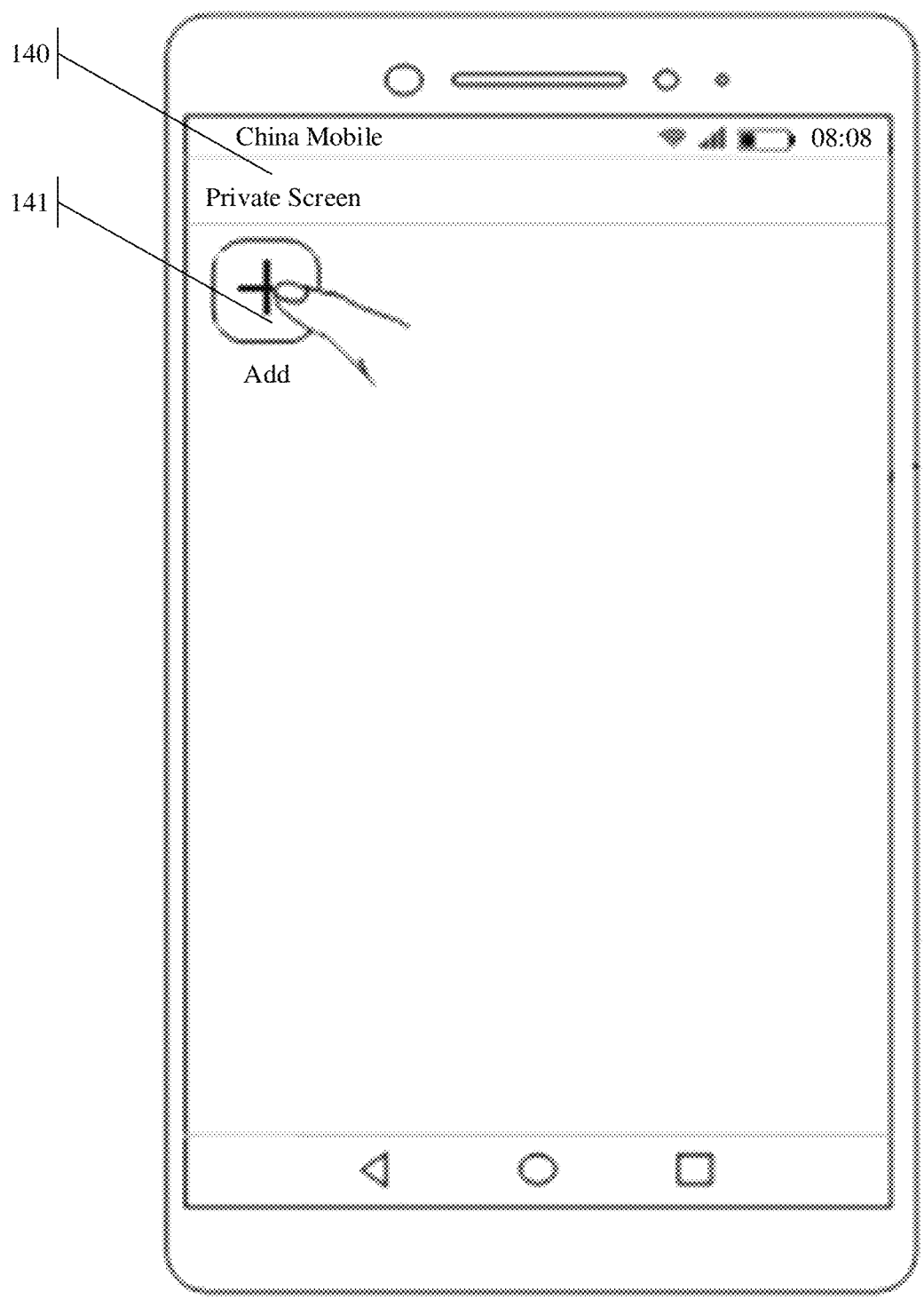
FIG. 14 to FIG. 17 are schematic diagrams for setting a private application according to an embodiment.
Figure 15:
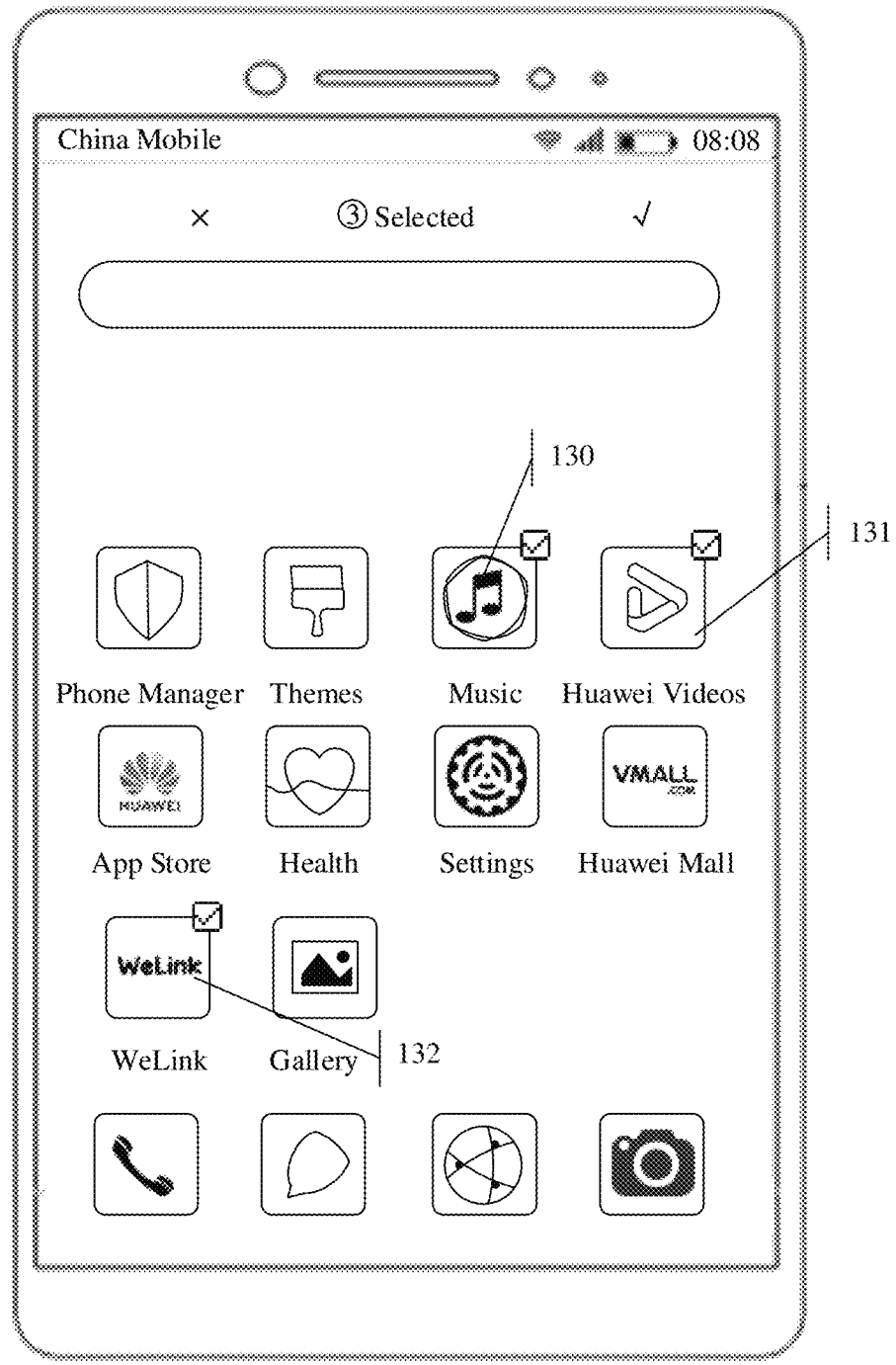
Figure 16:
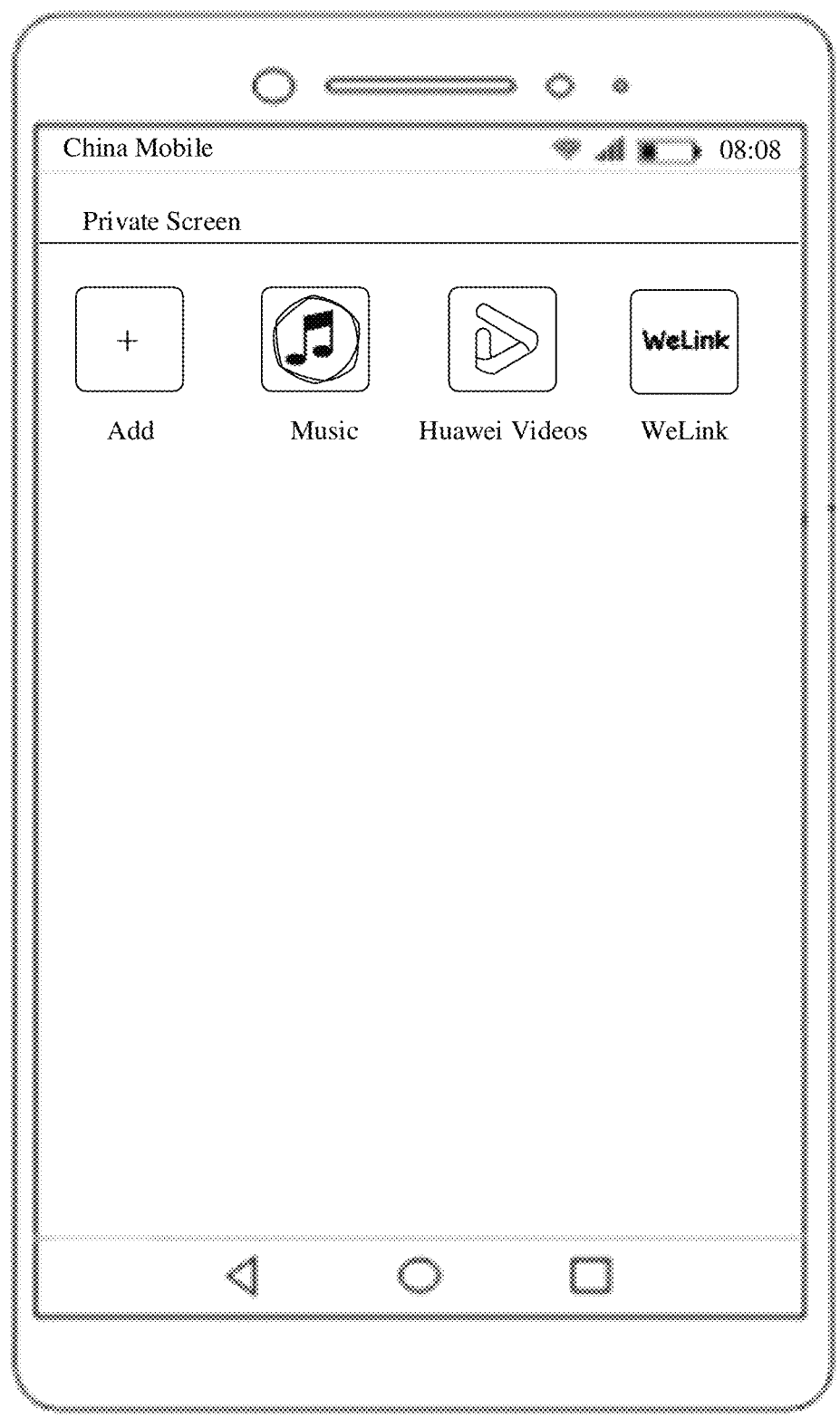

For example, as shown in FIG. 14, a private screen interface 1401 may be provided on a desktop of the electronic device 100. After the electronic device 100 enters an unlocked state, the electronic device 100 displays the home screen. The owner slides left on the screen until all desktop icons are displayed, and then slides to the private screen interface 140. There is an add icon 141 on the private screen interface 140. When the user wants to add a privacy protection program, the user taps the add icon 141. After the electronic device detects an operation of tapping the add icon 141, as shown in FIG. 15, a selection interface 142 is displayed. The selection interface 142 displays icons of a plurality of applications. If the user wants to add Music, Huawei Videos, and Welink as private applications, the user selects a Music icon 130, a Huawei Videos icon 131, and a Welink icon 132, and performs a confirmation operation (taps "√" in the upper right corner). After detecting the confirmation operation, the electronic device adds the icons of the three applications to the private screen interface 140, as shown in FIG. 16, thereby adding the three applications as private applications. In this case, the icons of the three applications may still be displayed on the desktop of the electronic device 100, or the icons of the three applications may not be displayed. This is not limited in this embodiment of this application. Optionally, when the user selects an icon of an application, a quantity of currently selected applications may be further prompted on the display, for example, ③ selected, as shown in FIG. 15.

Figure 17:
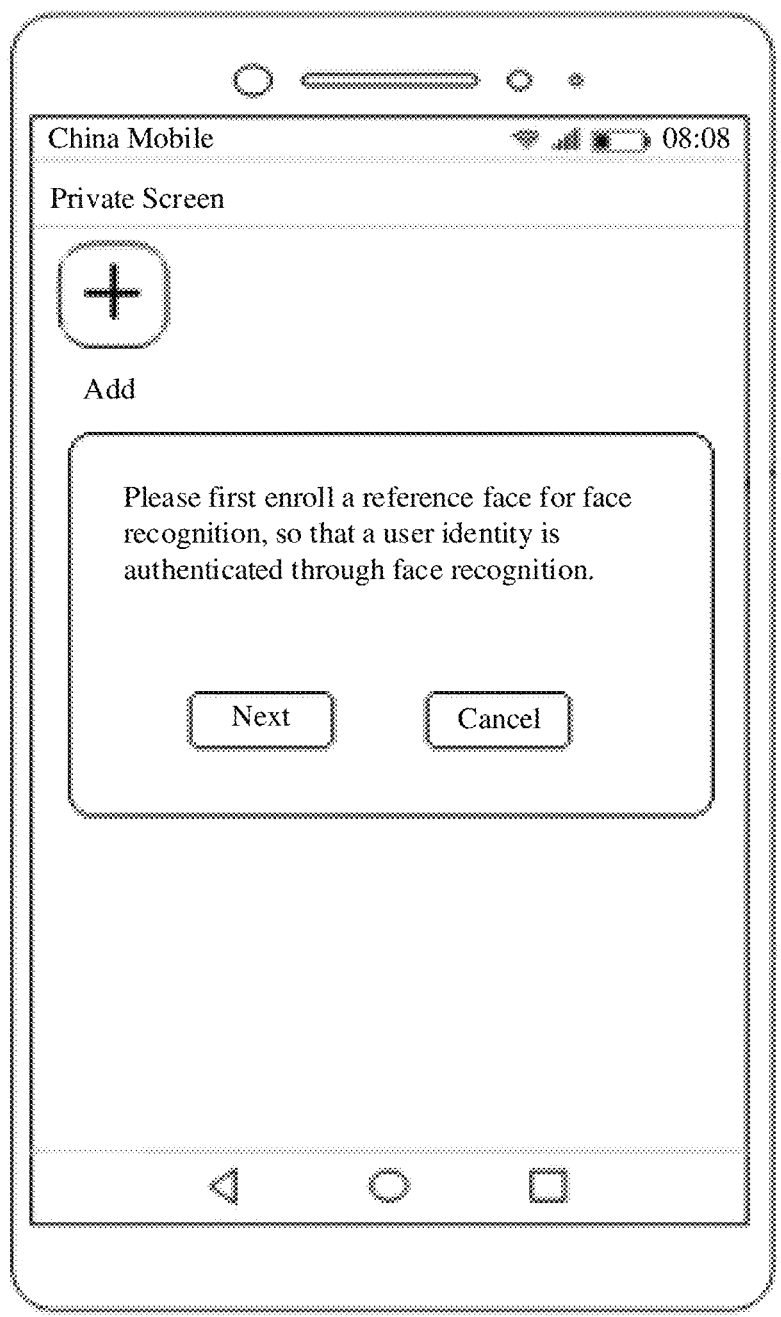

Optionally, after detecting an operation of tapping the add icon 141 by the user, the electronic device may further determine whether the user adds a private application for a first time. If yes, before the selection interface shown in FIG. 15 is displayed, a face enrollment interface (as shown in FIG. 17) may be first displayed, prompting the user to enroll, by using the face enrollment interface, a preset face as a basis for face recognition, and the selection interface shown in FIG. 15 is displayed for the user to select only after the preset face is successfully enrolled. The preset face may also be enrolled in another manner. This is not limited in this embodiment. Alternatively, the private screen directly uses a face enrolled through face unlocking as a preset face, and each time the user performs access, a user identity is authenticated through face recognition.

Figure 18:
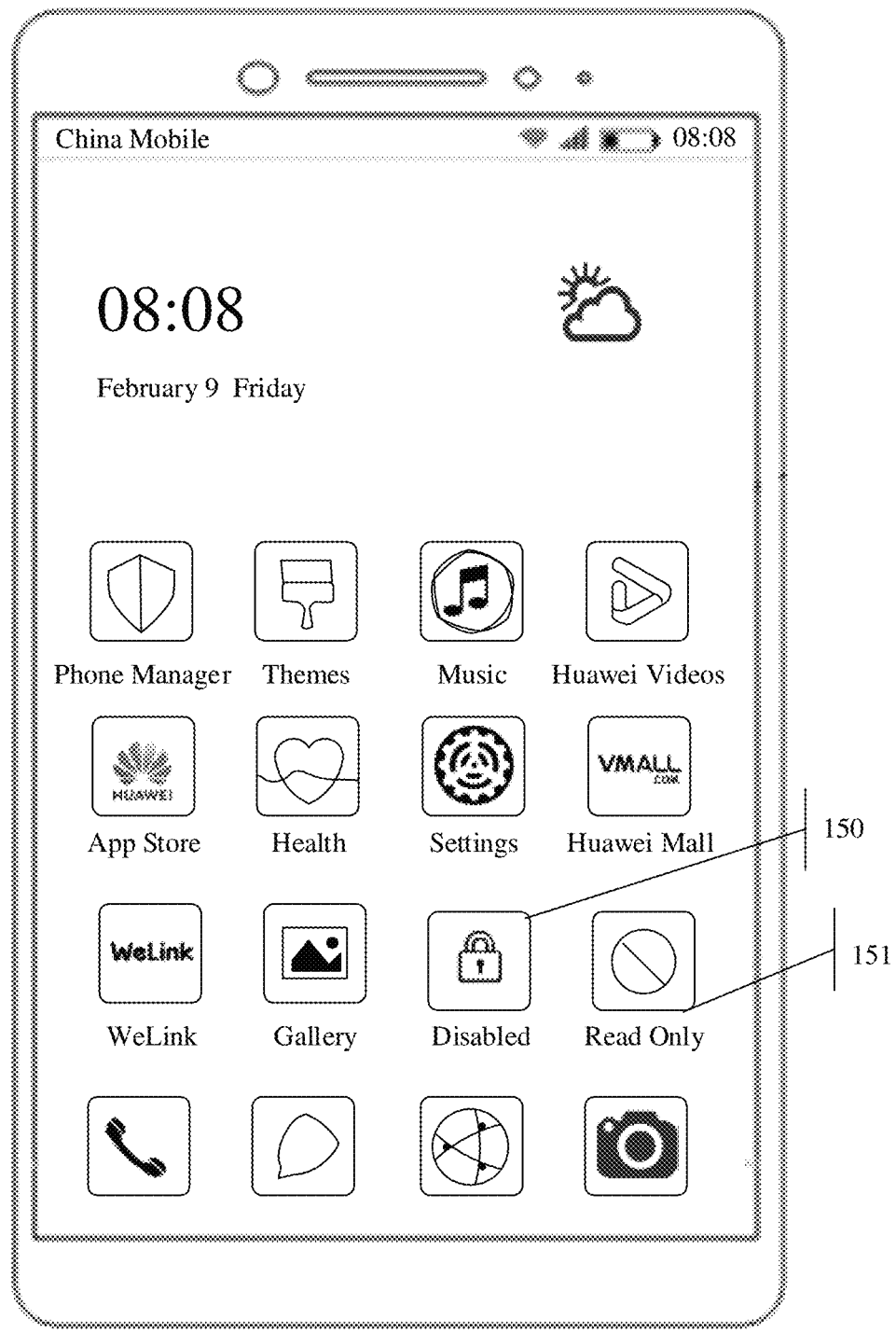
FIG. 18 is a schematic diagram of another method for setting a private application according to an embodiment.

Alternatively, as shown in FIG. 18, private folders (a disabled folder 150 and a read-only folder 151) for placing icons of private applications may be provided on an application list interface. The user drags an icon of an application to a private folder by performing a drag operation, and the electronic device 100 sets, in response to the drag operation, the application corresponding to the drag operation as a private application. Optionally, a plurality of private folders such as the disabled folder 150 and the read-only folder 151 shown in FIG. 18, and permissions of the unauthorized user to use private applications in different private folders may be set. For example, without authorization, no operation can be performed on a private application in the disabled folder 150 at all. When detecting that the private application included in the disabled folder 150 is started, the electronic device 100 directly prompts the user that the private application cannot be used, or displays an authorization interface, or displays an authentication interface, or the like. Alternatively, when the unauthorized user uses the electronic device 100, the disabled folder 150 may be directly hidden. In the private application in the read-only folder 151, the unauthorized user can browse some content of the private application, and when detecting an operation of starting the private application in the read-only folder 151, the electronic device 100 displays some or all content of the application, so that the user can view the content, but cannot edit the content. Assuming that the application is the instant chat software, the user can view information, contacts, and the like, but cannot send information, make payment, share to Moments, or the like.

Figure 19A:
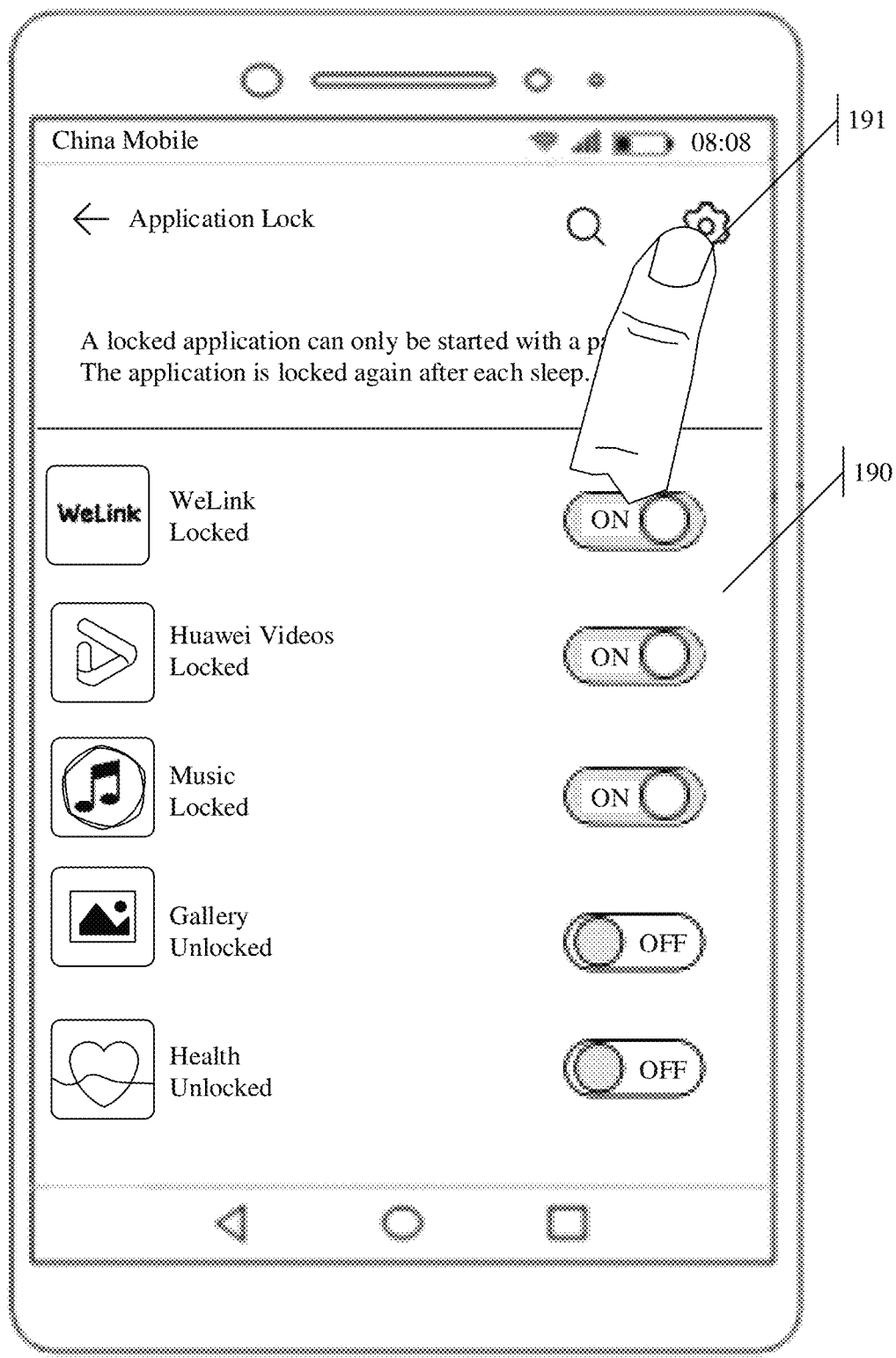
FIG. 19A and FIG. 19B are schematic diagrams of another method for setting a private application according to an embodiment.

Alternatively, an application lock button is added to the setting interface of the electronic device 100, and after an operation of tapping the application lock button is detected, as shown in FIG. 19A, the electronic device 100 jumps to a selection interface 190 of all applications, to add an application lock to an application corresponding to a selection operation of the user, or the like, and applications to which application locks are added are private applications. This is not limited in this embodiment of this application.

Figure 19B:
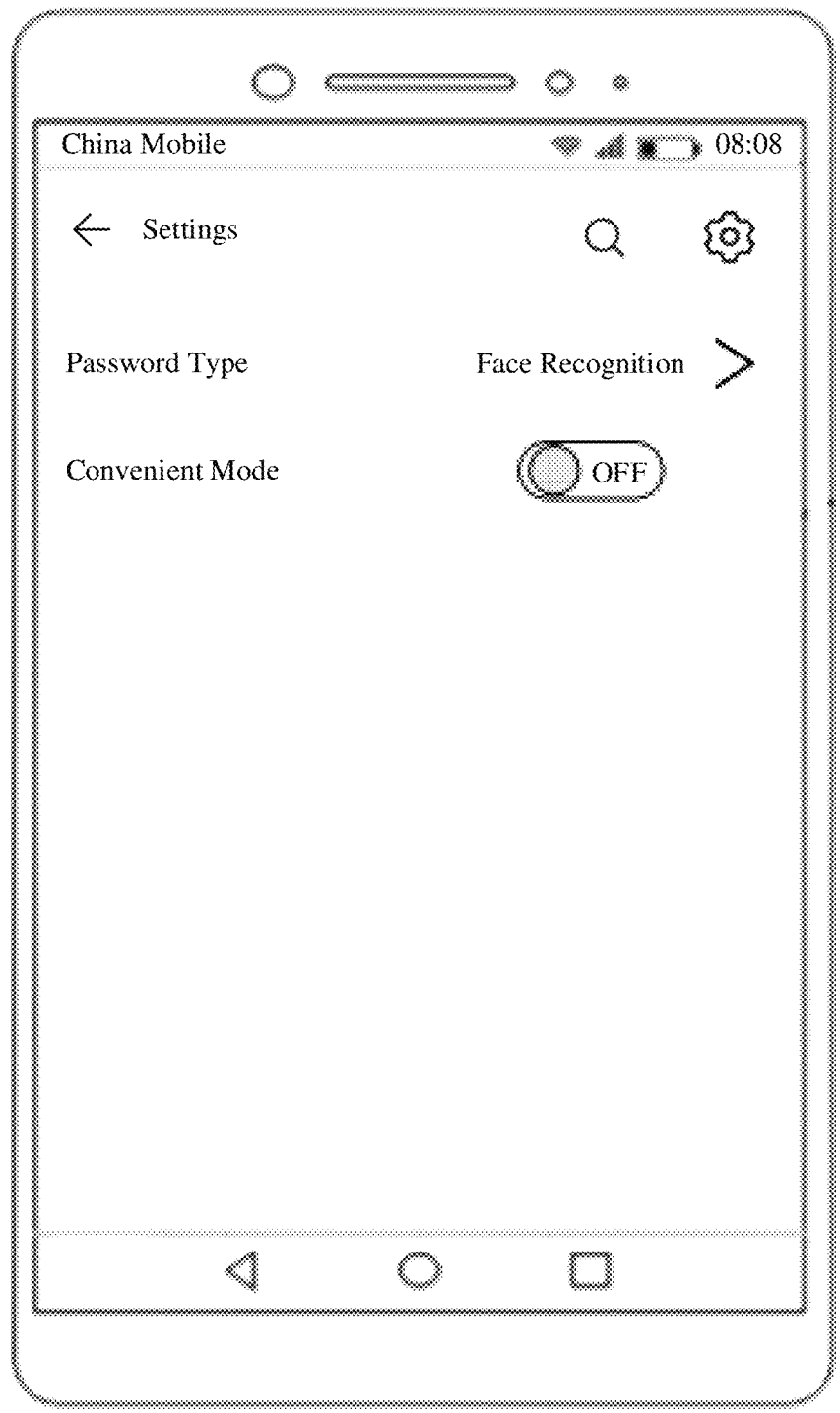

Optionally, the application lock interface 190 further includes a setting button 191. When an operation (for example, a tap operation) of triggering the setting button 191 by the user is detected, a setting interface shown in FIG. 19B is displayed. On the setting interface, an identity authentication mode (a password type shown in FIG. 19B) for accessing a private application may be set, where the password type includes, for example, face recognition, fingerprint recognition, and password recognition. On the setting interface, the user may further set whether to enable a convenient mode. When the convenient mode is disabled, identity authentication (for example, face recognition) needs to be performed when the user starts a private application for a first time in an unlocking period. When the convenient mode is enabled, when the user starts a private application for the first time in an unlocking period, whether the current user is an authorized user may be directly determined based on whether the face changes, but there is no need to perform identity authentication.

Figure 20A:
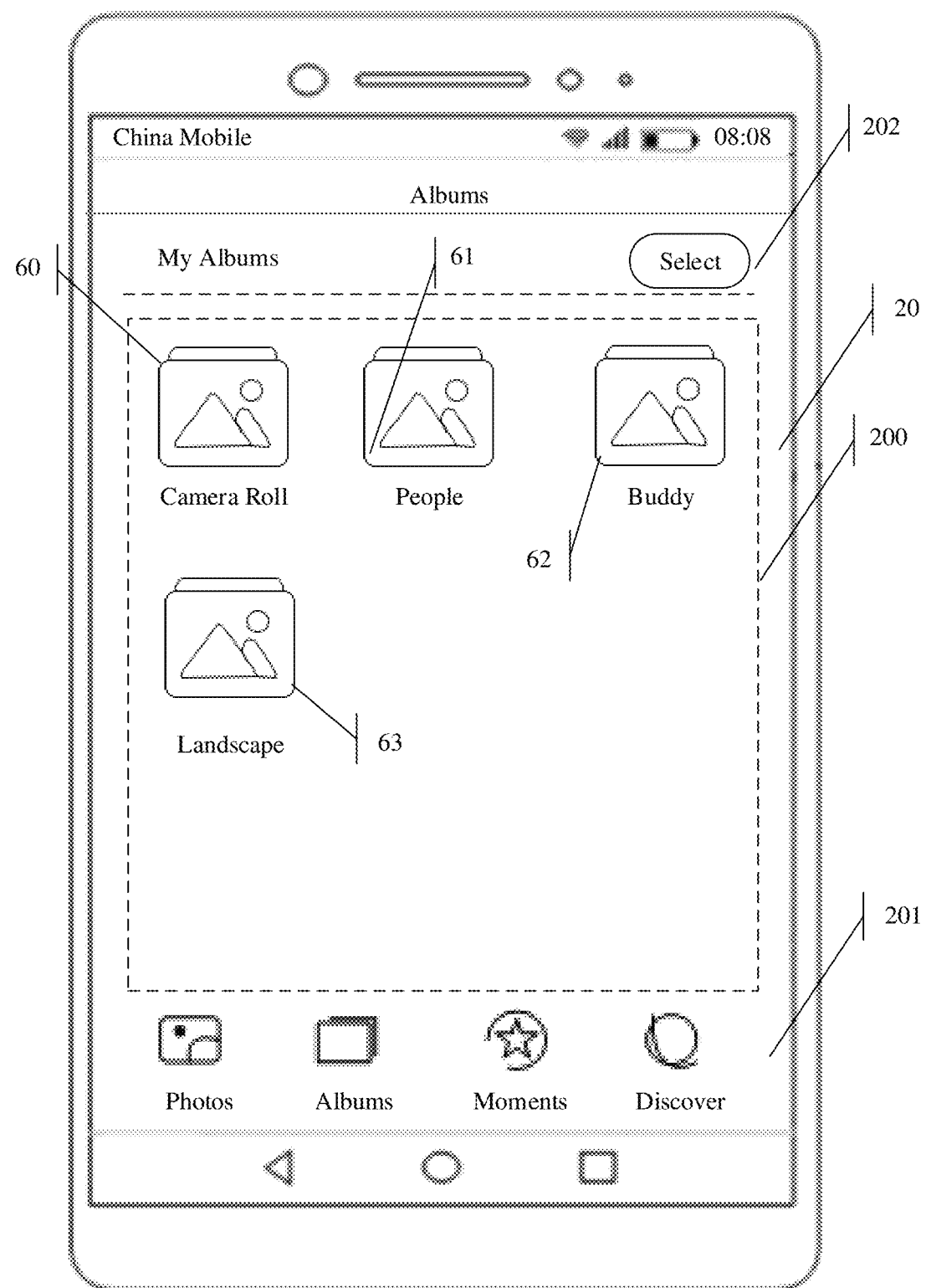
FIG. 20A to FIG. 20D are schematic diagrams for setting a private album according to an embodiment.

(2) Setting a private folder or a private file in the application. Using the setting of an album or a picture in the album application as an example, a user A starts the album application, and the electronic device 100 displays the album home page 20 shown in FIG. 20A. The album home page 20 includes an album display area 200 and a function menu area 201. The album display area 200 displays all albums included in the album application, including the camera roll album 60, the people album 61, the buddy album 62, and the landscape album 63. The function menu area 162 includes four function controls: a "Photos" menu control, an "Albums" menu control, a "Moments" menu control, and a "Discover" menu control.

Figure 20B:
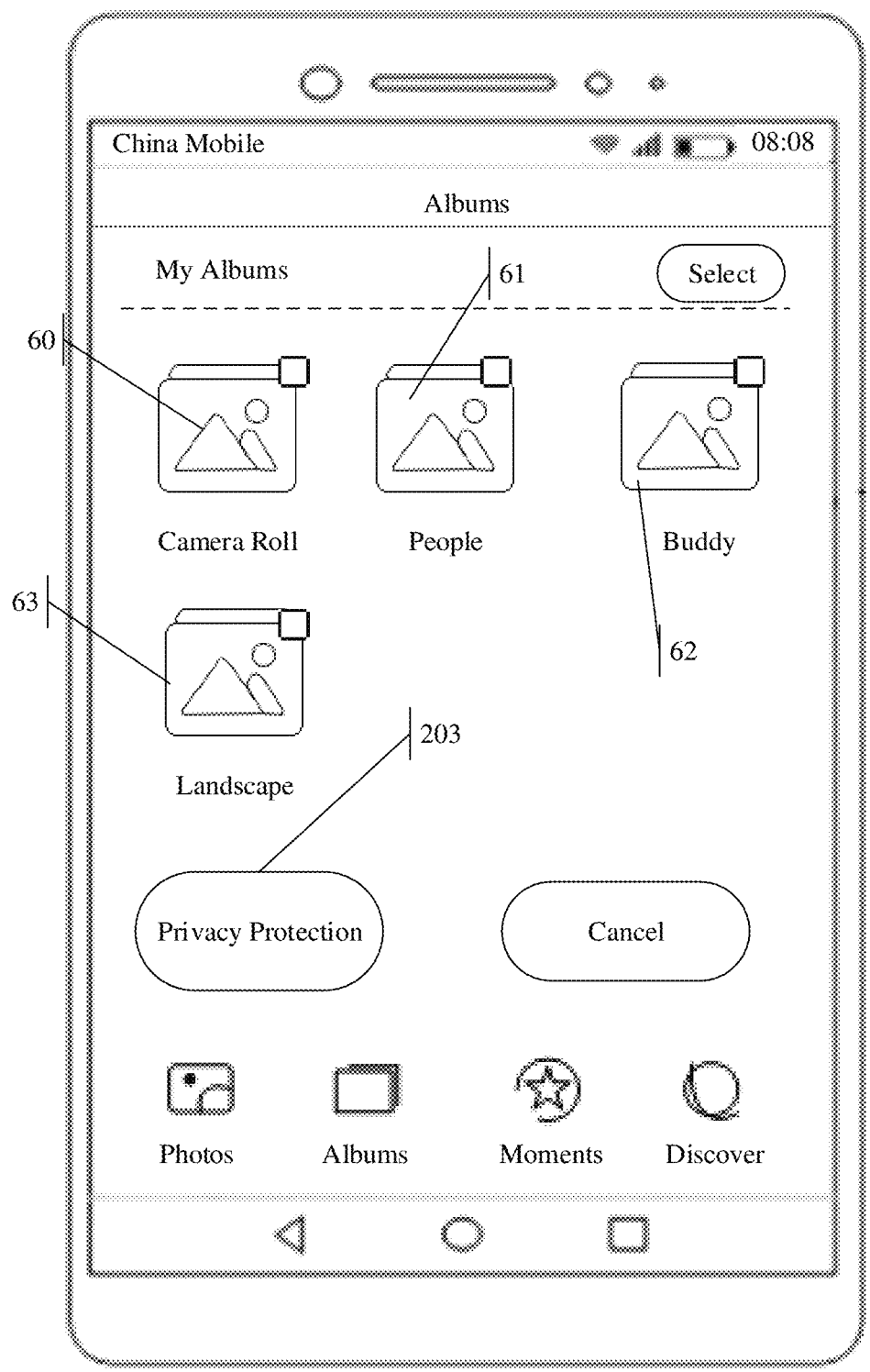
Figure 20C:
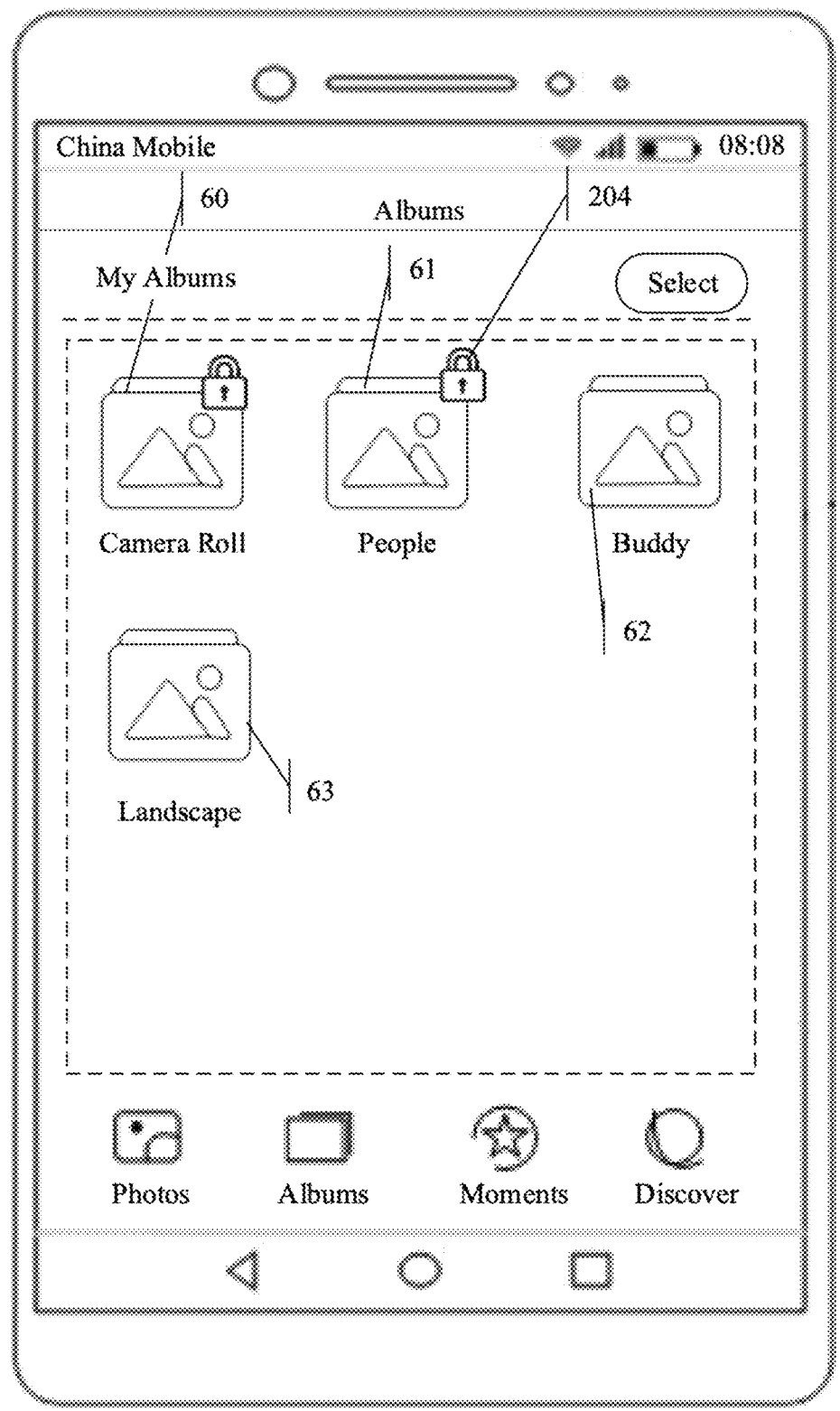
Figure 20D:
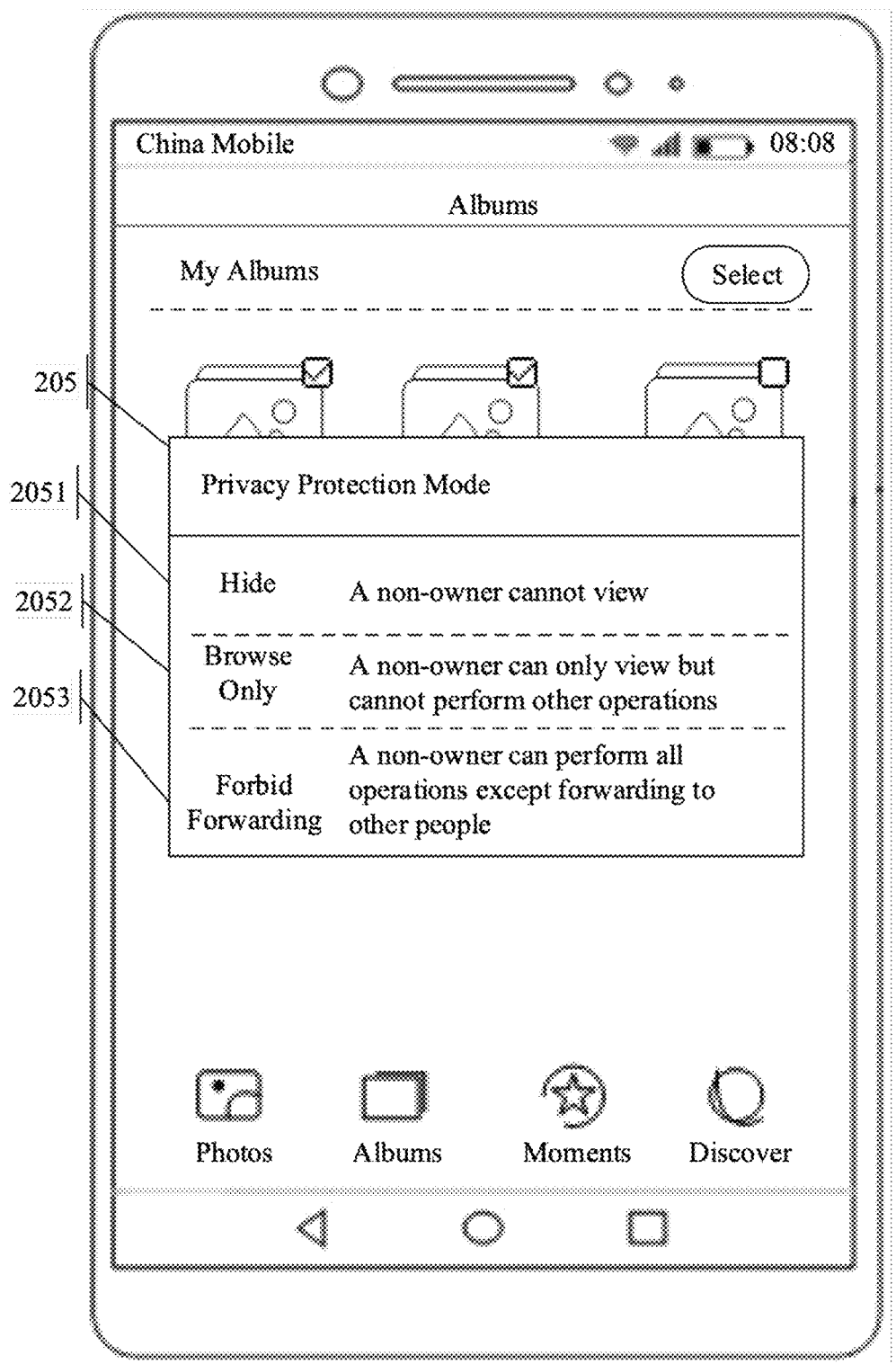

The user taps a Select button 202 in an upper right corner. After detecting an operation of tapping the Select button 202 by the user, the electronic device 100 displays a selection interface shown in FIG. 20B. There is a Privacy Protection button 163 at the bottom of the selection interface. If the user wants to set the camera roll album 60 and the people album 61 as private content, the user selects the camera roll album 60 and the people album 61, and then taps the Privacy Protection button 203 at the bottom. After detecting the operation, the electronic device 100 may directly set the two albums as private content and may further set privacy icons 204 for the two albums, as shown in FIG. 20C. Optionally, when a private album is set, a protection mode may be further set. For example, when detecting an operation of tapping the privacy protection icon 203 by the user, the electronic device 100 jumps to a privacy protection mode setting interface 205 shown in FIG. 20D. The privacy protection mode setting interface includes three buttons: a Hide button 2051, a Browse Only button 2052, and a Forbid Forwarding button 2053. The user selects a privacy protection mode of the album by triggering a corresponding button (for example, tapping a corresponding button). For example, if the user taps the Hide button, after detecting the operation performed by the user, the electronic device 100 sets the privacy protection mode for the corresponding album as follows: In an unauthorized user state, this part of content cannot be viewed. If the user taps the Browse Only button, after detecting the operation performed by the user, the electronic device 100 sets the privacy protection mode for the corresponding album as follows: The unauthorized user can browse this part of content but cannot perform an operation. Therefore, in the unauthorized user state, the album application displays the albums and the pictures included in the albums but does not display a corresponding Edit button (that is, the Edit button may be considered as private content), or the Edit button is in a disabled state (for example, displayed in gray). If the user taps the Forbid Forwarding button, after detecting the operation of the user, the electronic device 100 sets a privacy protection function for the corresponding album as follows: Forwarding to another device is forbidden, so that when the unauthorized user opens the corresponding album or a picture included in the album, the album application hides a forwarding button, or a forwarding button is in the disabled state, or the like. Optionally, prompt information may be further displayed beside each button, and is used to prompt the user for permission to view the corresponding album by the unauthorized user after the function is set for the album.

Similar setting manners may be used for pictures, other folders, and other files in the electronic device 100. This is not limited. Details are not listed in this embodiment.

Figure 21A:
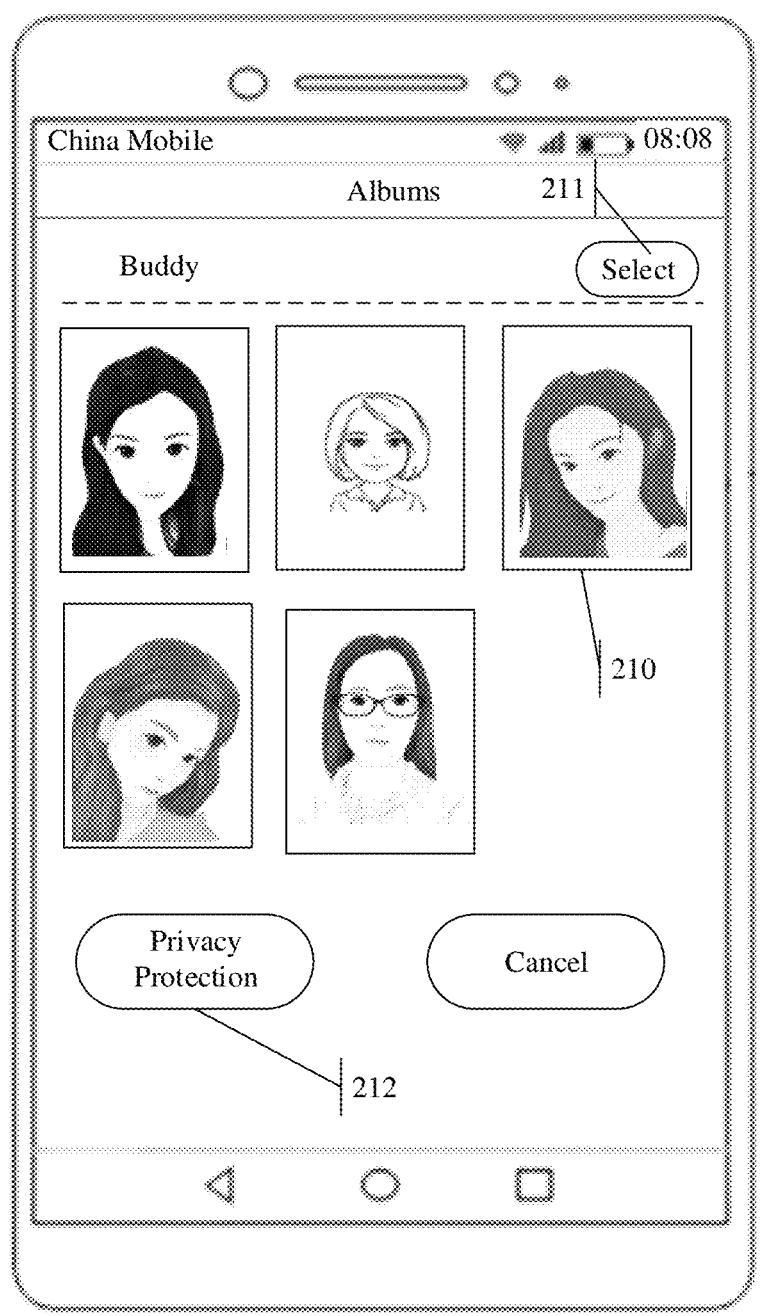
FIG. 21A to FIG. 21D are schematic diagrams for setting a private picture according to an embodiment.
Figure 21B:
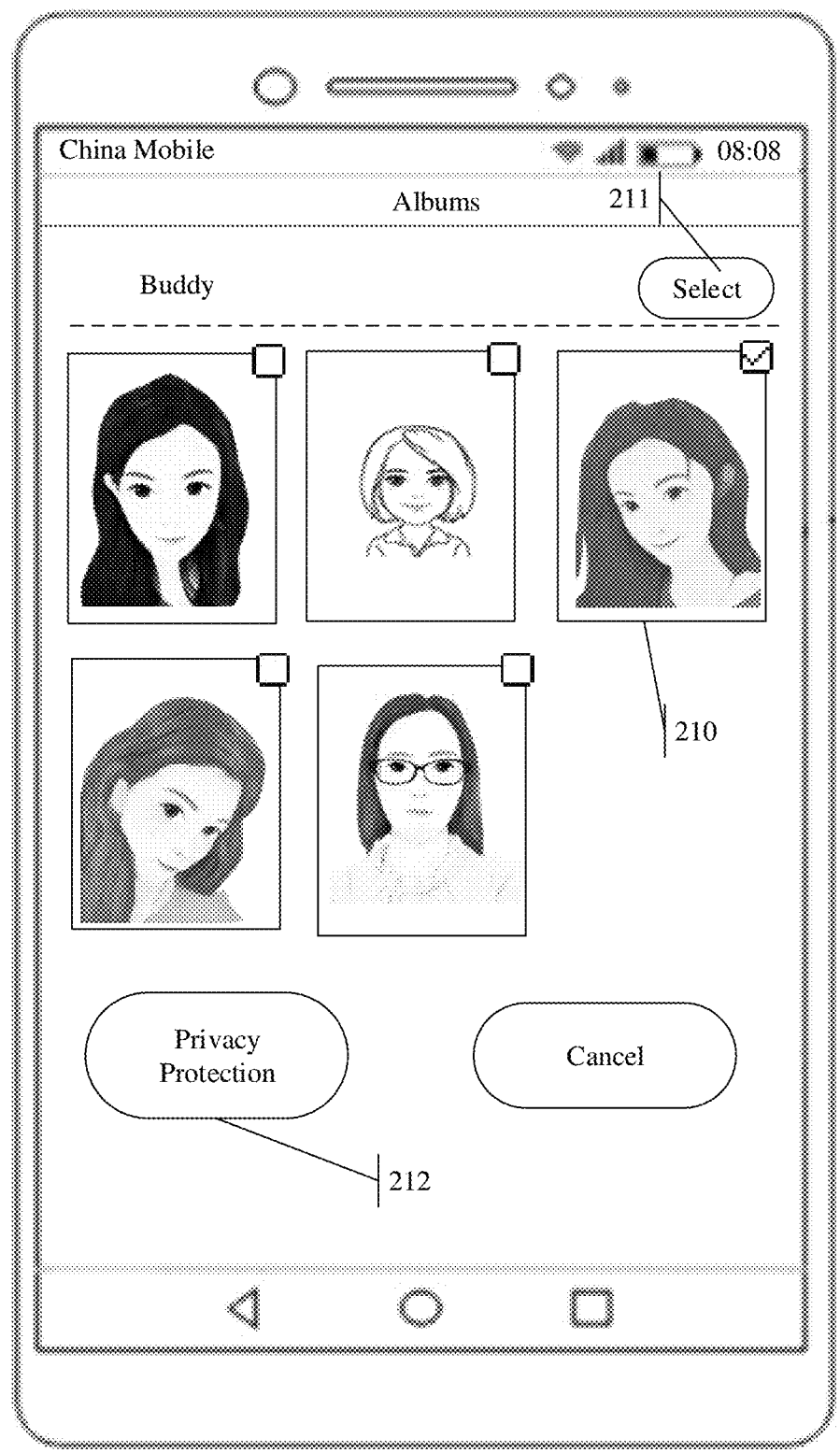
Figure 21C:
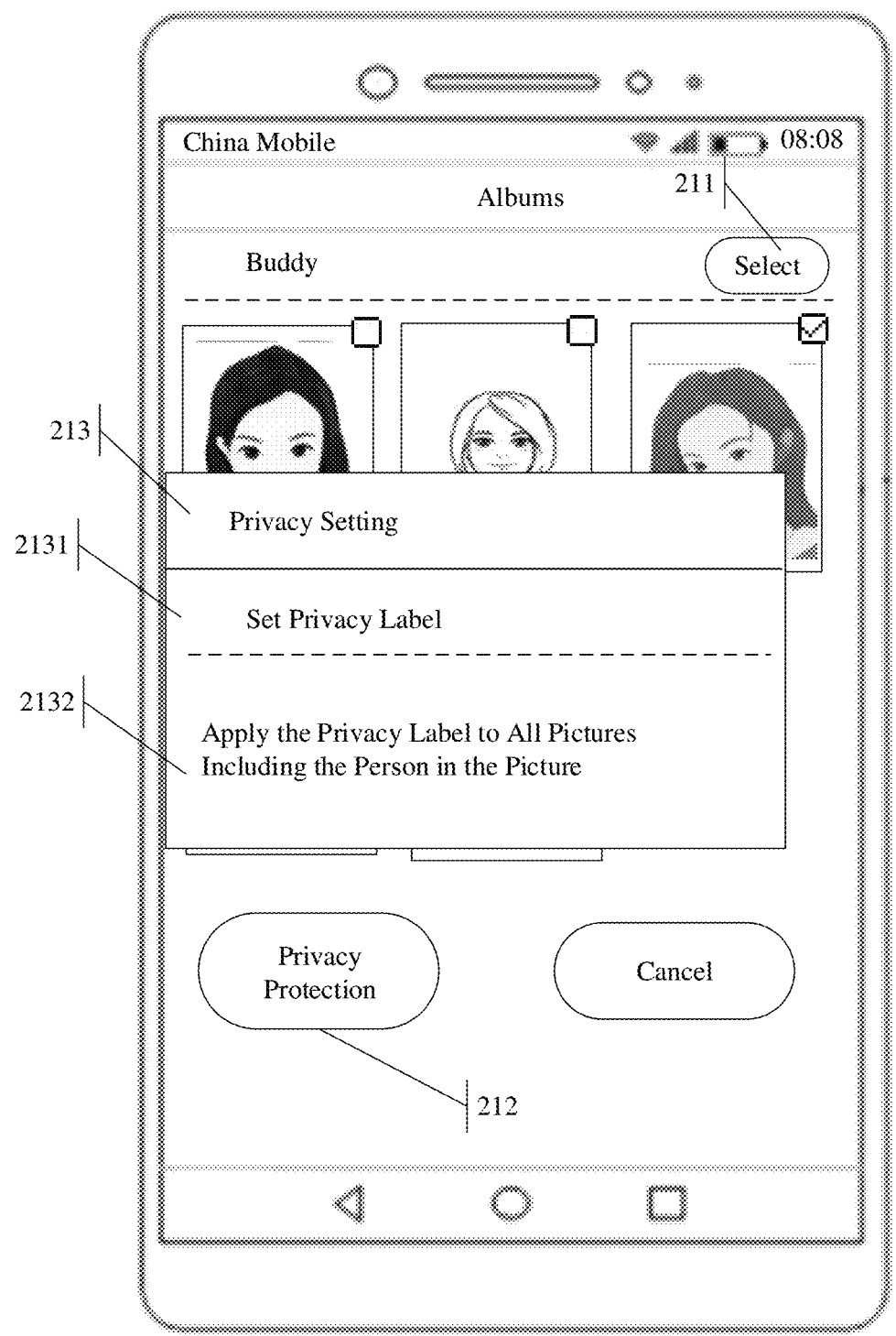
Figure 21D:
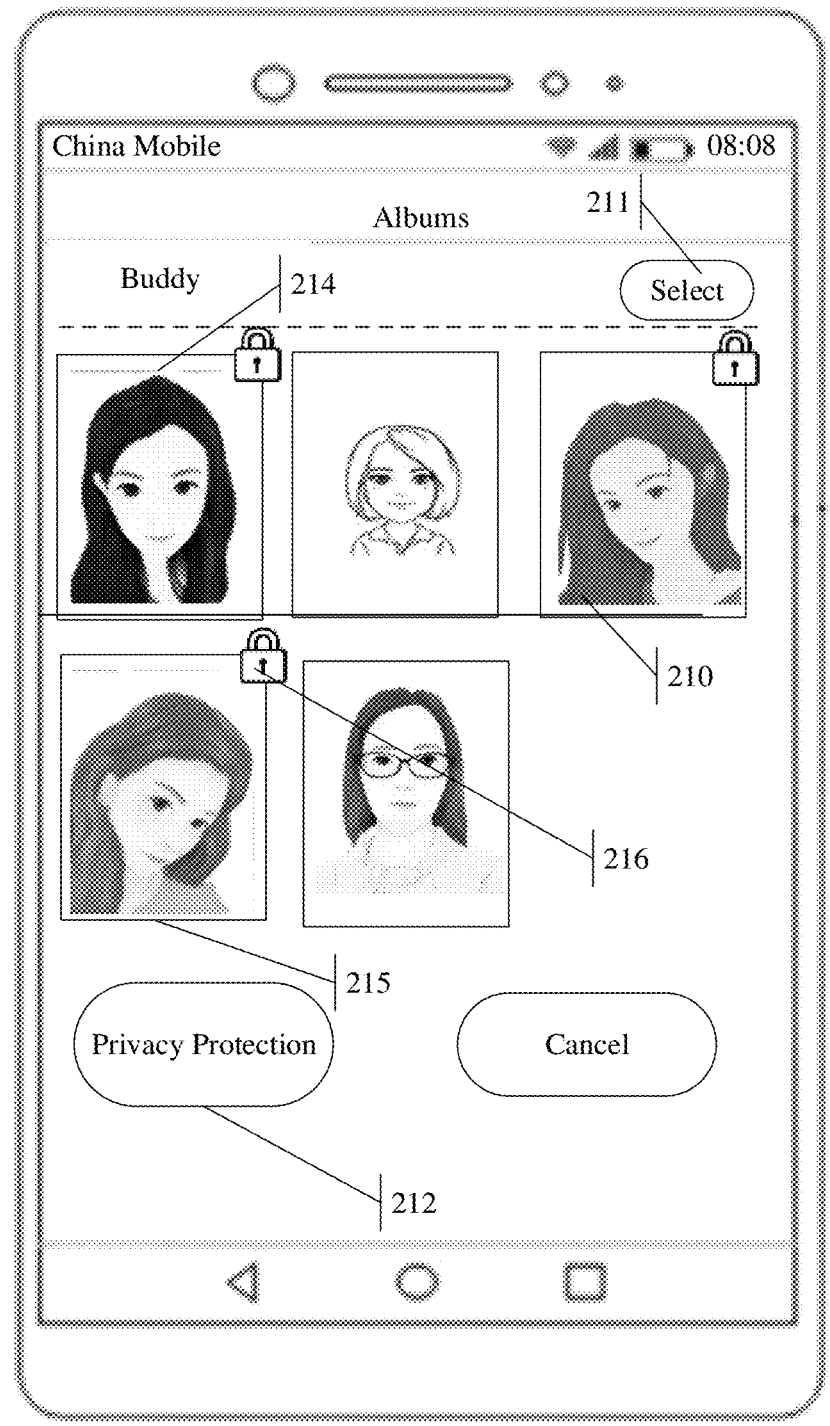

Optionally, while setting a privacy label for a picture, the user may further extend the label to all pictures including a person in the picture. After the electronic device 100 displays the album list shown in FIG. 20A, the user opens the buddy album 62 (for example, taps the icon 60 of the buddy album 62), and displays a picture list shown in FIG. 21A, where the picture list includes five pictures. The user wants to hide all pictures including a person in a picture 210 and taps the Select button 211. The electronic device 100 detects the operation of tapping the Select button 211 by the user and displays a selection interface shown in FIG. 21B. The user selects the picture 210, and then taps a privacy setting button 212 at the bottom. After detecting the operation, the electronic device 100 jumps to a privacy setting interface 213 shown in FIG. 21C. The privacy setting interface 213 includes two buttons: a Set Privacy Label button 2131 and an Apply the Privacy Label to All Pictures Including the Person in the Picture button 2132. The privacy label button 2131 is used to set a privacy label for the picture 210 selected by the user. For example, the electronic device 100 detects an operation of tapping the Set Privacy Label button 2131 by the user and sets a privacy label for the picture 210, thereby setting the picture 210 as private content. If the electronic device 100 detects a user operation of selecting the Apply the Privacy Label to All Pictures Including the Person in the Picture button 2132, the electronic device 100 not only sets the privacy label for the picture 210, but also recognizes pictures included in the album application (optionally, pictures in other applications may also be included), thereby determining all the pictures including the person in the picture 210, and sets privacy labels for the pictures, where the privacy labels may be set only for the pictures in the current album that include the same person as the selected picture (210), or the privacy label may be extended to the entire album application, or the privacy label may be further extended to the pictures included in other applications. Assuming that the electronic device 100 detects a user operation of tapping the Apply the Privacy Label to All Pictures Including the Person in the Picture button 2132, the electronic device 100 matches all the pictures in the album with the picture 210. Assuming that persons in a picture 214 and a picture 215 are found to be the same as the person in the picture 210, the electronic device 100 not only sets the privacy label for the picture 210, but also sets privacy labels for the pictures 214 and 215, so that the pictures are all set as private pictures. Optionally, privacy icons 216 may also be set for the private pictures. The buddy album 62 for which the privacy icons 216 are set is shown in FIG. 21D. Further, in other albums (for example, the camera roll album 60 and the landscape album 63), there may also be pictures including the same person as the picture 210. In this case, privacy labels are also set for related pictures in the camera roll album 60 and the landscape album 63. The foregoing solution can improve efficiency of setting private pictures and can avoid omission in manual settings of the user. The solution may also be applied to other folders, other files, system functions, and the like. This is not limited in this embodiment. In addition, after a privacy label is set, a privacy icon 216 may be further set for a corresponding private picture, to prompt the user that the picture is a private picture.

Figure 22A:
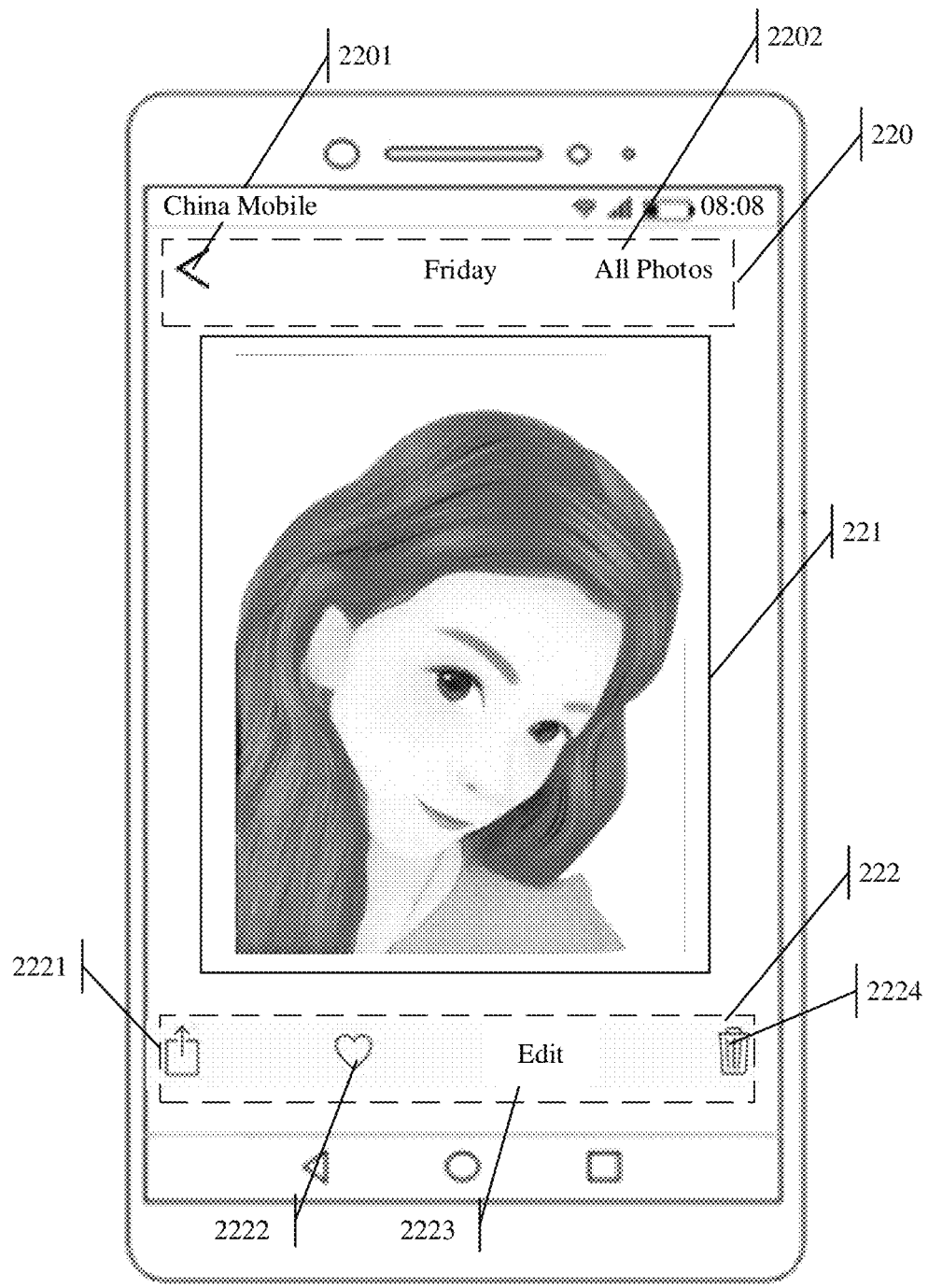
FIG. 22A and FIG. 22B are another schematic diagram for setting a private picture according to an embodiment.
Figure 22B:
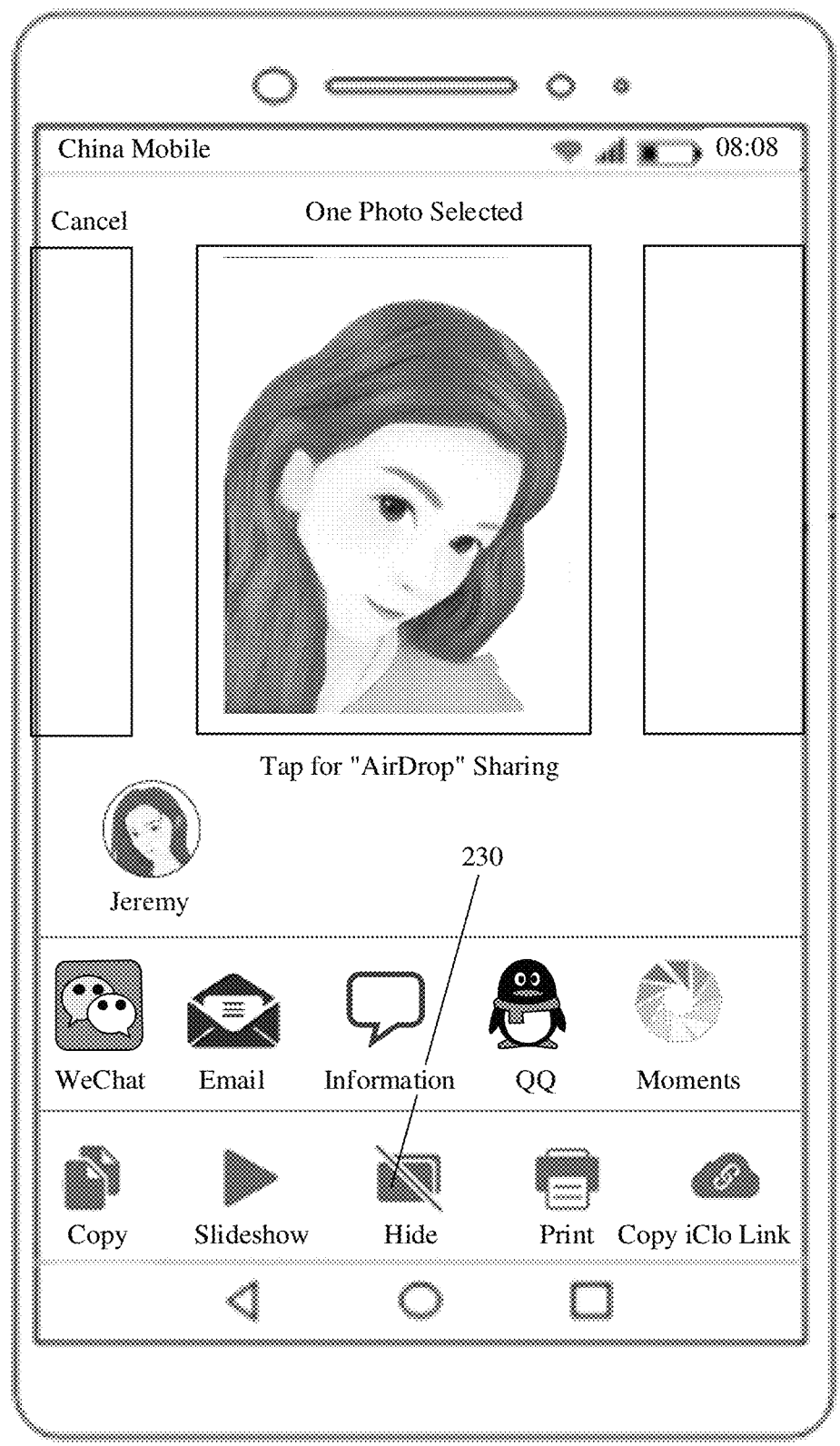

In another embodiment, after detecting an operation of viewing a picture by the user, the electronic device 100 displays a picture display interface shown in FIG. 22A. The picture display interface includes a picture display area 221, a top function menu area 220, and a bottom function menu area 222. The picture display area 221 is used to display a picture currently viewed by the user. The top function menu area 220 includes a control 2201 for returning to a previous-level menu and a control 2202 for displaying all pictures. The bottom function menu area 222 includes an operation button 2221, a Favorites button 2222, an Edit button 2223, and a delete button 2224. After the user taps the operation button 2221, and the electronic device 100 detects the operation, an operation interface shown in FIG. 22B is displayed. When detecting an operation of tapping the Hide button 230 by the user, the electronic device sets the picture as a private picture.

The preset system function and some functions of the private application of the electronic device 100 may also be set in the foregoing manner. This is not limited. Details are not listed in this embodiment.

In an embodiment, whether a user in front of the electronic device is an authorized user or an unauthorized user is determined based on face change detection (continuously detecting whether a face in front of the display of the electronic device 100 changes). Therefore, when the face in front of the display is the authorized user, the electronic device 100 displays private content, or when the face in front of the display is the unauthorized user, the electronic device 100 displays non-private content.

Figure 23:
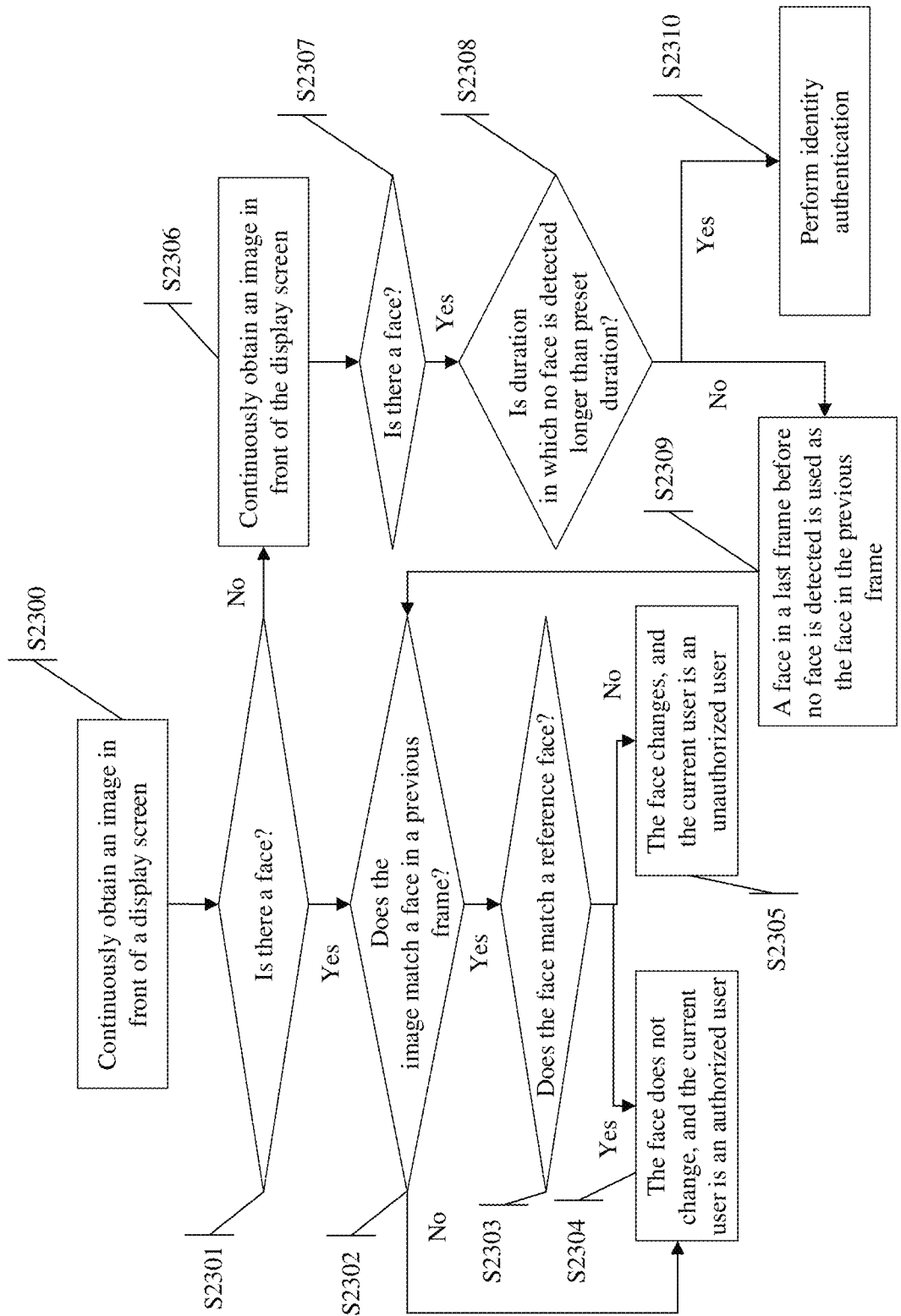
FIG. 23 is a flowchart of face change detection according to an embodiment.

As shown in FIG. 23, the face change detection includes the following steps:

S2300. Continuously obtain an image in front of the display.

In an implementation process, the image in front of the display may be captured by using the front-facing camera 193B. The front-facing camera 193B can obtain an image with higher precision, so that accuracy of face change detection can be improved. Alternatively, the image in front of the display may be captured by using the low-power camera 193B. Because energy consumption of the low-power camera 193B is lower than that of the front-facing camera 193B, a requirement on endurance of the electronic device 100 is reduced, and face change detection can be performed in more real time. In addition, because a resolution of the image captured by the low-power camera 193A is relatively low, privacy security of the user of the electronic device 100 can also be ensured.

In an implementation process, face change detection may be started at a plurality of occasions. The following lists three cases for description. The implementation process is not limited to the following three cases.

(1) In response to detecting that the electronic device 100 is powered on, a camera 193 of the electronic device 100 is started to continuously detect whether a face in front of the display of the electronic device changes.

For example, the camera 193 may be the front-facing camera 193B or the low-power camera 193A. Generally, to ensure endurance of the electronic device 100, the low-power camera 193A may be used. After the electronic device 100 is started, the low-power camera 193A is started. Therefore, whether a face changes is tracked in the entire power-on process. Because power-on authentication (for example, password authentication or fingerprint authentication) is generally required during startup, it can be ensured that a reference face for face change detection in an initial state is an authorized user (for example, the owner or a person authorized by the owner).

After entering the power-on state, the electronic device 100 sends a face change detection instruction to the processing subsystem. After receiving the face change detection instruction, the processing subsystem instructs the image signal processor to control the low-power camera 193A to capture an image. After obtaining the image captured by the low-power camera 193A, the processing subsystem runs the face change detection algorithm to obtain an operation result of whether the face changes.

(2) In response to detecting that the electronic device is successfully unlocked, a camera 193 of the electronic device 100 is started to continuously detect whether a face in front of the display of the electronic device changes.

For example, the user of the electronic device 100 may perform unlocking by using a fingerprint, a password, or a face. After the electronic device 100 detects the unlocking operation, the electronic device 100 is controlled to enter the unlocked state and send a face change detection instruction to the processing subsystem, to continuously determine whether a face changes. In this solution, energy consumption of the electronic device 100 can be reduced.

(3) In response to detecting that the screen of the electronic device is on, a camera 193 of the electronic device 100 is started to continuously detect whether a face in front of the display of the electronic device changes.

For example, after the electronic device 100 enters the unlocked state, the electronic device 100 may be in the screen-on state but may also be in the screen-off state temporarily. To further reduce energy consumption of the electronic device 100, face change detection may be started only when the electronic device 100 is in the screen-on state.

(4) In response to detecting an operation of starting a private application by the user of the electronic device, a camera 193 of the electronic device 100 is started to continuously detect whether a face in front of the display changes.

For example, an operation of enabling a private function includes, for example, starting a private application, or accessing a private album or a private picture. After the operation of enabling the private function is detected, identity authentication may be performed on the user first, and face change detection is started only after the identity authentication succeeds. In this way, energy consumption of the electronic device 100 can be further reduced. The identity authentication may be face recognition, fingerprint authentication, password authentication, nine-grid authentication, iris authentication, or the like.

S2301. Determine whether the image in front of the display includes a face.

For example, a feature point of the image in front of the display may be extracted, then the feature point is input into a face detection model, and whether the image includes a face is determined based on an output of the face detection model. Optionally, in addition to determining, by using the face detection model, whether the image includes a face, the face in the image may be positioned by using the face detection model, and high-precision face frame coordinates and face feature point coordinates are returned, thereby facilitating subsequent face feature matching. The face detection model is, for example, a gradient vector flow model or an active contour model. This is not limited in this embodiment.

S2302. Determine whether a captured image matches a face in a previous frame.

For example, after face change detection is started, and the camera 193 (for example, the low-power camera 193A) captures a face, the face is stored in a first template library. When it is determined, based on S1801, that the currently captured image includes a face, the image is matched with the face in the first template library; and if the matching succeeds, it is considered that the face does not change; otherwise, the process goes to S2303.

If the current face matches the face in the previous frame, the face in the first template library is replaced with the current face, so that the face stored in the first template library is a face of a tracked object in a latest frame (the tracked object may be the owner or may be a non-owner, and this is not limited in this embodiment). If the current face and the face in the previous frame are determined, the face in the first template library is not replaced with the current face.

S2303. Determine whether the current face matches the saved reference face. For example, the reference face is a face captured in the current unlocking period. Each time the electronic device 100 starts face change detection, the electronic device 100 first captures the reference face, and then compares the subsequently captured face with the reference face. At an initial stage of face change detection, a face of the tracked object is captured, and then stored in a second template library. In a face change detection period, the face in the second template library does not change, and the subsequently captured face is compared with the face in the second template library. In a process of using the electronic device 100 by the user, the user may take off glasses or add headwear, or the like halfway, causing incorrect determining in S2302. To prevent incorrect determining, after it is determined that the face changes in S2302, whether the current face and the reference face are the authorized user is determined. If the current face and the reference face are the authorized user, the process goes to S2304. If it is determined that the current face and the reference face are not the authorized user, the process goes to S2305.

S2304. Determine that the face does not change, and that the current user is still the authorized user.

When a private application (or another private function) needs to invoke a result of the face change detection, the private application sends a request to the processing subsystem. The processing subsystem sends the result of the face change detection to the application, and the application performs corresponding processing based on the result of the face change detection. Alternatively, when an application lock function detects that a currently started application is a private application, the application lock function sends a request to the processing subsystem, and the processing subsystem sends a result of the face change detection to the application lock function.

S2305. Determine that the face changes, and that the current user is not the authorized user.

In an implementation process, the foregoing step S2301 may be omitted, that is, whether the image captured by the camera includes a face is not determined, and a similarity value between the captured image entirety that includes a face and the face image in the first template library (or the second template library) is directly calculated. If the similarity value between the face in the captured image and the face in the first template library is greater than a first preset threshold (for example, 70% or 80%), it is considered that the face in the captured image matches the face in the previous frame; or if the similarity between the face in the captured image and the face in the second template library is greater than a second preset threshold (for example, 75% or 85%), it is considered that the face in the captured image does not change relative to the reference face, or the like. The first preset threshold and the second preset threshold may be set based on an actual requirement. The first preset threshold and the second preset threshold may be the same or different. This is not limited in this embodiment.

Step S2302 or step S2303 may be omitted, that is, whether the face changes may be determined only by matching the face with the face in the first template library, or whether the face changes may be determined only by matching the face with the face in the second template library. When only one template library is used to determine whether the face changes, using the second template library can ensure that the tracked object does not change in the whole tracking process, and improve accuracy of tracking.

A sequence of step S2302 and step S2303 may be changed, that is, the current image may be first compared with the second template library, and if it is considered, based on a comparison result, that the current image matches the reference face, it is considered that the current face does not change. If it is considered, based on a comparison result, that the current image does not match the reference face, the current image is matched with the first template library. If the matching succeeds, it is considered that the face does not change; or if the matching fails, it is considered that the face changes.

Alternatively, there may be no execution sequence between the foregoing steps S2302 and S2303, and whether the current face matches the reference face may be determined, to obtain a first matching result; whether the current face matches the face in the previous frame is determined, to obtain a second matching result; and if both the first matching result and the second matching result indicate that the matching fails, it is considered that the face changes. If the first matching result indicates that the matching succeeds, or the second matching result indicates that the matching succeeds, or both the first matching result and the second matching result indicate that the matching succeeds, it is considered that the face does not change.

In addition, when the current face is compared with the face in the first template library, if comparison results of a plurality of consecutive frames (for example, three frames or five frames) all indicate that the current face does not match the face in the first template library, the current face is no longer matched with the face in the first template library, and a face template in the first template library is no longer updated, but a subsequently detected current face is compared with the face in the second template library. If the comparison fails, the subsequently detected face is always compared with the face in the second template library; or if the comparison succeeds, the first template library is updated, and the subsequently detected face is compared with both the face in the first template library and the face in the second template library. Based on this, after the face switches from the authorized user to the unauthorized user and then switches back to the authorized user, it may be determined that the face does not change. In the foregoing steps S2302 and 2303, whether the current image matches a comparative image (the face in the previous frame or the reference face) may be determined in a plurality of manners. The following lists three manners for description. The implementation process is not limited to the following three cases.

Manner 1: Determine whether the current image changes in terms of a face quantity relative to the comparative image; and if the face quantity changes, consider that the current image does not match the comparative image; or if the face quantity does not change, compare whether a face feature in the current image matches a face in the comparative image.

Figure 24A:
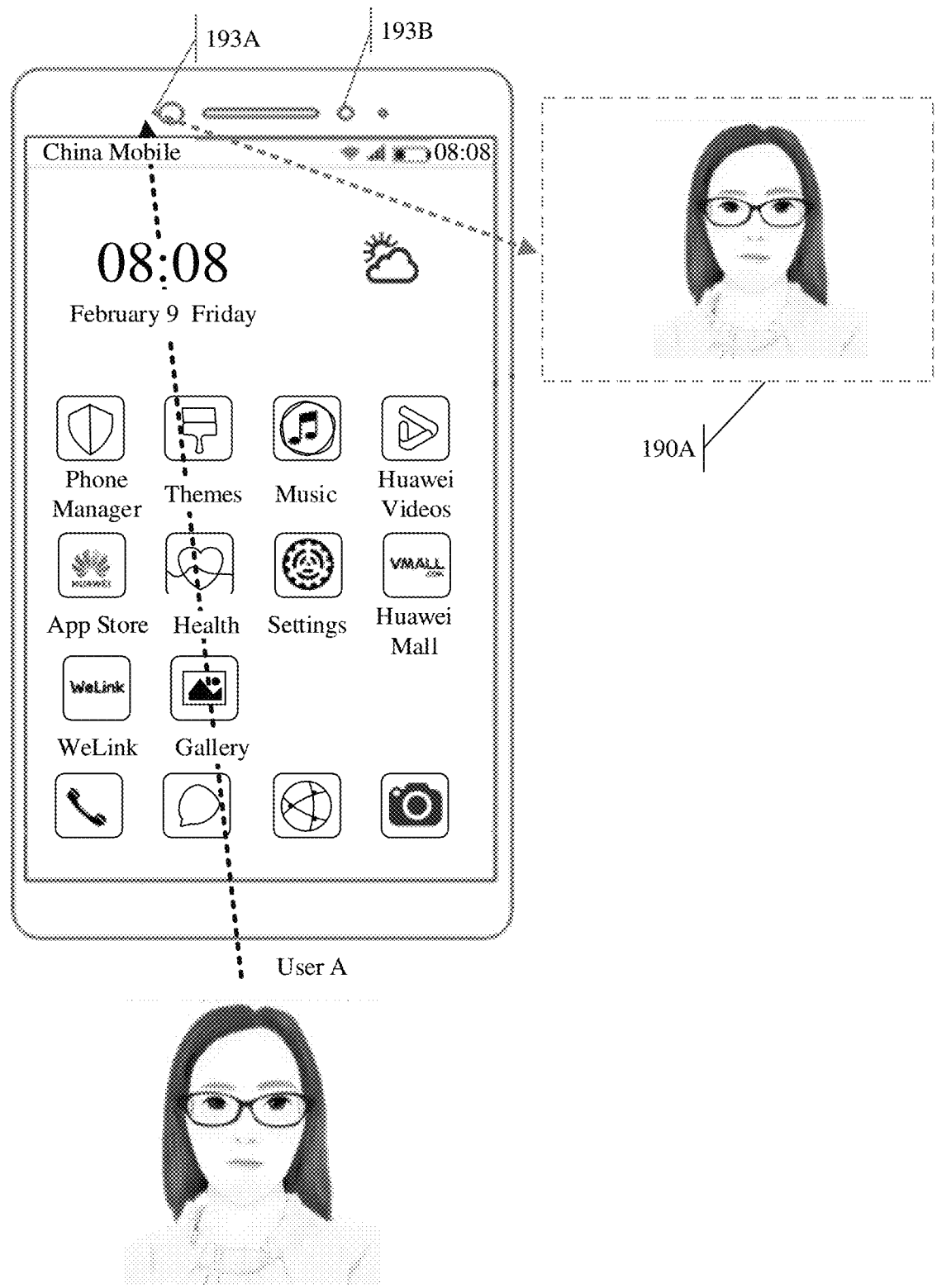
FIG. 24A to FIG. 24D are schematic diagrams of results of face change detection according to an embodiment.
Figure 24B:
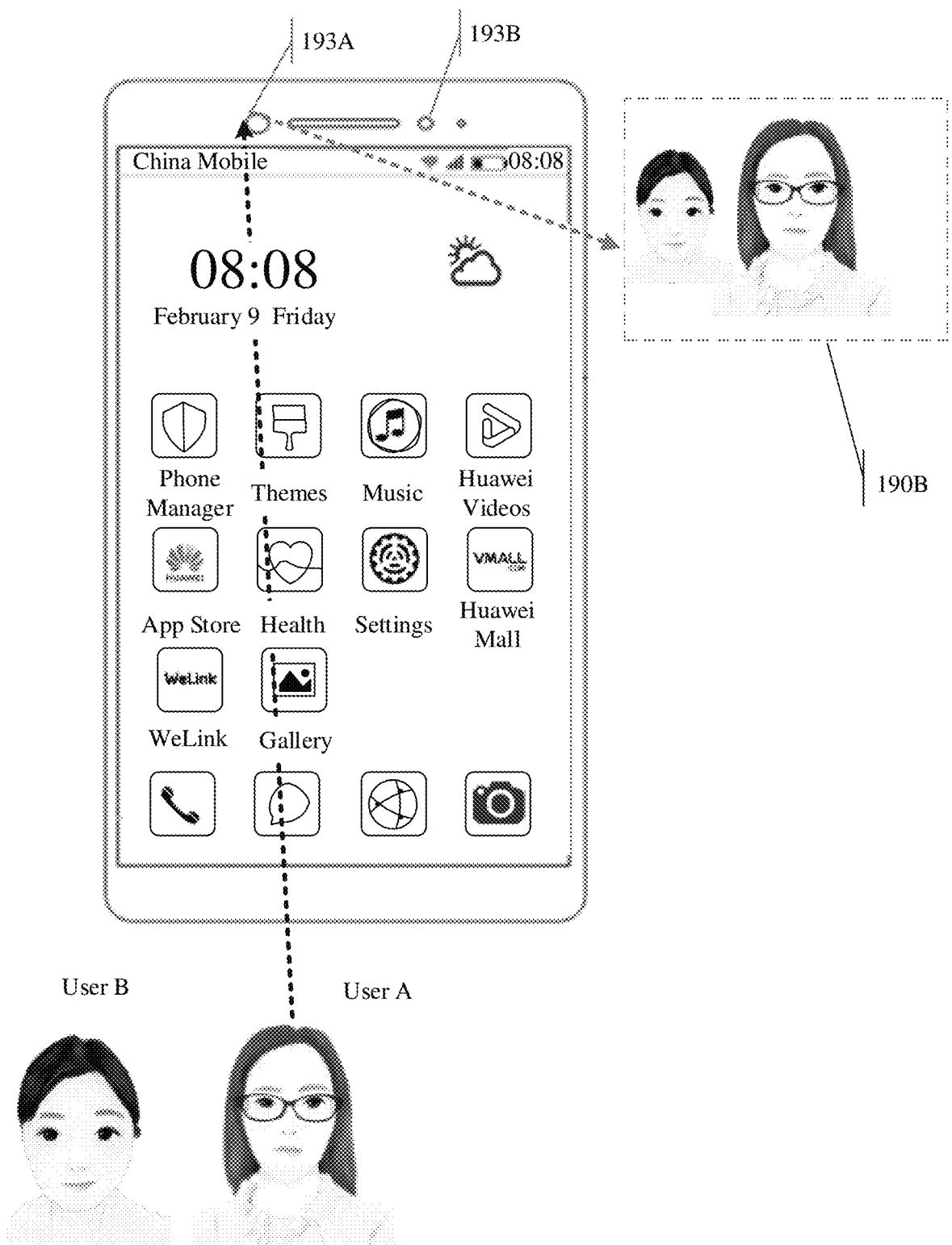
Figure 24C:
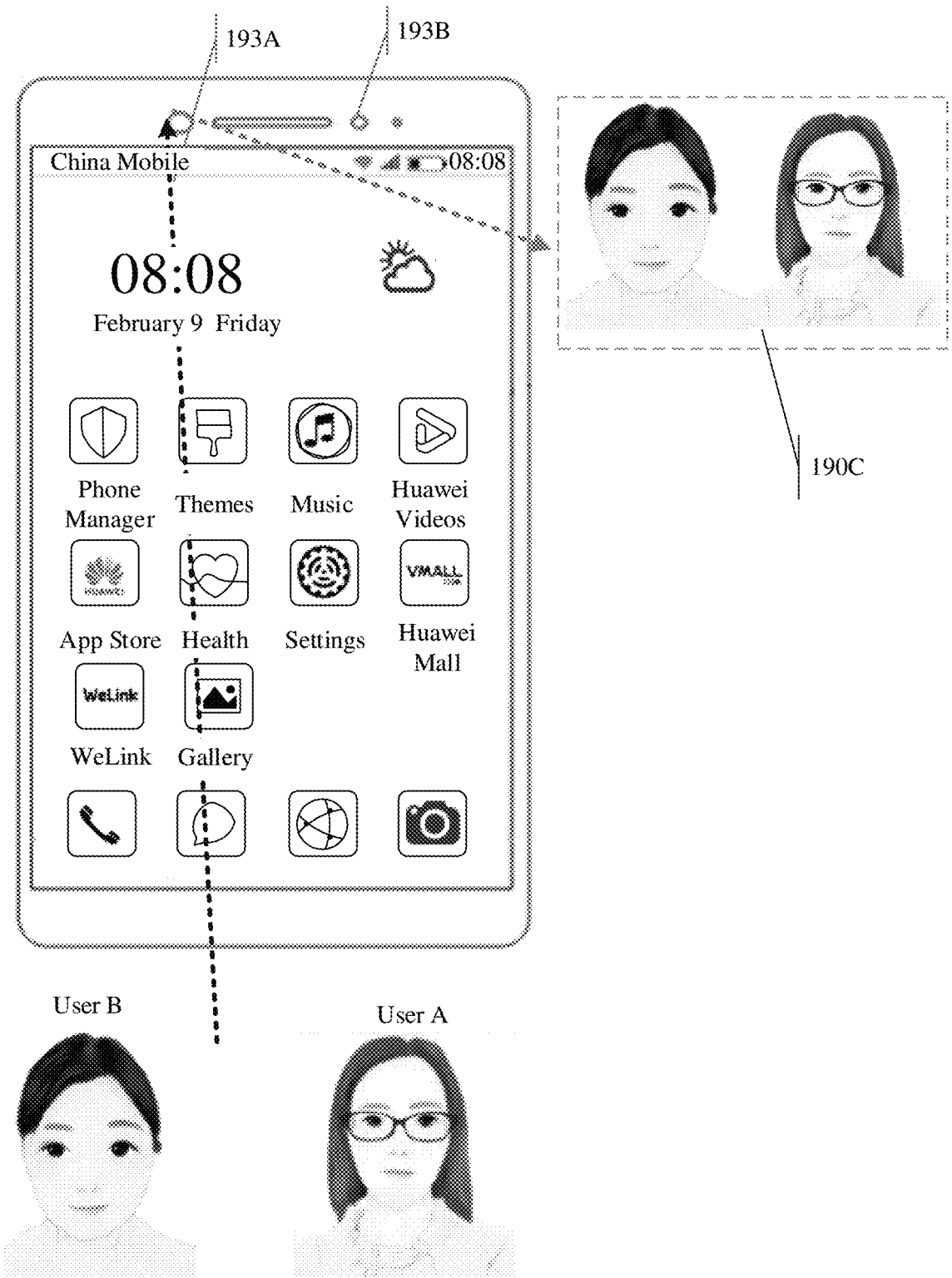
Figure 24D:
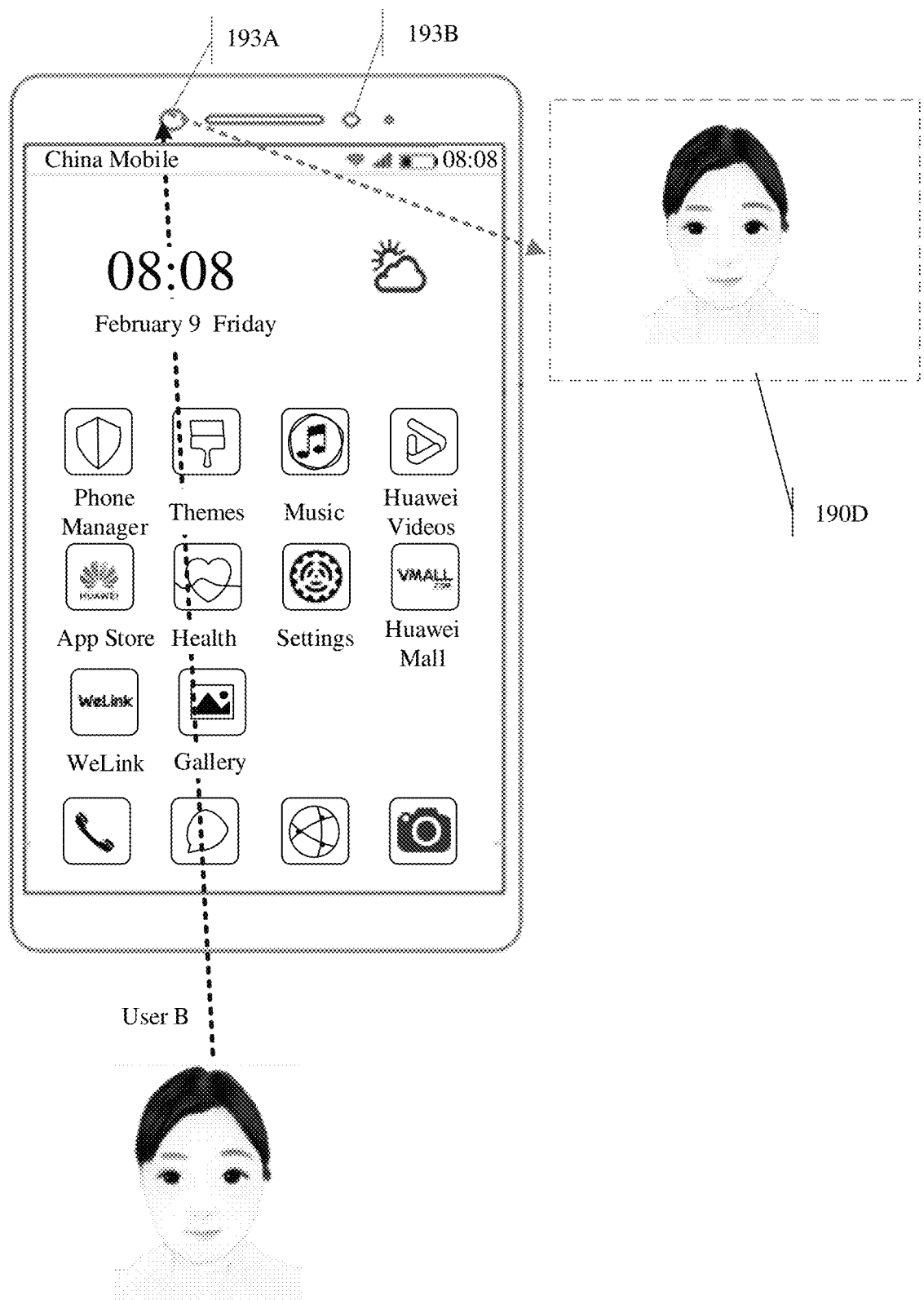

For example, the face feature in the current image may be extracted based on S2301, so that the face quantity is determined; and the face quantity is compared with a quantity of faces in the first template library. If the quantities are different, it is considered that the face changes relative to the comparative image; or if the quantities are the same, a similarity between the face feature in the current image and the face feature of the face in the first template library is further compared. The manner is similar to the manner of comparison with the reference face. Details are not described herein again. Assuming that the user A uses the electronic device 100 at the initial stage, the electronic device 100 captures a face 190A of the user A, as shown in FIG. 24A. The face quantity changes, for example, as shown in FIG. 24B and FIG. 24C, or the face quantity does not change, but the face feature changes, for example, as shown in FIG. 24D.

Manner 2: Extract a face feature having the largest area in the current image and match the face feature having the largest area with a face feature having the largest area in the comparative image, and if the matching succeeds, consider that the face does not change relative to the comparative image; otherwise, consider that the face changes relative to the comparative image.

Manner 3: Calculate a similarity value between the current image and the comparative image; and if the similarity value is greater than a preset threshold, consider that the face does not change relative to the comparative image; otherwise, consider that the face changes relative to the comparative image.

Optionally, if a detection result in step S2301 determines that the image in front of the display does not include a face, with continued reference to FIG. 23, the method may further include the following steps:

S2306. Continuously obtain an image in front of the display, where an obtaining process is similar to that of S2301, and details are not described herein again.

S2307. Determine whether the image in front of the display includes a face, where a determining process is similar to that of S2301, and details are not described herein again; and if not, return to S2306; or if yes, go to S2308.

S2308. Determine whether duration in which no face is detected is longer than preset duration.

For example, when it is determined that the image in front of the display does not include a face, the processing subsystem may trigger a timing function, and record duration in which the image in front of the display does not include a face and does not stop timing until a face is detected again. In a process of face change detection, no face may be detected sometimes. This is possibly because the user does not use the electronic device 100 temporarily, or because the electronic device 100 has a relatively great posture change (for example, the user flips the electronic device 100, or the electronic device 100 shakes). The two cases can be distinguished by whether the duration is longer than the preset duration, so that different processing is performed. The preset duration is, for example, 4 seconds or 5 seconds. This is not limited in this embodiment.

S2309. If the duration is no longer than the preset duration, it indicates that there may be a relatively great posture change of the electronic device 100. In this case, after a face is captured again, a previously saved face in a last frame may be used as the face in the previous frame. Therefore, the process goes to S2302 to continue to determine whether the face changes. When the image in front of the display does not include a face, the first template library may not be updated, or when no face is captured, the current image may be replaced by using the face in the previous frame, so that when the captured face is intermittent, face change detection can also be effectively performed.

S2310. If the duration is longer than the preset duration, it usually indicates that the user temporarily stops using the electronic device 100. Therefore, faces in the first template library and the second template library may be released, and when a face is detected again, identity authentication of the corresponding user is first performed. If the authentication succeeds, the face change detection is started. The identity authentication may include fingerprint authentication, password authentication, face authentication, or the like.

Based on the foregoing solution, when no face is detected within a short time, the face change detection function does not need to be restarted. Therefore, processing efficiency of the electronic device 100 is improved. In a scenario in which identity authentication needs to be performed before face change detection is started, when accuracy of face change detection is ensured (the tracked object is the owner or the person authorized by the owner), user operations can be reduced, and operation convenience can be improved.

The identity authentication may be performed after it is detected that the face changes or may be performed when it is detected that the user enables a private function (for example, the user starts a private application) again. This is not limited in this embodiment. The identity authentication may be face authentication, password authentication, fingerprint authentication, iris authentication, nine-grid authentication, or the like.

The identity authentication may be verifying whether the user is an authorized user (for example, the owner, or the person authorized by the owner), to prevent an unauthorized user from using the private function of the electronic device 100. Alternatively, the identity authentication may be verifying whether the electronic device 100 is currently operated by a person, to prevent unintentional triggering.

If the identity authentication is not face authentication, face change detection may be performed during the identity authentication, that is, a face captured during the identity authentication is used as a face in the second template library. If the identity authentication is face authentication, a face captured after a preset time period (for example, 5 seconds to 10 seconds) after the identity authentication may be used as a face in the second template library. Alternatively, when the face authentication succeeds and the face switches to another face, the face after switching may be captured and used as a face in the second template library. Alternatively, regardless of which identity authentication mode is used, an image captured after a preset time period (for example, 5 seconds to 10 seconds) after the identity authentication may be used as a face in the second template library. In this solution, it can be ensured that after the non-owner obtains authorization, face change detection can be performed on the non-owner. In the foregoing solution, face change detection can be performed on the non-owner.

Optionally, at different stages, the electronic device 100 may track different users. For example, at the initial stage, the electronic device 100 performs identity authentication on a first user (the owner) in the face authentication mode. After detecting that the identity authentication of the first user succeeds, the electronic device 100 captures a face of the first user as a reference face for face change detection and stores the face. Subsequently, the first user hands the electronic device 100 to a second user (a non-owner), and identity authentication is performed on the second user in a non-face authentication mode (for example, by using a fingerprint of the first user or a preset password). After the authentication succeeds, the electronic device 100 captures a face of the second user to perform face change detection. It can be learned that the electronic device 100 can track the owner and the non-owner, and both the owner and the non-owner may become authorized users.

Optionally, before face change detection is performed, to ensure that the tracked object is the authorized user (for example, the owner, or the person authorized by the owner), alternatively, the identity authentication may be performed first, and after the identity authentication succeeds, the current user is determined as the authorized user, and then face change detection is performed on the authorized user, where the authorized user may be the owner or the person authorized by the owner. For example, the owner informs the other party of an identity authentication password, performs authorization by using a fingerprint of the owner, or performs authorization by using a face feature of the owner.

If the identity authentication mode is the user's biometric feature (for example, a fingerprint, a face, or an iris), the electronic device 100 may further determine, based on the biometric feature, whether the user is the owner, and therefore record whether a current state is an owner state. Therefore, during face change detection, the result of the face change detection of the electronic device 100 may be whether the face changes or may be the current state. For example, if the electronic device is in the owner state at the initial stage and the face does not change, the result of the face change detection is that the current state is the owner state; or if the electronic device is in the owner state at the initial stage and the face changes, the result of the face change detection is that the current state is the non-owner state. In the non-owner state, if the face changes, the result of the face change detection is: state unknown. In the non-owner state, if the face does not change, the result of the face change detection is: the non-owner state.

For another example, the result of the face change detection includes, for example, face change+owner state before the change (the current state is the non-owner state), face change+non-owner state before the change (the current state is unknown), no face change+owner state currently, or no face change+non-owner state currently.

Based on the foregoing solution, when the authorized user uses the electronic device 100, different use permissions may be subsequently provided for the authorized user based on whether the authorized user is the owner or a non-owner. For example, the owner can use all functions of the electronic device, and the non-owner can use only currently authorized functions (for example, a private application, a private file or a private folder, and a private system function); alternatively, the non-owner can obtain authorization only in a preset time period (for example, 5 minutes or 10 minutes); alternatively, the private function may be divided into a plurality of privacy levels, and the non-owner can obtain only a private function equivalent to a level of the currently used private function.

However, if the identity authentication mode is, for example, a password or a preset path, other than the user's biometric feature, the electronic device 100 cannot determine whether the current state is the owner state, and the result of the face change detection is: whether the face changes relative to the authorized user.

In an implementation process, the identity authentication may be an independent identity authentication process. For example, the identity authentication is started when it is detected that the user starts a private application for the first time. Alternatively, the identity authentication may be another identity authentication process before a private application is started. For example, if face change detection is started when the electronic device 100 is unlocked, the unlocking process of the electronic device 100 may be used as the identity authentication process.

Optionally, the identity authentication mode is face recognition. A face may be captured by using the electronic device 100, and then the face is compared with the reference face (for example, a reference face recorded by using the face enrollment interface shown in FIG. 17). Whether a similarity value is greater than a third preset threshold (for example, 70% or 75%) is determined. If the similarity value is greater than the third preset threshold, it is considered that the current user is a preset user; or if the similarity value is not greater than the third preset threshold, it is considered that the current user is not a preset user; and face change detection is started only when the similarity value is greater than the third preset threshold.

A face may be captured by using the low-power camera 193A to perform face recognition. Because energy consumption of the low-power camera 193A is lower than that of the front-facing camera 193B, energy consumption of the electronic device 100 can be further reduced. Alternatively, a face may be captured by using the front-facing camera 193B to perform face recognition. Because capture precision of the front-facing camera 193B is higher than that of the low-power camera 193A, face matching precision can be improved, and privacy protection accuracy is improved.

In another possible case, the electronic device 100 enters the screen-off state from the screen-on state. In this case, to reduce energy consumption, face change detection may be suspended. The electronic device 100 saves a last frame of image captured by the camera 193 and stores the last frame of image in the first template library. When the electronic device 100 is in the screen-off state, updating the first template library is stopped; and when it is subsequently detected that the electronic device 100 switches from the screen-off state to the screen-on state again, whether duration of the electronic device being in the screen-off state is longer than preset duration is determined, and if no, face change detection is continued based on the face stored in the first template library.

Based on the foregoing solution, when no face is detected within a short time, the face change detection function does not need to be restarted. Therefore, processing efficiency of the electronic device 100 is improved. In a scenario in which identity authentication needs to be performed before face change detection is started, when accuracy of face change detection is ensured (the tracked object is the owner or the person authorized by the owner), user operations can be reduced, and operation convenience can be improved.

In an implementation process, when it is determined, based on the face change detection, that the face changes, whether the face meets a second preset condition may be further determined, and whether the user has a screen sharing behavior may be determined based on whether the face meets the second preset condition. The second preset condition includes a plurality of cases. The following lists several cases for description. The implementation process is not limited to the following several cases.

Case 1: Whether the current face includes the tracked object is determined (the current face may be matched with the reference face or may be matched with a face feature of the tracked object in the previous frame of face or may be matched with both). If the current face does not include the tracked object, it is considered that the second preset condition is not met. If the current face includes the tracked object, whether a difference between a total quantity of pixels of the face feature of the included tracked object and a total quantity of pixels of another face feature is less than a preset threshold is determined. If the difference is less than the preset threshold, it is considered that the user has a screen sharing behavior, and the face meets the second preset condition. If the difference is not less than the preset threshold, it is considered that the user has no screen sharing behavior, and the face does not meet the second preset condition. The preset threshold may be set based on an actual situation such as a sampling resolution, for example, 40 pixels or 50 pixels.

As shown in FIG. 24A, assuming that at the initial stage, the owner uses the electronic device 100, the face captured by the camera 193 includes only the face feature of the owner. At a moment, a user B looks at the display of the electronic device 100 over a shoulder, as shown in FIG. 24B. In this case, the owner does not actively share the screen with the user B, and therefore, the user B has a relatively partial view. Therefore, a total quantity of pixels of the face feature of the user A in the face captured by the camera 193 is obviously greater than a total quantity of pixels of a face feature of the user B (that is, the difference between the total quantities of pixels is greater than the preset threshold).

However, if the user A sees a wonderful picture at a moment and wants to share the picture with the user B for viewing, the user A usually pushes the electronic device 100 toward the user B, so that the electronic device 100 is located between the user A and the user B, as shown in FIG. 24C. In this case, there is no great difference between the total quantity of pixels of the face feature of the user A in the face captured by the camera 193 and the total quantity of pixels of the face feature of the user B (that is, the difference between the total quantities of pixels is greater than the preset threshold). In this case, it is considered that the second preset condition is met.

Case 2: Whether the current face includes a face (a reference face) of the authorized user is determined. If the current face does not include the face of the authorized user, it is considered that the second preset condition is not met. If the current face includes the face of the authorized user, whether an offset of the face feature of the authorized user in the current face relative to the face feature of the face in the previous frame is greater than a preset offset is determined. If the offset is greater than the preset offset, the face meets the second preset condition. If the offset is not greater than the preset offset, the face does not meet the second preset condition.

Similarly to the case 1, if the owner shares the screen, the owner moves the electronic device 100 toward the user B. In this case, the face feature of the authorized user in the current face obviously deviates. However, if the owner does not share the screen, the owner does not move the electronic device 100. In this case, the face feature of the authorized user in the current face does not obviously deviate. The preset offset is, for example, 20 pixels or 30 pixels. This is not limited in this embodiment.

Case 3: Whether a motion amount of the electronic device is greater than a preset motion amount in a preset time period (for example, 1 second or 2 seconds) in which the face changes is determined. If the motion amount is greater than the preset motion amount, it is considered that the face meets the second preset condition; otherwise, it is considered that the face does not meet the second preset condition.

Similarly to the case 1, if the user A shares the screen, the user A moves the electronic device 100 toward the user B. Therefore, a motion amount of the electronic device is relatively large. However, if the user A does not share the screen, the user A does not move the electronic device 100, and therefore, a motion amount of the electronic device 100 is relatively small. The preset motion amount is, for example, 20 centimeters or 30 centimeters. This is not limited in this embodiment.

In an implementation process, if the identity authentication process is face recognition, after the face recognition, whether the face meets a first preset condition may also be determined based on the foregoing solution, where the first preset condition is similar to the second preset condition. On a basis that the face includes a plurality of face features including the face feature of the authorized user, whether the face meets the first preset condition may be determined by determining a difference between a total quantity of pixels of the face feature of the tracked object and a total quantity of pixels of another face feature. Alternatively, whether the first preset condition is met may be determined by determining whether the offset of the face feature of the authorized user in the current face relative to the face feature in the face in the previous frame is greater than the preset offset. Alternatively, whether the motion amount of the electronic device is greater than the preset motion amount may be determined. Details are not described again in this embodiment.

Figure 25:
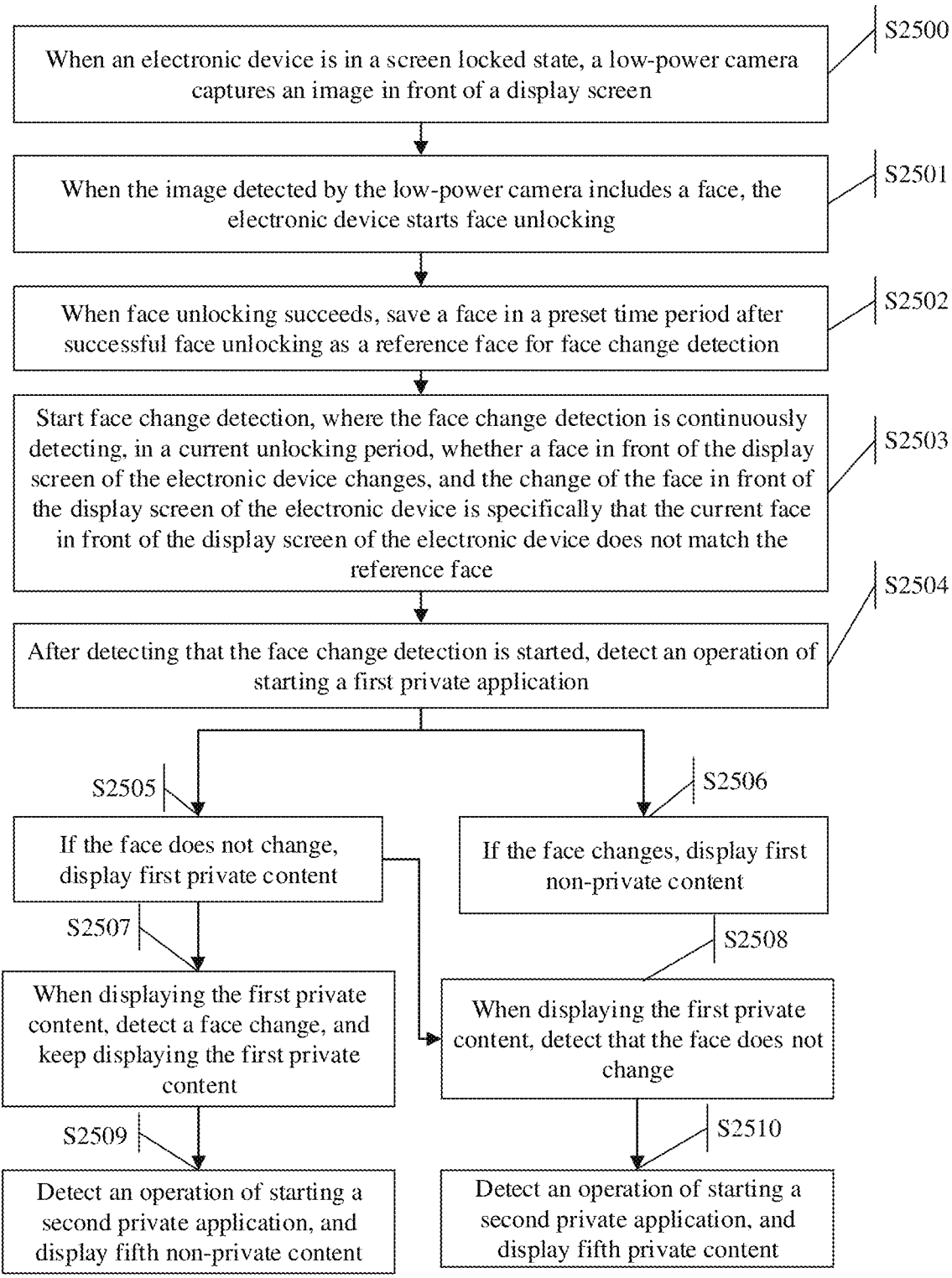
FIG. 25 is a flowchart of a privacy protection method for an electronic device according to an embodiment.

As shown in FIG. 25, a privacy protection method for an electronic device is provided in an embodiment. The method includes the following steps:

S2503. Start face change detection, where the face change detection is continuously detecting, in a current unlocking period, whether a face in front of a display of the electronic device changes, and the current face in front of the display of the electronic device does not match a reference face. Details have been described above, and therefore are not described herein again.

S2504. After detecting that the face change detection is started, detect an operation of starting a first private application, where the first private application is, for example, instant chat software, payment software, or financial institution software, and may be another application described above. This is not limited in this embodiment.

S2505. In response to the operation and determining that a result of the face change detection is that the current face does not change, display first private content corresponding to the first private application.

S2506. In response to the operation and determining that a result of the face change detection is that the current face changes, display first non-private content, where the first non-private content does not include first private content.

In the foregoing solution, because whether the face in front of the display of the electronic device changes (face change detection) is continuously detected, the result of the face change detection may be directly invoked when it is detected that the first private application is started, unlike the prior art in which a front-facing camera is enabled to perform face recognition only when it is detected that a first private application is started. Therefore, a response speed of starting the first private application is increased.

Before the face change detection is performed based on S2503, to ensure that an authorized user is tracked, identity authentication may be further performed on the user of the electronic device. The identity authentication mode may include: face recognition, fingerprint authentication, password authentication, iris authentication, nine-grid authentication, or the like.

The identity authentication process may be an unlocking process of the electronic device 100. Therefore, when identity authentication succeeds, the electronic device 100 enters an unlocked state, and the electronic device 100 captures a face in a preset time period when identity authentication succeeds (for example, within 1 second, or within 3 seconds after the identity authentication succeeds), uses the face as a reference face, and starts a face change detection process, to continuously capture a face in front of the display in the current unlocking period and determine whether the current face matches the reference face. In this way, face change detection is performed in the entire unlocking period. In this case, in response to detecting that the face does not change and detecting an operation of starting the first private application for a first time in the current unlocking period, the first private content corresponding to the first private application may be displayed; or in response to detecting that the face changes and detecting an operation of starting the first private application for a first time in the current unlocking period, the first non-private content is displayed. The first private content is the same as the private content described above, and the first non-private content is the same as the non-private content described above.

In an optional embodiment, the identity authentication mode is, for example, face recognition. With continued reference to FIG. 25, the privacy protection method for the electronic device may further include the following steps:

S2500. When the electronic device 100 is in a screen locked state, a low-power camera 193A captures an image in front of the display.

A low-power camera 193A has been described above, and therefore details are not described herein again. In an implementation process, when the electronic device 100 is in a started state, the low-power camera 193A may be controlled to always remain in a capture state, so that the electronic device 100 may be woken up at any time to start face unlocking. Because the low-power camera 193A has low energy consumption and a pixel of a captured image is low (as shown in FIG. 4), on one hand, endurance of the electronic device can be ensured when the low-power camera 193A continuously captures an image, and on the other hand, privacy of the user of the electronic device 100 can be ensured.

S2501. When an image detected by the low-power camera 193A includes a face, the electronic device 100 starts face recognition.

For example, after capturing an image, the low-power camera 193A may determine, by using a face detection algorithm, whether the image includes a face. If the image includes the face, face recognition may be performed on the face in front of the display. The face recognition process includes, for example, determining whether the captured face matches a prestored face of an owner, where the prestored face of the owner is a face input by the owner when a face recognition function is enabled for a first time, and the prestored face of the owner is used as a face recognition reference; and in response to detecting that the captured face successfully matches the prestored face of the owner, determining that the face recognition succeeds; or in response to detecting that the captured face fails to match the prestored face of the owner, determining that the face recognition fails. When the user initially uses the electronic device 100, the user is often prompted to record the face, and the face is the prestored face of the owner. If the face recognition succeeds, it indicates that the current user is the owner; otherwise, it is determined that the current user is not the owner. Optionally, the owner may further prerecord faces of some other users. During face recognition, the face in front of the display may be matched with the prerecorded faces of the other users, so that permissions to use the private function of the electronic device 100 can be granted to the other users.

In addition, in the face recognition, the face in front of the display may be captured by using the low-power camera 193A, and the face is matched with the prestored face of the owner. To improve face recognition accuracy, the face in front of the display may also be captured by using the front-facing camera 193B, and the face is matched with the prestored face of the owner. Optionally, to prevent the front-facing camera 193B from being mistakenly woken up, face recognition may be performed first by using an image captured by the low-power camera 193A, and when recognition succeeds, face recognition is performed by using an image captured by the front-facing camera 193B, to reduce a mistaken wake-up rate of the front-facing camera 193B while improving the face recognition accuracy. A quantity of feature points of the reference face is less than a quantity of feature points of the face of the owner.

In the foregoing solution, the user does not need to manually trigger a process of face recognition (for example, tapping a button of the electronic device 100) as in the prior art. Therefore, convenience of using the electronic device 100 by the user is improved.

The foregoing step S2500 may alternatively be omitted, and face recognition is directly triggered by a manual operation of the user. This is not limited in this embodiment.

Figure 26A:
FIG. 26A to FIG. 26E are interface change diagrams of the electronic device based on the privacy protection method for the electronic device in FIG. 25.

For example, as shown in FIG. 26A, a user A (the owner) uses the electronic device 100, and when it is detected, by using the low-power camera 193A, that the image in front of the display includes a face, the electronic device 100 starts the front-facing camera 193B to perform face recognition. Prompt information "Using face unlocking" is further generated on the display of the electronic device 100, to prompt a current state of the electronic device 100.

S2502. When face recognition succeeds, control the electronic device 100 to enter the unlocked state, and save a face in a preset time period after successful face unlocking as a reference face for face change detection.

Figure 26B:
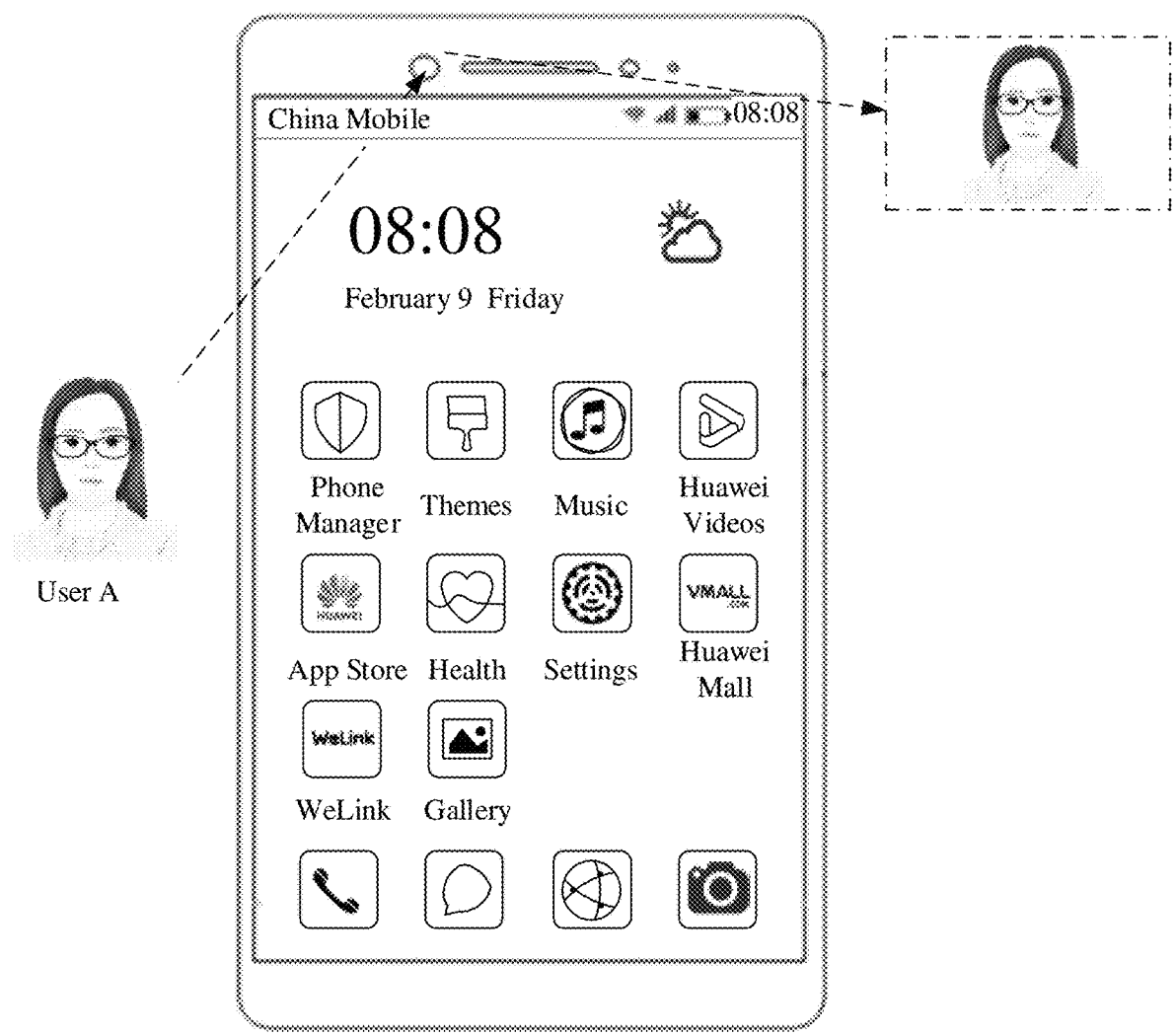

For example, when the electronic device 100 is successfully unlocked, the preset time period is, for example, 1 second or 3 seconds after the electronic device 100 is successfully unlocked. As shown in FIG. 26B, after the electronic device 100 is successfully unlocked, a home screen of the electronic device 100 is displayed on the display of the electronic device 100. The home screen displays icons of a plurality of applications. The electronic device 100 captures the current face by using a camera 193 (for example, the low-power camera 193A) and uses the current face as a reference face (that is, the face of the user A).

Figure 26C:
Figure 26D:
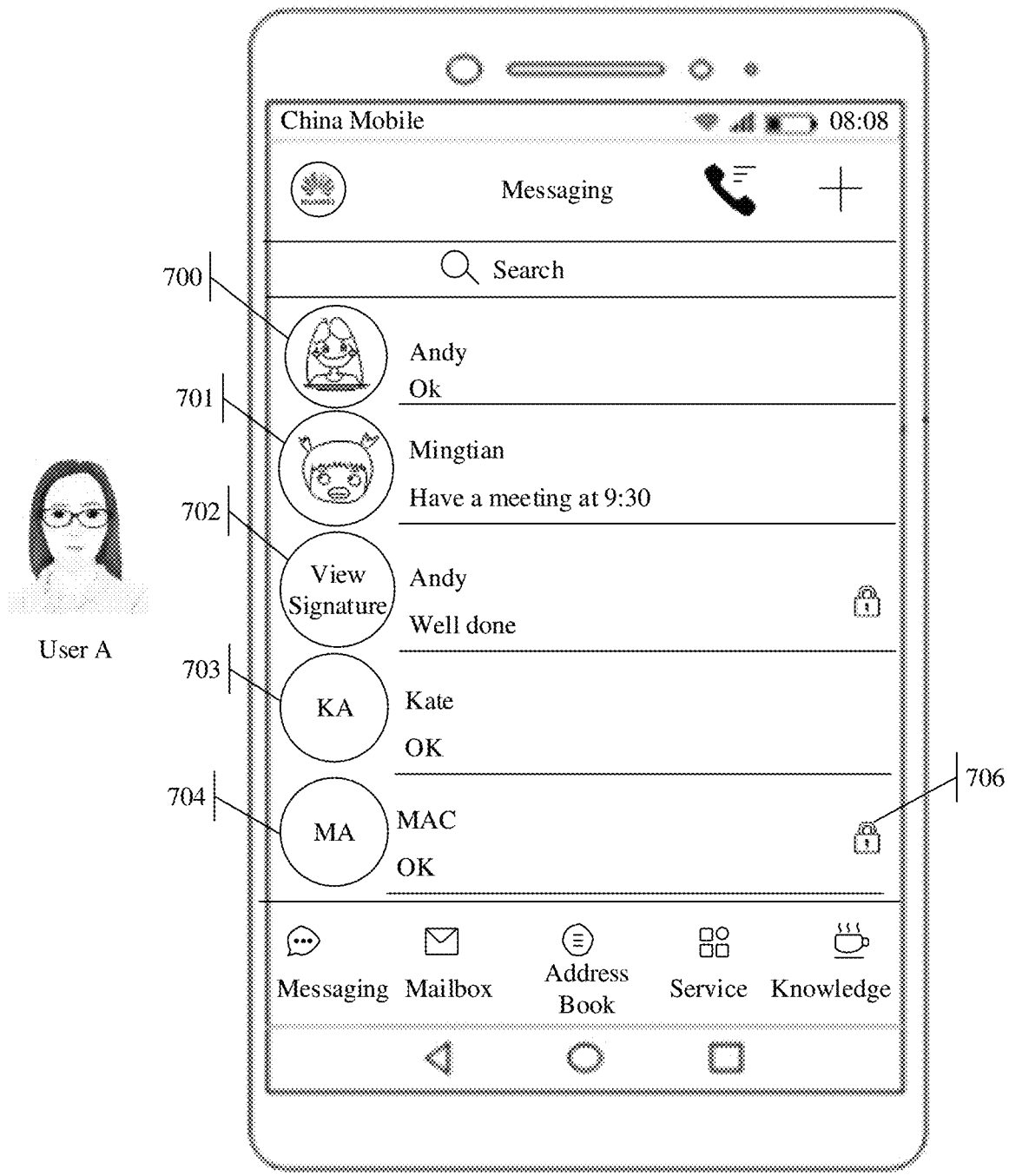

In S2505, assuming that the user A uses the electronic device 100 all the time, a result of the face change detection algorithm indicates that the face does not change. In this case, if an operation (as shown in FIG. 26C) of starting the first private application by the user is detected, the first private content of the first private application, for example, a home page of instant messaging software shown in FIG. 26D, is displayed. Further, the first private content of the instant messaging software may alternatively be other content. Details have been described above, and therefore are not described herein again.

After an application lock function of the electronic device 100 detects an operation of starting the instant messaging software (an application lock is set for the instant messaging software), the result of the face change detection algorithm is obtained. When the result of the face change detection algorithm shows that the face does not change, an identity authentication interface is skipped, and the home page of the instant messaging software is directly displayed. Alternatively, the application lock function always obtains the result of the face change detection algorithm; and if the result of the face change detection algorithm indicates that the face does not change, the application lock function is disabled, or if the result of the face change detection algorithm indicates that the face changes, the application lock function is enabled.

In S2505, the electronic device 100 may obtain the result of the face change detection in real time after the face change detection, to change a privacy protection state of the first private application (for example, when the face does not change, the application lock is disabled; or when the face changes, the application lock is enabled), so that when an operation of starting the first private application is detected, different content is directly provided to the user based on different privacy protection states. Alternatively, when detecting an operation of starting the first private application, the electronic device 100 may obtain the result of the face change detection and provide different content to the user based on the result of the face change detection.

Figure 26E:
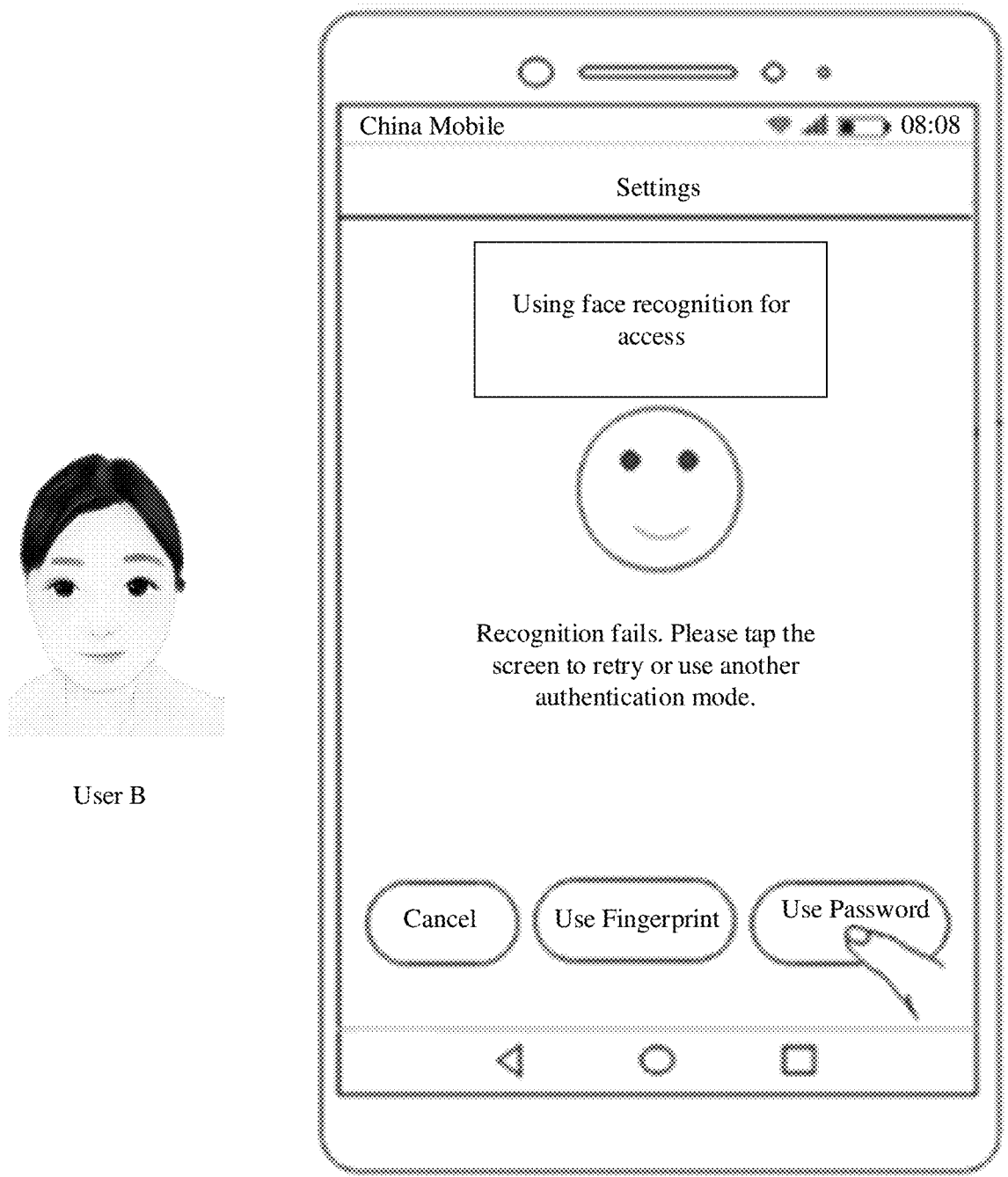

In S2506, assuming that the user A hands the electronic device 100 to a user B for use, the result of the face change detection algorithm shows that the face changes. When an operation of starting the instant messaging software by the user is detected, the first non-private content, for example, an identity authentication interface shown in FIG. 26E, is displayed. Further, the first non-private content may alternatively be other content. Details have been described above, and therefore are not described herein again.

Optionally, after the first private content is displayed based on S2506, with continued reference to FIG. 25, the method may further include the following step:

S2507. When displaying the first private content, detect a face change, and keep displaying the first private content.

Figure 27A:
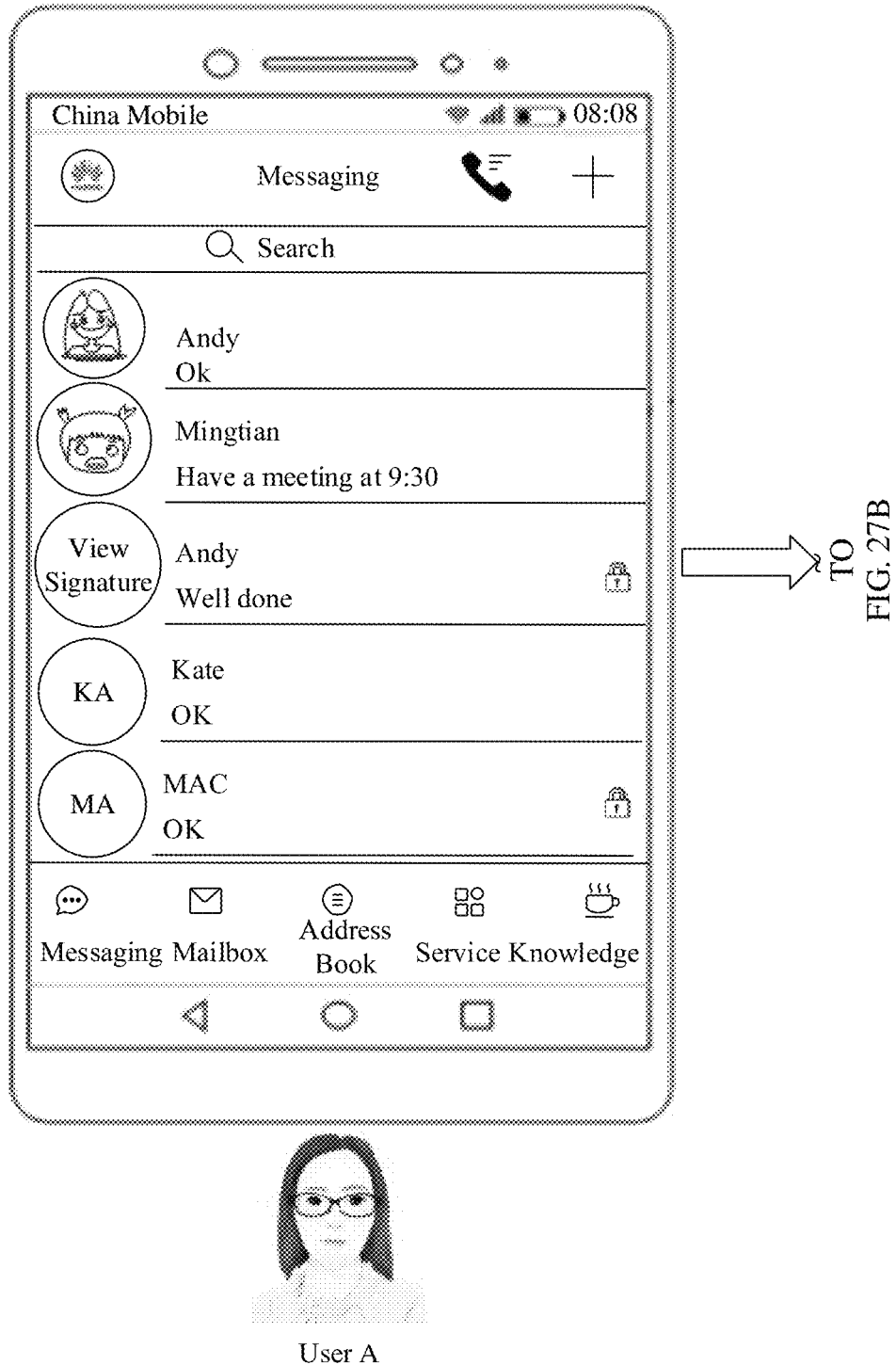
FIG. 27A to FIG. 27D are interface change diagrams of an electronic device when a face changes according to an embodiment.
Figure 27B:
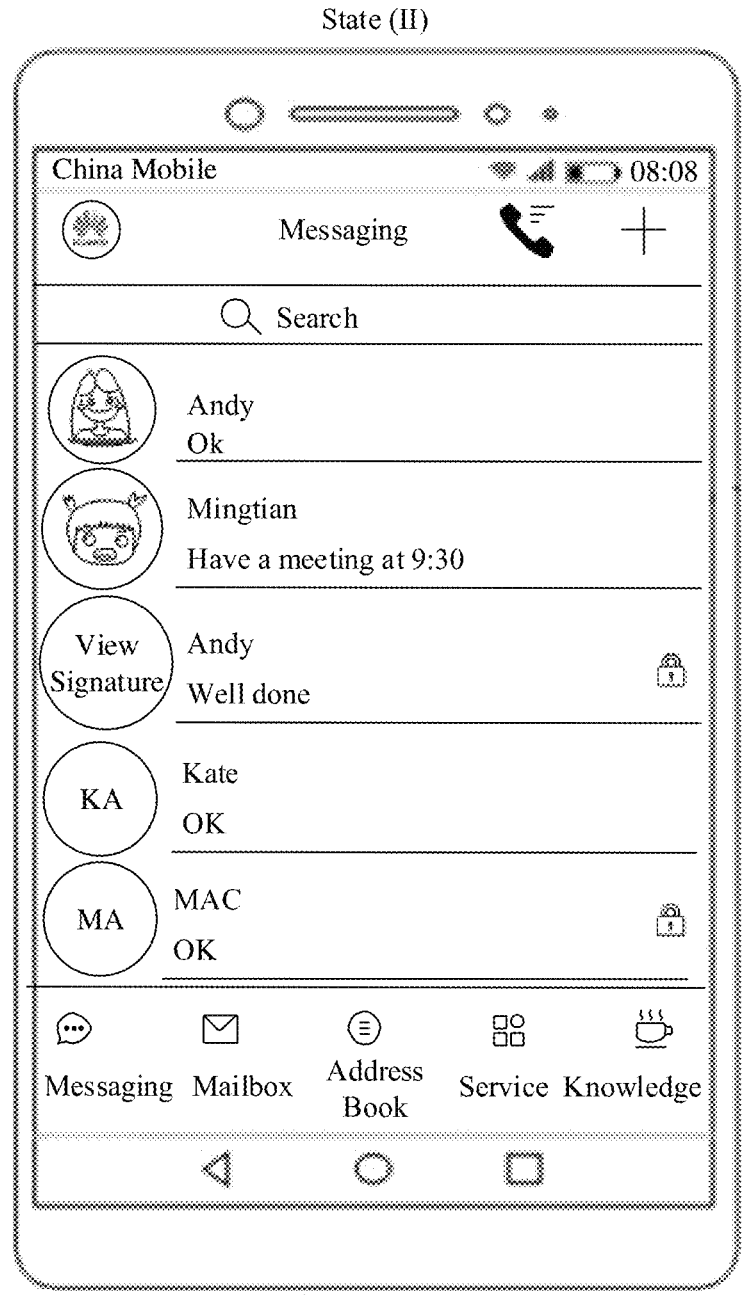
Figure 27B:
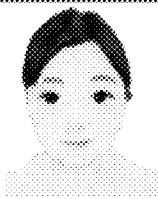
Figure 27C:
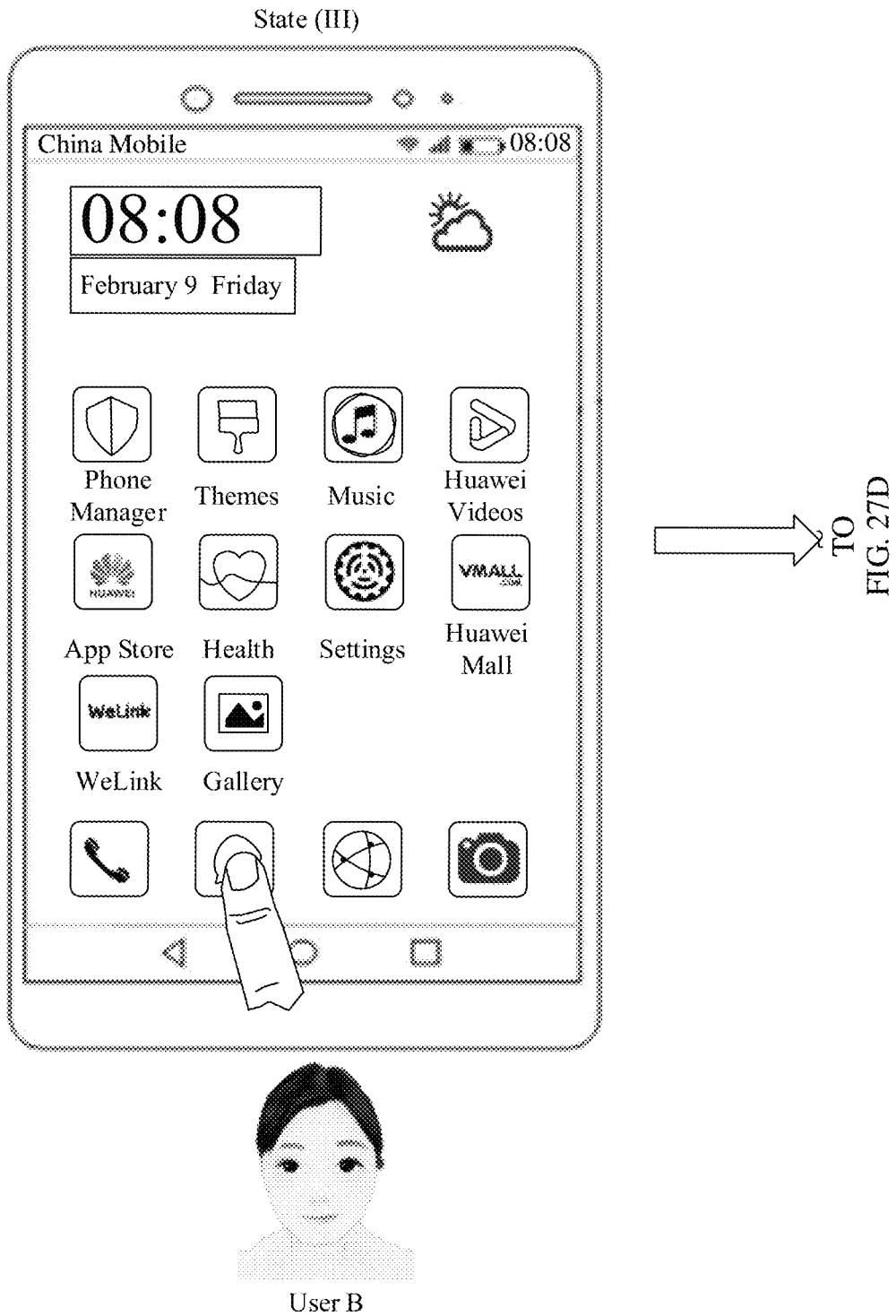

For example, when the user A uses the electronic device 100, if it is detected that the user A starts the instant messaging software and keeps the instant messaging software displayed in the foreground, it indicates that the user A wants to share a permission to use the instant messaging software with the user B. Therefore, the electronic device 100 keeps displaying the first private content of the instant messaging software, as shown in a state (I) in FIG. 27A, and then the electronic device 100 is handed to the user B. The user B receives the electronic device 100. The electronic device 100 detects a face change and keeps displaying the first private content on the electronic device 100, as shown in a state (II) in FIG. 27B.

Further, with continued reference to FIG. 25, the solution may further include the following steps:

S2509. Detect an operation of starting a second private application and display fifth non-private content.

Figure 27D:
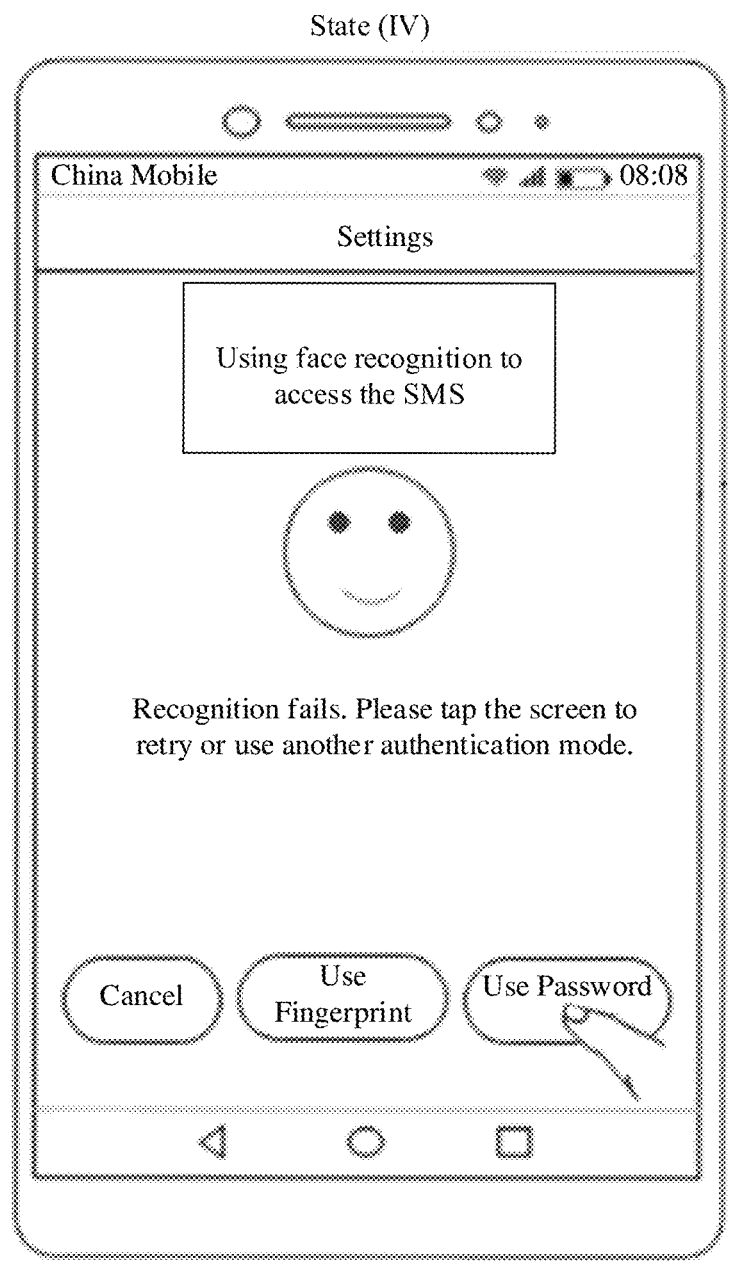

For example, when using the electronic device 100, the user B returns to a main screen of the electronic device 100 and taps an SMS (the second private application) icon. The electronic device 100 determines that SMS is a private application and that the face has changed (from the user A to the user B), and does not display private content corresponding to the SMS (for example, the home page of the SMS) any longer, but displays non-private content, such as an identity authentication interface (shown in a state (IV) in FIG. 27D), a home page after private information is hidden, or prompt information prompting that no access permission is available. A type of the non-private content has been described previously. Therefore, details are not described herein.

Optionally, after the first private content is displayed based on S2506, with continued reference to FIG. 25, the method may further include the following steps:

S2508. When displaying the first private content, detect that the face does not change.

S2510. When an operation of starting a second private application is detected, display fifth private content.

Figure 28A:
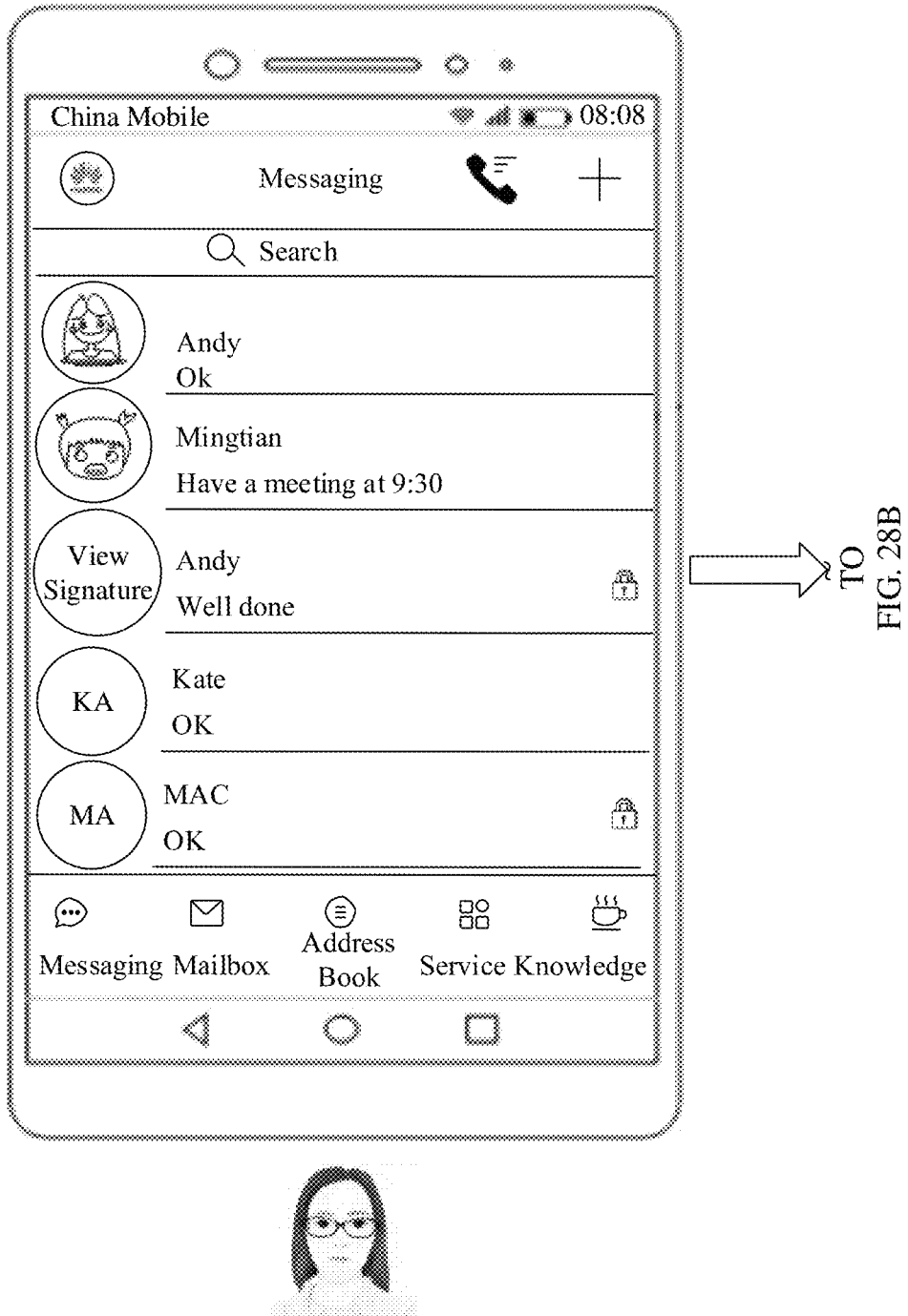
FIG. 28A to FIG. 28C are interface change diagrams of an electronic device when a face does not change according to an embodiment.
Figure 28B:
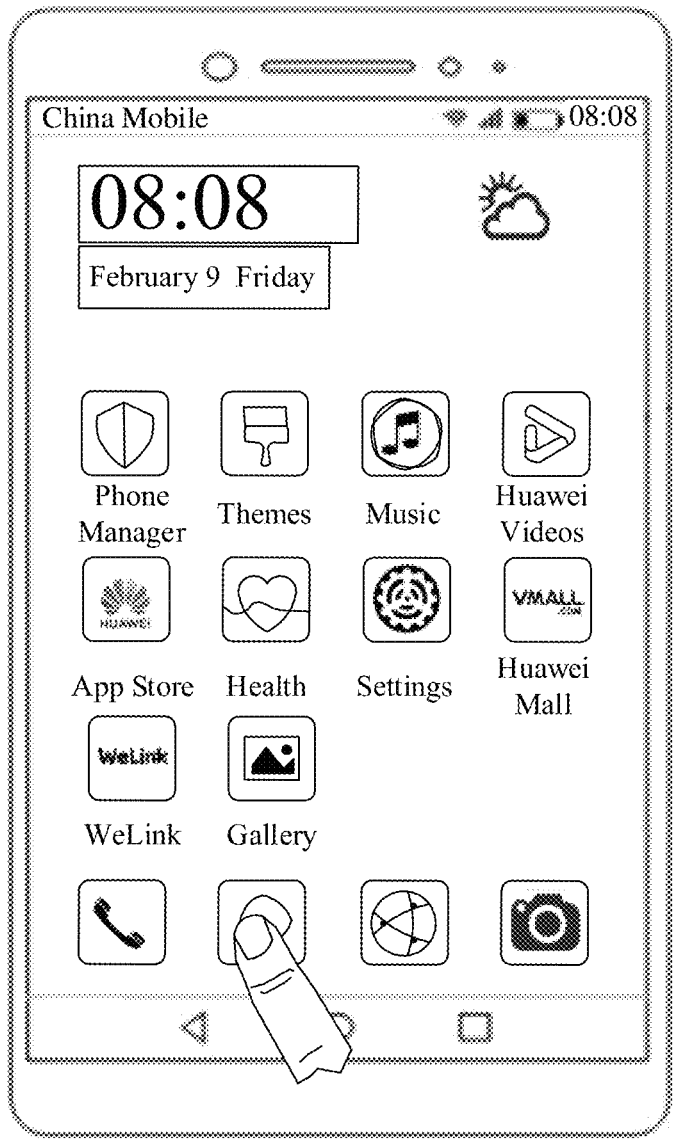
Figure 28C:
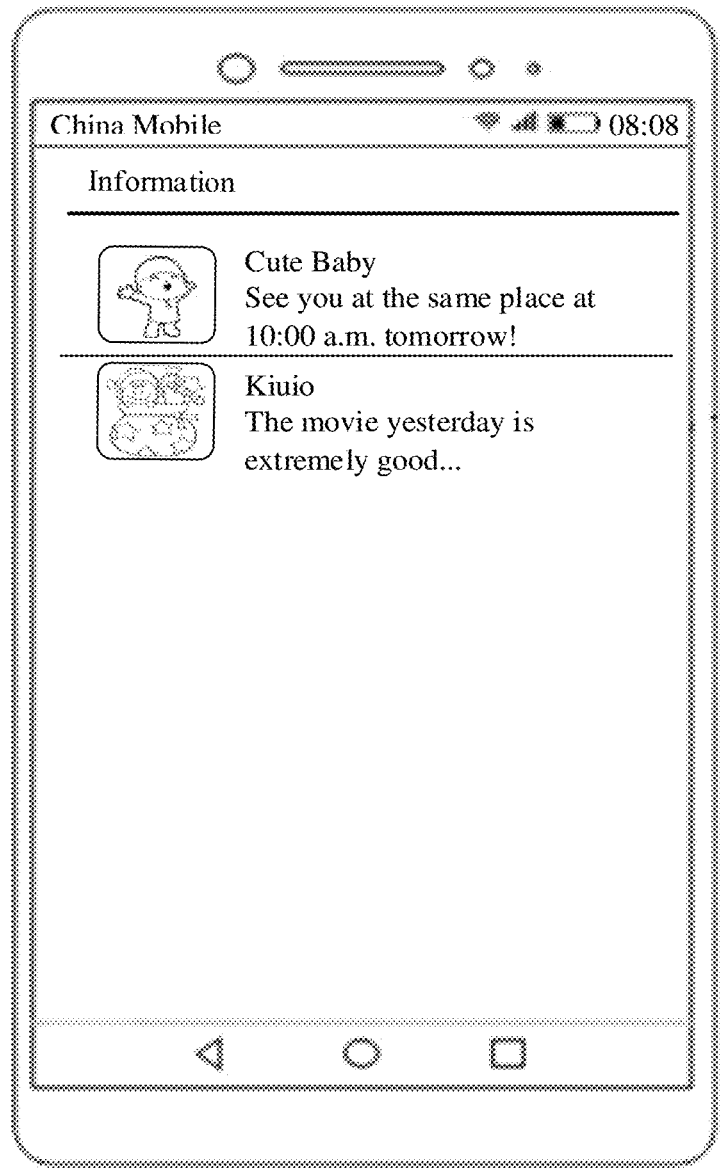

For example, after starting the instant messaging software (as shown in a state (I) in FIG. 28A), the user A uses the electronic device 100 all the time. Then the user A starts to return to the home page of the electronic device 100 and taps the SMS icon (as shown in a state (II) in FIG. 28B). After detecting the operation of the user A, the electronic device 100 determines that the face does not change and that the current user is an authorized user, and displays the home page of the SMS, as shown in a state (III) in FIG. 28C.

In the foregoing embodiment, when the face changes, the user cannot directly view the private content of the second private application, or when the face does not change, the user can view the private content of the second private application. Therefore, a response speed of using the private application by the authorized user can be reduced, while security of using the private application is improved.

In the foregoing embodiment, the second private application may be different from the first private application, and when the face changes, if it is detected that the user starts the first private application again, the first private content may continue to be viewed. The second private application may include both the first private application and other private content than the first private content. As long as it is detected that the user starts the private application after the face change is detected, the user cannot directly access the private content of the private application.

In another optional embodiment, the privacy protection method for the electronic device 100 further includes: in response to detecting that the face does not change and detecting an operation of starting the first private application again, displaying second private content corresponding to the first private application; or in response to detecting that the face changes and detecting an operation of starting the first private application again, displaying second non-private content, where the second non-private content does not include second private content.

As the time elapses, or because the user performs an operation such as zooming in, zooming out, or editing on content in the private application, private content of each private application may remain unchanged or change. Therefore, the second private content may be the same as, partially the same as, or completely different from the first private content. The second non-private content may also be the same as, partially the same as, or completely different from the first non-private content.

Figure 29:
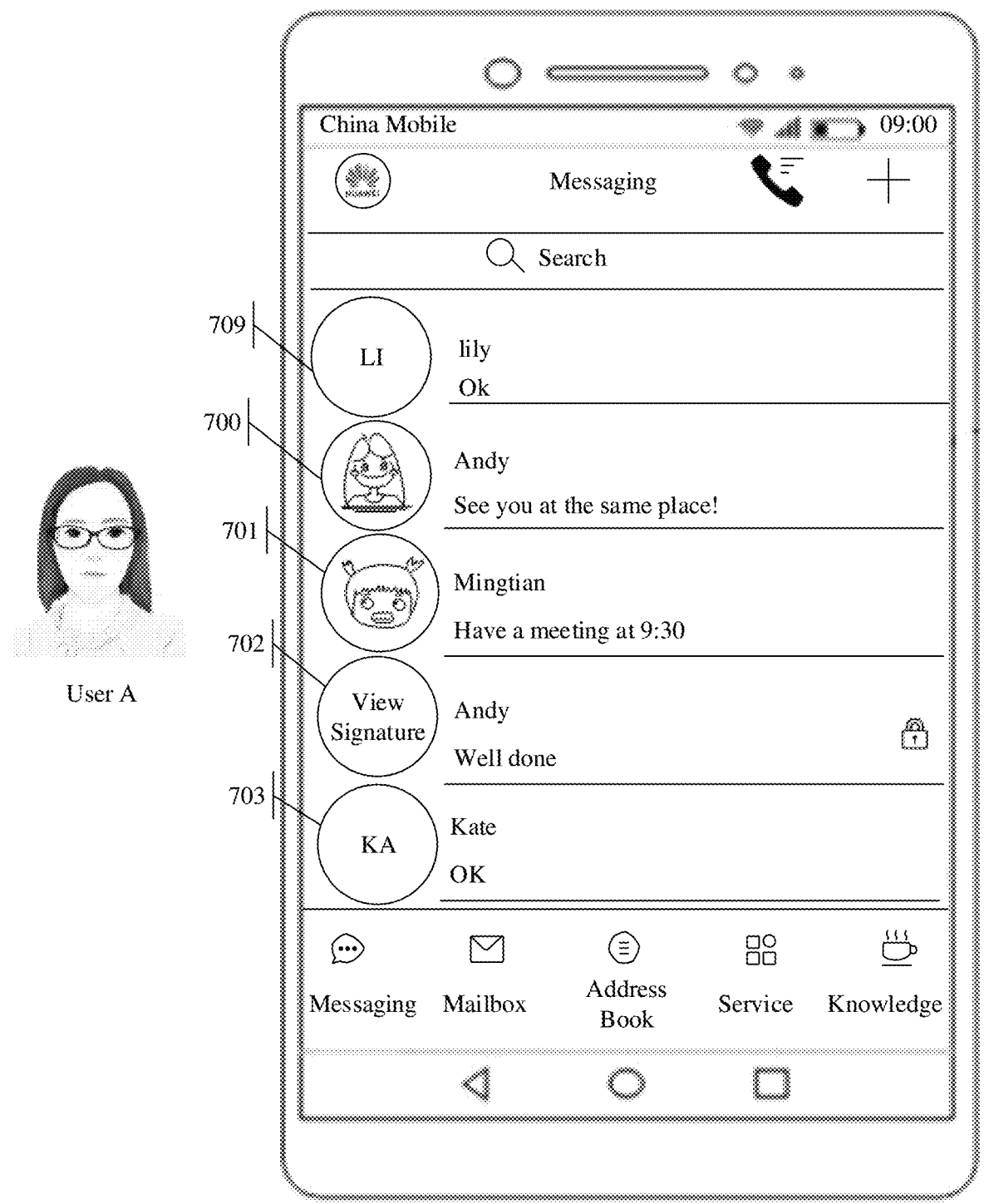
FIG. 29 is an interface diagram of an electronic device after a first private application is started again according to an embodiment.

For example, in a process of using the instant messaging software, the user may exit the instant messaging software halfway, and subsequently access the instant messaging software again. When the electronic device 100 detects an operation of accessing the instant messaging software again, if determining, based on the result of the face change detection, that the face does not change, the electronic device 100 displays the second private content of the instant messaging software (for example, as shown in FIG. 29), where both the second private content and the first private content of the instant messaging software are the home page of the instant messaging software. However, as the time changes, the displayed content is slightly different. For example, the first private content displayed in FIG. 26D includes a chat record 1302F with a private contact Candice, while a latest chat record 1302G in the second private content shown in FIG. 29 is updated, the chat record 1302F is no longer displayed, and display positions of other chat records are adjusted.

Figure 30:
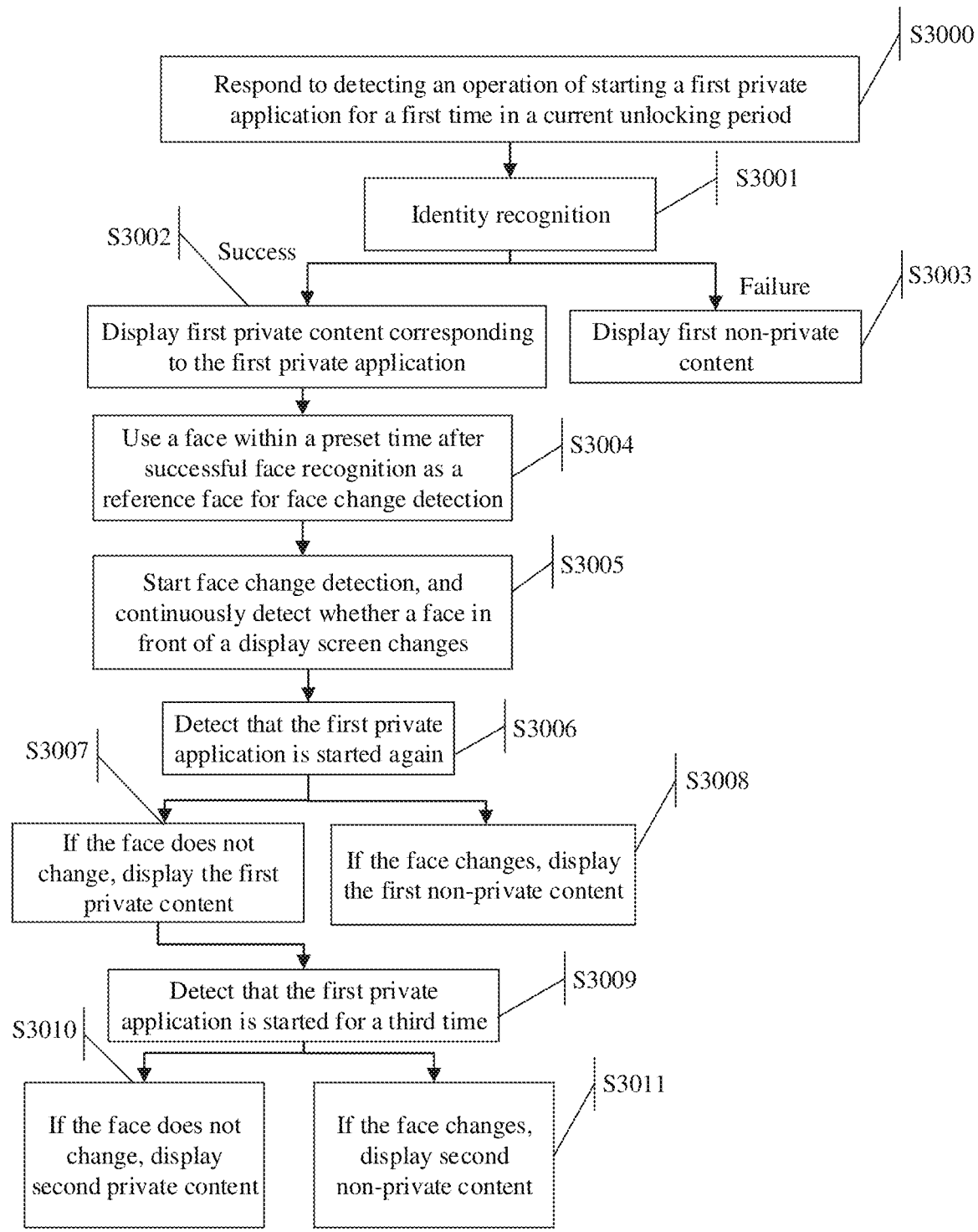
FIG. 30 is a flowchart of a privacy protection method for an electronic device according to another embodiment.

As shown in FIG. 30, a privacy protection method for an electronic device is provided in another embodiment. The method includes the following steps:

S3000. Respond to detecting an operation of starting a first private application for a first time in a current unlocking period.

Figure 31A:
FIG. 31A to FIG. 31F are interface change diagrams of the electronic device based on the privacy protection method for the electronic device in FIG. 30.

For example, the first private application may be a private application set by a user or may be a default setting of a system. As shown in FIG. 31A, the first private application is instant messaging software, and the electronic device 100 detects an operation (tapping an icon of the instant messaging software) of starting the instant messaging software by the user for the first time.

S3001. Perform identity recognition on the user of the electronic device.

Figure 6C:
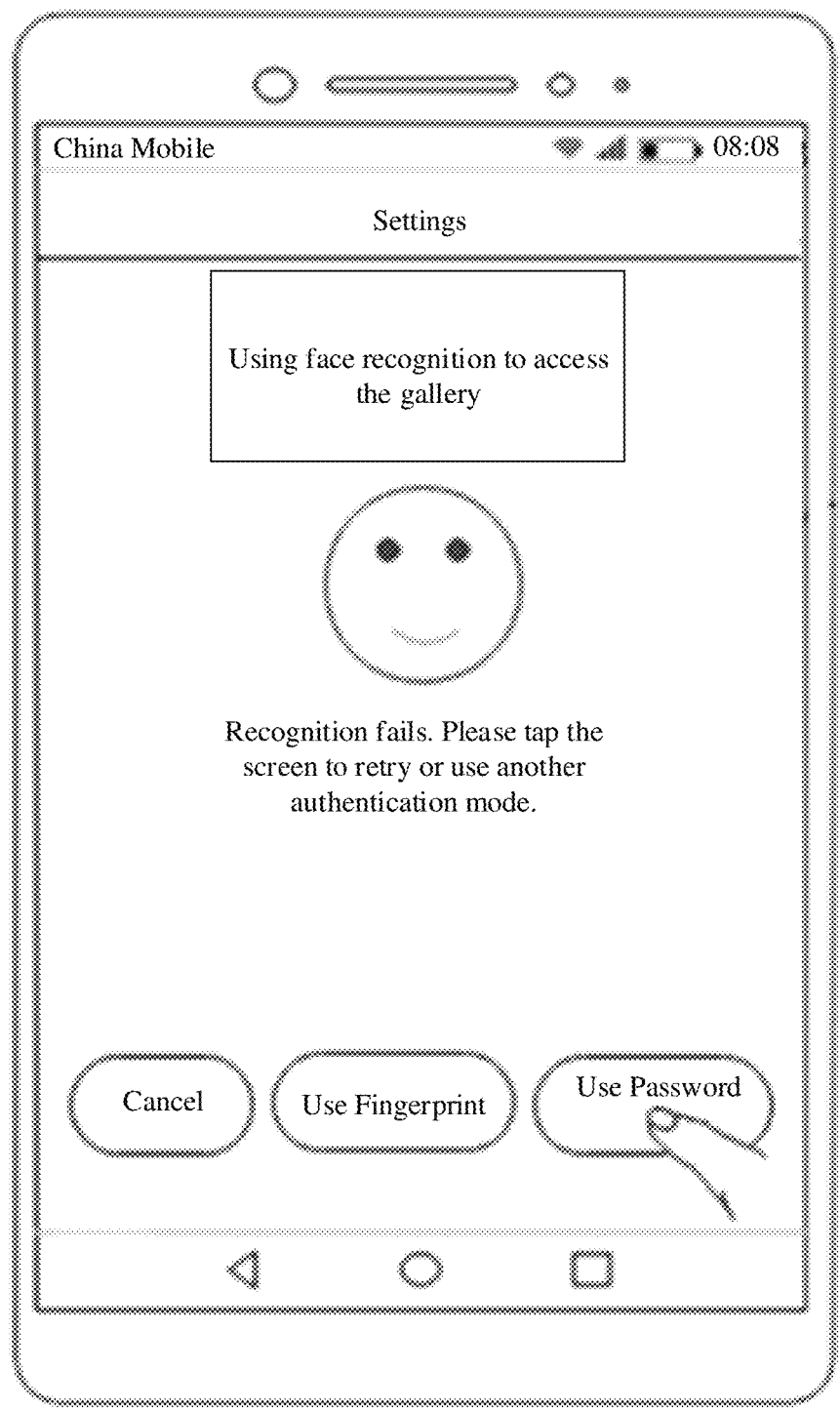
Figure 6D:
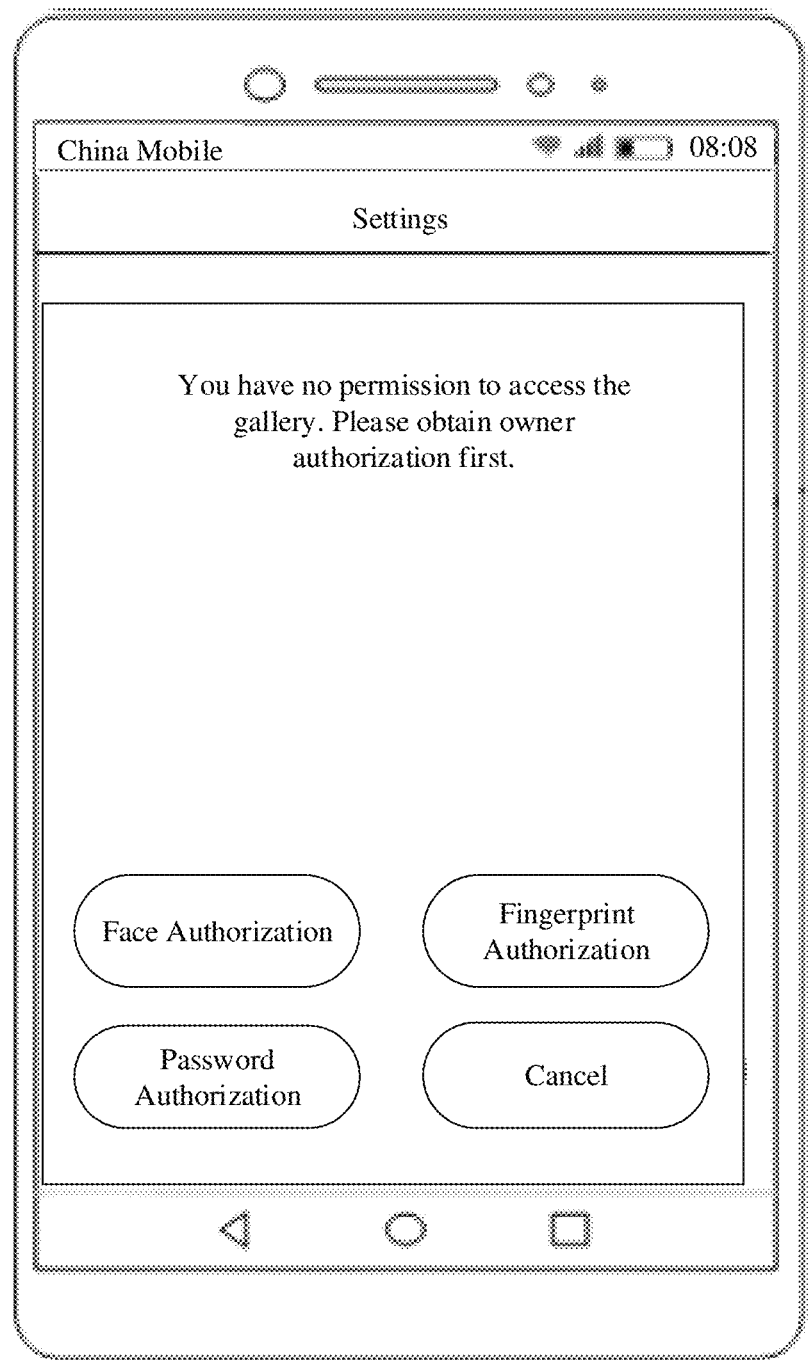

For example, an identity recognition mode is, for example, face recognition, password recognition, fingerprint recognition, or iris recognition. The user of the electronic device 100 may select a password type by using an interface shown in FIG. 19B to set a default identity recognition mode. For example, if the password type is face recognition, the identity recognition mode is face recognition, and the password type is a character password; or if the password type is a character password, the identity recognition mode is conventional password recognition. When identity recognition is performed on the user of the electronic device 100, a default recognition interface may be provided, but a button (as shown in FIG. 6C) for selecting another identity recognition mode is provided at the bottom of the default recognition interface, where the identity recognition mode is face recognition. A Use Fingerprint button, a Use Password button, and the like are provided at the bottom of the face recognition interface.

Figure 31B:

It is assumed that the current user of the electronic device 100 is a user B, and that the default identity recognition mode is password authentication. When detecting the operation of starting the first private application (instant messaging software) by the user, the electronic device 100 displays a password input interface shown in FIG. 31B, for receiving an identity authentication password input by the user.

Figure 31C:
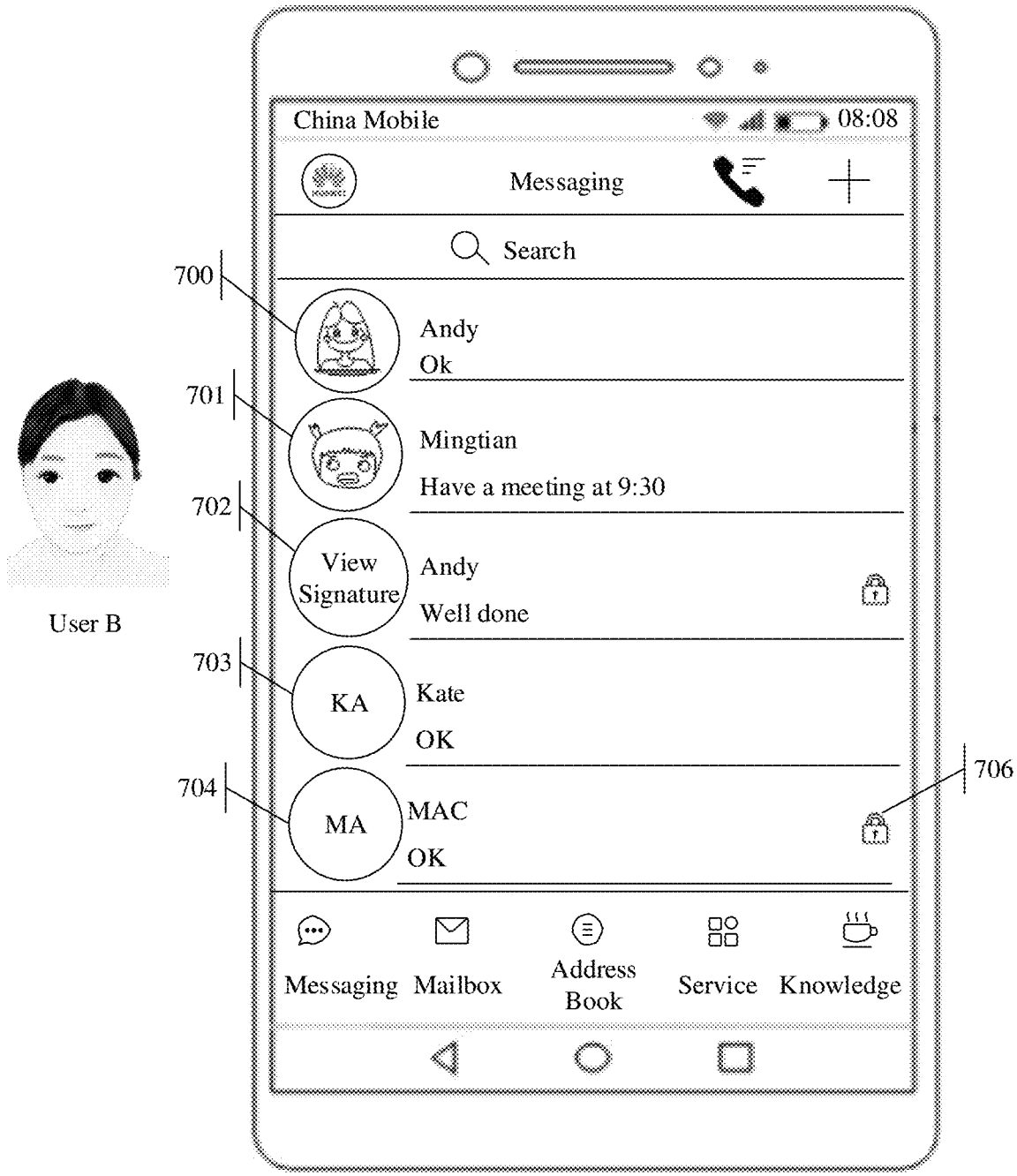

S3002. When identity recognition succeeds, display first private content corresponding to the first private application, where the first private content is similar to the private content described above, and details are not described herein again. For example, FIG. 31C is a home page of the instant messaging software.

Figure 31D:
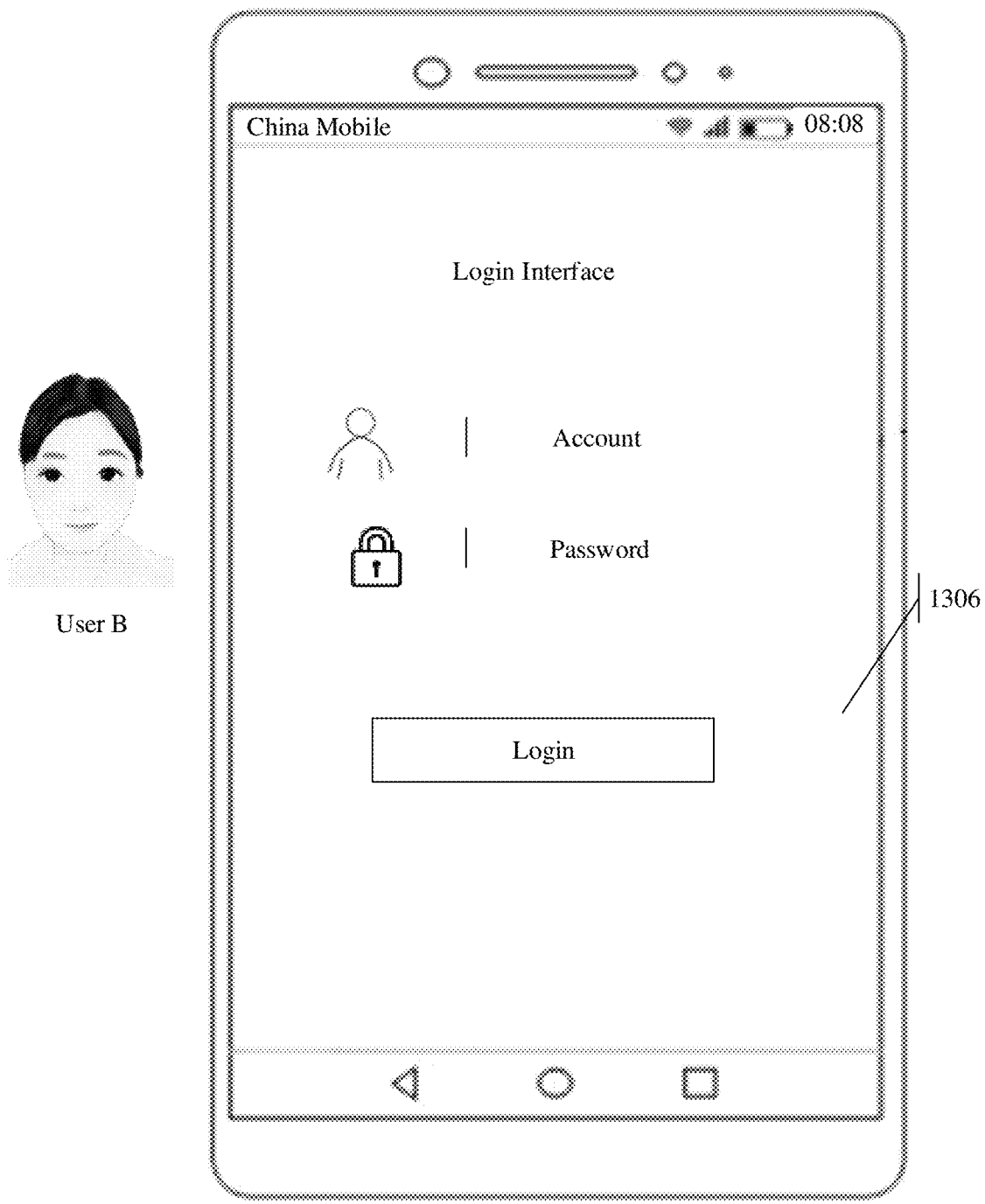

S3003. When identity recognition fails, display first non-private content, where the first non-private content is similar to the non-private content described above, and details are not described herein again. For example, FIG. 31D shows a login interface of the instant messaging software.

S3004. Use a face within a preset time after successful identity recognition as a reference face for face change detection.

Figure 31E:
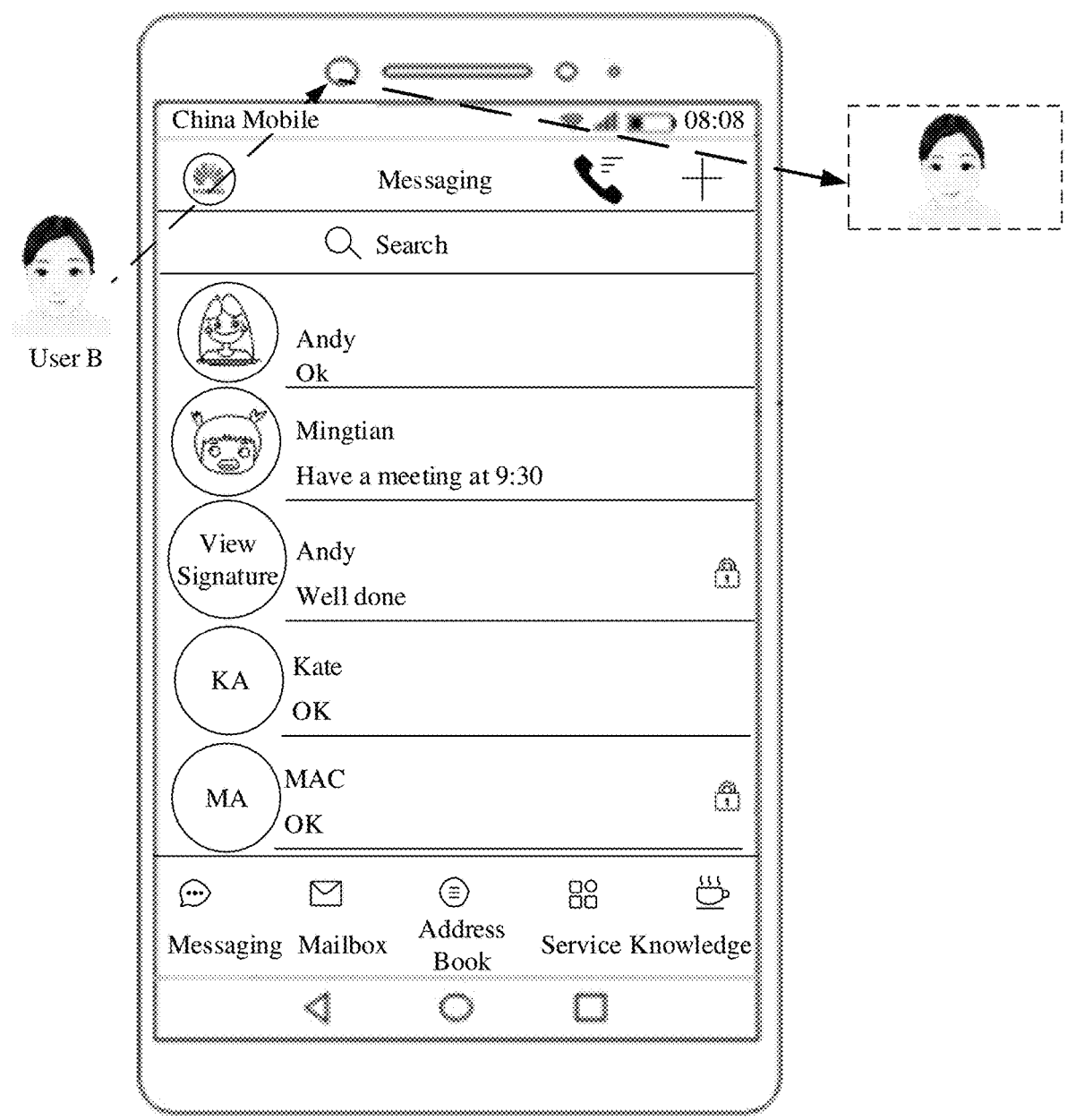

For example, after it is detected that the face recognition succeeds, it is determined that the user B is an authorized user. As shown in FIG. 31E, a face of the user B is captured as a reference face for subsequent face change detection, to ensure that a tracked object is an authorized user.

Optionally, in this embodiment, the authorized user and the authorized user in the foregoing embodiment may be different users, the authorized user in the foregoing embodiment is a first user (owner), and the authorized user in this embodiment may be a second user (non-owner). Therefore, in the solution of this embodiment, both the owner and the non-owner can be tracked.

For example, because the reference face is captured within a preset time after successful identity authentication, if the user performs identity recognition by using face recognition, but the preset time is very short, for example, 1 second, the reference face is generally a face of the owner. If the user performs identity recognition by using non-face recognition such as a password, the operation may be performed by a person other than the owner, and the reference face is the person performing identity recognition. If the non-owner inputs the password, the reference face is a face of the non-owner that inputs the password.

S3005. Start face change detection, and continuously detect, in the unlocking period, whether a face in front of a display of the electronic device changes, where the current face in front of the display of the electronic device does not match a reference user face. A method for continuously detecting whether the face in front of the display of the electronic device 100 changes has been described above. Therefore, details are not described herein again.

S3006. Detect an operation of starting the first private application, where the operation of starting the first private application is, for example, an operation of starting the first private application for a second time in the unlocking period.

In this embodiment, when the operation of starting the first private application is detected for the first time, identity authentication is performed first, and when identity authentication succeeds, face change detection is performed. Therefore, identity authentication does not need to be performed again when the private application is started for the second time. In this solution, provisioning of a prompt that the private application has a private function can be ensured, and when the user uses the private application for a plurality of times in the unlocking period, identity authentication does not need to be repeatedly performed. Therefore, convenience of using the private application is improved.

S3007. Display the first private content in response to no face change and detecting the operation of starting the first private content.

Figure 31F:
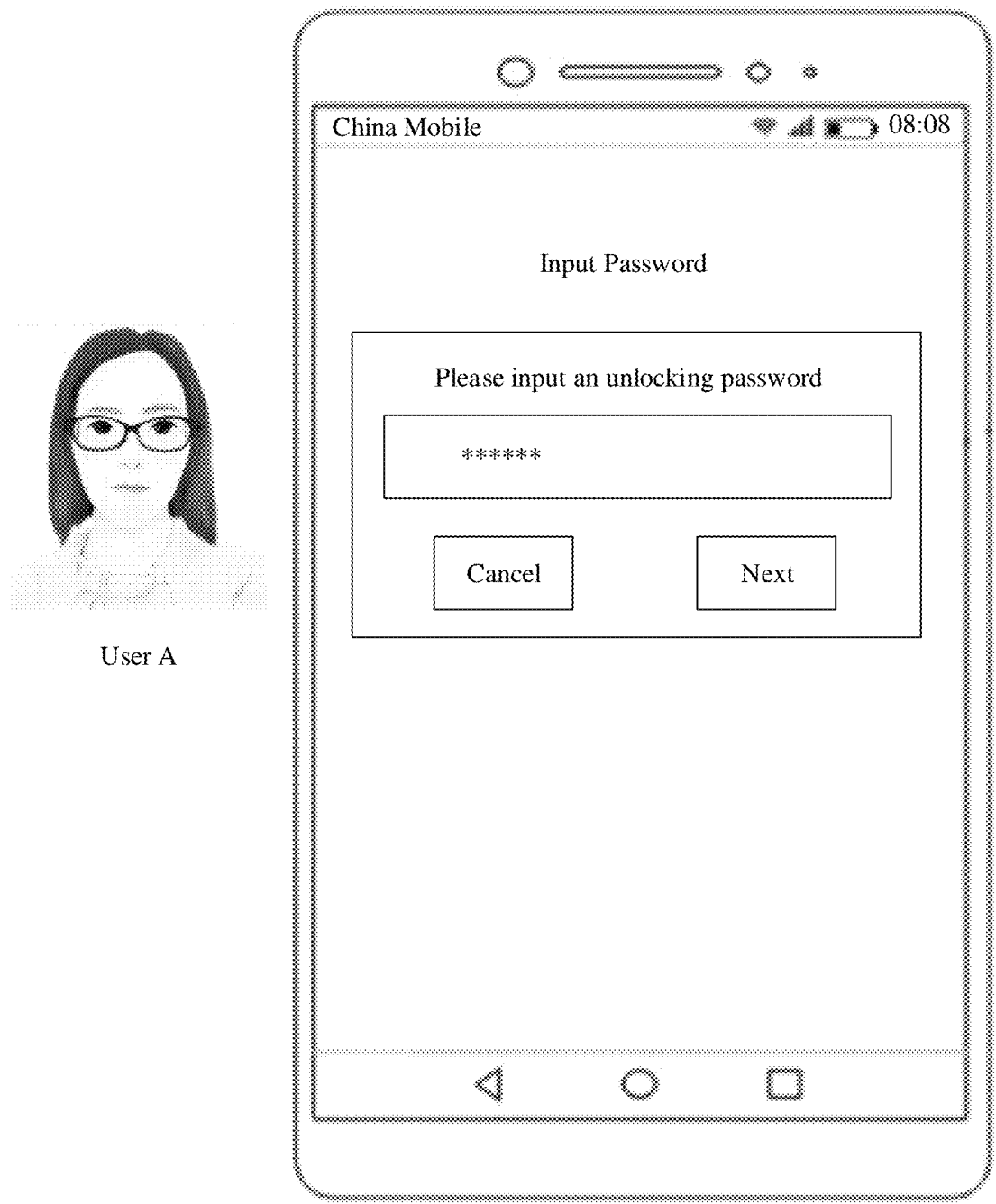

S3008. Display first non-private content in response to a face change and detecting an operation of starting the first private content, for example, as shown in FIG. 31F.

In an implementation process, for each private application, identity recognition may be used when the private application is started for the first time. When it is determined that the current user is an authorized user, face change detection is performed. Therefore, when the private application is started for the second time, identity authentication does not need to be started again. Alternatively, the electronic device 100 may perform identity authentication when the private application is started for the first time (the private application is any private application). If identity authentication succeeds, when it is subsequently detected that the private application is started (regardless of whether the private application has been started before), identity authentication may not need to be performed again. Instead, displayed content of the electronic device 100 is determined directly based on a result of the face change detection. If the result of the face change detection is that the face does not change, the private content corresponding to the private application is displayed; otherwise, the non-private content is displayed. For example, when the user starts instant chat software (the first private application), the electronic device 100 detects that the instant chat software is a private application that is started for the first time in the unlocking period and performs identity authentication; and after the identity authentication succeeds, starts face change detection. In a process of starting face change detection, if the electronic device 100 detects an operation of starting payment software (the second private application) by the user, and a result of the face change detection is that the face does not change, the electronic device 100 displays private content (for example, a home page of the payment software) corresponding to the payment software.

With continued reference to FIG. 30, the method further includes the following steps:

S3009. Detect an operation of starting the first private application for a third time.

S3010. If the result of the face change detection is that the face does not change, display the second private content.

S3011. If the result of the face change detection is that the face changes, display second non-private content. The second private content and the second non-private content have been described above. Therefore, details are not described herein again.

In an implementation process, the foregoing step S3007 is similar to step S2505 in FIG. 25. After step S3007 is performed, one or more of steps S2507, S2508, S2509, and S2510 may be further performed. This is not limited in this embodiment.

Figure 32:
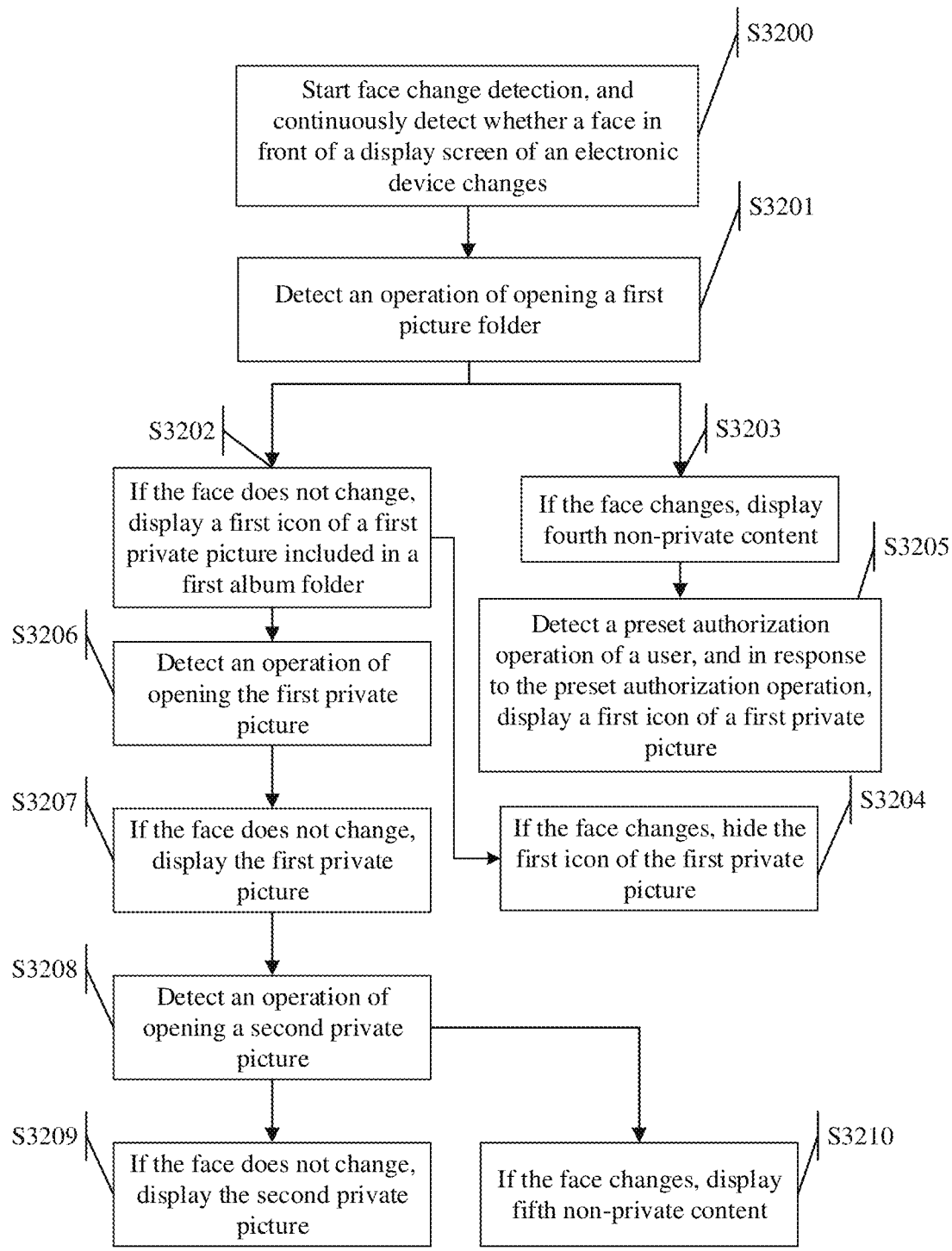
FIG. 32 is a flowchart of a privacy protection method for an electronic device according to another embodiment.

As shown in FIG. 32, a privacy protection method for an electronic device is provided in another embodiment. The method includes the following steps:

S3200. Start face change detection, where the face change detection is continuously detecting, in a current unlocking period, whether a face in front of a display of the electronic device changes, and the current face in front of the display of the electronic device does not match a reference face.

S3202. Display a first icon corresponding to a first private picture in a gallery application.

S3204. In response to determining that a result of the face change detection is that the current face changes, hide the first icon corresponding to the first private picture.

In an implementation process, S3200 may be performed directly after the electronic device is unlocked. To ensure that a user tracked in the face change detection process is a preset user, an identity authentication operation performed on the user of the electronic device 100 may be first detected. If the authentication succeeds, S3200 is performed. The identity authentication operation is, for example, fingerprint authentication, password authentication, face authentication, or iris authentication. Details have been described above, and therefore are not described herein again.

Identity authentication may be performed on the user of the electronic device 100 at a plurality of occasions. The following lists two cases for description. The implementation process is not limited to the following two cases.

Case 1: When the electronic device 100 is in a screen locked state, an identity authentication operation is detected. After the identity authentication succeeds, the electronic device 100 enters an unlocked state. After the identity authentication succeeds, the electronic device 100 performs S3200.

Case 2: When detecting that a first private application is started, the electronic device 100 detects an identity authentication operation performed on the user of the electronic device; and when the identity authentication succeeds, displays first private content corresponding to the first private application, and performs S3200. It is assumed that an initial user of the electronic device 100 is a user A, and that a currently captured reference face is a face of the user A.

In a possible case, the first private application is an application for which an application lock function is set, and the gallery application is an application for which no application lock function is set. After the electronic device 100 detects an operation of starting the first private application, face change detection is started when the identity authentication succeeds. When the user uses the gallery application, displayed content provided for the user in the gallery is determined directly based on a result of the face change detection. Based on this solution, when the user uses the gallery, identity authentication is not required, and security of using the gallery application can be ensured, so that the response speed and operation convenience of performing security protection on the gallery application are improved.

In another possible case, the first private application is a gallery application. When detecting an operation of starting the gallery application, the electronic device 100 performs identity authentication, and when the identity authentication succeeds, the face change detection is started. Therefore, in a process of using the gallery application by the user, if the user changes, the gallery application can also be protected. Based on this solution, real-time security protection of the gallery application is improved, and the gallery application can be used more securely.

In S3204, the private picture may be set based on the private file and the private picture setting manner that are described above. Details are not described herein again.

The private picture may be a private picture included in a picture folder in an album application or may be a private picture directly included in an album application. Alternatively, the private picture may be a private picture included in another application, for example, a chat picture in instant messaging software, a picture of Moments, a picture in favorites, a picture included in a web page viewed in a browser, or a picture obtained by searching. The private picture may be one picture or may be a plurality of pictures.

Figure 33A:
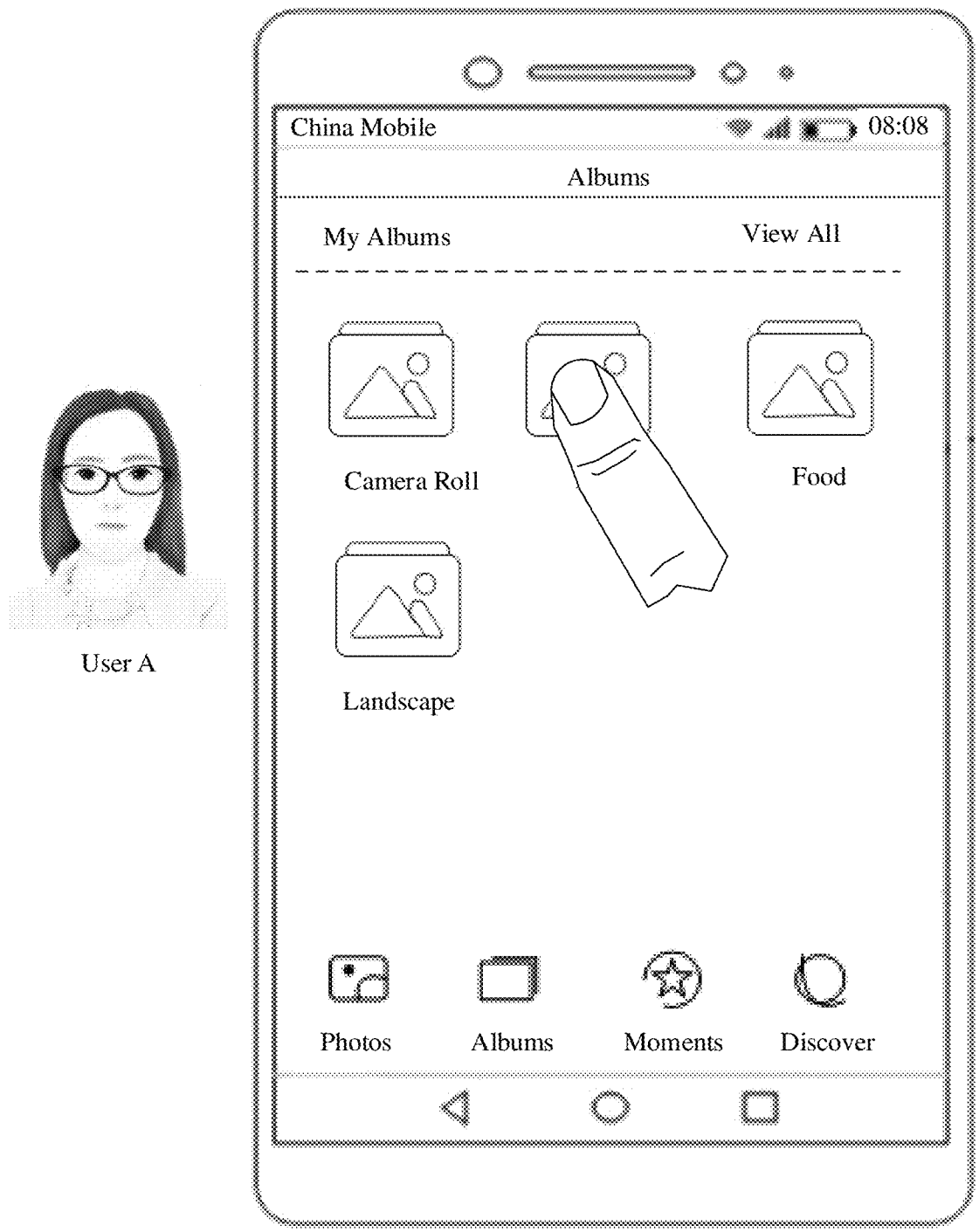

Assuming that the private picture is a private picture included in an album, with continued reference to FIG. 32, an icon of the private picture may be displayed in the following manner:

S3201. Respond to detecting an operation of opening a first picture folder including the first private picture, as shown in FIG. 33A, where the first picture folder is a picture folder included in the album application, and the picture folder may store a picture or a video. The first picture folder may alternatively be a picture folder included in another application, for example, a system folder that is of each application and is used to store a picture, or a folder that is in a net disk and is used to store a picture.

In another embodiment, the first picture folder may alternatively be a first folder, and the first folder may include various files, for example, an audio, a video, a document, and a picture.

In step S3202, if the result of the face change detection is that the face does not change, the first icon of the first private picture included in a first album folder is displayed. Further, in addition to the first icon of the first private picture, icons of other private pictures such as a second icon of a second private picture and a third icon of a third private picture may be further displayed. If the first album folder is the first folder, this step may be displaying an icon of a private file included in the first folder.

Figure 33B:
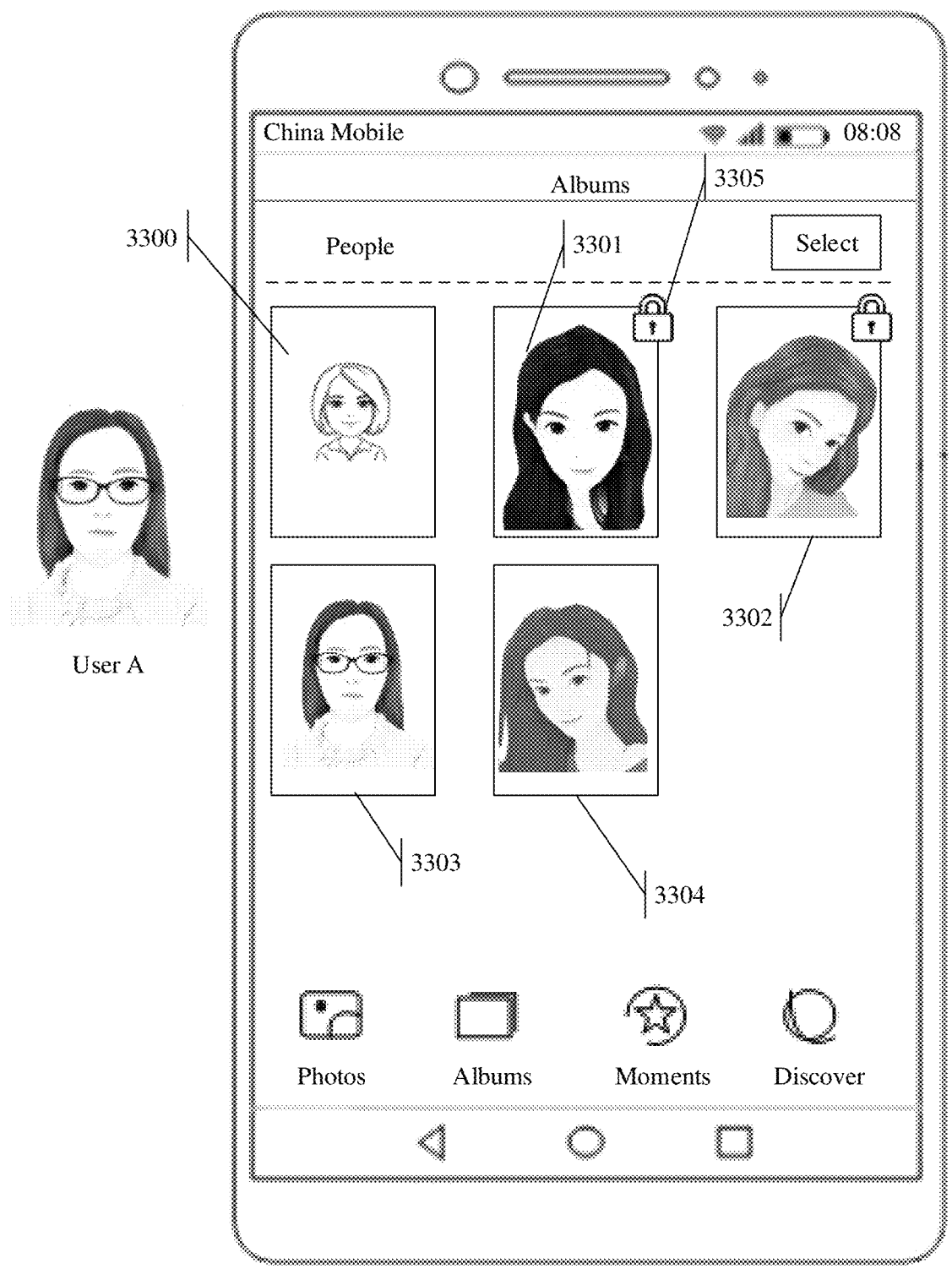

For example, as shown in FIG. 33B, the first album folder is a people album 61. After the electronic device 100 detects an operation of opening the people album 61, the result of the face change detection indicates that the face does not change, and icons of five pictures included in the people album 61 are displayed. Privacy icons 3305 are displayed in upper right corners of the icons 3301 and 3302 and are used to indicate that the two pictures are private pictures, and the other pictures are non-private pictures. When the face does not change, the icons of the five images are all in a displayed state.

Optionally, the method further includes S3203: If the result of the face change detection is that the face changes, display fourth non-private content, where the fourth non-private content does not include the first icon corresponding to the first private picture. The fourth non-private content in a plurality of forms may be displayed. For example, the first icon may be directly hidden, the first icon may be replaced with an icon of another non-private picture, the electronic device may return to an upper-level directory, or the icon of the private picture may be mosaiced. This is not limited. Details are not listed in this embodiment.

As shown in FIG. 33C(1) and FIG. 33C(2), assuming that after the electronic device 100 detects the operation of opening the people album 61, the result of the face change detection is that the face changes (from the user A to a user B), icons (3300, 3303, and 3304) of non-private pictures included in the people album 61 are displayed, as shown in a state (I) in FIG. 33C(1).

Optionally, after the fourth non-private content is displayed based on S3203, with continued reference to FIG. 32, the method further includes S3205: In response to detecting a preset authorization operation of the user, display the first icon corresponding to the first private picture. The preset operation is set by the user of the electronic device 100, for example, two-finger sliding or three-finger sliding on the display of the electronic device 100, so that the icon of the private picture can be displayed based on the operation. As shown in a state (II) in FIG. 33C(2), the icon of the private picture is displayed based on the preset operation of the user. The preset operation is a user-specific operation of the electronic device 100, so that it can be ensured that only an owner (or another authorized user) can display icons of the private pictures by using the preset operation.

After the icons (3301 and 3302) of the private pictures are displayed on the display of the electronic device 100, assuming that the user A hands the electronic device 100 to the user B, as shown in FIG. 33D(1) and FIG. 33D(2), a speed of displaying content on the display of the electronic device 100 switches from the state (I) to the state (II). Therefore, it is ensured that an unauthorized user cannot see the first icon of the first private picture and cannot see icons of other private pictures. Based on this solution, it can be ensured in real time that the unauthorized user cannot view private content. With continued reference to FIG. 32, after the first icon of the first private picture is displayed based on S3202, the method further includes the following steps:

S3206. Detect an operation of opening the first private picture.

Figure 33E:
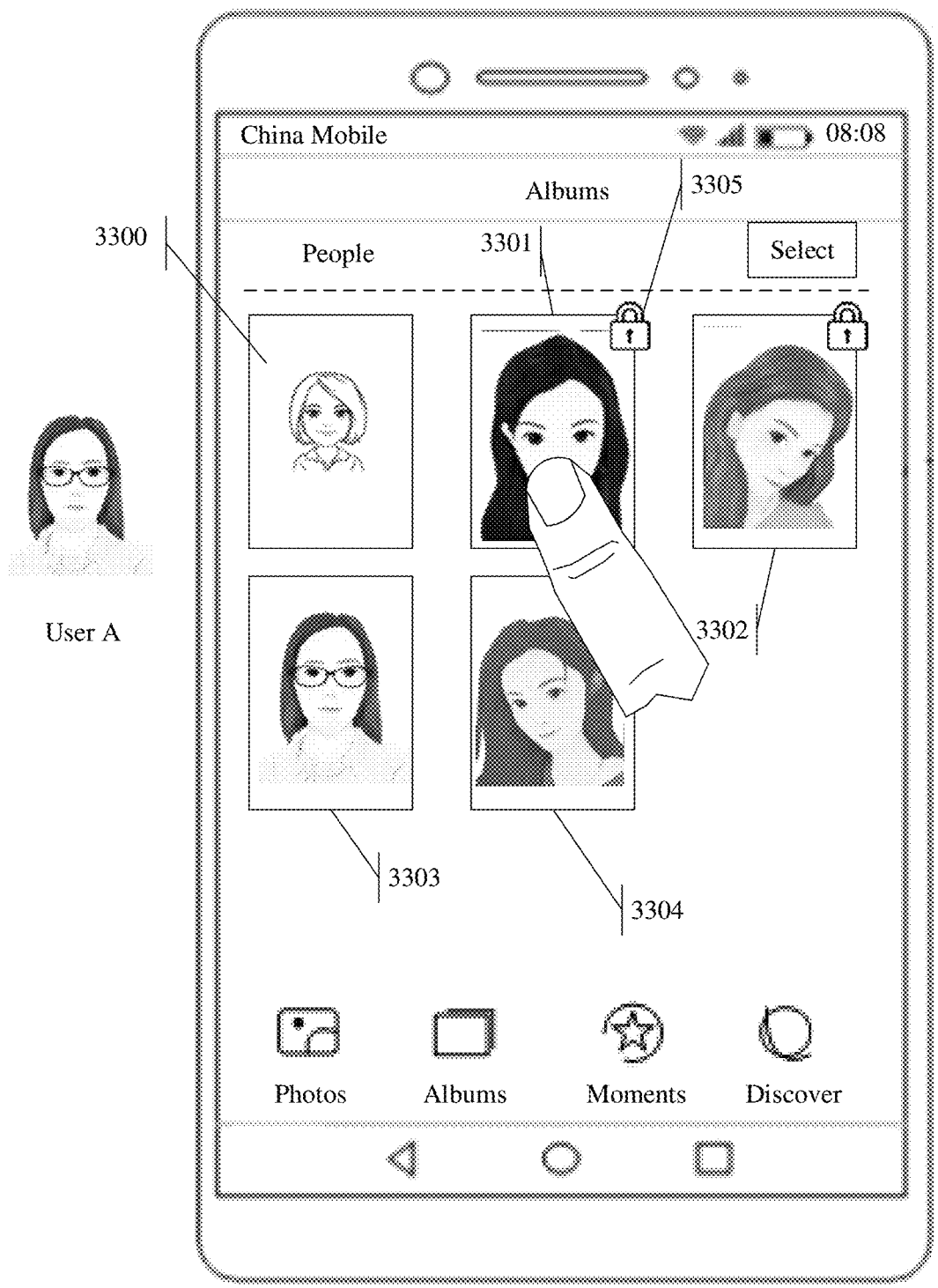

The operation is, for example, an operation of tapping the icon of the first private picture, an operation of generating a gesture, or an operation of generating a voice instruction. As shown in FIG. 33E, the electronic device 100 detects an operation of tapping an icon of a private picture 3301 (the first private picture), that is, the operation is an operation of opening the private picture 3301. The first private picture may be any private picture.

Figure 33F:
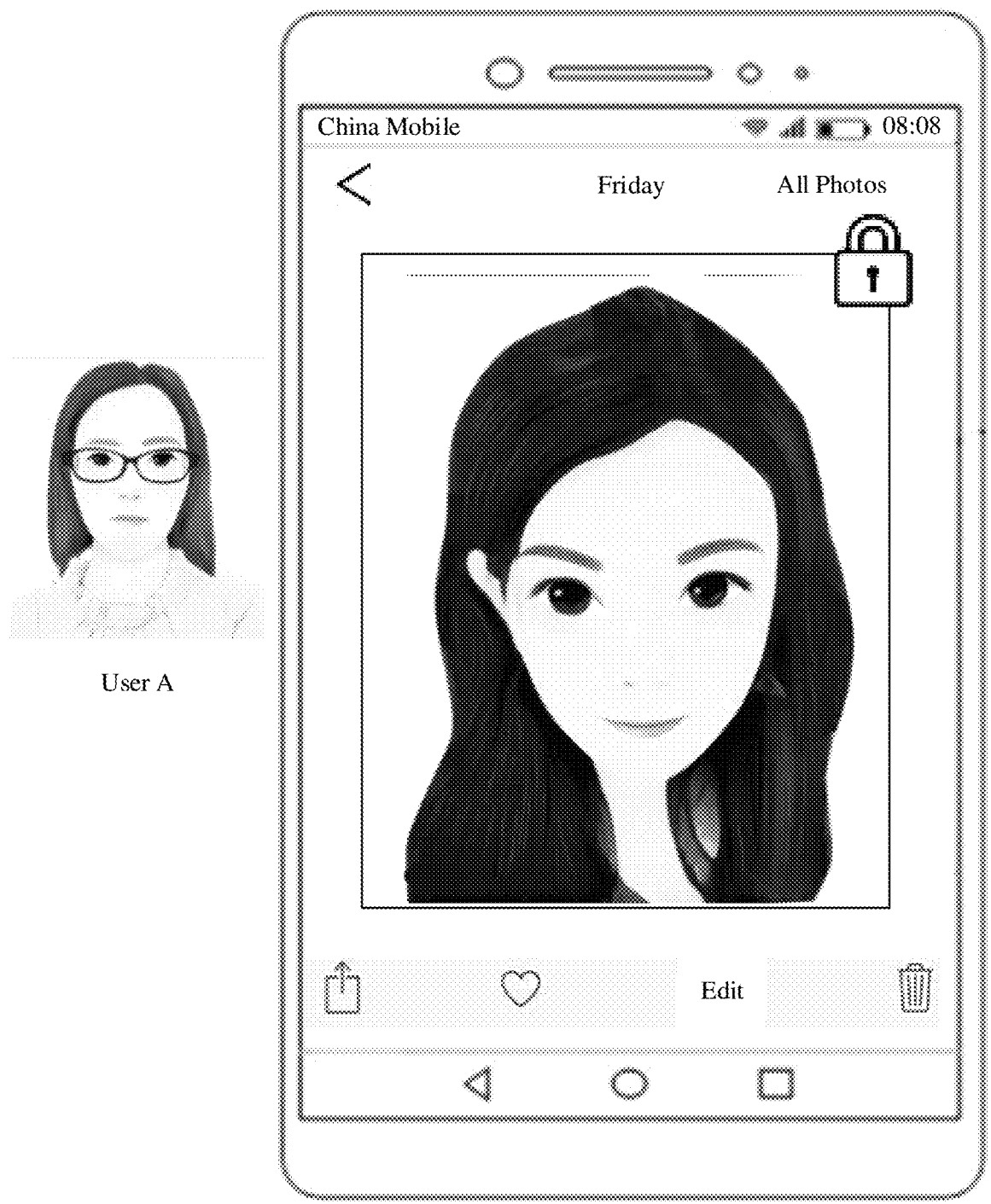

S3207. In response to detecting the operation of opening the first private picture and determining that the result of the face change detection is that the face does not change, display the first private picture, as shown in FIG. 33F. Optionally, when displaying the first private picture, a privacy icon may be further displayed in an upper right corner of the first private picture, to prompt the user that the picture currently viewed is a private picture. Further, the privacy icon may alternatively be set at another position and in another shape. This is not limited in this embodiment.

S3208. When the first private picture is displayed, detect an operation of opening the second private picture.

The operation of opening the second private picture is, for example, a next page operation, a previous page operation, a preset gesture, or a voice instruction. As shown in FIG. 34A to FIG. 34C and FIG. 35A to FIG. 35C, the operation of opening the second private picture is, for example, a next page operation, and the second private picture is, for example, a private picture corresponding to an icon 3302 in FIG. 33E.

Figure 35A:
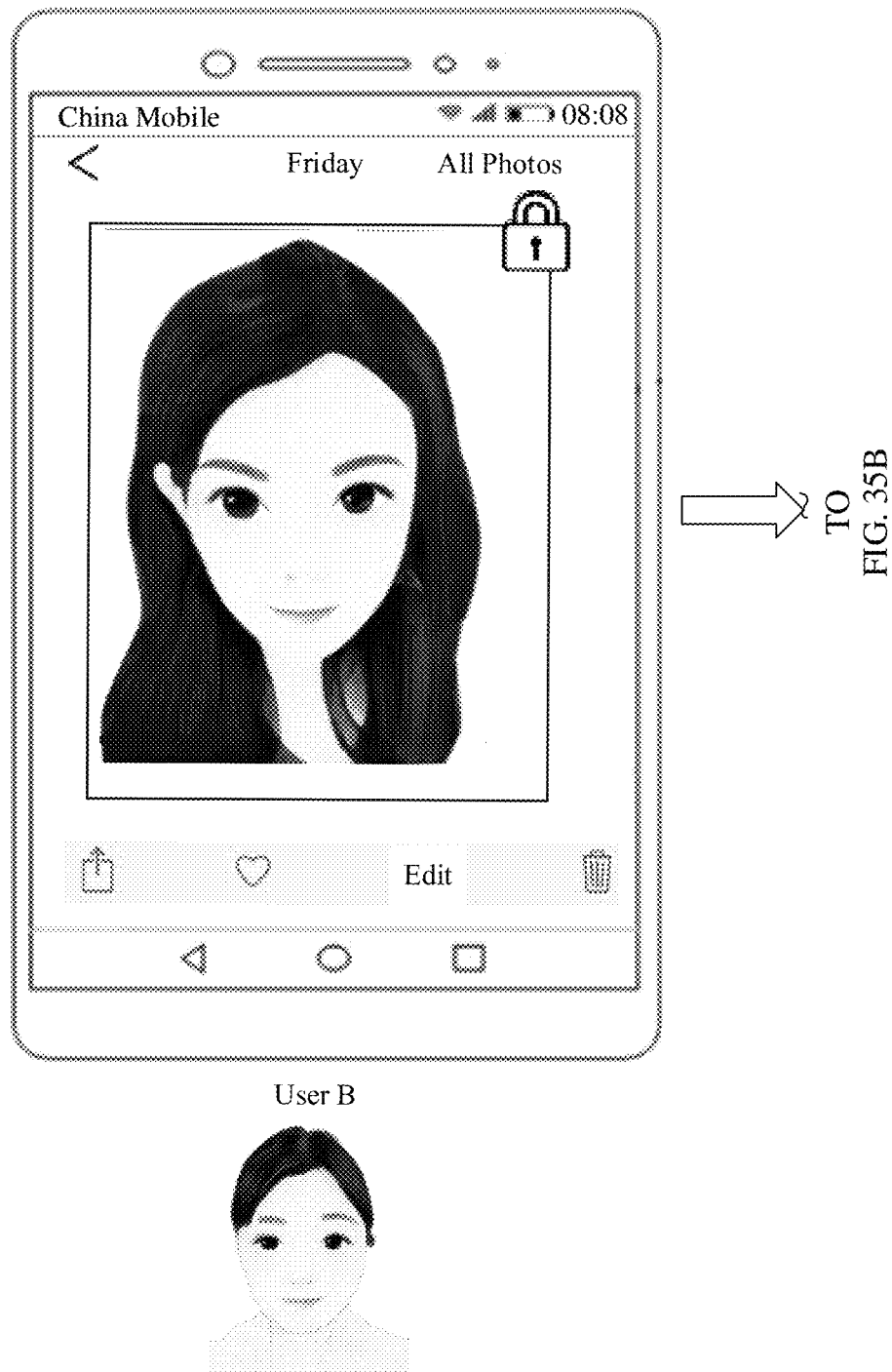
FIG. 35A to FIG. 35C are interface change diagrams of the electronic device when an unauthorized user performs picture switching based on the privacy protection method for the electronic device shown in FIG. 32.
Figure 35B:
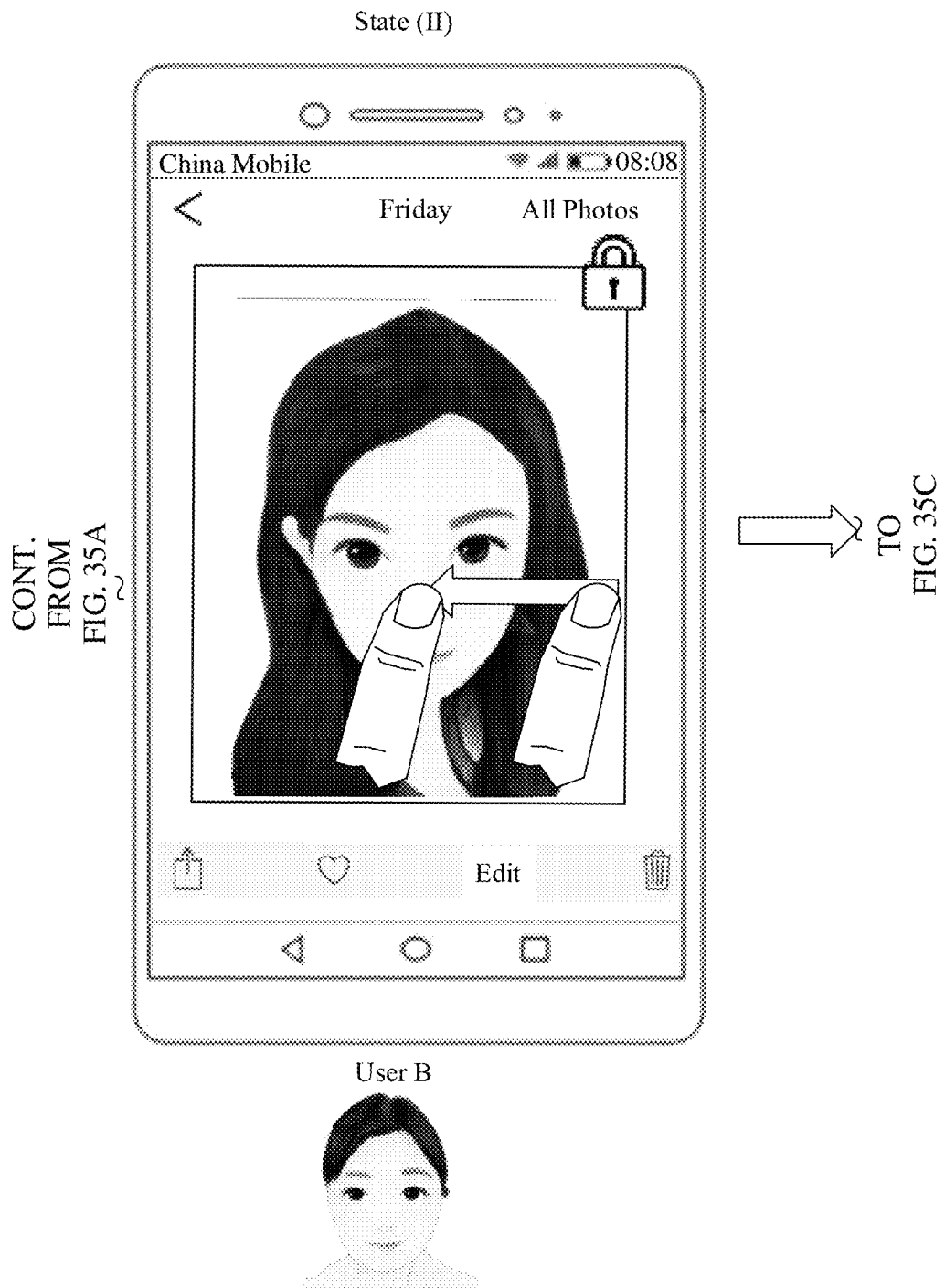
Figure 35C:
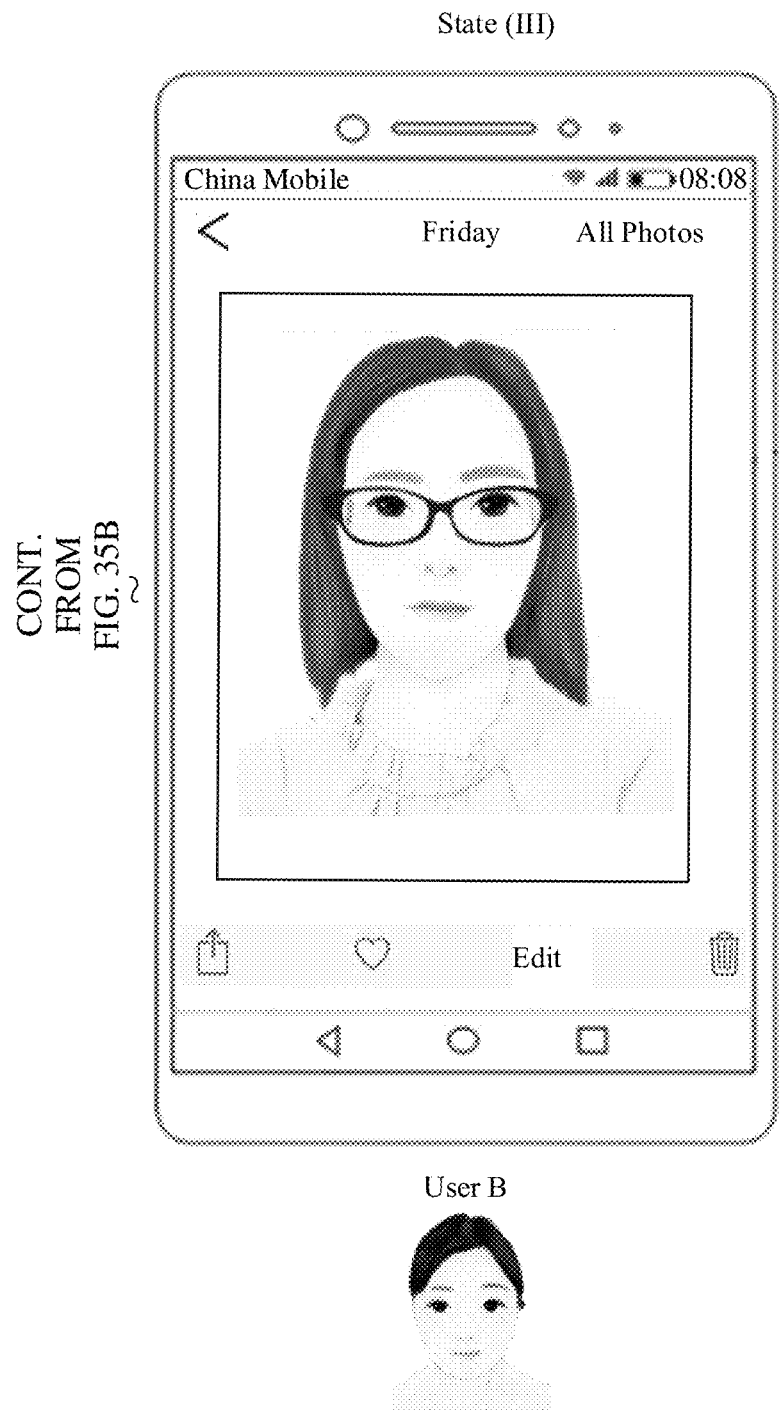

When the first private picture is displayed, if a face change is detected, the first private picture is kept in a displayed state, as shown in a state (I) in FIG. 35A.

S3209. If the result of the face change detection is that the face does not change, display the second private picture.

Figure 34A:
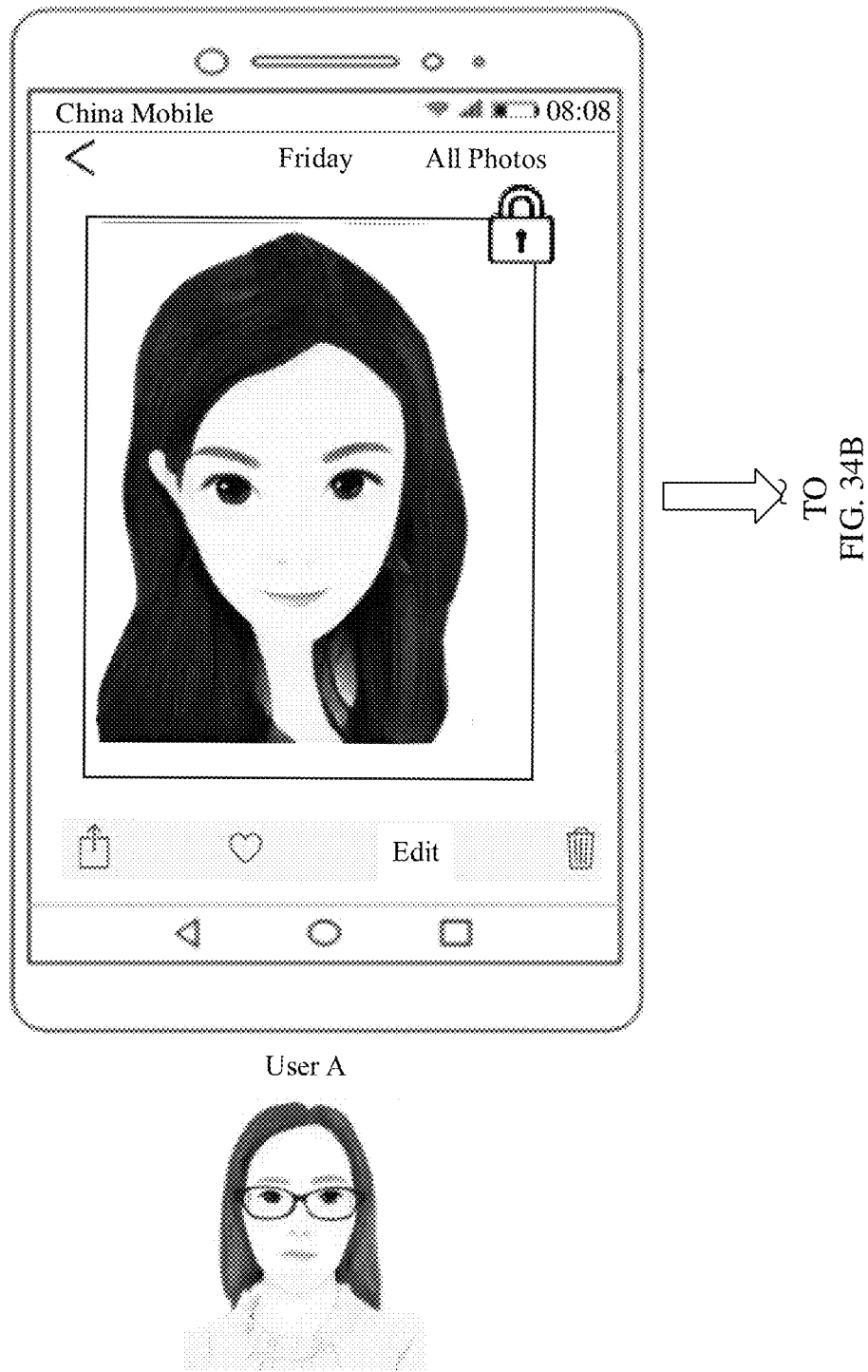
FIG. 34A to FIG. 34C are interface change diagrams of the electronic device when an authorized user performs picture switching based on the privacy protection method for the electronic device shown in FIG. 32.
Figure 34B:
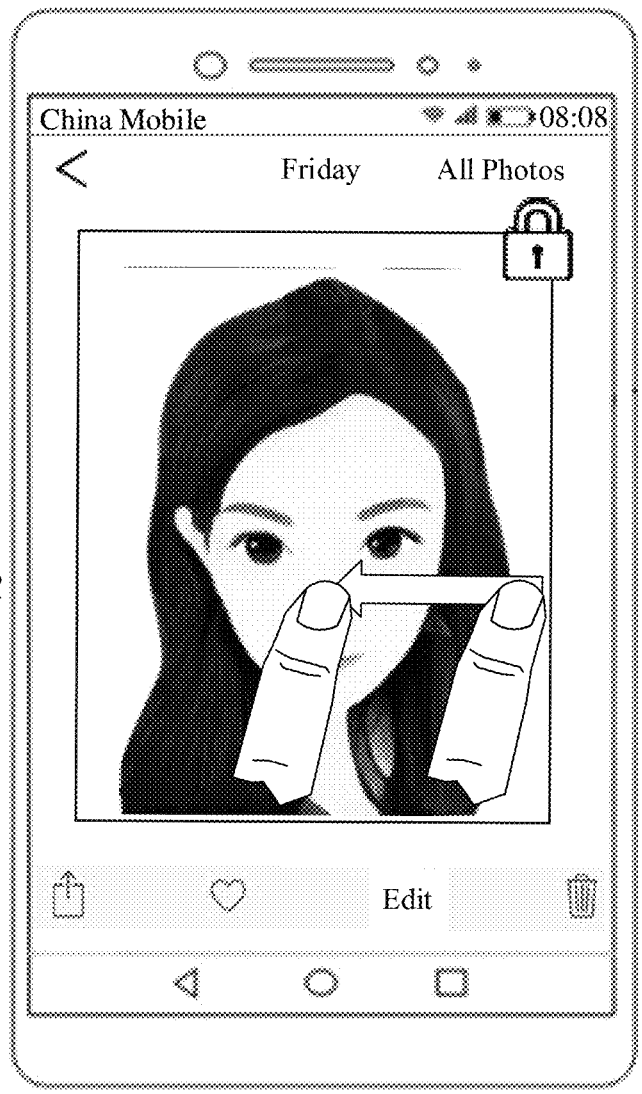
Figure 34B:
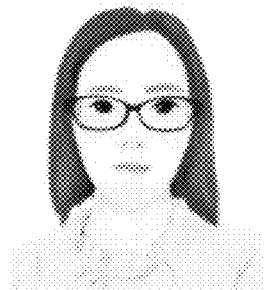
Figure 34C:
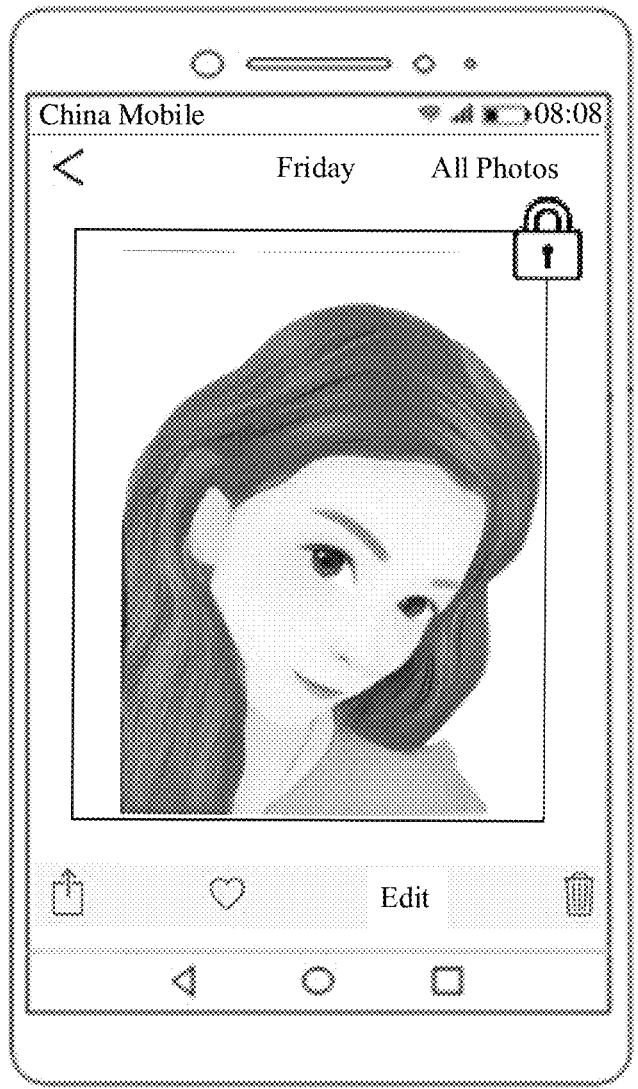
Figure 34C:
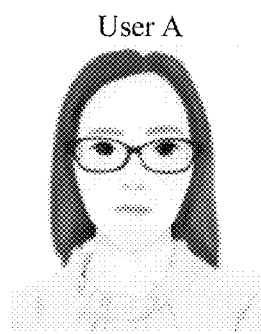

For example, as shown in FIG. 34A to FIG. 34C, the user A uses the electronic device 100 all the time. After the first private picture 3301 is displayed, the user A slides a finger left on the display (as shown in a state (II) in FIG. 34B), and the electronic device 100 determines, in response to the sliding operation, that a next picture is the second private picture 3302, and that the result of the face change detection is that the face does not change, and displays the second private picture 3302, as shown in a state (III) in FIG. 34C.

S3210. If the result of the face change detection is that the face changes, display fifth non-private content.

For example, when the electronic device 100 displays the first private picture 3301, the user A hands the electronic device 100 to the user B, and the electronic device 100 detects a face change. However, because the first private picture 3301 is currently displayed on the display, it is considered that the user A wants to share the first private picture 3301 with the user B. Therefore, the first private picture is kept in the displayed state, as shown in a state (I) in FIG. 35A, and then the user B slides a finger left on the display (as shown in a state (II) in FIG. 35B), and after detecting the sliding operation, the electronic device 100 determines that the next picture is the second private picture 3302, but in this case, the face has changed. The electronic device 100 continues to search for a picture next to the second private picture 3302 until a non-private picture is found, and then displays the non-private picture, as shown in a state (III) in FIG. 35C. In this case, the non-private picture 3303 is displayed. The fifth non-private content may be the non-private picture 3303. In addition, the electronic device 100 may return to a previous-level menu, or mosaic processing may be performed on the second private picture to obtain the fifth non-private content, or the like. The fifth non-private content is similar to the foregoing non-private content, and details are not described herein again.

Optionally, when the fourth content is displayed, if the electronic device 100 detects an operation of returning to the previous-level menu, the electronic device 100 still determines the result of the face change detection. If the result of the face change detection indicates that the face changes, an icon of a non-private picture in a folder corresponding to the previous-level menu is displayed. If the result of the face change detection is that the face does not change, icons of all pictures in the folder corresponding to the previous-level menu are displayed, including icons of private pictures and icons of non-private pictures.

When the fifth non-private content is a non-private picture, if an operation of deleting the non-private picture is detected, the electronic device 100 determines whether a next picture that needs to be displayed is a private picture. If the next picture is a private picture, the electronic device 100 determines, based on the result of the face change detection, whether the face changes, and if the face does not change, displays a next private picture, or if the face changes, does not display the private picture, but displays another non-private picture. If the next picture is a non-private picture, the picture be directly displayed. Alternatively, if an operation of deleting the fourth content is detected, the electronic device 100 obtains the result of the face change detection and determines whether the face changes; and if the face does not change, directly displays a next picture; otherwise, jumps to the previous-level menu, or the like. For a case in which the electronic device 100 displays a private picture, if an operation of deleting the private picture is detected, the electronic device 100 may use a same processing mode, that is, determine displayed content of the next picture based on whether the next picture is a private picture and whether the face changes.

Figure 36:
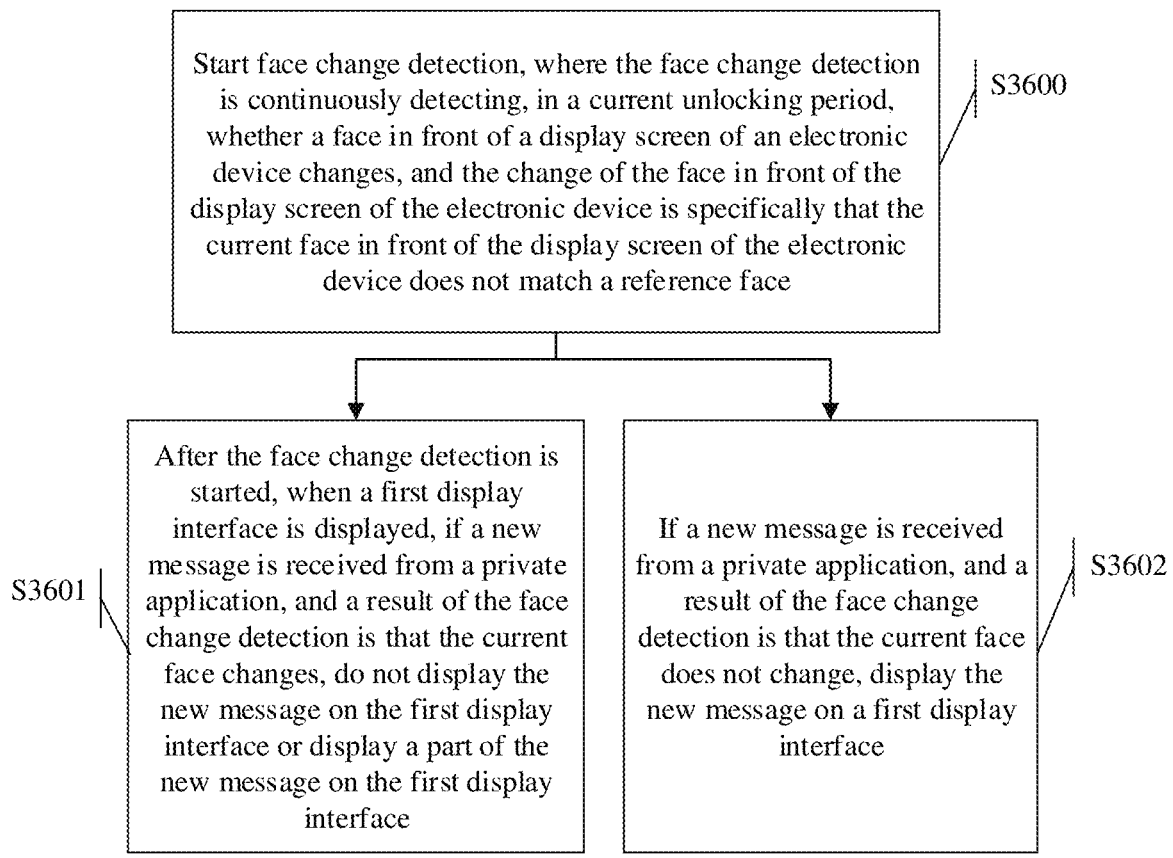
FIG. 36 is a flowchart of a privacy protection method for an electronic device according to another embodiment.

As shown in FIG. 36, a privacy protection method for an electronic device is provided in another embodiment. The method includes the following steps:

S3600. Start face change detection, where the face change detection is continuously detecting, in a current unlocking period, whether a face in front of a display of the electronic device changes, and the current face in front of the display of the electronic device does not match a reference face.

S3601. After the face change detection is started, when a first display interface is displayed, if a new message is received from a private application, and a result of the face change detection is that the current face changes, do not display the new message on the first display interface or display a part of the new message on the first display interface.

S3602. If a new message is received from a private application, and a result of the face change detection is that the current face does not change, display the new message on a first display interface.

How to start the face change detection in S3600 has been described above. Therefore, details are not described herein again.

In S3601, the first display interface may be a screen (for example, a home screen or a minus one screen) of the display of the electronic device 100, or may be an interface of an application, for example, an instant messaging software interface or an image browse interface of an album application or may be a system setting interface. This is not limited in this embodiment. A type of the private application has been described above. Therefore, details are not described herein again. After receiving the short message, the electronic device 100 first determines whether the short message is a short message of the private application and displays the short message when the short message is not a short message of the private application. When the short message is a short message of the private application, the electronic device 100 obtains the result of the face change detection, determines that the face changes, and hides the short message. Optionally, after receiving the short message, the electronic device 100 may further determine whether the short message includes private content, where the private content is, for example, password information, account information, an authentication code, information sent by a private contact, or a picture including preset content, and hide the short message.

All or a part of the short message may be hidden. For example, a sender of the short message is hidden, or private content included in the short message is hidden.

In S3602, after receiving the short message, the electronic device 100 determines that the short message is not a short message of the private application and may directly display the short message. Due to a limitation of a text length of the short message and a size of the display, for a short message with elongated content, only a part of the content may be displayed, but no part of private content is hidden willfully.

Optionally, after hiding all or a part of the content of the short message based on S3601, the electronic device 100 may continuously obtain the result of the face change detection. When the result of the face change detection is that the face does not change (switching back from an unauthorized user to an authorized user), the short message may be displayed.

Optionally, after a part of content of the short message is hidden based on S3601, a preset operation (for example, generating a gesture preset by the user) of the user may be received on the first display interface, so that all content of the short message is displayed. All hidden short messages may be displayed by using an operation, or only a short message corresponding to a user operation may be displayed. This is not limited in this embodiment.

Optionally, after starting the face change detection, when receiving a new message, the electronic device 100 may determine whether the new message is a private message. When the new message is a private message and the result of the face change detection is that the face changes, the new message is not displayed on the first display interface or a part of the new message is displayed on the first display interface; or when the new message is not a private message or the result of the face change detection is that the face does not change, the new message is displayed on the first display interface. One possibility that the new message is a private message is that the new message is a message of a private application. Another possibility is that the new message is a new message including preset content, for example, a preset contact, a preset keyword, or a preset picture.

There is no execution sequence between the process in which the electronic device 100 determines whether the new message is a private message and the process in which the electronic device 100 obtains the result of the face change detection. After receiving the new message, the electronic device 100 may directly obtain the result of the face change detection, and when the result of the face change detection indicates that the face changes, determine whether the new message is a private message. If the new message is a private message, the new message is not displayed on the first display interface, or a part of the new message is displayed on the first display interface. If the new message is not a private message, the new message is directly displayed. After receiving the new message, the electronic device 100 may alternatively first determine whether the new message is a private message, and when the new message is a private message, obtain the result of the face change detection to determine whether to display the new message.

In addition, before the face change detection is performed, identity authentication may also be performed on the user of the electronic device 100, and the face change detection is performed when the identity authentication succeeds. Because a mode and occasion for performing identity authentication have been described above, details are not described herein again.

Generally, an application relating to privacy may be, for example, albums, contacts, or SMS. The user may set a hidden album in the albums and set a private contact in the contacts, or the like. After detecting that the current user is an owner, the electronic device 100 may display private content; or after detecting that the current user is not an owner, the electronic device 100 may not display private content. The following uses a hidden album in the albums as an example for description. The following describes in detail the solutions provided in the embodiments of this application with reference to the accompanying drawings.

In the following embodiment, an example in which a private application is albums is used to describe a privacy protection method for an electronic device 100 according to an embodiment.

First, with reference to FIG. 37A to FIG. 37D, an application scenario—a process of setting a hidden album in an embodiment of this application is described.

Figure 37A:
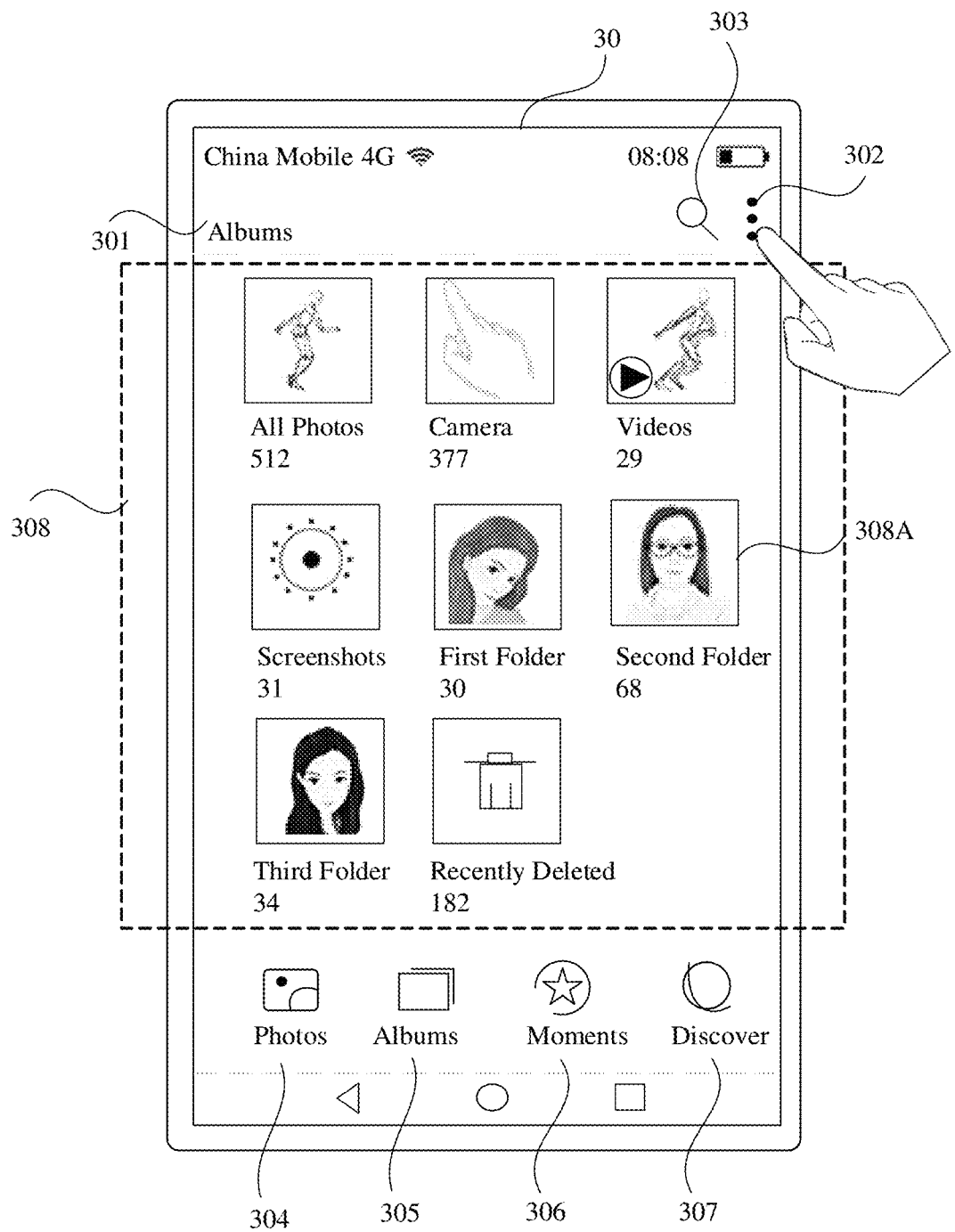
FIG. 37A to FIG. 37D are schematic diagrams of application scenarios for setting album hiding according to an embodiment.

The electronic device 100 may detect a touch operation (for example, a tap operation on an album icon) performed on a camera icon, and in response to the touch operation, the electronic device 100 may display a user interface 30 shown in FIG. 37A and used to display an album.

As shown in FIG. 37A, the user interface 30 may include a menu indicator 301, a more control 302, a search control 303, a "photos" menu control 304, an "albums" menu control 305, a "moments" menu control 306, a "discovery" menu control 307, and an album list 308. Details are as follows:

The menu indicator 301 may be used to indicate a menu type to which content currently displayed by the user interface 30 belongs. The menu types may include photos, albums, moments, and discovery. The menu type displayed by the user interface 30 shown in FIG. 37A is albums.

The more control 302 may be used to display more function lists. The electronic device 100 may detect a touch operation performed on the more control 302 (for example, a tap operation on the more control 302). In response to the touch operation, the electronic device 100 may display, on the user interface 30, a function list 309 shown in FIG. 37B. The function list 309 is not described in detail herein.

The search control 303 may be used to search for pictures. The electronic device 100 may detect a touch operation (for example, a tap operation on the search control 303) performed on the search control 303, and in response to the touch operation, the electronic device 100 may display a search box on the user interface 30, for receiving a keyword input by the user and searching an album for a picture that matches a keyword.

The "photos" menu control 304 may be used to display a photo list. The electronic device 100 may detect a touch operation performed on the "photos" menu control 304 (for example, a tap operation on the "photos" menu control 304). In response to the touch operation, the electronic device 100 may display a photo list on the user interface 30. The photo list may include all pictures stored in an internal memory 121 of the electronic device 100. The pictures may be arranged from top to bottom and left to right based on a time sequence of saving pictures. For example, a picture saved latest is displayed in a first column and a first row of the list, and a picture saved earliest is displayed in a last column and a last row of the list.

The "albums" menu control 305 may be used to display an album list. The electronic device 100 may detect a touch operation performed on the "albums" menu control 305 (for example, a tap operation on the "albums" menu control 305). In response to the touch operation, the electronic device 100 may display, on the user interface 30, the album list 308 shown in FIG. 37A.

The "moments" menu control 306 may be used to display a set of photos at a particular moment that are stored in the internal memory 121. The electronic device 100 may detect a touch operation performed on the "photos" menu control 304 (for example, a tap operation on the "photos" menu control 304). In response to the touch operation, the electronic device 100 may display, on the user interface 30, a set of photos, for example, a photo shot at a party, a photo shot during graduation, or a photo shot on a trip.

The "discovery" menu control 307 may be used to display one or more folders in other classification modes, where each folder may include one or more pictures. For example, a plurality of folders may be displayed based on location classification and time classification. In the location classification, pictures may belong to different folders based on shooting locations (for example, Beijing, Shanghai, New York, and Tokyo). In the time classification, pictures may belong to different folders based on shooting time (for example, 2018, 2017, and 2016).

The album list 308 may be used to display one or more folders (file sets), and each folder may include a plurality of pictures with common features. For example, pictures obtained by screen shooting and recording may belong to a screenshots folder, pictures from instant messaging software may belong to an instant messaging software folder 308A, pictures from first social software may belong to a first folder, pictures from first instant messaging software may belong to a second folder, pictures from second instant messaging software may belong to a third folder, and pictures deleted in a time period may belong to a recently deleted folder, or the user may define a folder, and a plurality of pictures may belong to the user-defined folder. Each folder may include a cover icon, a folder name, and a quantity of files included in the folder.

Figure 37B:
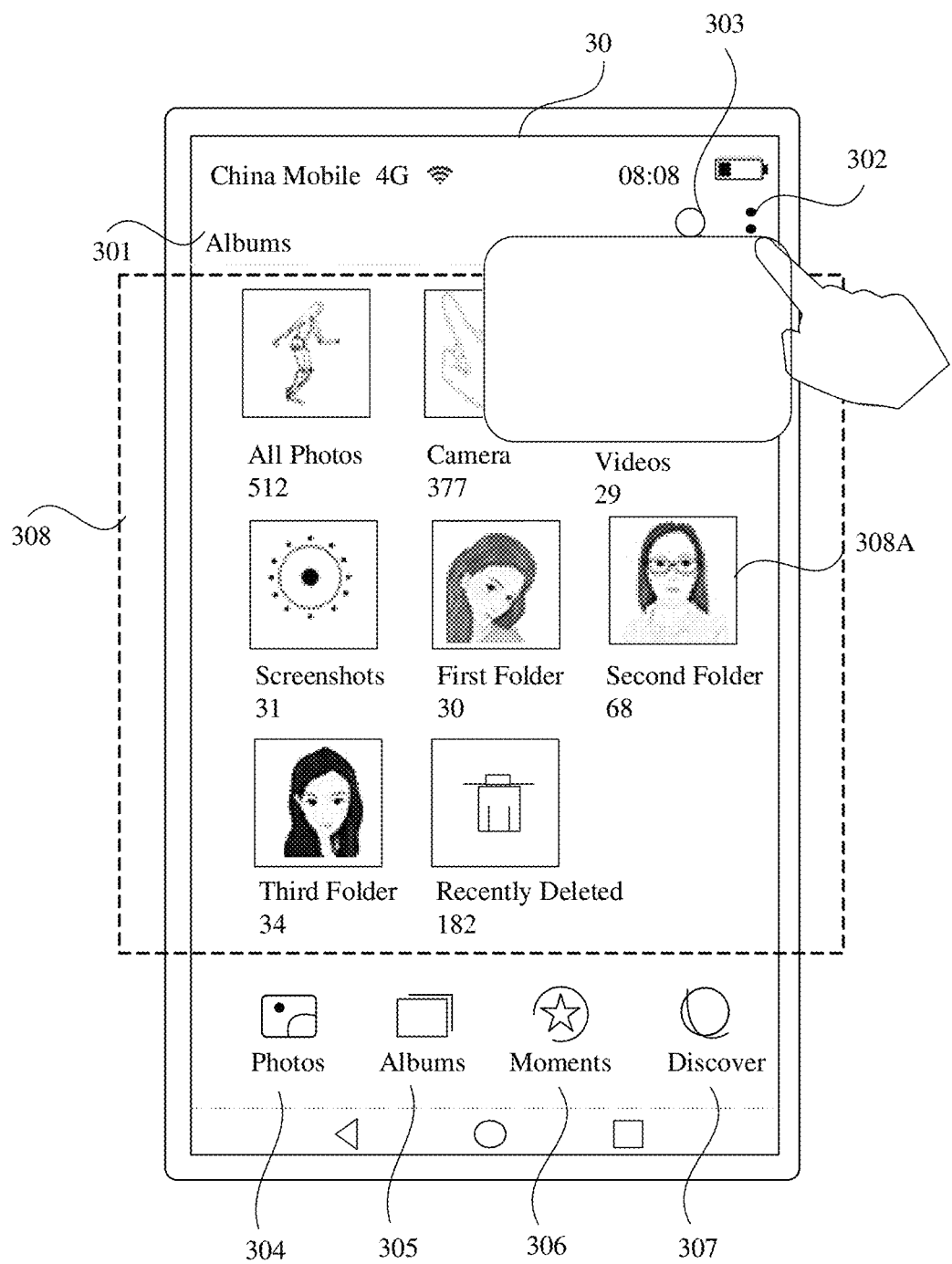

Next, the function list 309 shown in FIG. 37B is described. As shown in FIG. 37B, the function list 309 may include an album hiding control and a setting control. Details are as follows:

The album hiding control may be used to set a hidden album. The electronic device 100 may detect a touch operation (for example, a tap operation on the album hiding control) performed on the album hiding control, and in response to the touch operation, the electronic device 100 may display a user interface 40 shown in FIG. 37C.

The setting control may be used to set other functions of the album, for example, whether to enable album data synchronization, whether to rotate a picture based on gravity sensing, and whether to display a shooting time and location during viewing. The electronic device 100 may detect a touch operation (for example, a tap operation on the setting control) performed on the setting control, and in response to the touch operation, the electronic device 100 may display a user interface used to display other functions of the album.

Figure 37C:
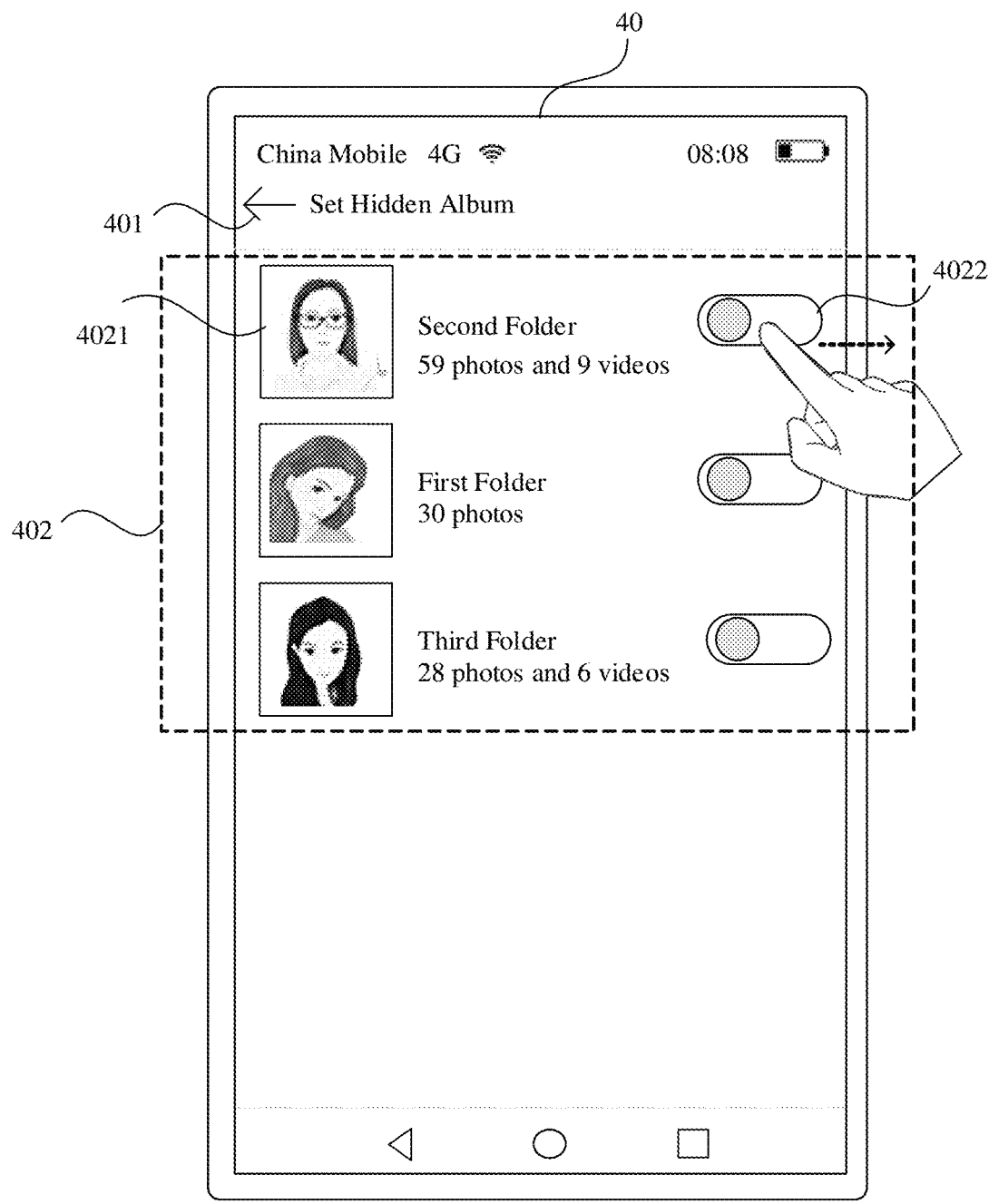
Figure 37D:
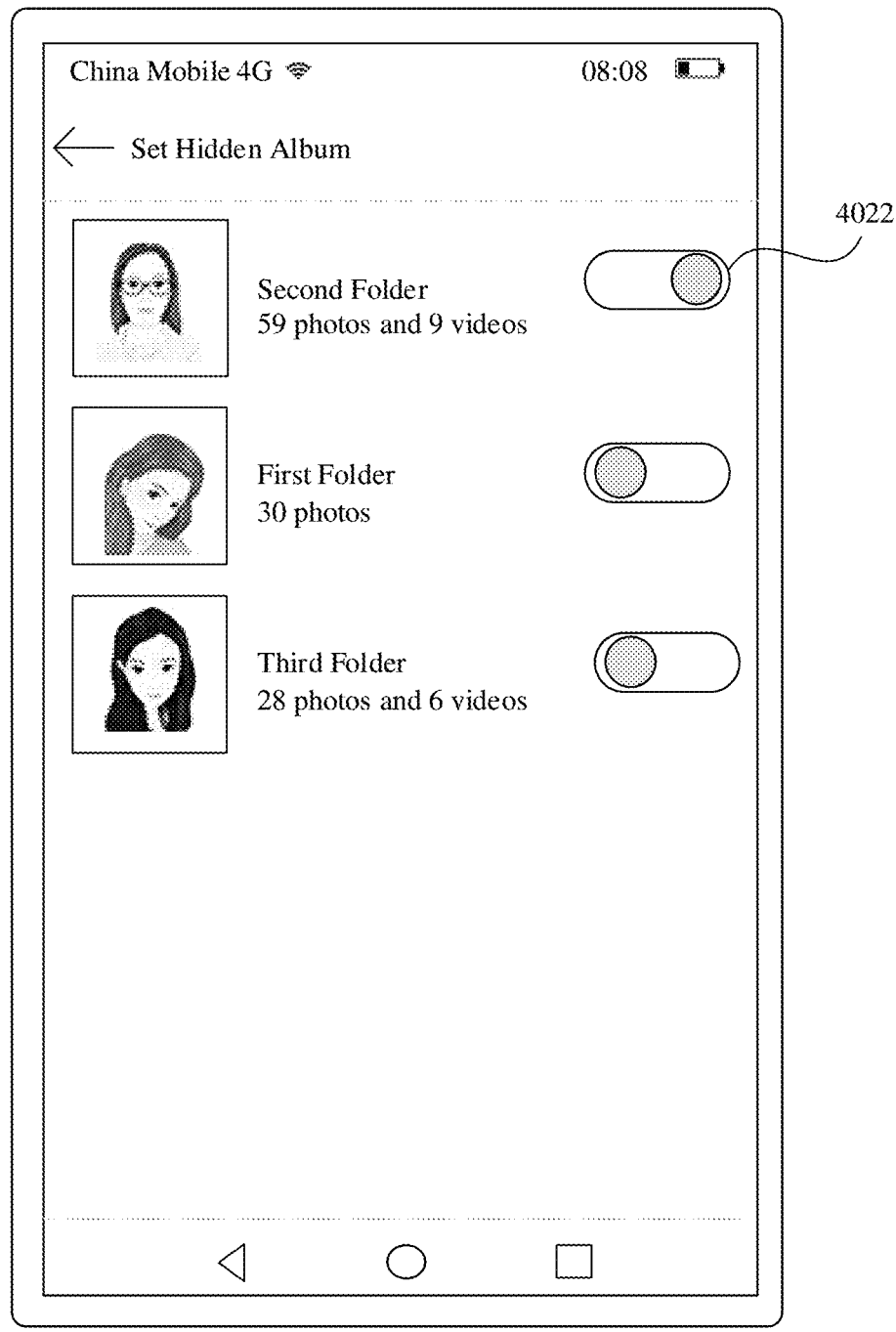

Next, the user interface 40 shown in FIG. 37C is described. As shown in FIG. 37C, the user interface 40 may include a return control 401 and an album list 402. Details are as follows:

The return control 401 may be used to return to a user interface previous to the current user interface. The electronic device 100 may detect a touch operation (for example, a tap operation on the return control 401) performed on the return control 401, and in response to the touch operation, the electronic device 100 may display the user interface 30 shown in FIG. 37C.

The album list 402 may be used to display one or more album options. Each album option may include a cover icon, for example, 4021, an album name, a quantity of files included in the album, and a selection control corresponding to the album, for example, 4022. The selection control 4022 may include two states: a selected state and an unselected state. The state of the selection control 4022 shown in 37C is an unselected state. The electronic device 100 may detect a sliding operation (for example, a left-to-right sliding operation performed on the selection control 4022) performed on the selection control 4022, and in response to the sliding operation, the electronic device 100 may set the album corresponding to the selection control 4022 as a hidden album and display the selection control 4022 in the selected state shown in FIG. 37D.

Based on the application scenarios shown in FIG. 37A to FIG. 37D, the following describes embodiments of some user interfaces (UIs) implemented on the electronic device 100.

A non-owner state mentioned in the following embodiment is that the electronic device 100 detects that a face of a user currently using the electronic device 100 does not match a face of an owner, or that a matching degree is lower than a preset threshold, for example, 80%. An owner state mentioned in the following embodiment is that the electronic device 100 detects that a face of a user currently using the electronic device 100 matches the face of the owner, or that a matching degree is not lower than a preset threshold, for example, 80%. A multi-person gaze state mentioned in the following embodiment is that the electronic device 100 detects that a quantity of faces of users currently using the electronic device 100 is greater than or equal to 2.

Figure 38A:
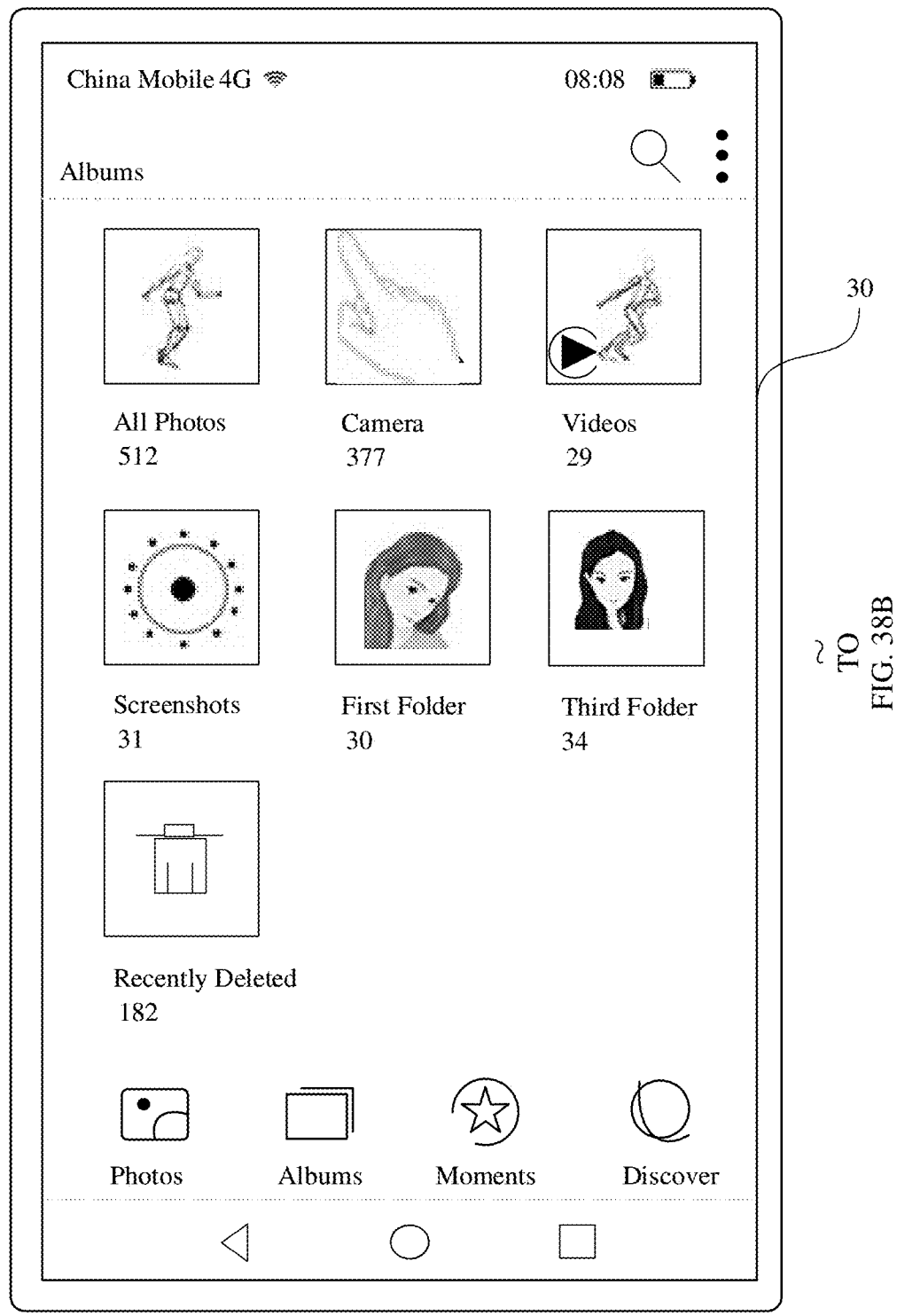
FIG. 38A and FIG. 38B are schematic diagrams of user interfaces according to an embodiment.
Figure 38B:
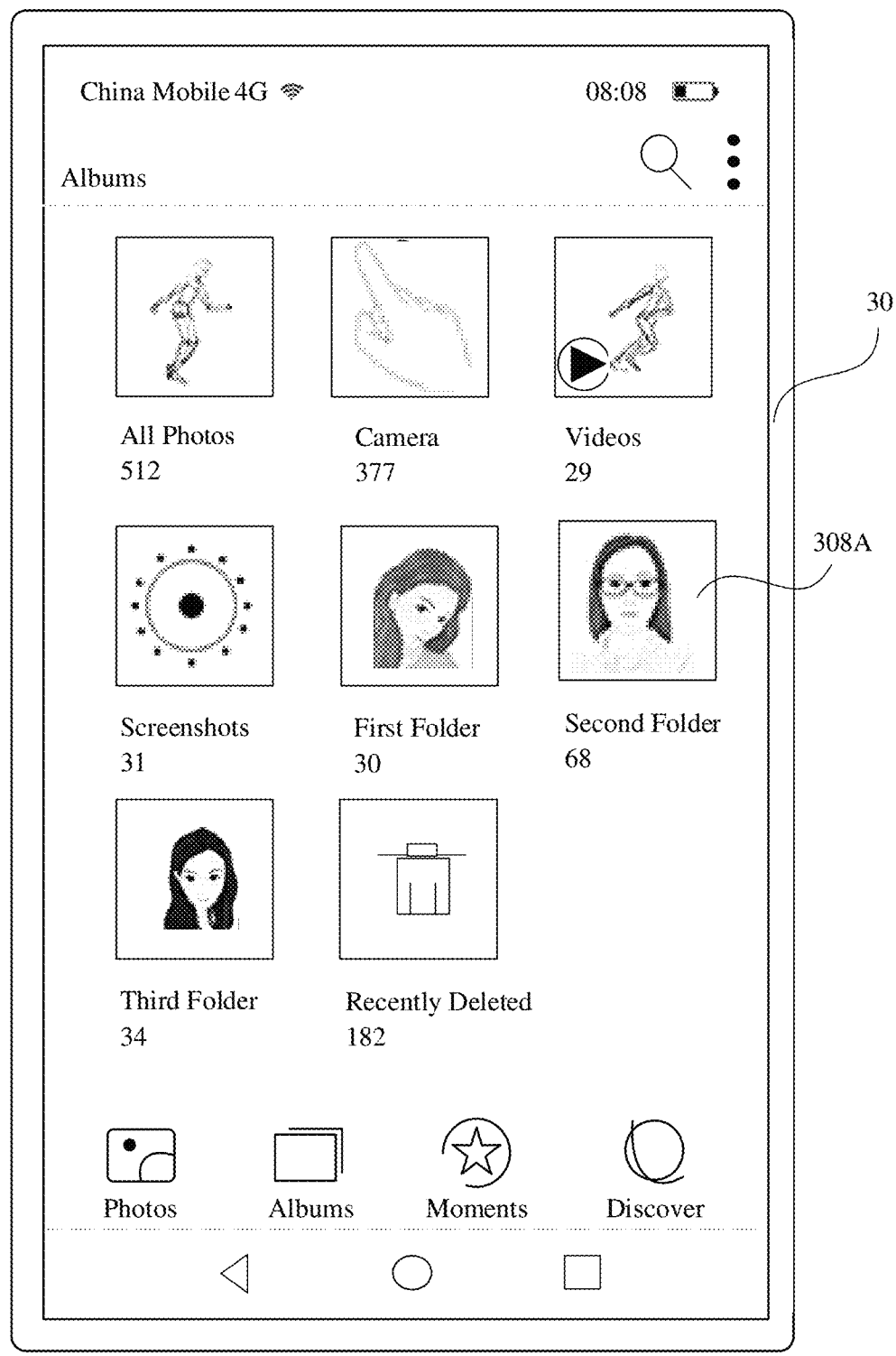

FIG. 38A and FIG. 38B illustrate a display mode of the user interface 30 in the owner state and the non-owner state.

As can be learned from FIG. 38A, in the non-owner state, the electronic device 100 may not display an instant messaging software folder set as a hidden album on the user interface 30.

As can be learned from FIG. 38B, in the owner state, the electronic device 100 may display an instant messaging software folder 308A set as a hidden album on the user interface 30.

Figure 39A:
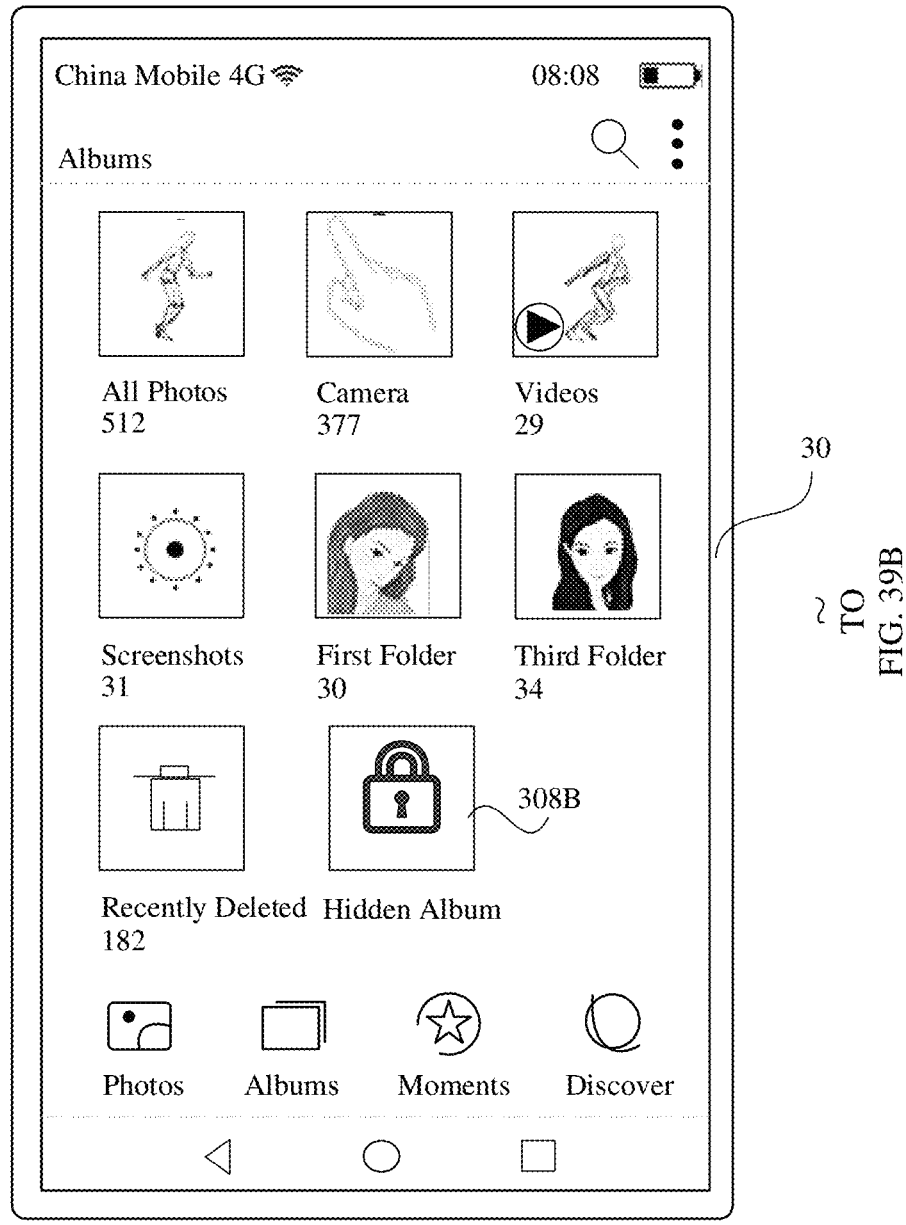
FIG. 39A and FIG. 39B are schematic diagrams of other user interfaces according to an embodiment.
Figure 39B:
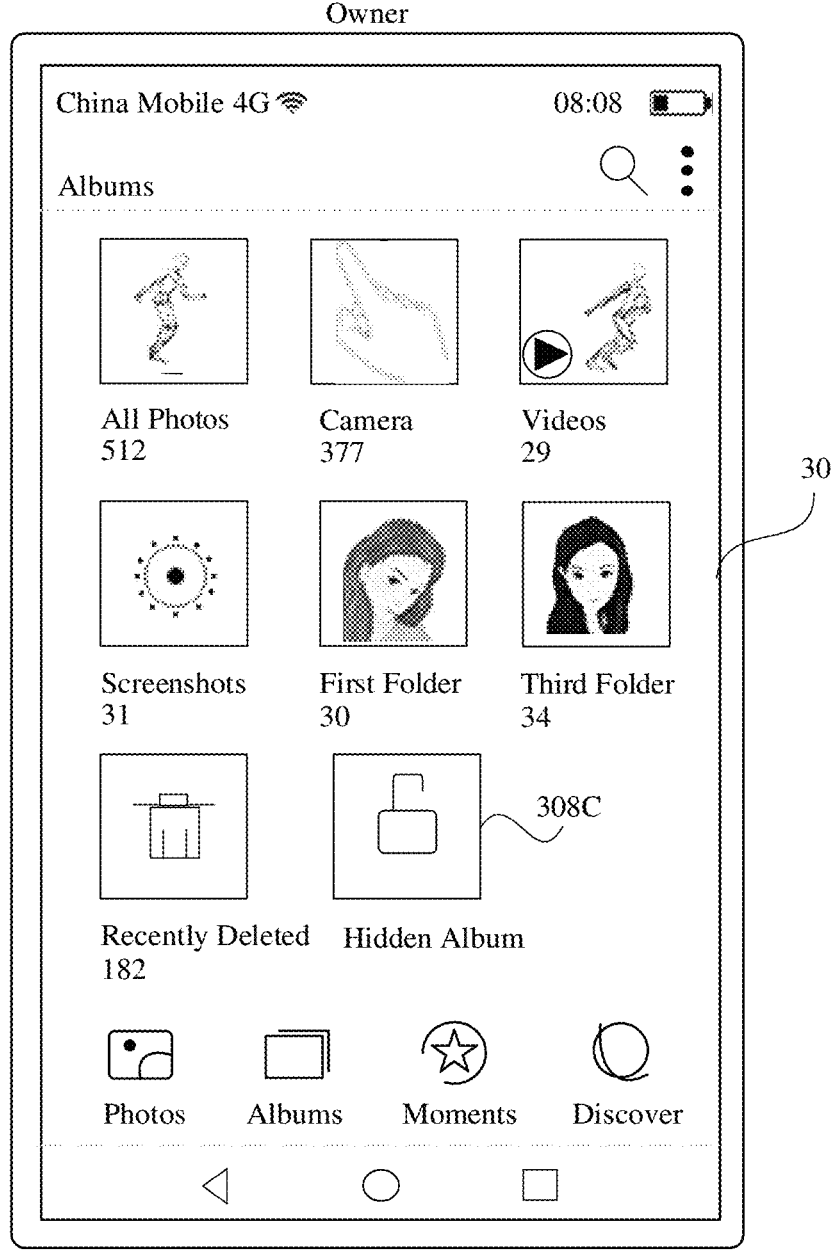

FIG. 39A and FIG. 39B illustrate another display mode of the user interface 30 in the owner state and the non-owner state.

As can be learned from FIG. 39A, in the non-owner state, the electronic device 100 may display a hidden album 308B on the user interface 30. For example, a cover icon of the album may be but is not limited to an icon of a lock with a lock head locked. The electronic device 100 may detect a touch operation (for example, a tap operation on the hidden album 308B) performed on the hidden album 308B, and in response to the touch operation, the electronic device 100 may display an identity authentication prompt box. The identity authentication prompt box may, for example, prompt the user to authenticate a fingerprint, input a password, or authenticate a face.

As can be learned from FIG. 39B, in the owner state, the electronic device 100 may display a hidden album 308C on the user interface 30. For example, a cover icon of the album may be but is not limited to an icon of a lock with a lock head unlocked. The electronic device 100 may detect a touch operation (for example, a tap operation performed on the hidden album 308C) performed on the hidden album 308C, and in response to the touch operation, the electronic device 100 may display a picture list in the hidden album.

The display modes shown in FIG. 38A, FIG. 38B, FIG. 39A, and FIG. 39B are not limited. The user interface 30 may alternatively have another display mode in the owner state and the non-owner state. This is not limited in this embodiment.

Correspondences displayed by the user interface 30 in the owner state and the non-owner state shown in FIG. 38A, FIG. 38B, FIG. 39A, and FIG. 39B are not limited. The display mode of the user interface 30 in the owner state may be a display mode in FIG. 7B, and the display mode of the user interface 30 in the non-owner state may be a display mode in FIG. 8A.

Figure 40:
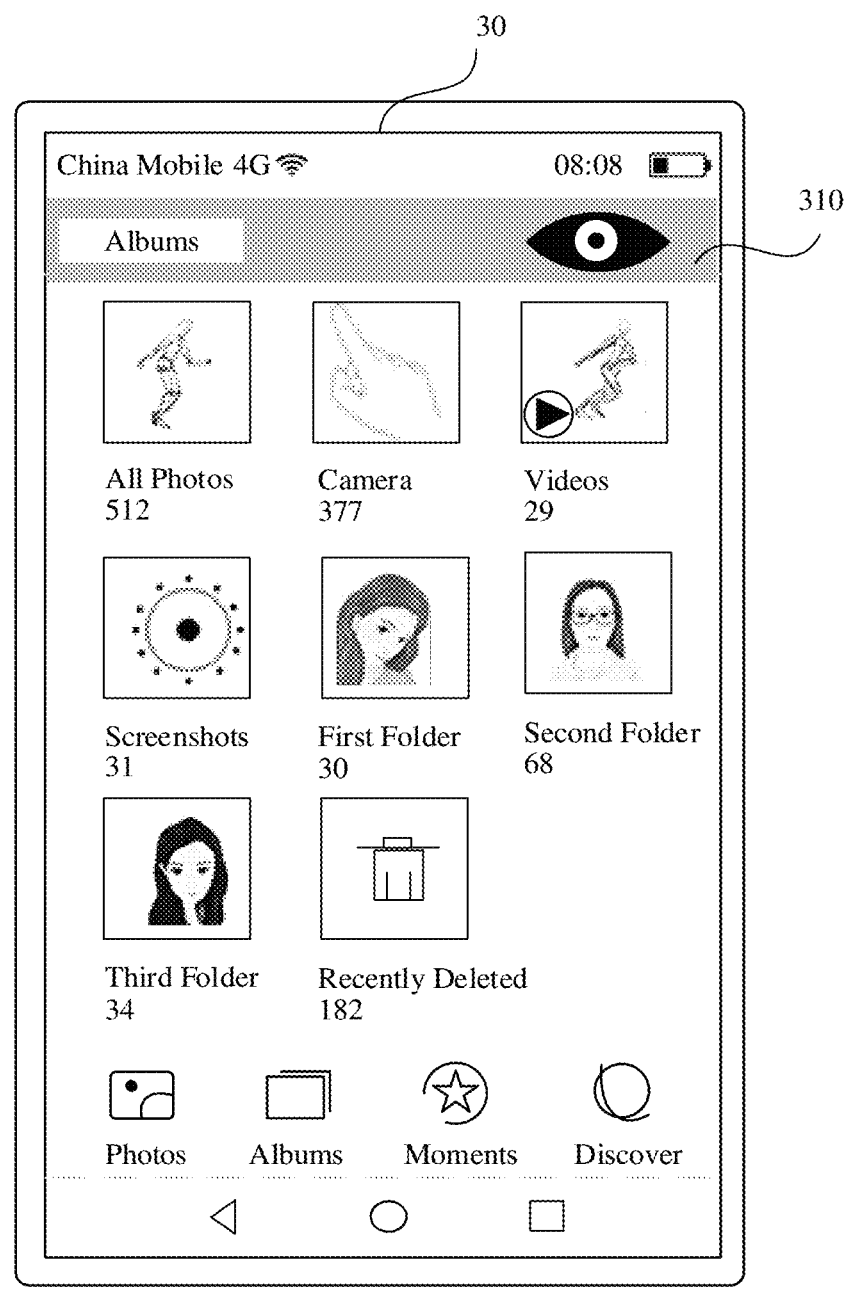
FIG. 40 is a schematic diagram of another user interface according to an embodiment.

FIG. 40 illustrates a display mode of the user interface 30 in the multi-person gaze state.

As can be learned from FIG. 40, when the electronic device 100 detects that a current state is the multi-person gaze state, the electronic device 100 may display a prompt 310 on the top of the current user interface, for example, the user interface 30. The prompt 310 may be used to prompt the user that another user is currently gazing at the user interface 30, to prevent privacy leakage.

Figure 47:
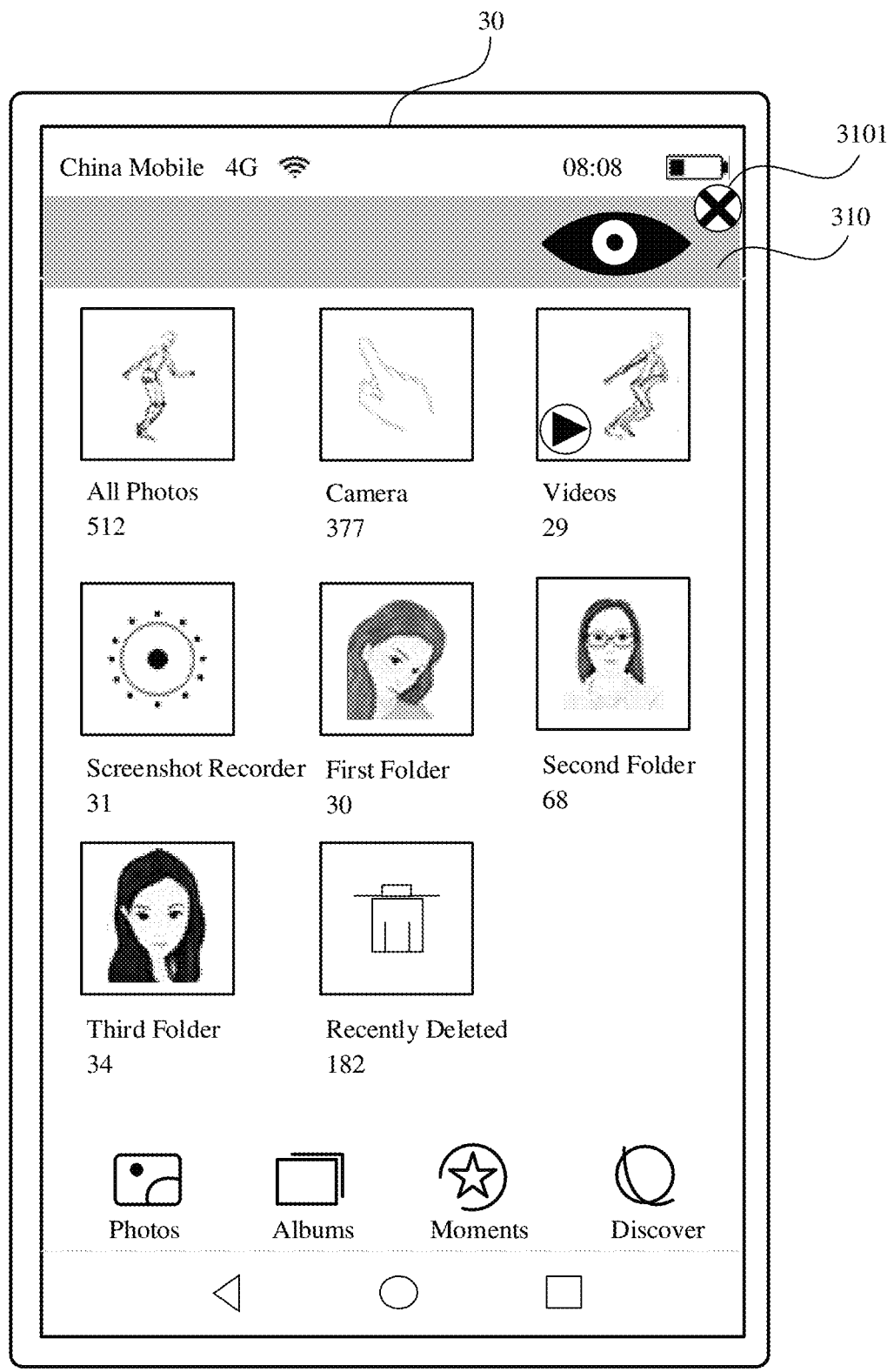
FIG. 47 is a schematic diagram of another user interface according to an embodiment.

Further, as shown in FIG. 47, the prompt 310 may also include a close control 3101. The close control 3101 may be used to close the prompt 310. When the user knows that another user around is gazing at the user interface 30 and does not mind the gazing, the user may close the prompt 310 by tapping the close control 3101, so that the user can view the user interface 30. Not limited to closing the prompt 310 by using the close control 3101, the user may also close the prompt 310 by sliding the prompt 310 left or right. A manner of closing the prompt 310 is not limited in this embodiment.

A prompt manner shown in FIG. 40 is not limited. The prompt of the multi-person gaze state may also have another presentation form. For example, a prompt box is displayed in a translucent form in the middle of the user interface 30, or the electronic device 100 may generate a vibration based on a preset frequency. Alternatively, the electronic device 100 may cause an indicator 192 to blink at a preset frequency to prompt the user. This is not limited in this embodiment.

The following describes a privacy protection method for an electronic device 100 according to an embodiment with reference to the foregoing application scenario.

Figure 41:
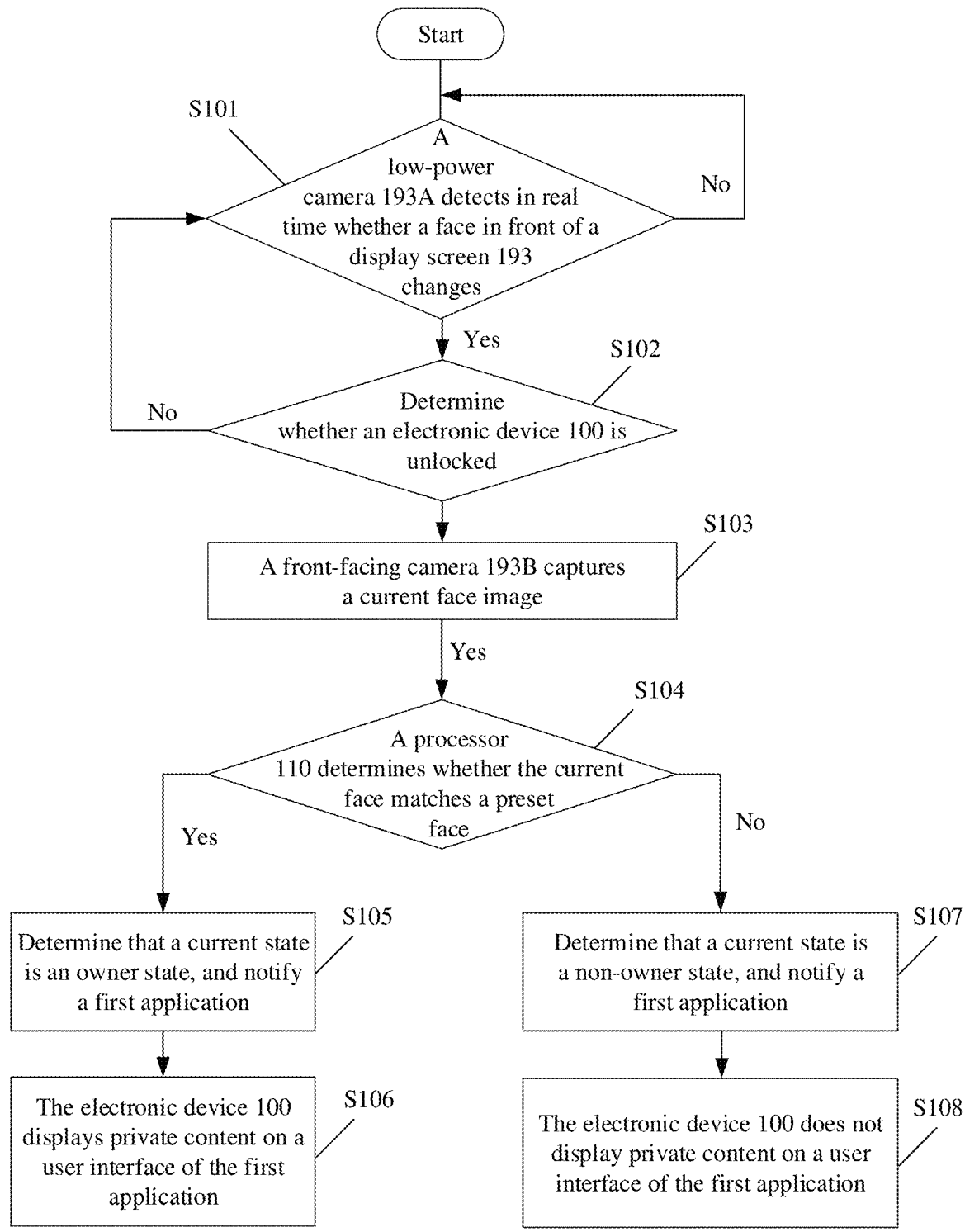
FIG. 41 is a schematic flowchart of a device privacy protection method for an electronic device according to an embodiment.

FIG. 41 is a schematic flowchart of a privacy protection method for an electronic device 100. As shown in FIG. 41, the method may include at least the following several steps:

S101. A low-power camera 193A continuously detects whether a face in front of a display 193 of the electronic device 100 changes, and if yes, performs S102, or if no, performs S101.

The low-power camera 193A may capture an image at a first frequency and determine whether a face included in the image changes. For example, the first frequency may be but is not limited to 10 frames per second.

A face included in the image changes may include: a quantity of faces included in the image may change from zero to non-zero, or the face changes from a face A to a face B.

The low-power camera 193A may be an infrared camera, and the captured image may be a black-and-white image.

In this embodiment, the low-power camera 193A may continuously detect whether a face in front of the display 193 of the electronic device 100 changes when the low-power camera 193A is enabled. For example, a manner of enabling the low-power camera 193A may be, but is not limited to, enabling the low-power camera 193A by using a control on a setting page of the electronic device 100.

Figure 48:
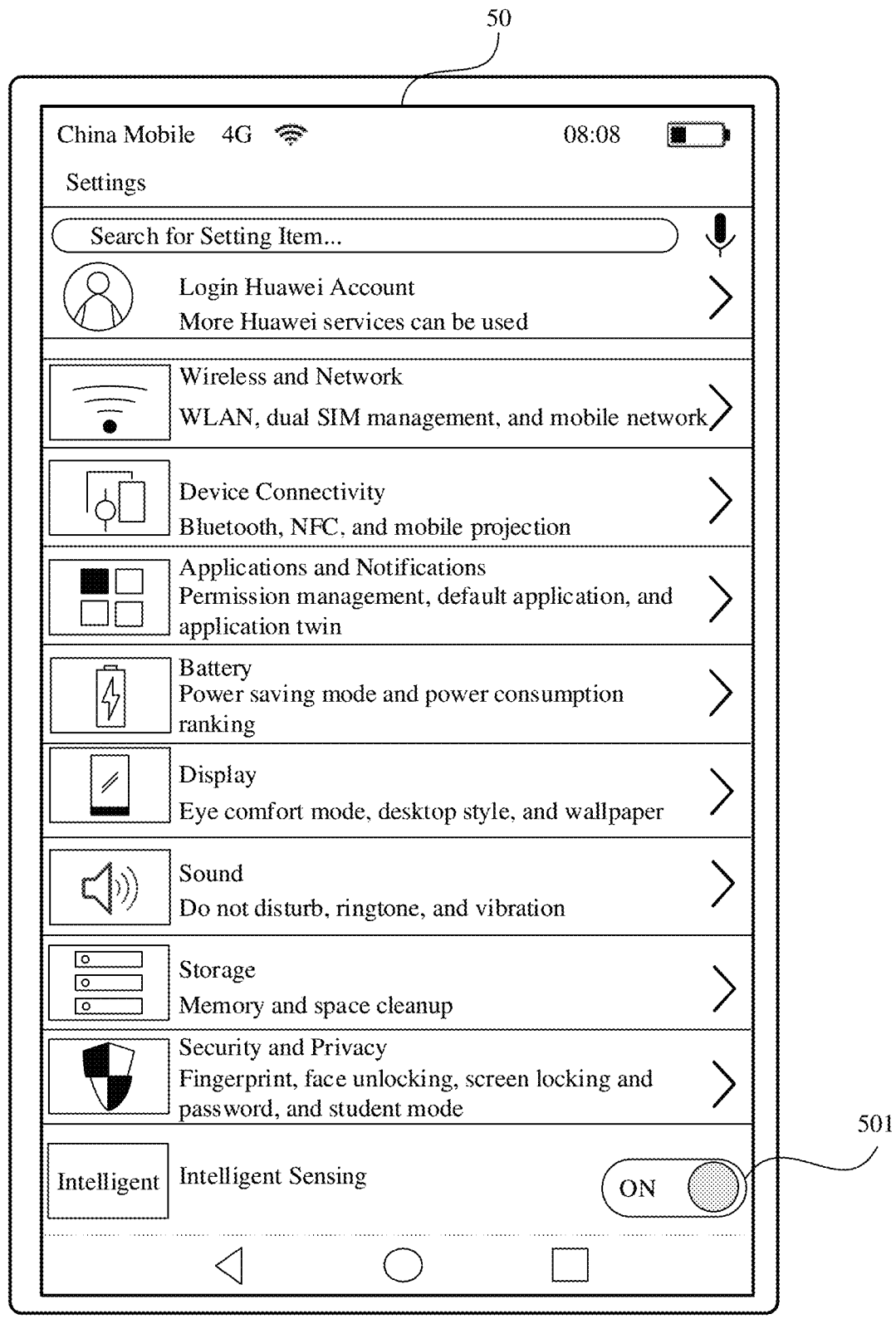
FIG. 48 is a schematic diagram for enabling a low-power camera according to an embodiment.

The electronic device 100 may detect a touch operation (for example, a tap operation on a setting icon 209) performed on the setting icon 209, and in response to the touch operation, the electronic device 100 may display a setting interface 50 shown in FIG. 48.

As shown in FIG. 48, the setting interface 50 may include a control 501. The control 501 may be used to enable or disable the low-power camera 193A. It is assumed that an initial state of the low-power camera 193A is a disabled state. The electronic device 100 may detect a user operation (for example, a sliding operation performed on the control 501) performed on the control 501, and in response to the operation, the electronic device 100 may enable the low-power camera 193A.

In addition, the setting interface 50 may further include other function setting items, such as a login Huawei account setting item, a wireless and network setting item, a device connectivity setting item, an application and notification setting item, a battery setting item, a display setting item, a sound setting item, a storage setting item, and a security and privacy setting item. The setting interface 50 may further include a search box and a language input control, both of which may be used to receive a keyword input by a user and search for a setting item matching the keyword.

The manners listed above are not limited. Another manner of enabling the low-power camera 193A may also be used. This is not limited in this embodiment.

S102. Determine whether the electronic device 100 is unlocked, and if yes, perform S103, or if no, perform S101.

If it is detected that the current face changes, whether the electronic device 100 is unlocked is further determined. If the electronic device 100 is unlocked, S103 may be performed to trigger a front-facing camera 193B to capture the current face. If the electronic device 100 is not unlocked, S101 may continue to be performed to detect whether the face changes.

In some other embodiments, after the low-power camera 193A detects that the current face changes, if the electronic device 100 is not unlocked, the front-facing camera 193B may be triggered to perform face recognition. If the recognition succeeds, the electronic device 100 may be unlocked.

Alternatively, after detecting that the current face changes, the low-power camera 193A may trigger an unlocking process if the electronic device 100 is not unlocked, for example, display a password input prompt box or a fingerprint recognition prompt box.

S103. The front-facing camera 193B captures the current face.

The front-facing camera 193B may capture an image at a second frequency. The second frequency is higher than the first frequency, and the second frequency, for example, may be but is not limited to 150 frames per second. In other words, a time interval at which the low-power camera 193A captures an image is longer than a time interval at which the front-facing camera 193B captures an image. In addition, a resolution of the image captured by the front-facing camera 193B is higher than a resolution of the image captured by the low-power camera 193A.

In another embodiment, the current face may also be captured by using the low-power camera 193A. The low-power camera 193A may capture the current face at the second frequency. The second frequency is higher than the first frequency, and the second frequency, for example, may be but is not limited to 30 frames per second.

If a face is captured by using the low-power camera 193A, and a capture frequency when the face is captured is higher than a capture frequency during detection of whether the face changes, in comparison with the capture by using the front-facing camera 193B, power consumption of the electronic device 100 can be further reduced and endurance of the electronic device 100 can be further improved while face recognition accuracy is ensured.

S104. A processor 110 determines whether the current face matches a preset face, and if yes, performs S105, or if no, performs S107.

An image of the preset face may be a face of an owner stored in an internal memory 121. The processor 110 may match a feature point of the image of the current face captured by the front-facing camera 193B with a feature point of the face of the owner stored in the internal memory 121. If the two feature points match successfully, it is determined that the current user is the owner, that is, a current state is an owner state. If the two feature points do not match successfully, it is determined that the current user is not the owner, that is, the current state is a non-owner state. The current state may include the owner state and the non-owner state.

That the current face matches the preset face may be that a similarity between the current face and the preset face exceeds a preset threshold. For example, the preset threshold may be but is not limited to 80%. That the current face does not match the preset face may be that the similarity between the current face and the preset face does not exceed the preset threshold.

S105. Determine that the current state is the owner state and notify a first application.

The first application may be a private application such as albums, SMS, or contacts. The first application may be an application set by the user or may be an application set by a manufacturer. There may be one or more first applications. The electronic device 100 may notify the first application in time after detecting that the current state changes, so that the first application determines displayed content of the first application.

The first application may register an owner state callback with the low-power camera 193A. After detecting that the current state changes, the low-power camera 193A may notify the first application that the current state is the owner state or the non-owner state.

The private applications listed above are not limited. The first application may alternatively be another application. This is not limited in this embodiment.

In some embodiments, S105 is an optional step. If the first application is a system application (for example, a calendar, a calculator, or a camera 193), the electronic device 100 may directly control content displayed on a user interface of the first application. In this case, the first application does not need to be notified that the current state is the owner state. However, if the first application is not a system application (for example, Baidu or instant messaging software), the first application may adjust the displayed content based on the owner state by sending a notification to the first application. Using S105 can enable a non-system application to distinguish between the owner state and the non-owner state, thereby displaying different content.

S106. The electronic device 100 displays private content on the user interface of the first application.

The first application may determine displayed content of the first application based on the current state. For example, FIG. 38A and FIG. 39A show the content displayed in the non-owner state, and FIG. 38B and FIG. 39B show the content displayed in the owner state. 308A in FIG. 38B is private content.

It can be learned that after the electronic device 100 displays the private content on the user interface of the first application, the low-power camera 193A may continue to detect whether a face in front of the display of the electronic device 100 changes.

S107. Determine that the current state is the non-owner state and notify the first application.

After detecting that the current state is the non-owner state, the electronic device 100 notifies the first application in time, so that the first application determines the displayed content of the first application.

Similarly, S107 is also an optional step.

S108. The electronic device 100 does not display private content on the user interface of the first application.

It can be learned that after the electronic device 100 does not display the private content on the user interface of the first application, the low-power camera 193A may continue to detect whether a face in front of the display of the electronic device 100 changes.

The first application may determine displayed content of the first application based on the current state. For example, FIG. 38A is compared with FIG. 38B. 308A in FIG. 38B is private content. It can be learned from FIG. 38A that, in the non-owner state, the electronic device 100 does not display the private content.

Possibly, when the electronic device 100 detects that the current state changes, the user interface displayed by the electronic device 100 may not be the user interface of the first application. After it is detected that the current state changes, when a user operation that causes the electronic device 100 to display the user interface of the first application is detected, authentication (for example, face recognition) does not need to be performed again, and corresponding content may be displayed based on the current state.

For example, the user interface currently displayed by the electronic device 100 may be a desktop. In this case, after detecting that the current state changes from the owner state to the non-owner state, the electronic device 100 may notify an album application that the current state is the non-owner state. After the electronic device 100 detects a tap operation performed on an album icon 207, in response to the operation, the electronic device 100 may display a user interface shown in FIG. 38A or FIG. 39A.

For another example, the user interface currently displayed by the electronic device 100 may be a desktop. In this case, after detecting that the current state changes from the non-owner state to the owner state, the electronic device 100 may notify the album application that the current state is the owner state. After the electronic device 100 detects a tap operation performed on the album icon 207, in response to the operation, the electronic device 100 may display a user interface shown in FIG. 38B or FIG. 39B.

Possibly, when the electronic device 100 detects that the current state changes, the user interface displayed by the electronic device 100 may be the user interface of the first application. After it is detected that the current state changes, the content displayed on the current user interface may be changed based on the current state.

For example, the user interface currently displayed by the electronic device 100 may be FIG. 38A or FIG. 39A. The current state is the non-owner state. If the electronic device 100 detects that the current state changes from the non-owner state to the owner state, the electronic device 100 may display the user interface shown in FIG. 38B or FIG. 39B.

For another example, the user interface currently displayed by the electronic device 100 may be FIG. 38B or FIG. 39B. The current state is the owner state. If the electronic device 100 detects that the current state changes from the owner state to the non-owner state, the electronic device 100 may display the user interface shown in FIG. 38A or FIG. 39A.

Possibly, when the electronic device 100 detects that the current state changes, the user interface displayed by the electronic device 100 may be the user interface of the first application. After detecting that the current state changes, the electronic device 100 does not change content on the current user interface.

Possibly, when the electronic device 100 detects that the current state changes, the user interface displayed by the electronic device 100 may be the user interface of the first application. After detecting that the current state changes from the non-owner state to the owner state, the electronic device 100 may change content displayed on the current user interface, that is, display the private content. However, after detecting that the current state changes from the owner state to the non-owner state, the electronic device 100 may not change content displayed on the current user interface, that is, still display the private content. This can avoid an embarrassment caused by other people seeing that some content is hidden when the owner hands the phone to the other people.

In a possible implementation, the electronic device 100 may set default displayed content of the first application as content displayed in the non-owner state, for example, content displayed on the user interface shown in FIG. 38A or FIG. 39A. After it is detected that the current state changes from the non-owner state to the owner state, the displayed content of the first application may be changed to content displayed in the owner state, for example, content displayed on the user interface shown in FIG. 38B or FIG. 39B.

In another possible implementation, the electronic device 100 may set the default displayed content of the first application as content displayed in the owner state, for example, content displayed on the user interface shown in FIG. 38B or FIG. 39B. After it is detected that the current state changes from the owner state to the non-owner state, the displayed content of the first application may be changed to content displayed in the non-owner state, for example, content displayed on the user interface shown in FIG. 38A or FIG. 39A.

In this embodiment, whether the current user changes may be detected in real time by using the low-power camera 193A, and when the current user changes, the front-facing camera 193B is triggered to capture the face, to perform face authentication. The electronic device 100 displays content based on a face authentication result. In this embodiment, user privacy can be comprehensively protected in real time, and whether the current user change is detected in real time by using the low-power camera 193A. Therefore, it can be ensured that the electronic device 100 has low power consumption and strong endurance.

Figure 42:
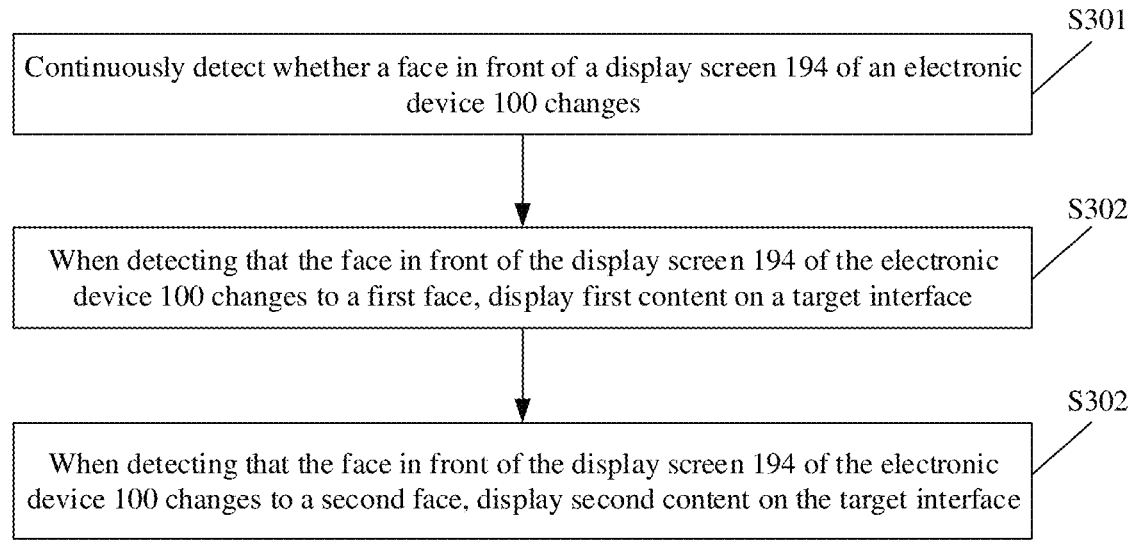
FIG. 42 is a schematic flowchart of another privacy protection method for an electronic device according to an embodiment.

FIG. 42 is a schematic flowchart of another privacy protection method for an electronic device 100 according to an embodiment. As shown in FIG. 42, the privacy protection method for the electronic device 100 may include at least the following several steps:

S301. Continuously detect whether a face in front of a display of the electronic device 100 changes.

The electronic device 100 may capture an image at a first frequency by using a first camera 193 (a low-power camera 193A) and determine whether a face included in the image changes. The first camera 193 may be the low-power camera 193A mentioned in the foregoing embodiment. For example, the first frequency may be but is not limited to 10 frames per second.

A face included in the image changes may include: a quantity of faces included in the image may change from zero to non-zero, or the face changes from a face A to a face B.

Regardless of whether the electronic device 100 is in a screen locked state or in an unlocked state, or whether the electronic device 100 is in a screen-on state or a screen-off state, the first camera 193 may continuously detect whether the face in front of the display 194 of the electronic device 100 changes.

S302. When detecting that the face in front of the display 194 of the electronic device 100 changes to a first face, display first content on a target interface.

The first face matches a preset face.

If a similarity between the first face and the preset face exceeds a preset threshold, it may be considered that the first face matches the preset face. For example, the preset threshold may be but is not limited to 80%.

The image of the preset face may be a face of an owner stored in an internal memory 121. That the first face matches the preset face may indicate that a current state is an owner state. The target interface may be, for example, a user interface shown in FIG. 5B or FIG. 6B. The first content may be, for example, content displayed on a user interface shown in FIG. 5B or FIG. 6B.

After the first content is displayed on the target interface, the electronic device 100 may further continue to detect, by using the first camera 193, whether a face in front of the display 194 changes, that is, the electronic device 100 may always detect, by using the first camera 193, whether a face in front of the display 194 changes.

S303. When detecting that the face in front of the display 194 of the electronic device 100 changes to a second face, display second content on the target interface.

The second face does not match the preset face.

If the similarity between the first face and the preset face does not exceed the preset threshold, it may be considered that the first face does not match the preset face. For example, the preset threshold may be but is not limited to 80%.

The first face matching the preset face may indicate that the current state is a non-owner state. The target interface may be, for example, a user interface shown in FIG. 38A or FIG. 39A. The second content may be, for example, content displayed on the user interface shown in FIG. 38A or FIG. 39A.

After the second content is displayed on the target interface, the electronic device 100 may further continue to detect, by using the first camera 193, whether a face in front of the display 194 changes, that is, the electronic device 100 may always detect, by using the first camera 193, whether a face in front of the display 194 changes.

An implementation sequence of S302 and S303 is not limited in this embodiment.

In some possible embodiments, S302 may include: when detecting, by using the first camera 193, that the face in front of the display of the electronic device 100 changes, capturing a changed face by using a second camera 193, where the changed face is the first face; determining that the first face matches the preset face; and displaying the first content on the target interface.

S303 may include: when detecting, by using the first camera 193, that the face in front of the display of the electronic device 100 changes, capturing the changed face by using the second camera 193, where the changed face is the second face; and displaying the second content on the target interface.

The second camera 193 may be the front-facing camera 193B mentioned in the foregoing embodiment. A frequency at which the second camera 193 captures an image may be a second frequency. The second frequency is higher than the first frequency. For example, the second frequency may be but is not limited to 150 frames per second. A resolution of the image captured by the second camera 193 may be higher than a resolution of the image captured by the first camera 193.

In some possible embodiments, the changed face captured in S302 or S303 may alternatively be captured by the first camera 193 at a third frequency. The third frequency is higher than the first frequency. The third frequency, for example, may be but is not limited to 30 frames per second.

In some possible embodiments, S302 may include: when detecting that the face in front of the display of the electronic device 100 changes to the first face, receiving a first user operation performed on the first control; and displaying the first content on the target interface in response to the first user operation.

S303 may include: when detecting that the face in front of the display of the electronic device 100 changes to the second face, receiving a second user operation performed on the first control; and displaying the second content on the target interface in response to the second user operation.

The first user operation and the second user operation are consistent, and both may be used to enable the electronic device 100 to display the target interface.

The first control may be, for example, an album icon 207 shown in FIG. 6A. The first user operation or the second operation may be a tap operation performed on the album icon 207. The target interface may be a user interface 30 shown in FIG. 7B or FIG. 8B. The first content may be content displayed on the user interface 30 shown in FIG. 38B or FIG. 39B. The second content may be content displayed on the user interface 30 shown in FIG. 38A or FIG. 39A.

In addition, when the first camera 193 detects that a quantity of faces in front of the display of the electronic device 100 is greater than or equal to 2, the electronic device 100 may display a prompt on the target interface. The target interface may be a user interface currently displayed by the electronic device 100. The prompt may be, for example, the prompt 310 shown in the embodiment in FIG. 40. The prompt may be used to prompt the user that another user is also gazing at the currently displayed user interface at this time and remind the user to pay attention to privacy protection and anti-peeping. In addition, a shooting angle of the first camera 193 is greater than that of the second camera 193, so that a privacy monitoring range can be expanded, and that user privacy can be more comprehensively protected.

In this embodiment, a change of a face in front of the screen of the electronic device 100 may be detected in real time, and face recognition is performed after a face change is detected. In an entire process, manual triggering by the user is not required. Therefore, user operations are reduced, and usage efficiency of the user is improved. Based on displayed content of a face recognition result, the electronic device 100 may display the private content when detecting that the current user is the owner or may not display the private content when detecting that the current user is not the owner, to ensure that privacy of the owner is not leaked and ensure privacy security of the owner. In addition, because a time interval for capturing an image by the low-power camera 193A is longer than a time interval for capturing an image by the front-facing camera 193B, and a resolution of the image captured by the low-power camera 193A is lower than a resolution of the image captured by the front-facing camera 193B, and the low-power camera 193A can be separately connected to one chip to process the image captured by the low-power camera 193A, the electronic device 100 detects a face change in real time by using the low-power camera 193A. Therefore, power consumption of the electronic device 100 can be reduced, and endurance of the electronic device 100 can be improved while it is ensured that privacy of the owner is not leaked.

Figure 43:
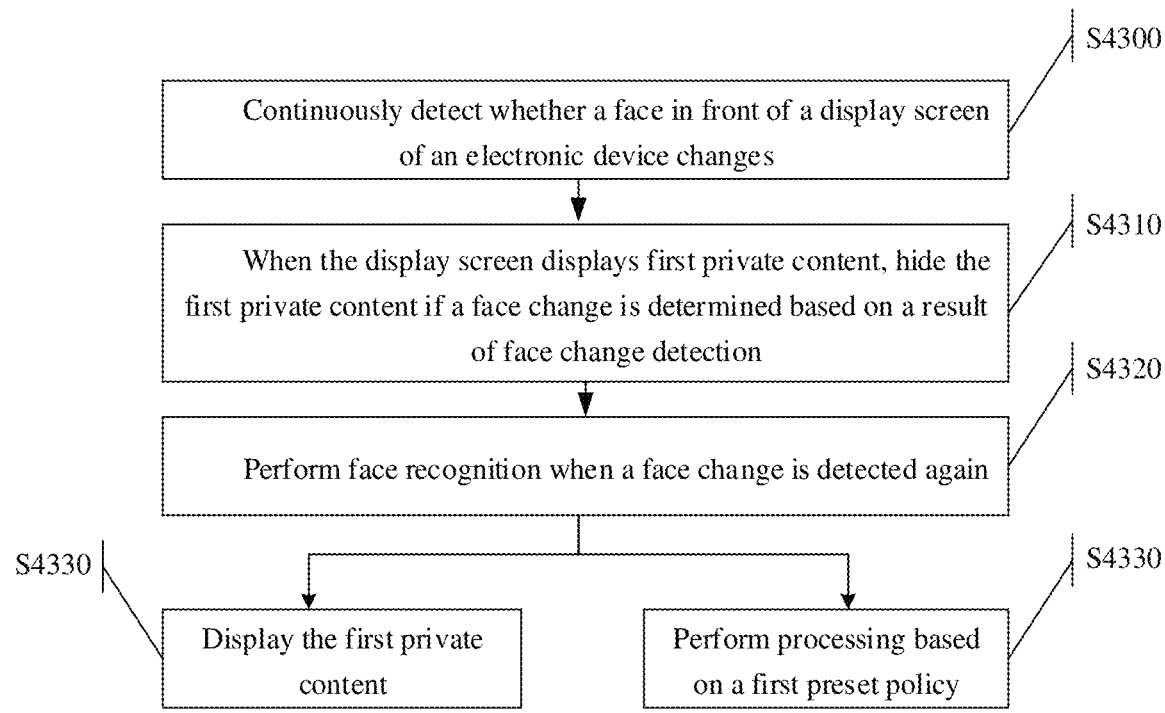
FIG. 43 is a schematic flowchart of another privacy protection method for an electronic device according to an embodiment.

As shown in FIG. 43, a privacy protection method for an electronic device is described in an embodiment. The method includes the following steps:

S4300. Continuously detect whether a face in front of a display of the electronic device changes.

A method for detecting whether a face change has been described above. Therefore, details are not described herein again.

S4310. When the display displays first private content, hide the first private content in response to detecting a face change.

Face change detection may be started first, where the face change detection is continuously detecting, in a current unlocking period, whether a face in front of the display of the electronic device changes, and the current face in front of the display of the electronic device does not match a reference face. After the face change detection is started, the electronic device 100 obtains a result of the face change detection and hides the first private content when the result of the face change detection is that the face changes.

Figure 44A:
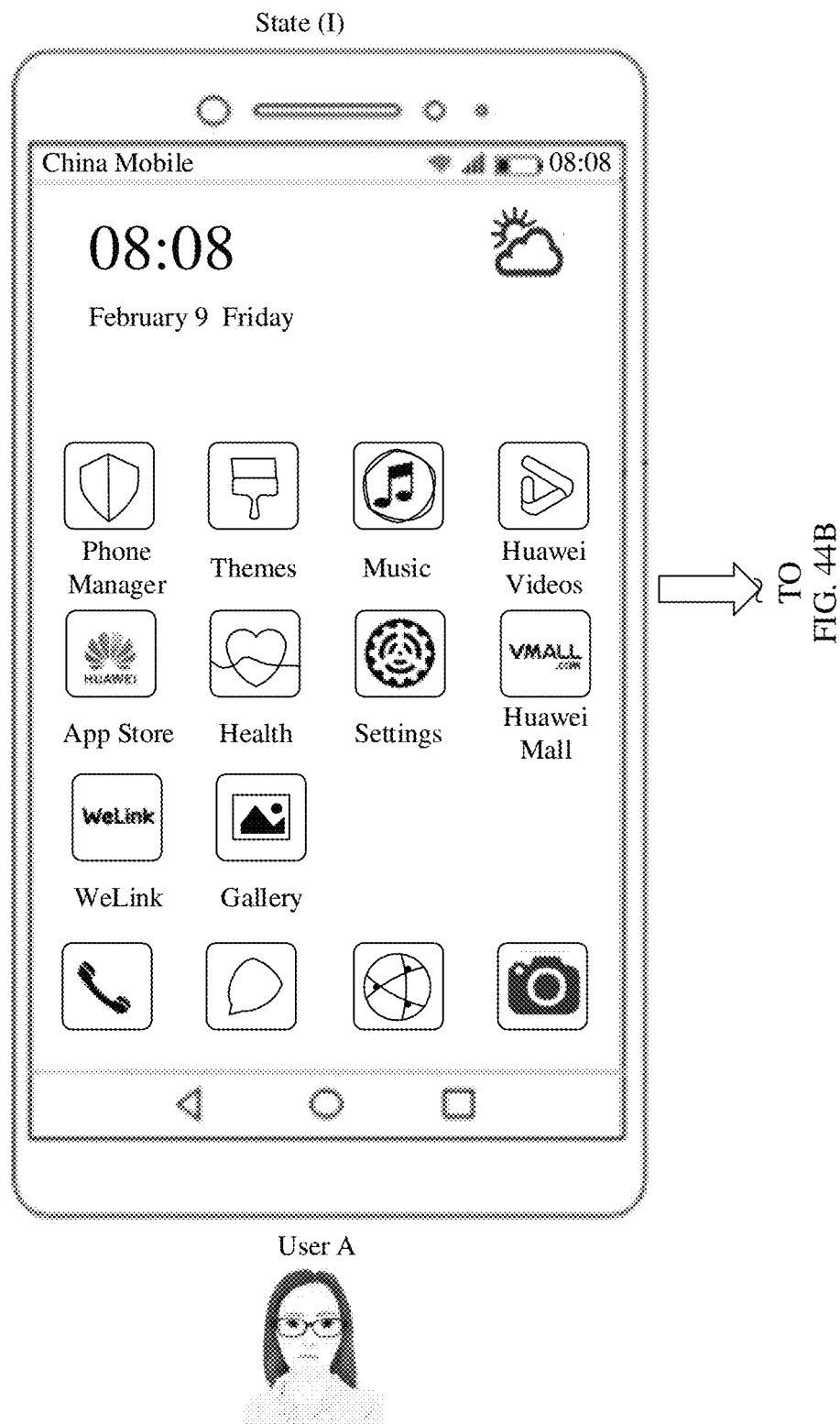
FIG. 44A to FIG. 44D are interface change diagrams of the electronic device based on the privacy protection method for the electronic device shown in FIG. 43.

For example, at an initial stage, an authorized user (for example, an owner, or a person authorized by an owner) uses the electronic device 100. A user A may first unlock the electronic device 100 when using the electronic device 100. For example, the electronic device 100 has a fingerprint sensor, and the electronic device 100 is currently in a screen locked state. If the user A wants to browse pictures in an album application by using the electronic device 100, the user A picks up the electronic device 100 and places a right thumb on a surface of the fingerprint sensor. After detecting that the user places the right thumb on the surface of the fingerprint sensor, the electronic device 100 captures a fingerprint of the user A and matches the fingerprint with a prestored unlock fingerprint. When the fingerprint of the user A matches the unlock fingerprint, the electronic device 100 enters an unlocked state, and an icon of an application is displayed on the screen of the electronic device 100, as shown in a state (I) in FIG. 44A.

Figure 44B:
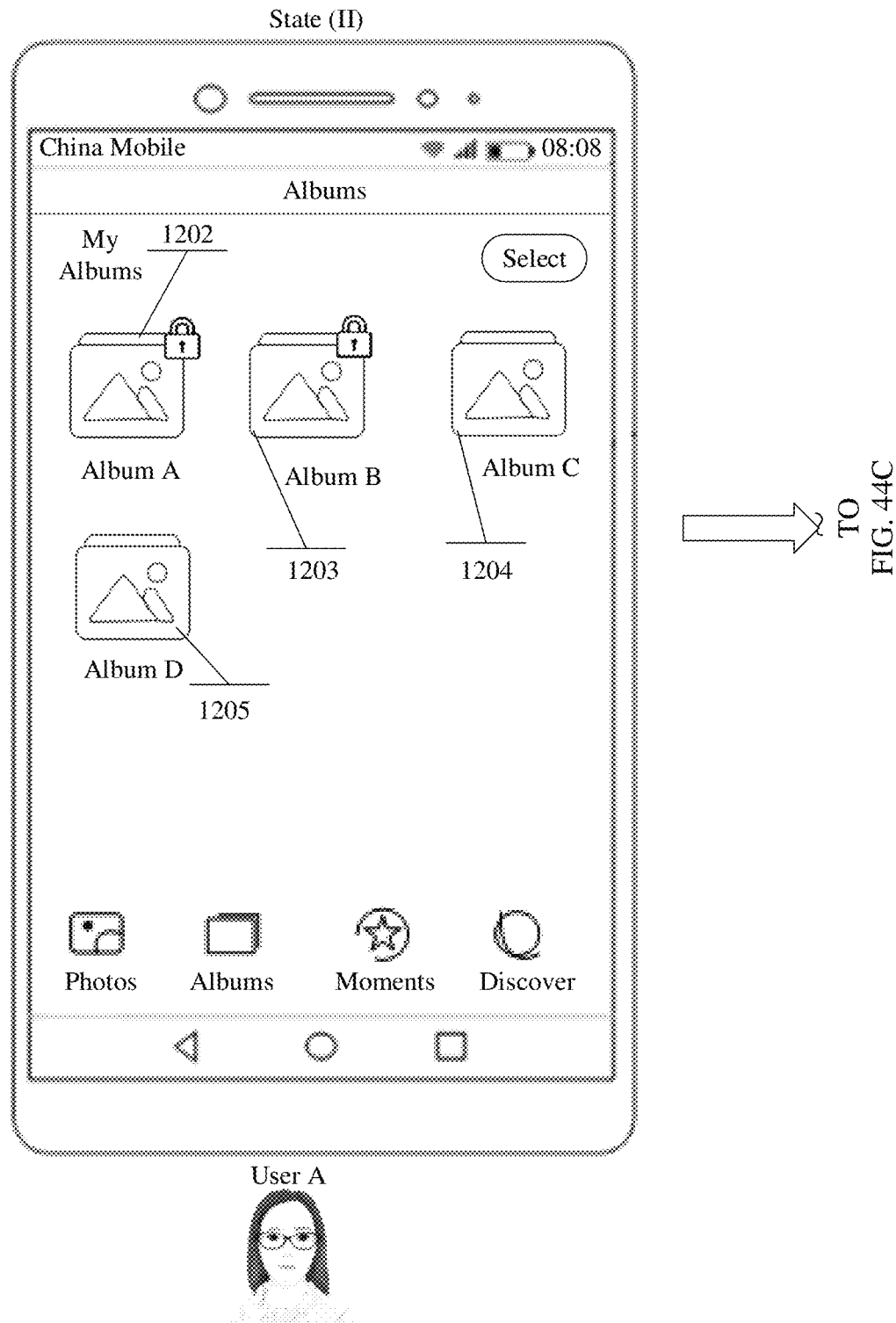

In some embodiments, the unlocking operation may alternatively be password unlocking, face recognition unlocking, sliding unlocking, nine-grid unlocking, or the like. This is not limited in this embodiment. In some other embodiments, the foregoing unlocking process is optional. If the user A wants to view a picture in the album application, an operation of starting the album application (for example, tapping an icon of the album application) is generated. After responding to the operation, the electronic device 100 displays a home page (by default, a page on which an album is located) of the album application. As shown in a state (II) in FIG. 44B, the home page includes icons of a plurality of albums, where an album A1202 and an album B1203 have privacy labels and are first private content; and albums C1204 and D1205 are non-private content. In some embodiments, the user A may further start the album application in another manner, for example, a predetermined gesture, double-tapping, or sliding.

Figure 44C:
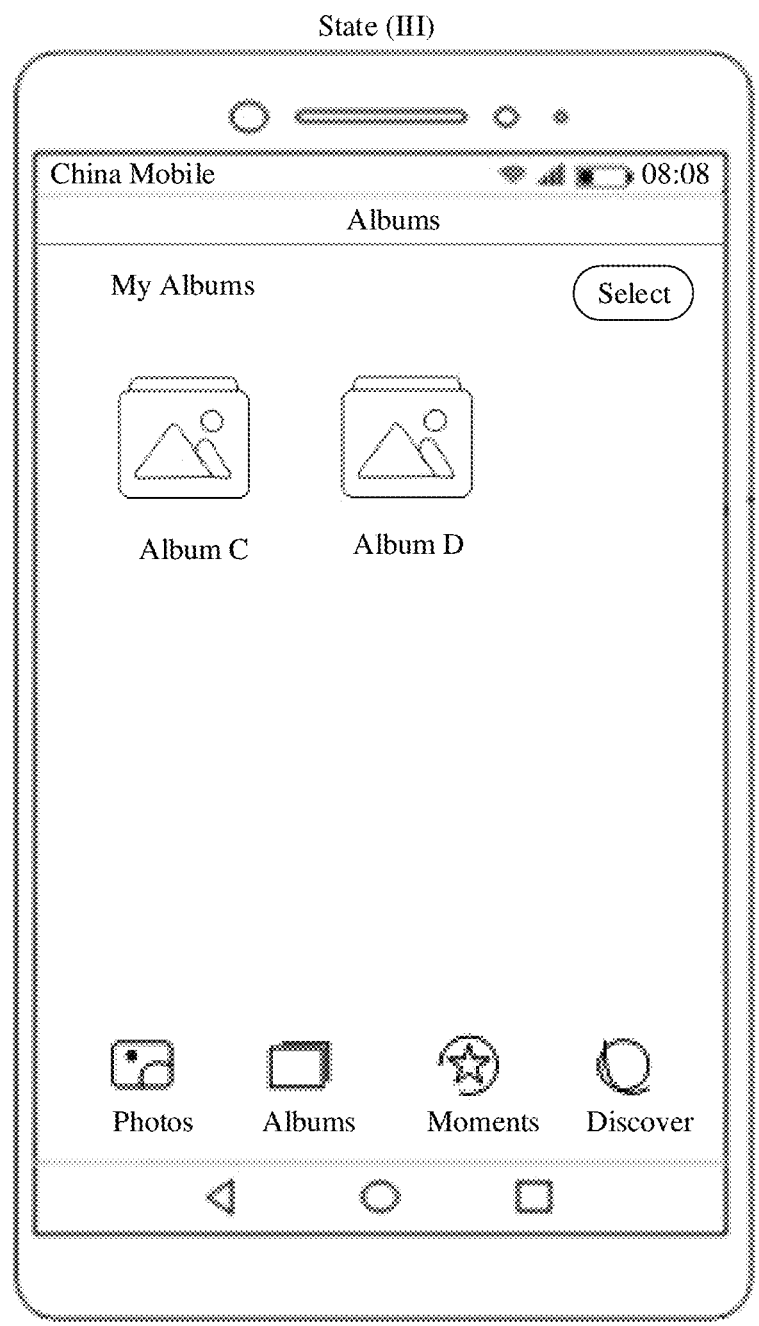
Figure 44C:
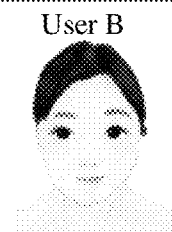

However, when the user A views the album, if a user B grabs the electronic device 100 of the user A and wants to see what the user A is currently looking at, a detection result of the face change detection is a face change, and it is determined that the current displayed content of the display includes the first private content (icons of the album A1202 and the album B1203). In this case, the icons of the album A1202 and the album B1203 are hidden, so that security of using the electronic device 100 by the user A is ensured in real time. In this case, second content may be displayed on the display of the electronic device 100, or the electronic device 100 may be in a screen-off state. The second content is the non-private content described above. When the electronic device 100 hides the icons of the album A1202 and the album B1203, the electronic device 100 may directly hide the album A1202 and the album B1203 from all the content displayed on the display, and keep the icons of the album C1204 and the album D1205 in a displayed state (the album C1204 and the album D1205 are the second content), as shown in a state (III) in FIG. 44C. Alternatively, prompt information (the prompt information is the second content) may be set on the album A1202 and the album B1203, to prompt the user B that the user B cannot access the albums. Further, other second content may also be displayed. Details have been described above, and therefore are not described herein again.

Optionally, with continued reference to FIG. 43, the privacy protection method for the electronic device 100 may further include the following steps:

S4320. Perform face recognition when a face change is detected again.

For example, when the electronic device 100 is in a non-owner state, if a face change detection algorithm detects a face change again, the electronic device 100 cannot determine whether the face changes from a non-owner (user B) to an owner (user A) or a non-owner (user C). In this case, the electronic device 100 needs to determine, through face recognition, whether the current user is the owner, to determine whether the first private content needs to be continuously provided to the current user. A result of the face recognition result may be the owner or the non-owner. A recognition process has been described above. Therefore, details are not described herein again.

S4330. If the current face matches a preset face, display the first private content.

Figure 44D:
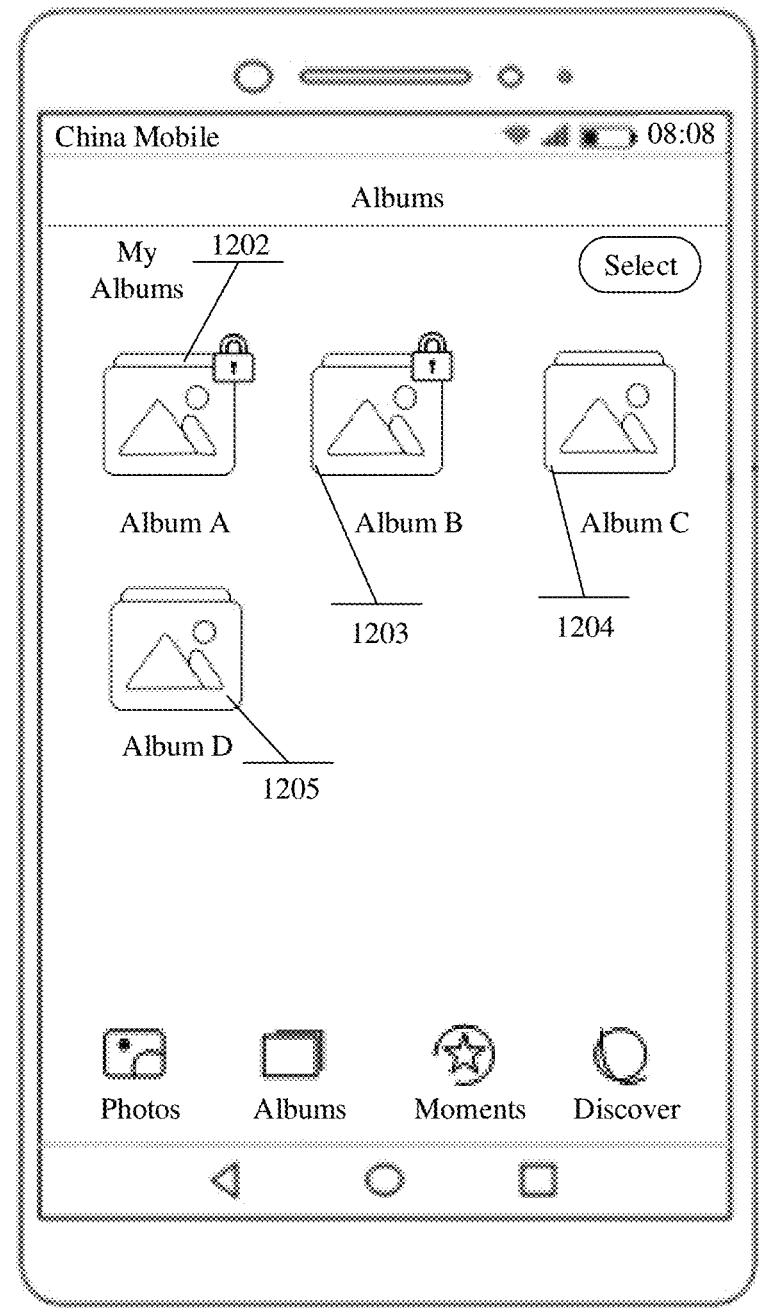
Figure 44D:
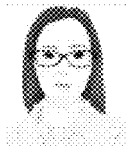

For example, after the user B grabs the electronic device 100 of the user A, the user B takes a look, feels that there is nothing good to look at, and returns the electronic device 100 to the user A when the display still displays an album interface. The electronic device 100 determines, through face recognition, that the current user is an authorized user, and therefore displays the first private content, as shown in a state (IV) in FIG. 44D.

In another possible case, after grabbing the electronic device 100, the user B opens the album C1205 (the album C includes other private content). After detecting the operation, the electronic device 100 opens the album C1205, but displays only an icon of an image that does not include a privacy label and does not display other private content. After opening the album C, the user B returns the electronic device 100 to the user A. The electronic device 100 determines, through face recognition, that the current user is the owner, and therefore displays private content (an icon of a picture including a privacy label) included in the album C.

S4040. If the current face does not match the preset face, perform processing based on a first preset policy.

In an implementation process, the first preset policy is, for example, not changing displayed content of the electronic device 100, and keeping the first private content in a hidden state; displaying, on a display interface, an authorization interface for receiving identity authentication; or displaying an interface of another authentication mode.

Optionally, that the current face does not match the preset face may include a plurality of cases, causing corresponding first preset policies to be different. That the current face does not match the preset face includes the following cases. Case 1: The user B takes away the electronic device 100, then the electronic device 100 is taken away by the user C, and the electronic device 100 determines, through face recognition, that the current user is not the owner.

Case 2: After taking away the electronic device 100, the user B uses the electronic device 100 together with the user A again. The electronic device 100 determines, through face recognition, that the current users include the owner and another user, and that the face meets a first preset condition. A method for determining whether the first preset condition is met has been described above. Therefore, details are not described herein again.

Case 3: After grabbing the electronic device 100, the user B returns the electronic device 100 to the user A, but the user C is beside the user A. The electronic device 100 determines, through face recognition, that the current users include the owner and another user. In addition, a difference between a total pixel value of an owner feature and a total pixel value of a non-owner feature in face photos is greater than a preset threshold, and the face does not meet the first preset condition.

Therefore, when detecting that the face changes, the electronic device 100 may further determine whether the face meets the first preset condition, and if the face meets the first preset condition (as shown in FIG. 24C), display the first private content; or if the face does not meet the first preset condition (as shown in FIG. 24B or FIG. 24D), keep the first private content in the hidden state.

Figure 45A:
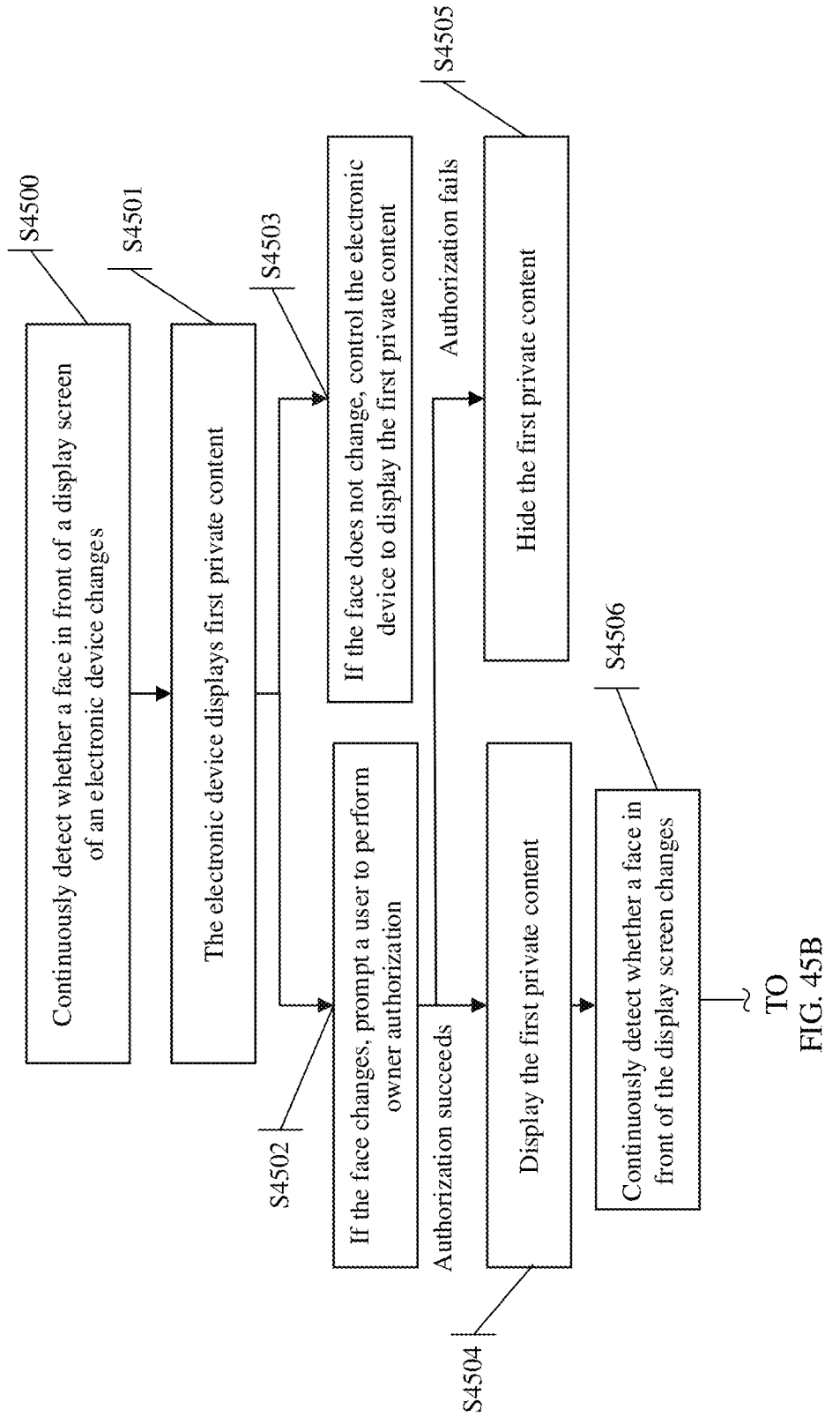
FIG. 45A and FIG. 45B are a schematic flowchart of another privacy protection method for an electronic device according to an embodiment.
Figure 45B:
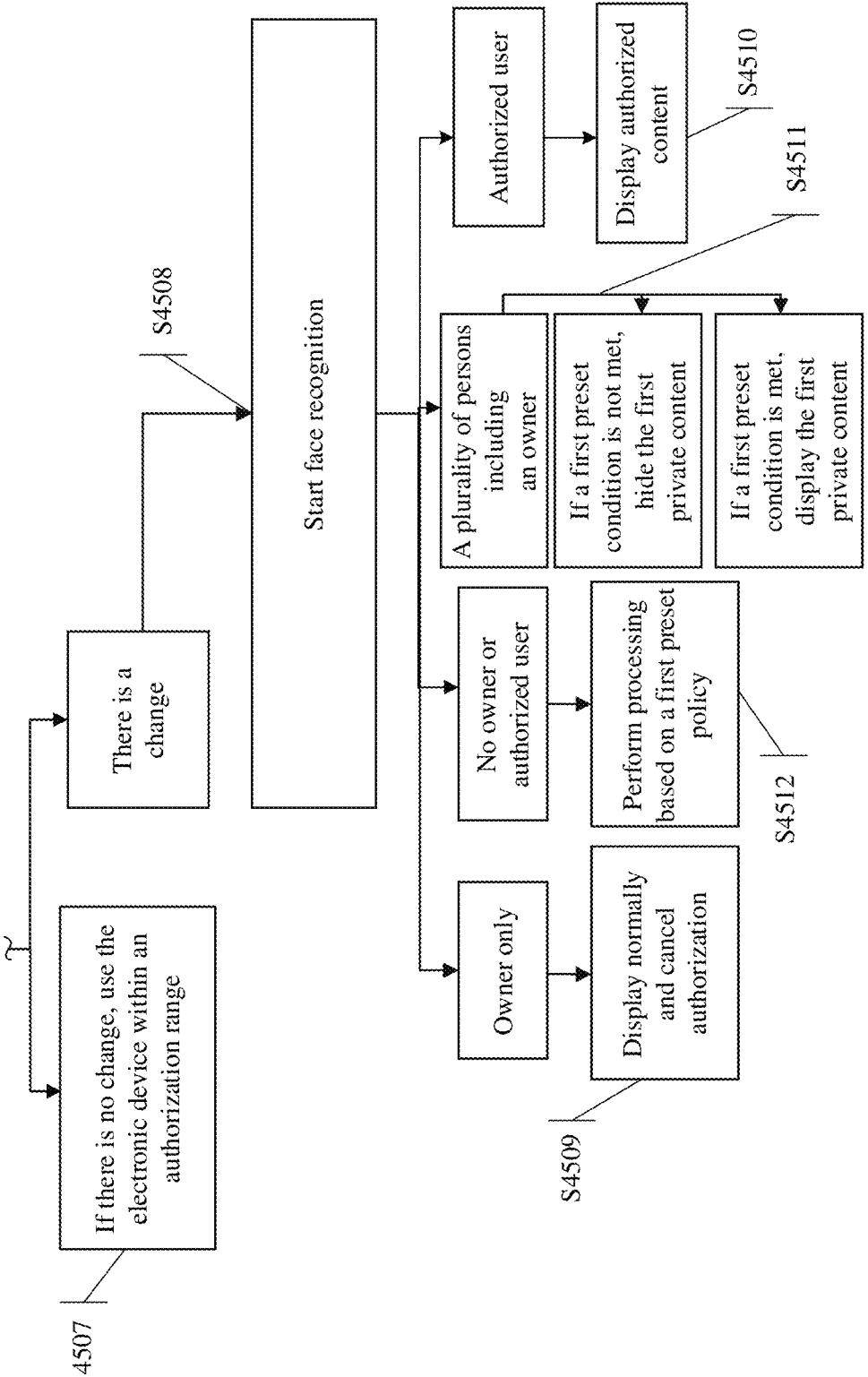

As shown in FIG. 45A and FIG. 45B, a privacy protection method for an electronic device 100 is described in an embodiment. The method includes the following steps:

S4500. Start face change detection, where the face change detection is continuously detecting, in a current unlocking period, whether a face in front of a display of the electronic device 100 changes, and the current face in front of the display of the electronic device 100 does not match a reference face. Because a method for performing face change detection has been described above, details are not described herein again.

S4501. The electronic device 100 displays first private content.

S4502. In response to detecting that the face changes, prompt the user to perform owner authorization.

S4503. If the face does not change, the electronic device 100 keeps displaying the first private content.

In S4501, after starting the face change detection, if the electronic device 100 detects an operation of displaying the first private content, and a result of the face change detection is that the face does not change, the electronic device 100 displays the first private content. Alternatively, after detecting an operation of starting a first private application for a first time, the electronic device 100 performs identity authentication, and when the identity authentication succeeds, starts face change detection, so that during an operation of starting the first private application for a second time, the electronic device 100 directly determines, based on a result of the face change detection, whether to display the first private content.

For example, the first private content displayed on the display may be content displayed on a screen of the display, for example, a home screen or a minus one screen. The first private content may alternatively be content included in a page of a private application, for example, a home page of an album application, a photo control interface, an album control interface, a home page of instant messaging software, a contact page, or a personal information page. The first private content may alternatively be content included in a folder of an application, for example, a private folder of the album application, or a folder that includes a private picture in the album application. The first private content may alternatively be a file included in an application, for example, a picture displayed in the album application.

Figure 46A:
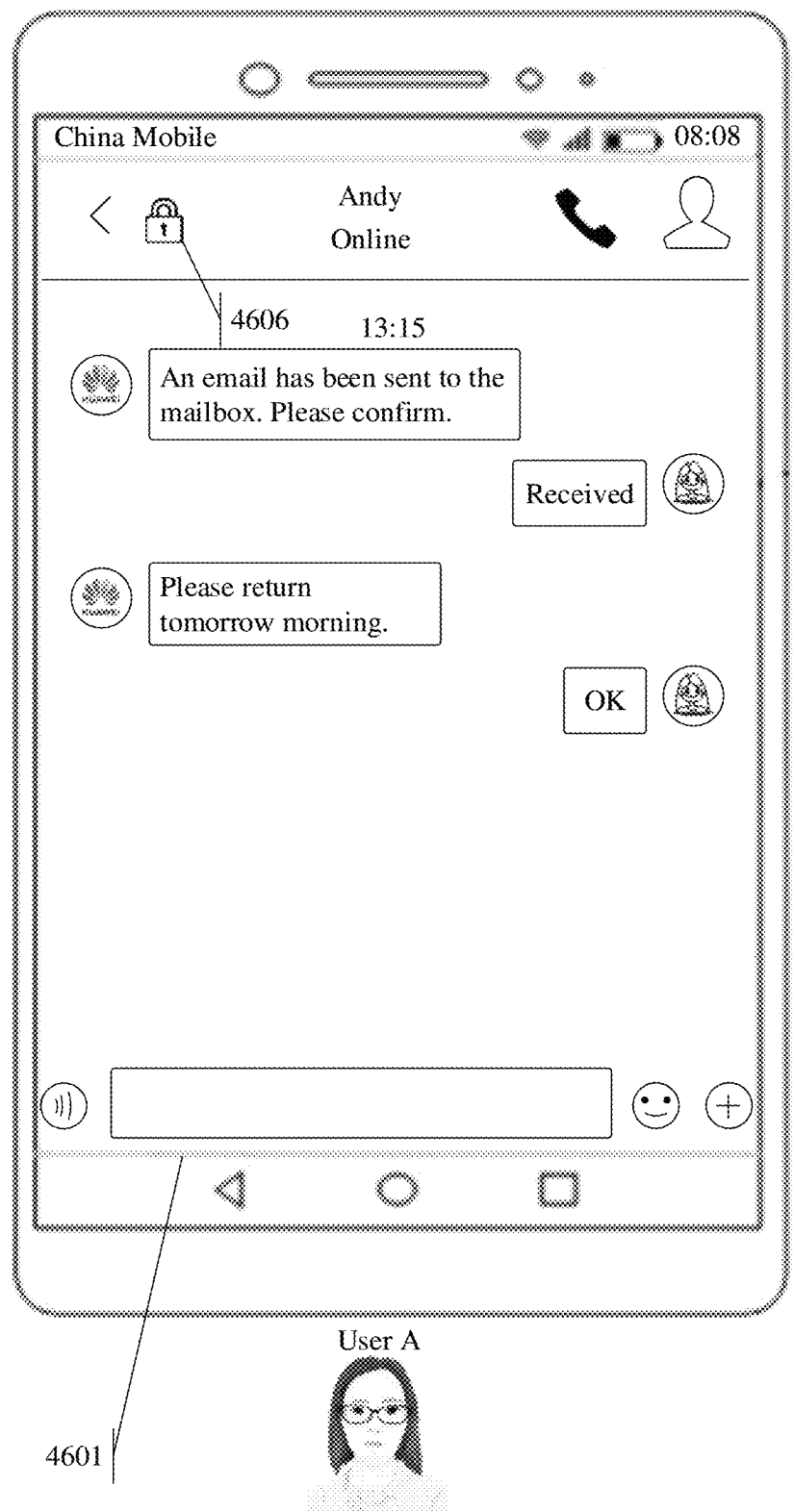
FIG. 46A to FIG. 46G are interface change diagrams of the electronic device based on the privacy protection method for the electronic device shown in FIG. 45A and FIG. 45B.

As shown in FIG. 46A, the electronic device 100 is currently used by an owner (a user A), and the user A is using the instant messaging software. Currently, the instant messaging software displays a chat interface 4601 between the user A and a contact Andy.

Subsequently, the electronic device 100 is taken away by a user B. In this case, the electronic device 100 may display an authorization interface, to hide the first private content, and prompt the user B (the current user) for owner authorization. The authorization interface may be a prompt interface floating on a surface of the chat window 4601, a prompt interface floating on the home page of the instant messaging software (an upper-level directory of the chat window 4601), or a new interface that completely covers the chat window 4601. This is not limited in this embodiment.

Figure 46B:
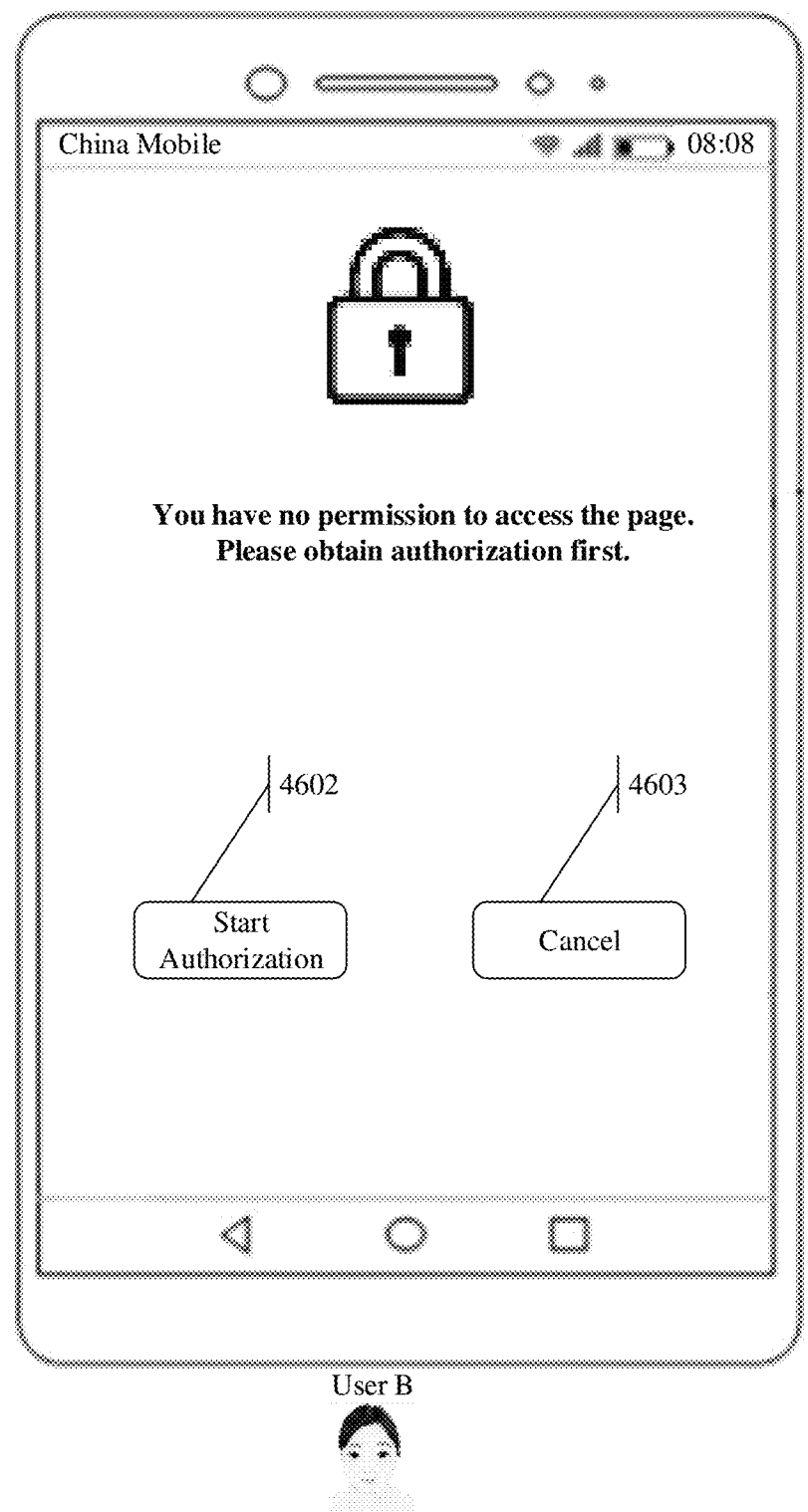

The authorization interface may prompt that the current user does not have a permission to access the page and needs to obtain authorization first, as shown in FIG. 46B. In this case, the owner may perform authorization through fingerprint or face recognition, iris recognition, or the like. After the electronic device 100 displays the authorization interface, if an authorization operation (for example, a camera 193 detects a preset face feature or an iris feature, or a preset fingerprint is read in a fingerprint recognition area) of the owner is detected in a preset time period (for example, 5 seconds or 10 seconds), it is considered that there is an owner authorization operation. Therefore, the first private content is displayed in the case of a non-owner.

Optionally, to distinguish an authorization behavior of the owner from a use behavior of the owner, a preset button may be generated on the authorization interface (for example, a start authorization button shown in FIG. 46B), and the electronic device 100 is triggered, by using the preset button, to receive an authorization operation. When detecting an operation of tapping the start authorization button 4602 by the user, the electronic device 100 captures a face image of the user by using a camera 193, and determines whether the face is a preset face, and if the face is the preset face, authorization succeeds. If an operation of tapping a cancel button 4603 by the user is detected, the electronic device 100 exits the interface of the instant messaging software (for example, closes the instant messaging software and displays a login interface of the instant messaging software) or displays non-private content of the instant messaging software (for example, exits the current chat window, returns to an upper-level page, and displays only non-private content on the upper-level page). Alternatively, the electronic device 100 enters a screen locked state, or the like.

Figure 46C:
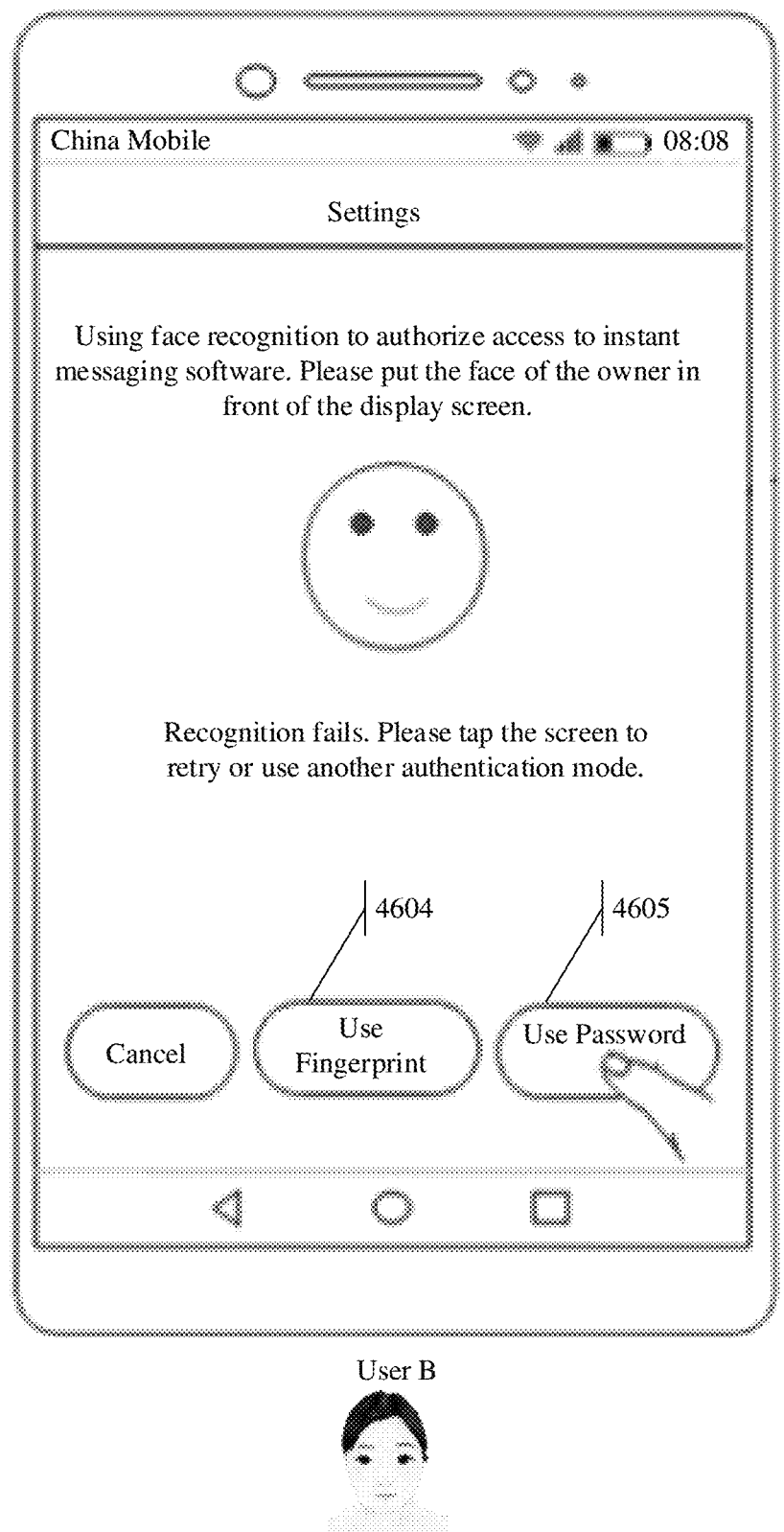

Optionally, during authorization and authentication, as shown in FIG. 46C, an authorization result and an authorization mode may be further prompted. In FIG. 46C, the authorization mode is face recognition, and the authorization result is that after authorization succeeds, the non-owner can access the instant messaging software. After detecting that the user taps the start authorization button 4602 shown in FIG. 46B, the electronic device 100 may jump to a face recognition interface, or when detecting that the face changes, display the authorization interface for performing authorization through face recognition.

Optionally, buttons of other authentication modes, for example, a Use Fingerprint button 4604 and a Use Password button 4605 that are displayed in FIG. 46C, may be further displayed on a face authentication interface, so that a fingerprint or a password can be selected for authorization. If the user B wants to perform authentication by using a password, the user B taps the Use Password button 4605, and the screen displays a password receiving interface. The user B asks the owner (the user A) for the password, and the user A tells the user B that the password is "123ABC". The user B inputs "123ABC" on the password receiving interface. After receiving the password, the electronic device 100 matches the password with a prestored password. If the matching succeeds, it indicates that the owner authorization succeeds. If the matching fails, it is considered that the owner authorization fails. For another example, if the user B wants to perform authentication by using a fingerprint, the user B taps the Use Fingerprint button 4604, and the screen prompts "Please perform fingerprint authentication in the fingerprint input area." The user B holds a thumb of the user A and places the thumb in the fingerprint recognition area. After detecting the fingerprint in the fingerprint recognition area, the electronic device 100 matches the fingerprint with the preset fingerprint (the fingerprint of the user A). If the matching succeeds, the owner authorization succeeds; otherwise, the owner authorization fails.

After the owner authorization succeeds and the electronic device 100 displays the first private content, the electronic device 100 may further record that the electronic device 100 is currently in an owner authorization state, and therefore distinguish a permission of the current user to use the electronic device 100 from use by the real owner.

Optionally, after the user is prompted to perform the owner authorization based on S4502, with continued reference to FIG. 45A and FIG. 45B, the privacy protection method for the electronic device 100 further includes the following steps:

S4504. If the owner authorization succeeds, the electronic device 100 displays the first private content.

S4505. If the owner authorization fails, the electronic device 100 hides the first private content, and may hide the first private content by displaying non-private content corresponding to the first private content. Because a type of the non-private content has been described above, details are not described herein again.

For example, when the face changes, the owner authorization mode is used to grant a permission to view the first private content, to the user B that has no permission to view the first private content. The electronic device 100 may hide the first private content by displaying second content (non-private content), or the electronic device 100 may directly enter the locked state. Because a type of the second content has been described above, details are not described herein again.

Based on the foregoing solution, when the owner uses the electronic device 100 to view the first private content, privacy protection can be performed on the first private content based on face change detection in real time when it is detected that the user in front of the display switches from the owner to the non-owner. However, the first private content may be provided to the non-owner based on the authorization operation of the owner, so that sharing can be conveniently implemented in a case of privacy protection.

Figure 46D:
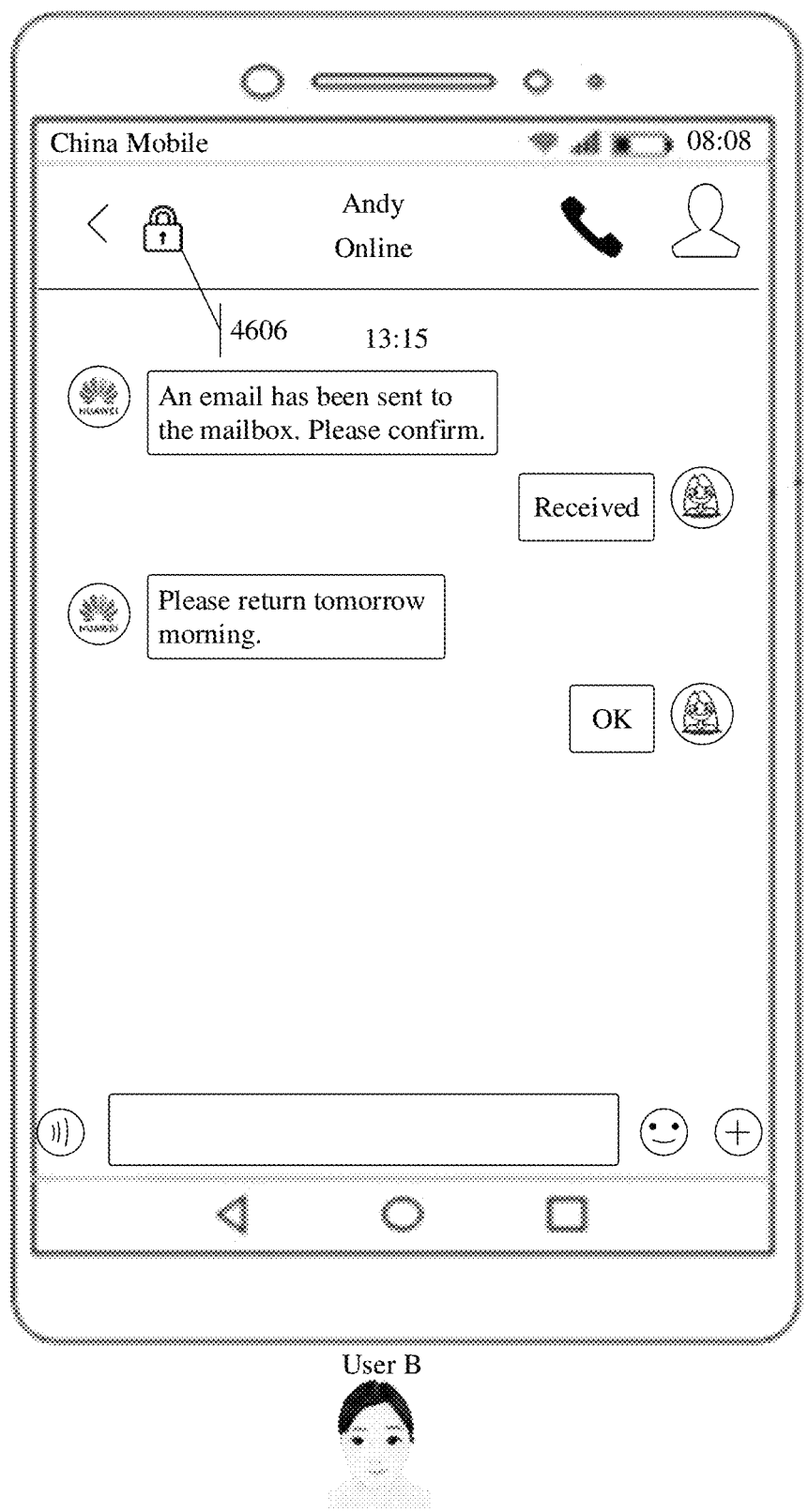

In another embodiment, a preset button may be further provided on the top of the first private content. The preset button is, for example, a sharing button 4606 shown in FIG. 46A. When the user A wants to share the first private content with another user, the user A triggers the sharing button 4606 (for example, a tap operation, a sliding operation, or a preset gesture). After detecting the operation, the electronic device 100 considers that the user A wants to share the first private content. Therefore, if it is detected that the face changes, the first private content is kept in a displayed state, as shown in FIG. 46D. After the operation of triggering the sharing button 4606 by the user is detected, an icon of the sharing button 4606 may further change, to prompt the user that the first private content is currently in a shared state. For example, the sharing button 4606 in FIG. 46A is a small locked lock. However, the sharing button 4606 in FIG. 46D is a small unlocked lock. To allow only the user A know that privacy protection exists for the first private content, while the user B is unaware of this, the first private content is kept in the displayed state when a face change is detected. However, the icon of the sharing button 4606 is controlled in a hidden state.

In the foregoing solution, another user can be granted a permission to view private content when another user cannot perceive this.

In an implementation process, after the owner authorization, and the electronic device 100 displays the first private content, with continued reference to FIG. 45A and FIG. 45B, the privacy protection method for the electronic device 100 further includes the following steps:

S4506. Continuously detect whether a face in front of the display of the electronic device 100 changes.

S4507. When the face does not change, control the user of the electronic device 100 to use the electronic device 100 within an authorization range.

Authorization range 1: Authorization is performed only on an application to which the first private content belongs. When the electronic device 100 responds to detecting an operation of displaying third private content, if the third private content and the first private content belong to a same application, the electronic device 100 displays the third private content; or if the third private content and the first private content do not belong to a same application, the electronic device 100 displays the authorization interface.

For example, when the user B displays a chat interface with a private contact "Andy" shown in FIG. 46D on the electronic device 100, the user B taps a return key in an upper left corner. After detecting the operation of the user B, the electronic device 100 returns to the home page of the instant messaging software. Then the user B taps information about a private contact "William". After detecting the operation, the electronic device 100 determines whether the chat interface with the private contact "Andy" and a chat interface with the private contact "William" are in a same application, and when it is determined that both belong to the instant messaging software, the electronic device 100 displays the chat interface with the private contact "William".

After viewing the chat interface with the private contact "William", the user B returns to a main screen of the electronic device 100 and taps an album icon (the album is a private application). After detecting the operation, the electronic device 100 determines that the album application and the chat interface with the private contact "Andy" do not belong to the same application. Therefore, the electronic device 100 displays the authorization interface, to prompt the user that authorization is required to access the album application. Alternatively, the electronic device 100 may start the album application, but a private folder or a private picture in the album application is in a hidden state. In addition, the third private content may be all content of an application (for example, the album application), or may be all or a part of content in a folder in an application (for example, an album in the album application, or some pictures in the album), or may be a file in an application (for example, a picture in the album application), or the like. This is not limited in this embodiment.

Authorization range 2: Overall authorization is performed on the electronic device 100 within a preset time. For example, the system may set a sharing time (that is, a preset time) by default, or when receiving an authorization operation of the user, the system may further provide a time setting button on the authorization interface, and the user sets an authorization time. The preset time is, for example, 5 minutes or 10 minutes. In a preset time period, the user B may use most private functions of the electronic device 100 (for example, the user B can use all private functions except private functions absolutely reserved by the user A). Alternatively, a permission of the user B to use the electronic device 100 is the same as that of the user A.

After detecting the preset authorization operation of the user A, the electronic device 100 displays the third private content in response to detecting the operation of displaying the third private content and determining that the operation occurs within a preset time after the preset authorization operation is received. After the user A authorizes the user B to use the electronic device 100, the electronic device 100 starts a timer. In a process of using the electronic device 100 by the user B, if an operation of displaying the third private content by the user B is detected, the electronic device 100 determines whether a timing result of the timer is greater than a preset time, and if yes, the electronic device 100 no longer displays the third private content, or if no, the electronic device 100 displays the third private content. In a possible case, the third private content may include the first private content (for example, the user B first closes the first private content and then opens the first private content) and other private content than the first private content. In another possible case, the third private content includes only other private content than the first private content, that is, within a preset time, the electronic device 100 authorizes the user B to use all or most private functions, and after the preset time, the electronic device 100 authorizes the user B to use only the first private content.

Authorization range 3: Authorization is performed on only the first private content, and in response to detecting an operation of displaying the third private content, the electronic device 100 displays the authorization interface. For example, it is assumed that the instant messaging software includes a plurality of private contacts, and that the first private content is a chat interface with the private contact "Andy". After viewing the chat interface with "Andy", the user B returns to the home page of the instant messaging software and taps information about the private contact "William", to view the chat interface (third private content) with the private contact "William". After detecting the operation, the electronic device 100 determines that currently the user (not the owner) authorized by the owner uses the electronic device 100, and therefore does not display the chat interface with the private contact "William", but displays the authorization interface, prompting the user to obtain the owner authorization first. Further, in another embodiment, when detecting an operation of opening the third private content, the electronic device 100 may not display only the third private content but does not provide the authorization interface. This is not limited in this embodiment.

Authorization range 4: Authorization is performed on only content whose folder is in an open state. In response to detecting an operation of displaying the third private content, if the folder to which the third private content belongs is in the open state when the preset authorization operation is received, the electronic device 100 displays the third private content; or if the folder to which the third private content belongs is not in an open state when the preset operation is received, displays the authorization interface.

For example, it is assumed that the first private content is a picture of an album in the album application, for example, a picture of an album A1202 on an album interface. After the user B finishes viewing the picture, the user B taps a next picture to view the next picture (the third private content). After detecting the operation, the electronic device 100 determines that the folder (the album A) in which the next picture is located is in the open state. However, for content in other folders, because the folders are not in the open state when the preset authorization operation is received, the electronic device 100 detects that the private content is opened, and does not display corresponding private content, but prompts the user to receive authorization.

With continued reference to FIG. 45A and FIG. 45B, after detecting, based on S4506, whether the face in front of the display of the electronic device 100 changes, if the face changes, the method further includes the following steps:

S4508. Start face recognition and determine whether a current face in front of the display of the electronic device 100 matches the preset face.

In an implementation process, face recognition may be performed by using a low-power camera 193A or a front-facing camera 193B. The preset face may be a face of the owner, or may include a face of the owner, or faces of one or more authorized users. The owner may want to authorize some users (for example, children or parents of the owner) to use certain functions of the electronic device 100 for a long time. Therefore, faces of these users are recorded in the electronic device 100, so that these users are set as authorized users. In addition, a permission range may be set for each authorized user. For example, a payment function, a permission to browse certain pictures, a permission to start a game application, a permission to start an entertainment application, and the like are restricted for the children; and a maximum payment amount, a permission to view certain pictures, and the like are restricted for the parents. In other words, a permission of the authorized user to use the electronic device 100 is lower than that of the owner (or equal to the owner) but higher than that of an unauthorized non-owner.

S4509. When the face in front of the display of the electronic device 100 includes only the owner, keep displaying the first private content.

When the electronic device 100 displays the first private content (or other private content), if it is detected that the face switches from the non-owner (user B) to the owner (user A), the electronic device 100 keeps the displayed content unchanged. In addition, the electronic device 100 may further record that it is currently in an owner state.

S4510. When the face in front of the display of the electronic device 100 includes only the authorized user, display authorized content, where the authorized content may be the same as the first private content, or may be less than the first private content, or may be other authorized content different from the first private content. This is not limited in this embodiment.

S4511. When the face in front of the display of the electronic device 100 includes a plurality of users including the owner, determine whether the face meets a first preset condition; and if the face meets the first preset condition, the electronic device 100 displays the first private content; or if the face does not meet the first preset condition, the electronic device 100 hides the first private content.

Figure 46E:
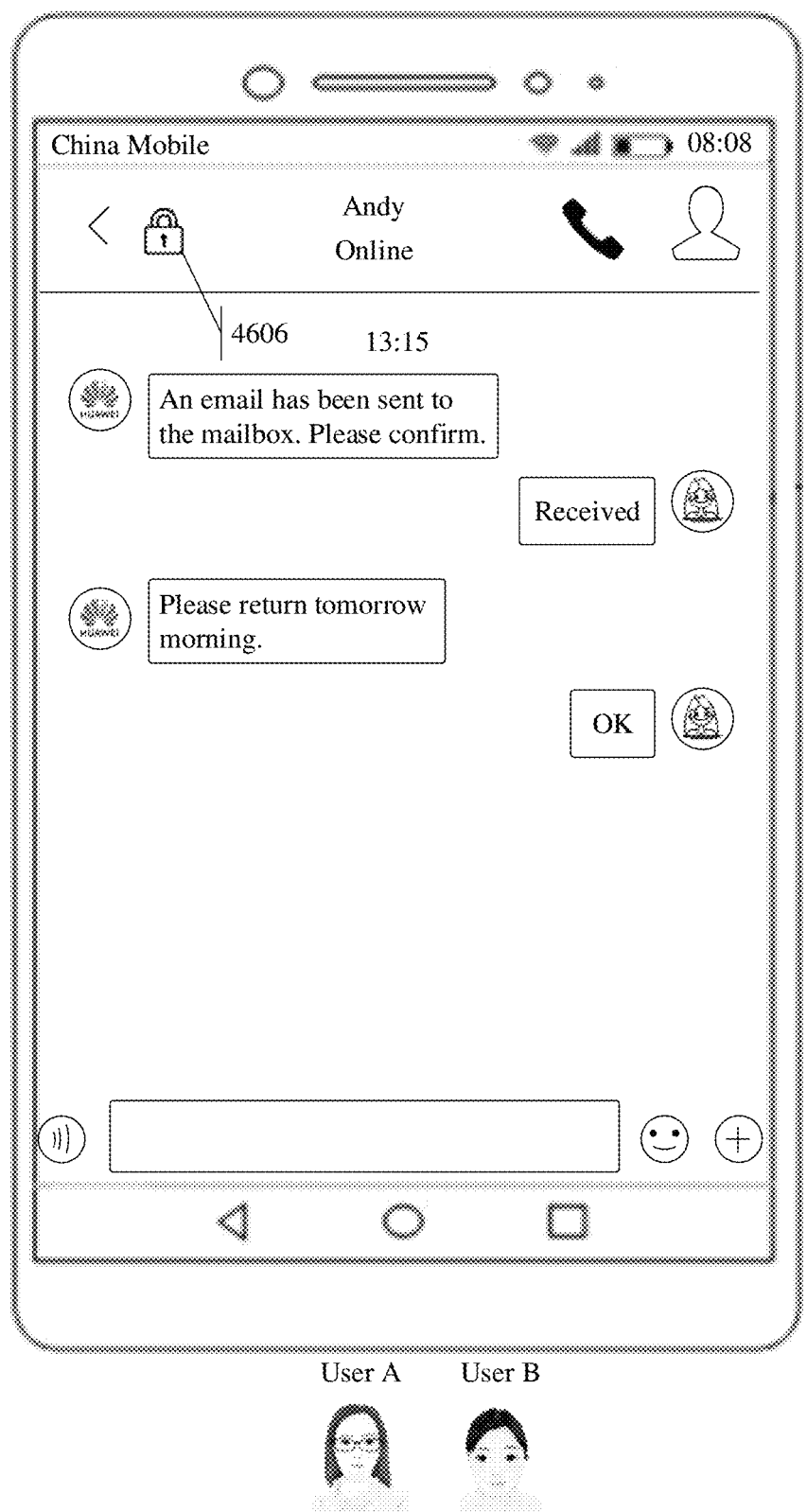
Figure 46F:
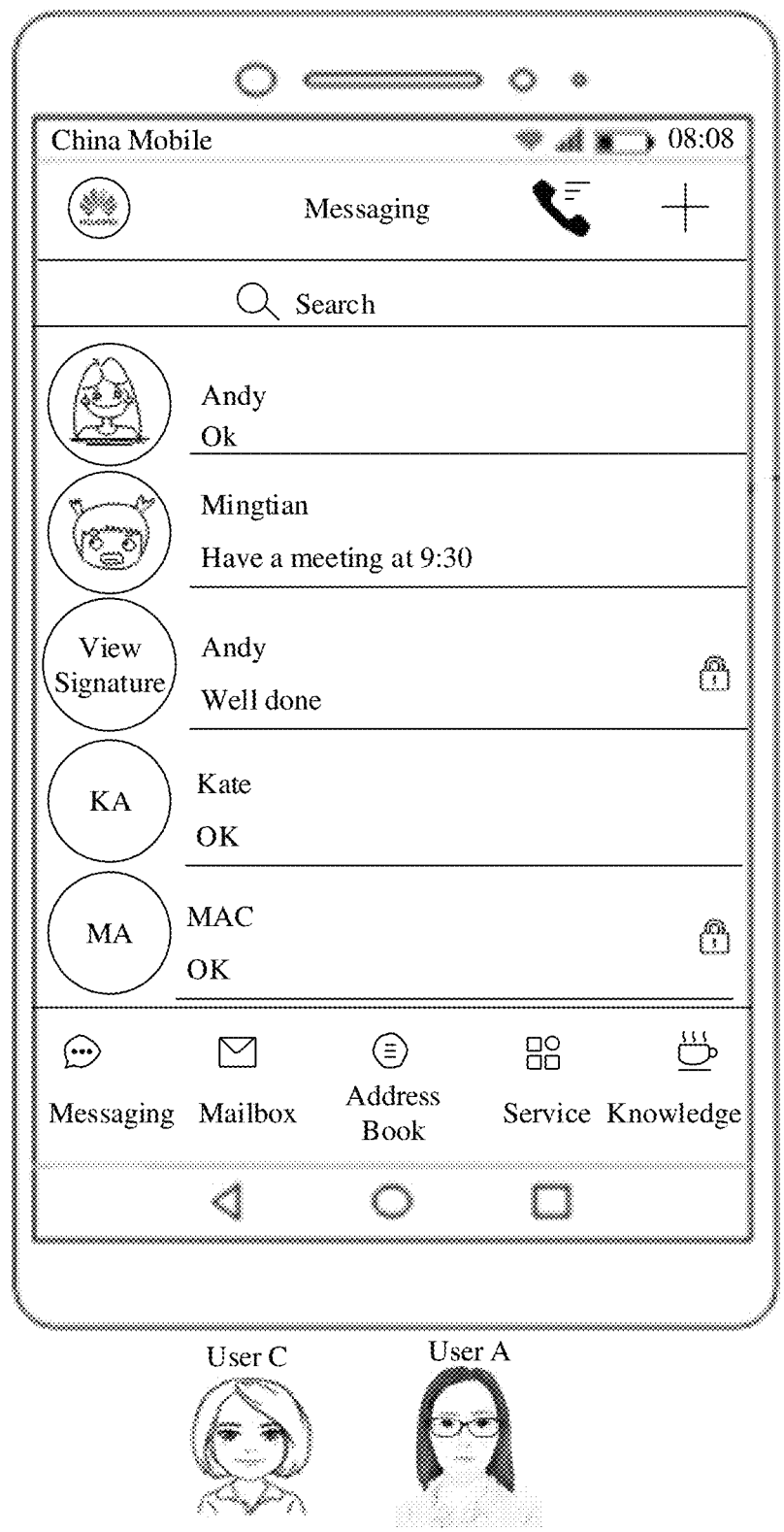
Figure 46G:
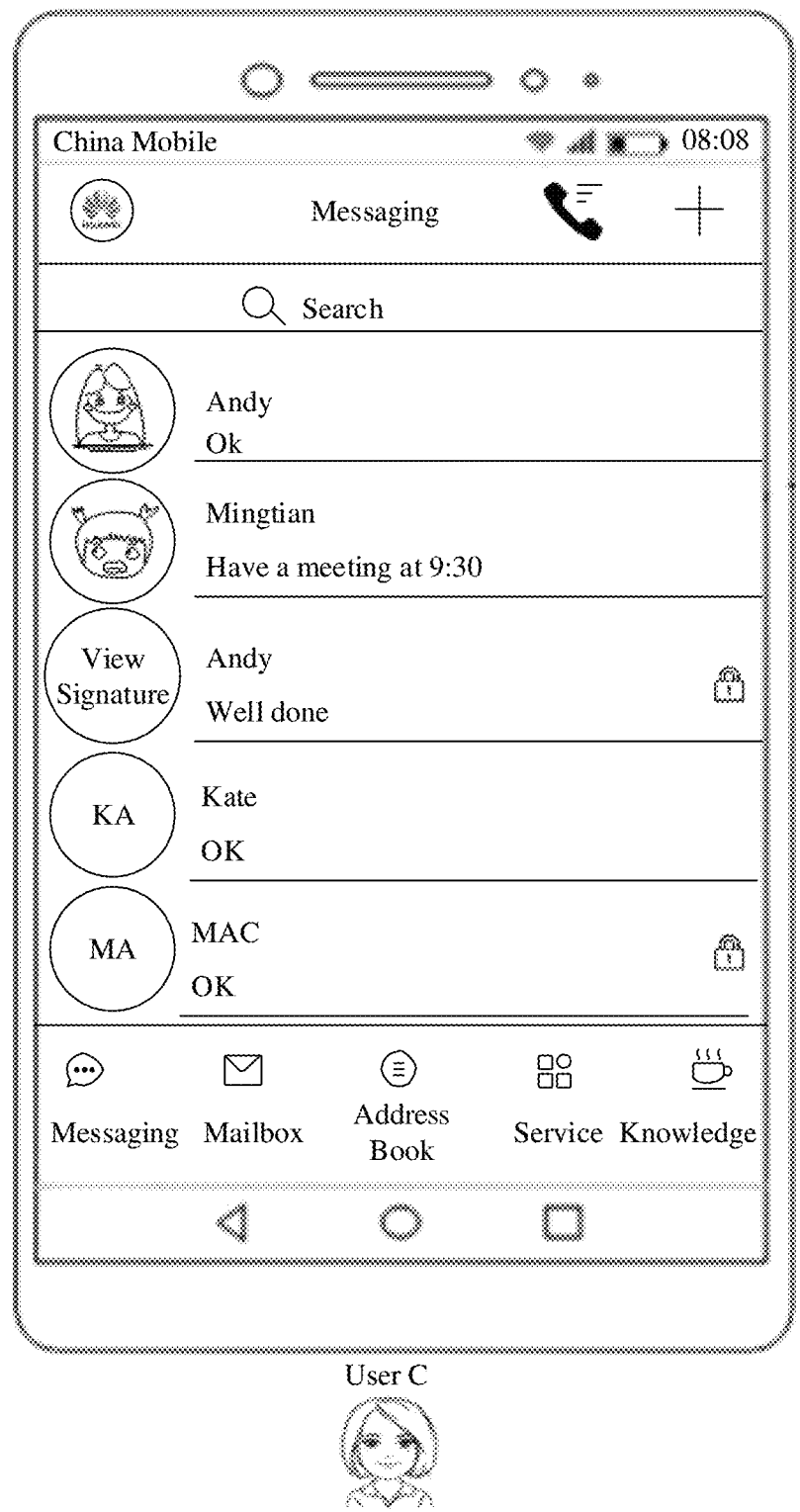

A method for determining whether the first preset condition is met has been described above. Therefore, details are not described herein again. It is assumed that the user B uses the electronic device 100 for a time period and then uses the electronic device 100 together with the user A again. After detecting a face change, the electronic device 100 determines that the owner and the non-owner are included and that the first preset condition is met, and therefore keeps displaying the private content before the face change. It is assumed that before the face change, the display of the electronic device 100 displays the first private content shown in FIG. 46A. After the face change, the electronic device 100 still displays the first private content shown in FIG. 46A, as shown in FIG. 46E. However, if the user B returns the electronic device 100 to the user A after using the electronic device 100 for a time period, and a user C is still standing next to the user A, the electronic device 100 determines, after detecting a face change, that the users includes the owner and a non-owner, but this case is not a case of screen sharing. In this case, the electronic device 100 hides the first private content, as shown in FIG. 46F, and returns to an upper-level interface of the first private content (the main interface of the instant messaging software). Further, the first private content may be further hidden in another manner. This is not limited in this embodiment.

S4512. If there is no owner or authorized user, perform processing based on a first preset policy.

In an implementation process, to ensure use of a private function (for example, a private application) each time, face recognition is started each time an operation of starting the private application (or an operation of switching the private application from the background to the foreground) is detected. When the face is recognized as a preset user, private content corresponding to the private application is displayed; or when the face is recognized as a non-preset user, processing is performed based on the first preset policy, where the first preset policy is, for example, returning to a previous-level menu, as shown in FIG. 46. Because the first preset policy has been described above, details are not described herein again. Alternatively, face recognition may be started only when it is detected that the private application is started for the first time, and face recognition does not need to be started again when it is detected that the private application is started again.

In an implementation process, to improve convenience of using the electronic device 100, when it is detected that the private application is started, whether to start the private application may also be determined only based on a result of face change detection. When the face does not change (and the current state is the owner state), the private application is started; or when the face changes, processing is performed based on the first preset policy. Further, whether an unlocking mode used for unlocking the electronic device 100 is face unlocking may be determined. If the unlocking mode is face unlocking, face recognition does not need to be performed when the private application is subsequently started. If the used unlocking mode is not face unlocking, face recognition needs to be performed again when the private application is started subsequently. Alternatively, whether an unlocking mode used for unlocking the electronic device 100 is biometric feature unlocking (for example, face unlocking, fingerprint unlocking, or iris unlocking) may be determined. If the used unlocking mode is not biometric feature unlocking, face recognition needs to be performed when the private application is subsequently started. If the used unlocking mode is biometric feature unlocking, face recognition does not need to be performed when the private application is subsequently started.

For other content, refer to the description of the foregoing related content, and details are not described again.

In an implementation process, the foregoing S4508 may also be performing identity authentication in another identity authentication mode, and the identity authentication mode is, for example, fingerprint authentication, password authentication, nine-grid authentication, or iris authentication. If the identity authentication succeeds, S4509 may be performed, or if the authentication succeeds, S4512 may be performed.

In addition, in absence of conflicts, the foregoing embodiments may also be used in combination.

Another embodiment provides an electronic device 100, configured to perform the privacy protection method for the electronic device 100. The electronic device 100 includes:
  one or more processors;
  a memory;
  a plurality of applications; and
  one or more computer programs, where the one or more computer programs are stored in the memory, the one or more computer programs include instructions, and when the instructions are executed by the electronic device 100, the electronic device 100 is enabled to perform the following steps:
  starting face change detection, where the face change detection is continuously detecting, in a current unlocking period, whether a face in front of a display of the electronic device 100 changes, and the current face in front of the display of the electronic device 100 does not match a reference face;
  after starting the face change detection, detecting an operation of starting a first private application; and
  in response to the operation and determining that a result of the face change detection is that the current face does not change, displaying first private content corresponding to the first private application; or
  in response to the operation and determining that a result of the face change detection is that the current face changes, displaying first non-private content, where the first non-private content does not include first private content.

The electronic device 100 is, for example, the electronic device 100 shown in FIG. 1. The processor 110 is, for example, the processor 110 shown in FIG. 1. The memory 121 is, for example, the internal memory 121 shown in FIG. 1. How the electronic device 100 performs the foregoing steps when the instructions are executed by the electronic device 100 has been described above. Therefore, details are not described herein again.

Optionally, when the instructions are executed by the electronic device 100, the electronic device 100 is further enabled to perform the following steps:
  before starting the face change detection, performing identity authentication on a user in front of the display in response to detecting an operation of starting the first private application for a first time in the current unlocking period; and if the identity authentication succeeds, displaying the first private content corresponding to the first private application; or if the identity authentication fails, displaying the first non-private content, where the first non-private content does not include the first private content;
  the starting face change detection includes: starting the face change detection when the identity authentication succeeds; and
  the displaying first private content corresponding to the first private application in response to the operation and determining that a result of the face change detection is that the current face does not change includes: in response to an operation of starting the first private application again and determining that the result of the face change detection is that the current face does not change, displaying the first private content corresponding to the first private application; or
  the displaying first non-private content in response to the operation and determining that a result of the face change detection is that the current face changes includes: in response to an operation of starting the first private application again and determining that the result of the face change detection is that the current face changes, displaying the first non-private content, where the first non-private content does not include the first private content.

Optionally, the starting face change detection, where the face change detection is continuously detecting, in a current unlocking period, whether a face in front of a display of the electronic device 100 changes includes:
  when the identity authentication succeeds, saving a face captured within a preset time after the identity authentication succeeds as a reference face; and
  continuously capturing a face in front of the display in the current unlocking period and determining whether the currently captured face matches the saved reference face.

Optionally, the displaying first private content corresponding to the first private application in response to the operation and determining that a result of the face change detection is that the current face does not change includes:
  in response to an operation of starting the first private application for a first time in the current unlocking period and determining that the result of the face change detection is that the current face does not change, displaying the first private content corresponding to the first private application; or
  the displaying first non-private content in response to the operation and determining that a result of the face change detection is that the current face changes includes: in response to an operation of starting the first private application for a first time in the current unlocking period and determining that the result of the face change detection is that the current face changes, displaying the first non-private content.

Optionally, before starting the face change detection, the electronic device 100 further includes:
  when the electronic device 100 is in a screen locked state, performing identity authentication on a user of the electronic device 100;
  when the identity authentication succeeds, controlling the electronic device 100 to enter an unlocked state; and
  the starting face change detection includes:
  when the electronic device 100 enters the unlocked state, saving a face within a preset time after the identity authentication succeeds as a reference face; and
  continuously capturing a face in front of the display in the current unlocking period and determining whether the currently captured face matches the saved reference face.

Optionally, the performing identity authentication on a user of the electronic device 100 when the electronic device 100 is in a screen locked state includes:
  when the electronic device 100 is in the screen locked state, capturing an image in front of the display by using a low-power camera 193A;

determining, based on the image in front of the display, whether a face is included; and when the image in front of the display includes the face, capturing the face in front of the display of the electronic device 100 by using a front-facing camera 193B of the electronic device 100, to perform face unlocking, where energy consumption of the low-power camera 193A is lower than that of the front-facing camera 193B; and the continuously detecting whether a face in front of a display of the electronic device 100 changes includes:

when the face unlocking succeeds, continuously capturing a face by using the low-power camera 193A, and determining, by using the face captured by the low-power camera 193A, whether the face in front of the display of the electronic device 100 changes.

Optionally, the performing identity authentication on a user of the electronic device includes:

performing face recognition on a face in front of the display of the electronic device 100;

performing fingerprint authentication on the user of the electronic device 100;

performing password authentication on the user of the electronic device 100; or performing iris authentication on the user of the electronic device 100.

Optionally, the performing face recognition on a face in front of the display of the electronic device 100 includes:

capturing a face in front of the display of the electronic device 100, and determining whether the captured face matches a prestored face of an owner, where the prestored face of the owner is a face input by the owner when a face recognition function is enabled for a first time, and the prestored face of the owner is used as a face recognition reference; and in response to detecting that the captured face successfully matches the prestored face of the owner, determining that the face recognition succeeds; or in response to detecting that the captured face fails to match the prestored face of the owner, determining that the face recognition fails.

Optionally, capturing a face in front of the display of the electronic device 100, and determining whether the captured face matches a prestored face of an owner includes: capturing a face in front of the display by using a front-facing camera 193B of the electronic device 100, and determining whether the captured face matches the prestored face of the owner; and the continuously detecting whether a face in front of a display of the electronic device 100 changes includes: continuously capturing a face in front of the display by using a low-power camera 193A of the electronic device 100, and determining whether a current face captured by the low-power camera 193A matches the saved reference face, where energy consumption of the low-power camera 193A is lower than that of the front-facing camera 193B, and a quantity of saved feature points of the reference face is less than a quantity of feature points of the face of the owner.

Optionally, after displaying the first private content, the electronic device 100 further includes:

when detecting an operation of starting the first private application again and determining that the result of the face change detection is that the current face does not change, displaying second private content corresponding to the first private application; or when detecting an operation of starting the first private application again and determining that the result of the face change detection is that the current face changes, displaying second non-private content, where the second non-private content does not include second private content.

Optionally, when the instructions are executed by the electronic device 100, the electronic device 100 is further enabled to perform the following steps:

when displaying the first private content, if determining that the result of the face change detection is that the current face changes, keeping displaying the first private content; and in response to detecting an operation of starting a second private application, displaying third non-private content; or when displaying the first private content, in response to not detecting any face change but detecting an operation of starting a second private application, displaying third private content corresponding to the second private application, where third non-private content does not include the third non-private content.

Optionally, the continuously detecting whether a face in front of a display of the electronic device 100 changes includes:

continuously capturing an image in front of the display, and determining whether the image includes a face; and when the image includes the face, determining, based on the current face included in the image, whether the face changes.

Optionally, the determining, based on the current face included in the image, whether the face changes when the image includes the face includes:

when the image includes the face, determining whether the current face matches the saved reference face and whether the current face matches a face in a previous frame, where the reference face is a user face captured in a face change detection start stage; and in response to detecting that the current face fails to match the reference face and that the current face fails to match the face in the previous frame, determining that the face changes.

Optionally, the determining, based on the current face included in the image, whether the face changes when the image includes the face includes:

when the image includes the face, determining whether the face matches the saved reference face and whether the face matches a face in a previous frame, where the reference face is a user face captured in a face change detection start stage; and in response to detecting that the face successfully matches the saved reference face or detecting that the face successfully matches the face in the previous frame or detecting that the face successfully matches the saved reference face and that the face successfully matches the face in the previous frame, determining that the face does not change Optionally, the continuously detecting whether a face in front of a display of the electronic device 100 changes includes:

continuously capturing an image in front of the display, and determining whether the image includes a face; and if the image does not include the face, continuing to detect an image in front of the display; when detecting again that the image includes a face, determining whether duration in which no face is detected is longer than preset duration; and if the duration is no longer than the preset duration, matching the current face with a face in a last frame before no face is detected; or if the duration is longer than the preset duration, starting face recognition, to determine whether the current face matches the prestored face of the owner.

Optionally, the determining whether the current face matches the saved reference face includes:
  determining whether the current face changes in terms of a face quantity relative to the reference face; and
  when the face quantity changes, determining that the current face does not match the reference face; or
  when the face quantity does not change, determining whether the current face matches a face feature included in the reference face, and if the face feature is matched, determining that the current face matches the reference face, or if the face feature is not matched, determining that the face does not match the reference face.

Optionally, when the face quantity changes, the method further includes: if the face quantity changes from one face to a plurality of faces, outputting prompt information to prompt the user.

Optionally, the first private content is a home page of the first private application, and the first non-private content is a login interface or an identity authentication interface of the first private application, or a prompt interface used to prompt the user that the user has no permission to use the first private application; or
  the first private content is preset content of a home page of the first private application, and the first non-private content includes content other than the preset content hidden on the home page of the first private application.

Optionally, the starting face change detection, where the face change detection is continuously detecting, in a current unlocking period, whether a face in front of a display of the electronic device 100 changes includes:
  capturing a face of a first user as a reference face in the current unlocking period; and
  matching the captured current face in front of the display with the reference face captured in the current unlocking period, to determine whether the face in front of the display changes.

How the electronic device 100 performs the foregoing steps has been described in the foregoing method part. Therefore, details are not described herein again.

Another embodiment provides an electronic device 100, where the electronic device 100 is configured to perform the privacy protection method for the electronic device 100 described in another embodiment, and the electronic device 100 includes:
  one or more processors;
  a memory;
  a plurality of applications; and
  one or more computer programs, where the one or more computer programs are stored in the memory, the one or more computer programs include instructions, and when the instructions are executed by the electronic device 100, the electronic device 100 is enabled to perform the following steps:
  starting face change detection, where the face change detection is continuously detecting, in a current unlocking period, whether a face in front of a display of the electronic device 100 changes, and the current face in front of the display of the electronic device 100 does not match a reference face;
  displaying a first icon corresponding to a first private picture in a gallery application; and
  in response to determining that a result of the face change detection is that the current face changes, hiding the first icon corresponding to the first private picture.

The electronic device 100 is, for example, the electronic device 100 shown in FIG. 1. The processor 110 is, for example, the processor 110 shown in FIG. 1. The memory 121 is, for example, the internal memory 121 shown in FIG. 1.

Optionally, when the instructions are executed by the electronic device 100, the electronic device 100 is further enabled to perform the following steps:
  in response to detecting an operation of opening a first picture folder including the first private picture and determining that the result of the face change detection is that the current face does not change, displaying the first icon corresponding to the first private picture; or
  in response to detecting an operation of opening a first picture folder including the first private picture and determining that the result of the face change detection is that the current face changes, displaying fourth non-private content, where the fourth non-private content does not include the first icon corresponding to the first private picture.

Optionally, after the displaying fourth non-private content in response to detecting an operation of opening a first picture folder including the first private picture and determining that the result of the face change detection is that the current face changes, the method further includes:
  in response to detecting a preset authorization operation of a user, displaying the first icon corresponding to the first private picture.

Optionally, before the hiding the first icon corresponding to the first private picture in response to determining that a result of the face change detection is that the current face changes, the electronic device 100 further includes:
  in response to detecting an operation of opening the first private picture and determining that the result of the face change detection is that the current face does not change, displaying the first private picture; and
  when displaying the first private picture, in response to detecting an operation of opening a second private picture and determining that the result of the face change detection is that the current face does not change, displaying the second private picture; or
  when displaying the first private picture, in response to an operation of opening a second private picture and determining that the result of the face change detection is that the current face changes, displaying fifth non-private content, where the fifth non-private content is different from the second private picture.

Optionally, the starting face change detection includes:
  detecting an identity authentication operation on a user of the electronic device 100; and
  when the identity authentication succeeds, starting the face change detection.

Optionally, the detecting an identity authentication operation on a user of the electronic device 100 includes: when the electronic device 100 is in a screen locked state, detecting the identity authentication operation; and after the detecting an identity authentication operation on a user of the electronic device 100, the method further includes: if the identity authentication succeeds, the electronic device 100 enters the current unlocked state; or
  the detecting an identity authentication operation on a user of the electronic device 100 includes: when detecting that a first private application is started, detecting the identity authentication operation on the user of the electronic device 100; and after the detecting an identity authentication operation on a user of the electronic device 100, the method further includes: if the identity authentication succeeds, displaying first private content corresponding to the first private application; or if the identity authentication fails, displaying first non-private content, where the first non-private content does not include first private content.

Another embodiment provides an electronic device 100, including:
one or more processors;
a memory;
a plurality of applications; and
one or more computer programs, where the one or more computer programs are stored in the memory, the one or more computer programs include instructions, and when the instructions are executed by the electronic device 100, the electronic device 100 is enabled to perform the following steps: starting face change detection, where the face change detection is continuously detecting, in a current unlocking period, whether a face in front of a display of the electronic device 100 changes, and the current face in front of the display of the electronic device 100 does not match a reference face; and
after starting the face change detection, and when displaying a first display interface:
in response to receiving a new message from a first private application, and a result of the face change detection being that the current face changes, skipping displaying the new message on the first display interface, or displaying only a part of content of the new message on the first display interface; or
in response to receiving a new message from a first private application, and a result of the face change detection being that the current face does not change, displaying the new message on the first display interface.

The electronic device 100 is, for example, the electronic device 100 shown in FIG. 1. The processor 110 is, for example, the processor 110 shown in FIG. 1. The memory 121 is, for example, the internal memory 121 shown in FIG. 1. How the electronic device 100 performs the foregoing steps when the instructions are executed by the electronic device 100 has been described above. Therefore, details are not described herein again.

Another embodiment provides a computer-readable storage medium including instructions, where when the instructions are run on an electronic device 100, the electronic device 100 is enabled to perform the method.

Another embodiment provides a computer program product including instructions, where when the computer program product runs on an electronic device 100, the electronic device 100 is enabled to perform the method.

Another embodiment provides a chip including instructions, where when the chip runs on an electronic device 100, the electronic device 100 is enabled to perform the method.

Another embodiment provides a chip including instructions, where when the chip runs on an electronic device 100, the electronic device 100 is enabled to perform the following method:
starting face change detection, where the face change detection is continuously detecting, in a current unlocking period, whether a face in front of a display of the electronic device 100 changes, and the current face in front of the display of the electronic device 100 does not match a reference face;
after starting the face change detection, detecting an operation of starting a first private application; and
in response to the operation and determining that a result of the face change detection is that the current face does not change, instructing the display to display first private content corresponding to the first private application; or
in response to the operation and determining that a result of the face change detection is that the current face changes, instructing the display to display first non-private content, where the first non-private content does not include first private content.

Another embodiment provides a chip including instructions, where when the chip runs on an electronic device 100, the electronic device 100 is enabled to perform the following method:
starting face change detection, where the face change detection is continuously detecting, in a current unlocking period, whether a face in front of a display of the electronic device 100 changes, and the current face in front of the display of the electronic device 100 does not match a reference face;
instructing the display to display a first icon corresponding to a first private picture in a gallery application; and
in response to determining that a result of the face change detection is that the current face changes, instructing the display to hide the first icon corresponding to the first private picture.

Another embodiment provides a chip including instructions, where when the chip runs on an electronic device 100, the electronic device 100 is enabled to perform the following method:
starting face change detection, where the face change detection is continuously detecting, in a current unlocking period, whether a face in front of a display of the electronic device 100 changes, and the current face in front of the display of the electronic device 100 does not match a reference face; and
after starting the face change detection, instructing the display to display a first display interface:
in response to receiving a new message from a first private application, and a result of the face change detection being that the current face changes, instructing the display to skip displaying the new message on the first display interface, or display only a part of content of the new message on the first display interface; or
in response to receiving a new message from a first private application, and a result of the face change detection being that the current face does not change, instructing the display to display the new message on the first display interface.

It may be understood that, to implement the foregoing functions, the terminal includes a corresponding hardware structure and/or software module for executing the functions. A person of ordinary skill in the art should easily be aware that, in combination with the examples described in the embodiments, units, algorithms, and steps may be implemented by hardware or a combination of hardware and computer software. Whether a function is performed by hardware or hardware driven by computer software depends on constraints of the solutions. A person skilled in the art may use different methods to implement the described functions, but it should not be considered that the implementation goes beyond the scope.

Function module division may be performed on the foregoing electronic device 100 and the like based on the foregoing method examples. For example, the function modules may be obtained through division based on to the corresponding functions, or two or more functions may be integrated into one processing module. The integrated module may be implemented in a form of hardware or may be implemented in a form of a software function module. It should be noted that, in the embodiments, module division is an example, and is merely logical function division. During actual implementation, another division manner may be used. Descriptions are provided below by using an example in which function modules are obtained through division based on corresponding functions.

All or some of the foregoing methods may be implemented through software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or functions are generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

A person of ordinary skill in the art may be aware that, in combination with the examples described in the embodiments, units and algorithm steps can be implemented by electronic hardware or a combination of computer software and electronic hardware. Whether the functions are performed by hardware or software depends on particular constraints of the solutions. A person skilled in the art may use a different method to implement the described functions, but it should not be considered that the implementation goes beyond the scope.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments, it should be understood that the disclosed systems, apparatuses, and methods may be implemented in other manners. For example, the described apparatus embodiment is merely an example. For example, division into the units is merely logical function division. During actual implementation, another division manner may be used. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions in the embodiments.

In addition, function units may be integrated into one processing unit, or each of the units may exist alone physically, or two or more units may be integrated into one unit.

The foregoing descriptions are merely implementations, but are not intended to limit the protection scope. Any variation or replacement that can be readily figured out by a person skilled in the art within the scope disclosed in the embodiments shall fall within the protection scope of the embodiments.

What is claimed is:

1. A privacy protection method for an electronic device, the electronic device having a camera positioned to perform face change detection in a predetermined area in front of the display of the electronic device, the method comprising:
   with the camera, starting the face change detection, wherein the face change detection is continuously detecting, in a current unlocking period, whether a face in front of a display of the electronic device changes by performing a plurality of detection attempts at least a predetermined frequency, and the change of the face in front of the display of the electronic device is specifically that the current face in front of the display of the electronic device does not match a reference face; and
   after starting the face change detection, and when displaying a first display interface:
   in response to receiving a new message from a first private application and a result of the face change detection being that the current face changes, displaying only a part of content of the new message on the first display interface, wherein the first private application contains a browser, a payment software, a chat software, or a social software; and
   after displaying only the part of the content of the new message, continuing to acquire a result of the face change detection, and in response to a result of the face change detection being that the current face does not change, displaying all content of the new message on the first display interface.

2. The privacy protection method of claim 1, wherein the part of the content of the new message does not contain a sender of the message or private content included in the new message.

3. The privacy protection method of claim 1, wherein the result of the face change detection is that the current face changes contain a quantity of faces changes.

4. The privacy protection method of claim 1, wherein the result of the face change detection is that the current face switches from an authorized user to an unauthorized user and then switches back to the authorized user.

5. The privacy protection method of claim 1, further comprising:
   in response to a preset operation in the first display interface, displaying all content of the new message.

6. The privacy protection method of claim 1, wherein the first display interface contains a minus one screen or a home screen.

7. The privacy protection method of claim 1, wherein receiving the new message from the first private application further comprises:
  determining whether the new message is a message of the first private application.

8. The privacy protection method of claim 7, further comprising:
  displaying all content of the new message when the new message is not the message of the first private application.

9. An electronic device, comprising:
  one or more processors;
  a memory;
  a plurality of applications;
  a display, and a camera positioned to perform face change detection in a predetermined area in front of the display; and
  one or more computer programs, wherein the one or more computer programs are stored in the memory, the one or more computer programs comprise instructions, and when the instructions are executed by the electronic device, the electronic device is enabled to perform the following steps:
  with the camera, starting the face change detection, wherein the face change detection is continuously detecting, in a current unlocking period, whether a face in front of the display of the electronic device changes by performing a plurality of detection attempts at least a predetermined frequency, and the change of the face in front of the display of the electronic device is specifically that the current face in front of the display of the electronic device does not match a reference face; and
  after starting the face change detection, and when displaying a first display interface:
  in response to receiving a new message from a first private application and a result of the face change detection being that the current face changes, displaying only a part of content of the new message on the first display interface, wherein the first private application contains a browser, a payment software, a chat software, or a social software; and
  after displaying only the part of the content of the new message, continuing to acquire a result of the face change detection, and in response to a result of the face change detection being that the current face does not change, displaying all content of the new message on the first display interface.

10. The electronic device of claim 9, wherein the part of the content of the new message does not contain a sender of the message or private content included in the new message.

11. The electronic device of claim 9, wherein the result of the face change detection is that the current face changes contain a quantity of faces changes.

12. The electronic device of claim 9, wherein the result of the face change detection is that the current face switches from an authorized user to an unauthorized user and then switches back to the authorized user.

13. The electronic device of claim 9, wherein the electronic device is further enabled to display all content of the new message in response to a preset operation in the first display interface.

14. The electronic device of claim 9, wherein the first display interface contains a minus one screen or a home screen.

15. The electronic device of claim 9, wherein receiving the new message from the first private application further comprises:
  determining whether the new message is a message of the first private application.

16. The electronic device of claim 15, wherein the electronic device is further enabled to perform:
  displaying all content of the new message when the new message is not the message of the first private application.

17. The electronic device of claim 9, wherein the first private application contains a browser, a payment software, a chat software, or a social software.

18. A non-transitory computer-readable storage medium, comprising instructions, wherein when the instructions are run on an electronic device having a camera positioned to perform face change detection in a predetermined area in front of a display of the electronic device, the electronic device is enabled to perform a method comprising:
  with the camera, starting face change detection, wherein the face change detection is continuously detecting, in a current unlocking period, whether a face in front of the display of the electronic device changes by performing a plurality of detection attempts at least a predetermined frequency, and the change of the face in front of the display of the electronic device is specifically that the current face in front of the display of the electronic device does not match a reference face; and
  after starting the face change detection, and when displaying a first display interface:
  in response to receiving a new message from a first private application and a result of the face change detection being that the current face changes, displaying only a part of content of the new message on the first display interface, wherein the first private application contains a browser, a payment software, a chat software, or a social software; and
  after displaying only the part of the content of the new message, continuing to acquire a result of the face change detection, and in response to a result of the face change detection being that the current face does not change, displaying all content of the new message on the first display interface.

* * * * *